United States Patent
Alward et al.

(10) Patent No.: US 7,550,117 B2
(45) Date of Patent: *Jun. 23, 2009

(54) NONWOVEN COMPOSITES AND RELATED PRODUCTS AND PROCESSES

(75) Inventors: Gordon S. Alward, Palm Desert, CA (US); Robert A. DiChiara, Jr., Carlsbad, CA (US)

(73) Assignee: GEO2 Technologies, Inc., Woburn, MA (US)

( * ) Notice: Subject to any disclaimer, the term of this patent is extended or adjusted under 35 U.S.C. 154(b) by 377 days.

This patent is subject to a terminal disclaimer.

(21) Appl. No.: 10/833,298

(22) Filed: Apr. 28, 2004

(65) Prior Publication Data

US 2005/0042151 A1 Feb. 24, 2005

Related U.S. Application Data

(63) Continuation-in-part of application No. 10/281,179, filed on Oct. 28, 2002, now Pat. No. 6,946,013.

(51) Int. Cl.
*B01D 50/00* (2006.01)
(52) U.S. Cl. ...................... 422/177; 422/180
(58) Field of Classification Search .......... 422/168, 422/180; 55/486; 428/285
See application file for complete search history.

(56) References Cited

U.S. PATENT DOCUMENTS

| | | | |
|---|---|---|---|
| 3,090,094 A | 5/1963 | Schwartzwalder et al. | 25/156 |
| 3,311,481 A | 3/1967 | Sterry et al. | 106/57 |
| 3,549,473 A | 12/1970 | Le BLanc et al. | |
| 3,788,935 A | 1/1974 | Shyne et al. | 161/141 |
| 3,795,524 A | 3/1974 | Sowman | 106/65 |

(Continued)

FOREIGN PATENT DOCUMENTS

EP 0358522 3/1990

(Continued)

OTHER PUBLICATIONS

Graves, Ronald L., "Review of Diesel Exhaust Aftertreatment Programs," *SAE Technical Paper Series*, No. 1999-01-2245, Government/Industry Meeting, Washington, D.C., Apr. 26-28, 1999, pp. 1-4 (Society of Automotive Engineers, Inc.).

(Continued)

*Primary Examiner*—Tom Duong

(57) ABSTRACT

The present invention in certain embodiments is directed to a catalytic substrate suitable for use in a number of applications, including as a substrate in a catalytic converter or a particulate filter. Another aspect of the present invention is a filtering substrate suitable for use in a number of applications, including as a substrate in a particulate filter, such as a diesel particulate filter (DPF), or diesel particulate trap (DPT). The invention also provides an improved substrate for removing and/or eliminating pollutants from the exhaust of combustion engines. The catalytic substrate and filtering substrate provide, in certain embodiments, improvements in removing pollutants from an exhaust gas. The improvements include one or more of the following: faster light-off period, depth filtration of PM, less backpressure, lower probability of clogging, ability to be placed in multiple locations in the exhaust system including the manifold or the head itself, high probability of catalytic reaction, high conversion ratios of NOx, HC, and CO, a faster burnoff of PM, minimization of catalyst material use, and the like.

77 Claims, 54 Drawing Sheets

U.S. PATENT DOCUMENTS

| | | | |
|---|---|---|---|
| 3,929,671 A | 12/1975 | Nakamura et al. | |
| 3,935,060 A | 1/1976 | Blome et al. | 162/152 |
| 3,952,083 A | 4/1976 | Fletcher et al. | 264/63 |
| 3,953,646 A | 4/1976 | Fletcher et al. | 428/332 |
| 3,956,185 A | 5/1976 | Yagi et al. | |
| 4,041,199 A | 8/1977 | Cartwright | 428/36 |
| 4,047,965 A | 9/1977 | Karst et al. | |
| 4,148,962 A | 4/1979 | Frosch et al. | 428/366 |
| 4,195,063 A | 3/1980 | Iwaoka et al. | |
| 4,338,368 A | 7/1982 | Lovelace et al. | 428/212 |
| 4,348,362 A | 9/1982 | Foss | 422/171 |
| 4,415,342 A | 11/1983 | Foss | 95/107 |
| 4,423,090 A * | 12/1983 | Hammond et al. | 427/181 |
| 4,457,895 A | 7/1984 | Prigent | |
| 4,529,718 A | 7/1985 | Dupin | |
| 4,686,128 A | 8/1987 | Gentilman | |
| 4,722,920 A | 2/1988 | Kimura et al. | |
| 4,732,879 A | 3/1988 | Kalinowski et al. | |
| 4,737,326 A | 4/1988 | Wirth et al. | 264/87 |
| 4,749,671 A | 6/1988 | Saito et al. | |
| 4,847,506 A | 7/1989 | Archer | 250/515.1 |
| 4,894,070 A | 1/1990 | Keidel et al. | 55/96 |
| 4,928,645 A | 5/1990 | Berneburg et al. | 123/188.3 |
| 4,929,429 A | 5/1990 | Merry | 422/179 |
| 4,942,020 A | 7/1990 | Whittenberger et al. | |
| 4,970,035 A | 11/1990 | Baarsch | 264/628 |
| 4,976,760 A | 12/1990 | Helferich et al. | 55/523 |
| 4,988,290 A | 1/1991 | Forster et al. | 432/103 |
| 5,028,397 A | 7/1991 | Merry | 422/179 |
| 5,053,062 A | 10/1991 | Barris et al. | 55/523 |
| 5,066,432 A | 11/1991 | Gabathuler et al. | 264/44 |
| 5,079,082 A | 1/1992 | Leiser et al. | |
| 5,100,632 A | 3/1992 | Dettling et al. | |
| 5,102,639 A | 4/1992 | Chou et al. | |
| 5,154,901 A | 10/1992 | Yoshida et al. | 423/215.5 |
| 5,171,341 A | 12/1992 | Merry | 55/484 |
| 5,174,969 A | 12/1992 | Fischer et al. | 422/180 |
| 5,180,409 A | 1/1993 | Fischer | 55/486 |
| 5,182,249 A | 1/1993 | Wang et al. | |
| 5,196,120 A | 3/1993 | White | 210/504 |
| 5,244,852 A | 9/1993 | Lachman et al. | 502/66 |
| 5,248,481 A | 9/1993 | Bloom et al. | 55/523 |
| 5,248,482 A | 9/1993 | Bloom | 422/174 |
| 5,258,164 A | 11/1993 | Bloom et al. | 422/174 |
| 5,260,125 A * | 11/1993 | Copes | 442/72 |
| 5,262,129 A | 11/1993 | Terada et al. | 422/122 |
| 5,272,125 A | 12/1993 | Weible et al. | 502/242 |
| 5,279,737 A | 1/1994 | Sekhar et al. | 210/490 |
| 5,294,409 A | 3/1994 | Cohen et al. | 422/169 |
| 5,296,288 A | 3/1994 | Kourtides et al. | |
| 5,298,046 A * | 3/1994 | Peisert | 55/486 |
| 5,378,142 A | 1/1995 | Kennelly et al. | |
| 5,409,669 A | 4/1995 | Smith et al. | 422/174 |
| 5,429,780 A | 7/1995 | Prin et al. | 264/625 |
| 5,449,654 A | 9/1995 | Prin et al. | 55/523 |
| 5,451,444 A | 9/1995 | DeLiso et al. | 428/116 |
| 5,453,116 A | 9/1995 | Fischer et al. | 95/278 |
| 5,482,538 A | 1/1996 | Becker et al. | 95/12 |
| 5,540,981 A | 7/1996 | Gallagher et al. | |
| 5,552,360 A | 9/1996 | Farrauto et al. | |
| 5,611,832 A | 3/1997 | Suzuki et al. | |
| 5,629,186 A | 5/1997 | Yasukawa et al. | 435/177 |
| 5,656,048 A | 8/1997 | Smith et al. | 55/282 |
| 5,670,443 A | 9/1997 | Irite et al. | |
| 5,687,787 A | 11/1997 | Atmur et al. | 164/98 |
| 5,692,373 A | 12/1997 | Atmur et al. | 60/274 |
| 5,702,494 A | 12/1997 | Tompkins et al. | 55/498 |
| 5,702,761 A | 12/1997 | DiChiara et al. | |
| 5,723,403 A | 3/1998 | Durand et al. | |
| 5,750,026 A | 5/1998 | Gadkaree et al. | 55/523 |
| 5,766,458 A | 6/1998 | Sekhar et al. | 55/523 |
| 5,783,515 A | 7/1998 | Sakurai et al. | 502/207 |
| 5,795,456 A | 8/1998 | Friedman et al. | |
| 5,830,250 A | 11/1998 | Shirk et al. | 55/498 |
| 5,853,684 A | 12/1998 | Fang et al. | 423/244.1 |
| 5,856,263 A | 1/1999 | Bhasin et al. | |
| 5,879,640 A | 3/1999 | Atmur et al. | 422/180 |
| 5,928,775 A | 7/1999 | DiChiara et al. | |
| 5,983,631 A | 11/1999 | Mineo | |
| 5,989,476 A | 11/1999 | Lockard et al. | 264/628 |
| 6,013,599 A | 1/2000 | Manson | 502/340 |
| 6,090,744 A | 7/2000 | Koda et al. | |
| 6,166,283 A | 12/2000 | Bharadwaj et al. | 585/658 |
| 6,248,689 B1 | 6/2001 | Manson | 502/340 |
| 6,341,662 B1 | 1/2002 | Karlsson | |
| 6,365,092 B1 | 4/2002 | Backa et al. | 264/628 |
| 6,444,006 B1 | 9/2002 | Haberkamp et al. | 55/521 |
| 6,444,271 B2 | 9/2002 | Wittenauer et al. | 427/376.2 |
| 6,531,078 B2 | 3/2003 | Laine et al. | 264/87 |
| 6,576,200 B1 | 6/2003 | Yamamoto et al. | |
| 6,604,604 B1 | 8/2003 | Badeau et al. | |
| 6,605,259 B1 | 8/2003 | Henry | |
| 6,613,255 B2 | 9/2003 | DiChiara | |
| 6,622,482 B2 | 9/2003 | Knight et al. | |
| 6,660,115 B2 | 12/2003 | Butler et al. | 156/89.11 |
| 6,667,012 B1 | 12/2003 | Anand et al. | |
| 6,673,414 B2 | 1/2004 | Ketcham et al. | |
| 6,682,706 B1 | 1/2004 | Yamamoto et al. | |
| 6,685,889 B1 | 2/2004 | Raftery et al. | |
| 6,692,712 B1 | 2/2004 | Andersen | |
| 6,916,450 B2 * | 7/2005 | Akama et al. | 422/180 |
| 2001/0051218 A1 * | 12/2001 | Wittenauer et al. | 427/376.2 |
| 2003/0165638 A1 | 9/2003 | Louks et al. | 427/600 |

FOREIGN PATENT DOCUMENTS

| | | |
|---|---|---|
| EP | 0678128 B1 | 9/1996 |
| EP | 0687805 | 5/1998 |
| EP | 0473715 B1 | 8/1998 |
| EP | 0884459 A2 | 12/1998 |
| EP | 0800420 B1 | 10/2002 |
| EP | 0912820 B1 | 8/2003 |
| GB | 2208207 | 3/1989 |
| WO | WO 03/004438 | 1/2003 |
| WO | WO 2004/018079 | 3/2004 |

OTHER PUBLICATIONS

Harkonen, M. et al., "Advanced Metallic Three-Way Catalyst with Optimized Washcoat Performance," *SAE Technical Paper Series*, No. 960560, International Congress & Exposition, Detroit, MI, Feb. 26-29, 1996, pp. 167-175 (Society of Automotive Engineers, Inc.).

Ichikawa, S., et al., "Material Development of High Porous SiC for Catalyzed Diesel Particulate Filters," *SAE Technical Paper Series*, No. 2003-01-0380, 2003 SAE World Congress, Detroit, MI, Mar. 3-6, 2003 (Society of Automotive Engineers, Inc.).

Merkel, G.A., et al, "Thermal Durability of Wall-Flow Ceramic Diesel Particulate Filters," *SAE Technical Paper Series*, No. 2001-01-0190, SAE 2001 World Congress, Detroit, MI, Mar. 5-8, 2001, pp. 1-16 (Society of Automotive Engineers, Inc.).

Miwa, S., et al., "Diesel Particulate Filters Made of Newly Development SiC," *SAE Technical Paper Series*, No. 2001-01-0192, SAE 2001 World Congress, Detroit MI, Mar. 5-8, 2001, pp. 1-6 (Society of Automotive Engineers, Inc.).

Cutler, W.A., and Merkel, G.A., "A New High Temperature Ceramic Material for Diesel Particulate Filter Applications," *SAE Technical Paper Series*, No. 2000-01-2844, International Fall Fuels and Lubricants Meeting and Exposition, Baltimore, MD, Oct. 16-19, 2000 (Society of Automotive Engineers, Inc.).

Ohno, K., et al., "Characterization of SiC-DPF for Passenger Car," *SAE Technical Paper Series*, No. 2000-01-0185, SAE World Congress, Detroit, MI, Mar. 6-9, 2000, pp. 1-14 (Society of Automotive Engineers, Inc.).

Jatkar, A.D., "A New Catalyst Support Structure for Automotive Catalytic Converters," *SAE Technical Paper Series*, No. 971032, International Congress & Exposition, Detroit, MI, Feb. 24-27, 1997, pp. 149-186 (Society of Automotive Engineers, Inc.).

Held, W., et al., "Catalytic NOx Reduction in Net Oxidizing Exhaust Gas," *SAE Technical Paper Series*, No. 900496, International Congress and Exposition, Detroit, MI, Feb. 26-Mar. 2, 1990, pp. 13-20 (Society of Automotive Engineers, Inc.).

Pelters, et al., "The Development and Application of A Metal Supported Catalyst for Porsche's 911 Carrera 4," *SAE Technical Paper Series*, No. 890488, International Congress and Exposition, Detroit, MI, Feb. 27-Mar. 3, 1989 (Society of Automotive Engineers, Inc.).

Cutler, W.A., and Day, J.P., "Mechanical Durability of Cordierite-Based NOx Adsorber/Catalyst Systems for Lean Burn Gasoline Applications," *SAE Technical Paper Series*, No. 199-01-3500, International Fall Fuels and Lubricants Meeting and Exposition, Toronto, Ontario, Canada, Oct. 25-28, 1999, pp. 1-9 (Society of Automotive Engineers, Inc.).

Rajadurai, S., et al., "Single Seam Stuffed Converter Design for Thinwall Substrates," *SAE Technical Paper Series*, No. 1999-01-3628, International Fall Fuels and Lubricants Meeting and Exposition, Toronto, Ontario, Canada, Oct. 25-28, 1999, pp. 1-8 (Society of Automotive Engineers, Inc.).

Plaintiff's Complaint for Case No. GIN033511, filed in Superior Court of the State of California for the County of San Diego, Oct. 31, 2003.

Defendant's Answer for Case No. GIN033511, filed in Superior Court of the State of California for the County of San Diego.

Yuuki, K et al., "The Effect of SiC Properties on the Performance of Catalyzed Diesel Particulate Filter (DPF)", *SAE Technical Paper Series*, No. 2003-01-0383, 2003 SAE World Congress, Mar. 3-6, 2003,1-11.

Eisenstock, Gregory et al., "Evaluation of SoftMount(SM) Technology for Use in Packaging Ultra Thinwall Ceramic Substrates", *SAE Technical Paper Series*, No. 2002—1-1097, SAE 2002 World Congress, Mar. 4-7, 2002,1-11.

Olson, J "Diesel Emission Control Devices—Design Factors Affecting Mounting Mat Selection", *SAE Technical Paper Series*, No. 2004-02-01-1420, 2004 SAE World Congress, Mar. 8-11, 2004,1-8.

Fong, Z "The Assembly Deformation and Pressure of Stuffed Catalytic Converter Accounting for the Hysteresis Behavior of Pressure vs Density Curve of the Intumescent Mat", *SAE Technical Paper Series*, No. 2000-01-0223, SAE 2000 World Congress, Mar. 6-9, 2000, 1-7.

\* cited by examiner

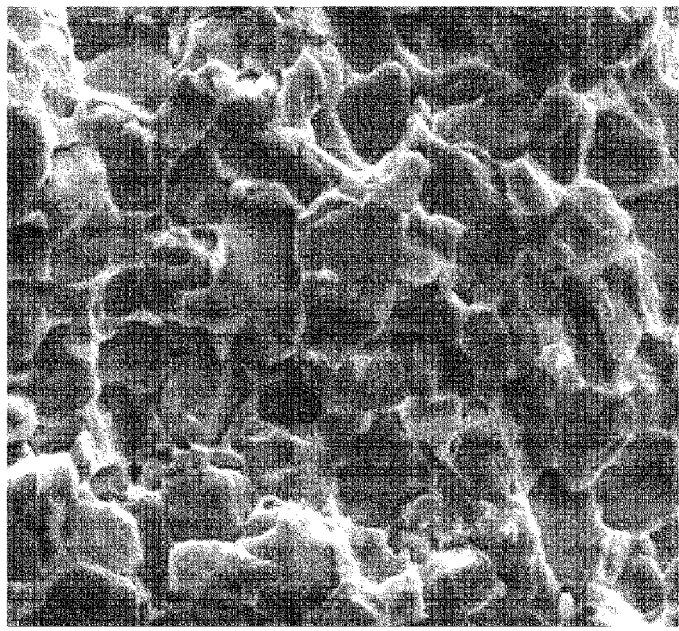
200
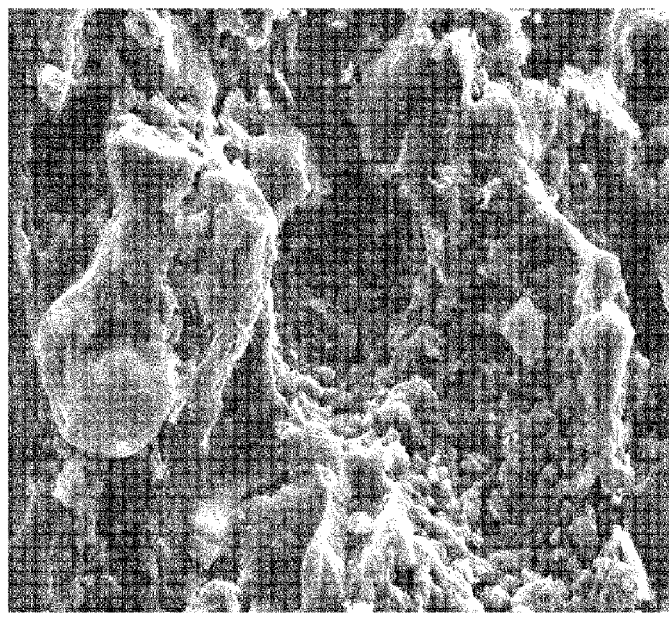
201
FIG. 2a
PRIOR ART

300

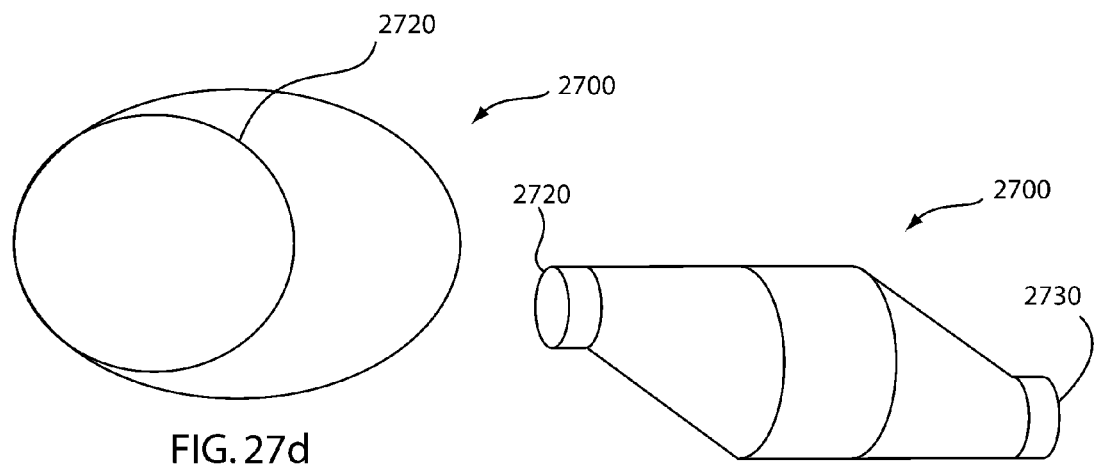
FIG. 27d
FIG. 27c
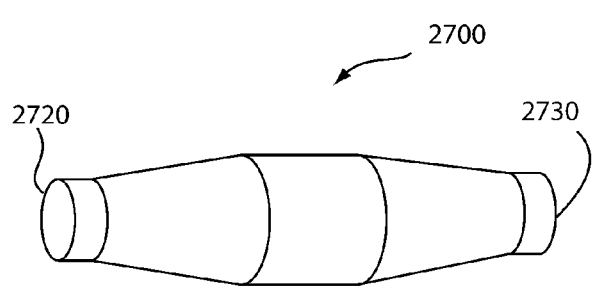
FIG. 27b
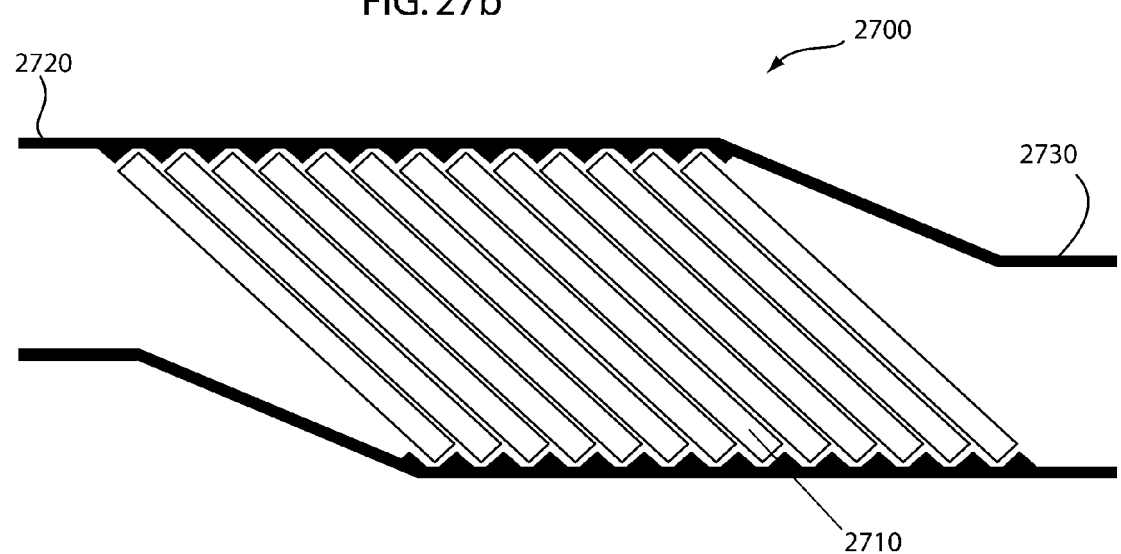
FIG. 27a

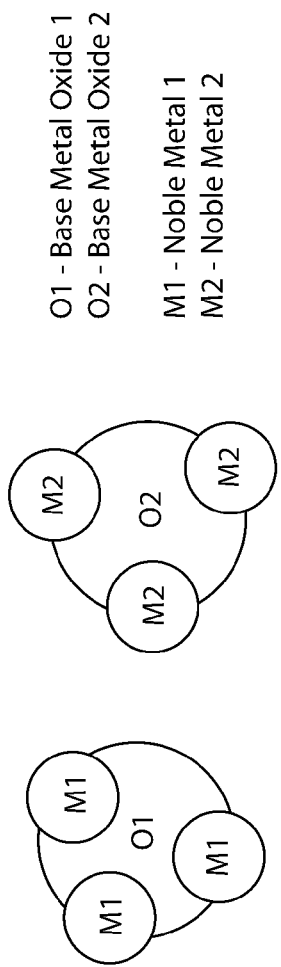

Example wash-coatings

O1 - Base Metal Oxide 1
O2 - Base Metal Oxide 2

M1 - Noble Metal 1
M2 - Noble Metal 2

| | | | | |
|---|---|---|---|---|
| Name | Aluminum Oxide | | Name | Zirconium dioxide |
| Formula | Al₂O₃ | | Formula | ZrO₂ |
| Formula Weight | 101.94 | | Formula Weight | 123.22 |
| Appearance | White powder | | Suppliers | Magnesium Elektron, Rhodia |
| Density | 4 g/cc | | | |
| Melting Point | 1999 to 2032°C | | Name | Titanium dioxide |
| Suppliers | LaRoche, Condea-Vista, Alcoa, W.R. Grace | | Formula | TiO₂ |
| | | | Formula Weight | 79.9 |
| Name | Zeolites, molecular sieves | | Density | 3.84 g/cc (anatase) 4.26 g/cc (rutile) |
| Formula | xSiO₂ · yAl₂O₃ | | | |
| Suppliers | GSA, UOP, Degussa, Zeolyst, Zeochem | | | |

| | |
|---|---|
| Name | Silicon dioxide |
| Formula | SiO₂ |
| Formula Weight | 60.06 |
| Appearance | White powder |
| | |
| Name | Cerium dioxide, ceric oxide |
| Formula | CeO₂ |
| Formula Weight | 172.1 |
| Appearance | light-brown to pale-yellow powder |
| Density | 7.28 g/cc |
| Melting Point | ~2500°C |
| Suppliers | Rhodia, Molycorp, W.R. Grace |

FIG. 41

NONWOVEN COMPOSITES AND RELATED PRODUCTS AND PROCESSES

CROSS-REFERENCE TO RELATED APPLICATIONS

This application is a continuation-in-part of U.S. patent application Ser. No. 10/281,179, filed Oct. 28, 2002, which is herein incorporated by reference in its entirety.

This application includes material which is subject to copyright protection. The copyright owner has no objection to the facsimile reproduction of the patent disclosure, as it appears in the United States Patent and Trademark Office files or records, but otherwise reserves all rights.

BACKGROUND OF THE INVENTION

Field of the Invention

This invention relates to substrates useful for catalyzing particular reactions and for filtering particulate matter, and to embodiments related thereto, such as but not limited to the treatment of emissions from internal combustion engines, and more specifically to catalyst/substrate combinations useful in emissions control and related processes and to related products and methods of manufacture. It is believed that embodiments of the invention described herein materially enhances the quality of the environment of mankind by contributing to the restoration or maintenance of one or more basic life-sustaining natural elements, including air, water, and/or soil. The invention and embodiments thereof are more fully described below in the Brief Summary of the Invention and Detailed Description sections.

Exhaust, Industry, and Pollution

Engines produce much of the power and mechanical work used across the globe. The internal combustion engine is perhaps the most widespread device, as it is more efficient than an external combustion engine, such as those that existed on old-fashioned trains and steamboats. With internal combustion engines, combustion of the fuel takes place internally. Such engines produce motion and power used for any number of purposes. Examples include motor vehicles, locomotives, marine applications, recreational vehicles, tractors, construction equipment, generators, power plants, manufacturing facilities, and industrial equipment. Fuels used to power internal combustion engines include, but are not limited to gasoline, compressed gas, diesel, ethanol, and vegetable oil. Inherent inefficiencies in engine mechanics and the fuels used to power the them result in emissions of various pollutants. Thus, while they are a great innovation and convenience, the millions of engines used throughout the world today represent a substantial source of air pollution.

There are two main types of pollutants produced by internal combustion engines: particulate and nonparticulate. Particulate pollution is generally small solids and liquid particles. Examples include carbonaceous soot and ash, dust, and other related particles. Nonparticulate pollutants include gases and small molecules, such as carbon monoxide, nitrogen oxides, sulfur oxides, unburned hydrocarbons, and volatile organic compounds. Particulate pollutants can be filtered from the exhaust and, in certain situations, further burned off. Nonparticulate pollutants are converted to nonpollutants. Both kinds of pollutants can also be produced from non-engine sources, such as "off-gas" chemical reactions and evaporative emissions.

Air pollution can cause serious health problems for people and the environment. Ground-level ozone and airborne particles are the two pollutants that pose one of the greatest threats to human health in this country. Ozone ($O_3$), can irritate the respiratory system, causing coughing, irritation in the throat, and/or a burning sensation in the respiratory airways. Ozone contributes to the formation of smog. Ozone can also reduce lung function, causing feelings of chest tightness, wheezing and shortness of breath, and can aggravate asthma. Particle pollution, is composed of microscopic solids or liquid droplets that are small enough to get deep into the lungs and cause serious health problems. When exposed to these small particles, people may experience nose and throat irritation, lung damage and bronchitis, and can increase their risk of heart or lung disease. Short-term effects of air pollutants include irritation to the eyes, nose, and throat. Upper respiratory infections such as bronchitis and pneumonia may also result. Other symptoms can include headaches, nausea, and allergic reactions. Long-term health effects can include chronic respiratory disease, lung cancer, heart disease, and even damage to the brain, nerves, liver, or kidneys. Continual exposure to air pollution affects the lungs of growing children and may aggravate or complicate medical conditions in the elderly.

Medical conditions arising from air pollution can be very expensive. Healthcare costs, lost productivity in the workplace, and human welfare impacts cost billions of dollars each year. Understanding the health effects of pollution and finding means to ameliorate, prevent, or eliminate pollution would not only enhance the overall respiratory health of the population but would also decrease the substantial burden and cost borne by the healthcare system.

For all of these reasons, governments, environmental agencies, and various industries have committed to reducing the level of air pollution emitted from various sources. Government agencies are the principal bodies setting emissions standards and implementing regulations. In the European Union (EU), regulations stem from European Community legislation; individual countries enforce the regulations. For instance, most EU states have taxes on sources that produce excessive air pollution. A recent development was the Kyoto Protocol, which called for worldwide reductions in greenhouse gases. Many nations, including the EU, ratified the protocol. The EU, Japan, and U.S. have enacted some of the most stringent standards worldwide, but many other countries, including Argentina, Brazil, Mexico, Korea, Thailand, India, Singapore, and Australia, have all enacted regulations on air pollution. In the U.S., there are many different groups that affect regulations in certain geographies, such as: state environmental agencies (e.g., California Air Resources Board (CARB)), national parks, forest agencies, and the Mine Safety and Health Administration. Some states and metropolitan areas that have failed national ambient air quality standards (NAAQS) have been designated as "non-attainment areas" and implement standards of their own. CARB has historically been one of the strictest agencies regulating air pollution in the U.S.. The chief U.S. regulatory agency, however, is the Environmental Protection Agency (EPA). It was created by the Nixon administration in the 1970 amendments to the Clean Air Act (CAA) of 1963. The Clean Air Act is the comprehensive Federal law that regulates air emissions from area, stationary, and mobile sources. (See, e.g., 42 U.S.C. SS 7401 et seq. (1970) of the Clean Air Act). The Clean Air Act has had five major amendments, the most recent of which was in 1990. The 1990 amendments to the Clean Air Act in large part were intended to meet unaddressed or insufficiently addressed problems such as acid rain, ground-level ozone, stratospheric ozone depletion, and air toxics. These amendments required the EPA to issue 175 new regulations, including automotive emissions, gasoline reformation, uses of ozone depleting chemicals, etc.

Following the Clean Air Act legislation, the EPA set regulations for pollutants that are or could be harmful to people. This set of "criteria pollutants" includes: (1) ozone ($O_3$); (2) lead (Pb); (3) nitrogen dioxide ($NO_2$); (4) carbon monoxide (CO); (5) particulate matter (PM); and (6) sulfur dioxide ($SO_2$). Each criteria pollutant is described in turn.

Ground-level ozone (a primary constituent of smog) continues to be a pollution problem in the U.S. Ozone is not emitted directly into the air but is formed by the reaction of volatile organic compounds (VOCs) or reactive organic gases (ROGs) and nitrogen oxides (NOx) in the presence of heat and sunlight. VOCs/ROGs are emitted from a various sources including burning fuels, and from solvents, petroleum processing, and pesticides, which come from sources such as motor vehicles, chemical plants, refineries, factories, consumer and commercial products, and other industrial sources. Nitrogen oxides are emitted from motor vehicles, power plants, and other sources of combustion. Ozone and the precursor pollutants that cause ozone also can be carried miles from their original sources by wind. In 1997, the EPA revised the national ambient air quality standards for ozone by replacing the 1-hour ozone 0.12 parts per million (ppm) standard with a new 8-hour 0.08 ppm standard.

Nitrogen dioxide ($NO_2$) is a reactive gas that can be formed by the oxidation of nitric oxide (NO). Nitrogen oxides (NOx), the term used to describe NO, $NO_2$, and other oxides of nitrogen, play a major role in the formation of ozone and smog. The major sources of man-made NOx emissions include high-temperature combustion processes, such as those occurring in automobiles, heavy construction equipment, and power plants. Home heaters and gas stoves also produce substantial amounts of $NO_2$.

Carbon monoxide (CO) is a colorless, odorless, and poisonous gas that can be formed by incomplete combustion of carbon in fuels. Motor vehicle exhaust contributes about 60% of CO emissions in the U.S. In cities, as much as 95% of CO emissions may come from automobile exhaust. Other sources of CO emissions include industrial processes, non-transportation fuel combustion, and natural sources such as wildfires.

Particulate matter (PM) is a term used for a mixture of solid particles and liquid droplets found in the air. Some particles are large or dark enough to be seen as soot or smoke. Others are so small they can be detected only with an electron microscope. These particles, which come in a wide range of sizes ("fine" particles are less than 2.5 micrometers in diameter and coarser particles are larger than 2.5 micrometers), originate from many different stationary and mobile sources as well as from natural sources. Fine particles (PM-2.5) result from fuel combustion from motor vehicles, power generation, and industrial facilities, as well as from residential fireplaces and wood stoves. Coarse particles (PM-10) are generally emitted from sources such as vehicles traveling on unpaved roads, materials handling equipment, and crushing and grinding operations, as well as windblown dust. Some particles are emitted directly from their sources, such as smokestacks and cars. In other cases, gases such as sulfur oxide, $SO_2$, NOx, and VOC interact with other compounds in the air to form fine particles. Their chemical and physical compositions vary depending on location, time of year, and weather. In 1997, the EPA added two new PM-2.5 standards, set at 15 micrograms per cubic meter ($\mu GA$) and 65 $\mu g/m^3$, respectively, for the annual and 24-hour standards.

Sulfur dioxide can be formed when fuel containing sulfur (such as coal and oil) is burned, for example, during metal smelting and other industrial processes.

The last criteria pollutant, lead, was historically produced from use of leaded fuel in automobiles. As a result of regulatory efforts to reduce the content of Pb in gasoline, the contribution from the transportation sector has declined over the past decade. Today, metals processing is the major source of Pb emissions to the atmosphere.

The Clean Air Act requires to EPA and states to develop plans to meet national ambient air quality standards for these six criteria pollutants. Outside of the six is a separate list of 188 "toxic air pollutants." Examples of toxic air pollutants include benzene, found in gasoline; perchloroethylene, emitted from some dry cleaning facilities; and methylene chloride, used as a solvent and paint stripper by a number of industries. Some air toxics are released from natural sources, but most originate from anthropogenic sources, including both mobile sources (e.g., cars, trucks, and buses) and stationary sources (e.g., factories, refineries, and power plants). The CAA required the EPA to have a two-phased program for these 188 pollutants. The first phase consists of identifying the sources of toxic pollutants and developing technology-based standards to significantly reduce them. The EPA determined a list of over 900 stationary sources, which resulted in new air toxics emissions standards, affecting many industrial sources, including: chemical plants, oil refineries, aerospace manufacturers, and steel mills, as well as smaller sources, such as dry cleaners, commercial sterilizers, secondary lead smelters, and chromium electroplating facilities. The second phase consists of strategies and programs for evaluating the remaining risks and ensuring that the overall program has achieved substantial reductions; this phase is still in progress.

Internal combustion engines are directly affected by these regulations since they emit criteria pollutants. These engines run on two fuel. The most common types of fuel used are: gasoline and diesel. Each type of fuel contains complex mixtures of hydrocarbon compounds as well as traces of many other materials, including sulfur. Even when burned completely, these fuels produce pollutants. Moreover, because no engine is capable of "perfect" combustion, some fuel is incompletely oxidized and therefore produces additional pollutants. Other types of fuel can also be used, for example, ethanol mixtures, vegetable oils, and other fuels known in the art.

In gasoline engines, in order to reduce emissions, modern car engines carefully control the amount of fuel they burn. They try to keep the air-to-fuel ratio very close to the stoichiometric point, which is the calculated ideal ratio of air to fuel. Theoretically, at this ratio, all of the fuel will be burned using all of the oxygen in the air. The fuel mixture actually varies from the ideal ratio quite a bit during driving. Sometimes the mixture can be lean (e.g., an air-to-fuel ratio higher than the typical value of 14.7), and other times the mixture can be rich (e.g., an air-to-fuel ratio lower than 14.7). These deviations result in various air emissions.

Significant emissions of a gasoline car engine include: nitrogen gas ($N_2$) (air is 78% $N_2$); carbon dioxide ($CO_2$), a combustion product; and water vapor ($H_2O$), another combustion product. These emissions are mostly benign to humans (although excess levels of atmospheric $CO_2$ are believed to contribute to global warming). Gasoline engines, however, also produce carbon monoxide, nitrogen oxides, and unburned hydrocarbons, all of which are included in the EPA's criteria pollutants (unburned hydrocarbons form part of the ozone formation mechanism, along with NOx).

Diesel engines also contribute to the criteria pollutants. These engines use hydrocarbon fractions that auto-ignite when compressed sufficiently in the presence of oxygen. In general, diesel combusting within a cylinder produce greater amounts of particulate matter and the pollutants nitrogen and sulfur oxides ($NO_x$ and $SO_x$ respectively) than does gasoline. Even so, diesel mixtures are generally lean, with relatively abundant amounts of oxygen present. Consequently, the combustion of smaller hydrocarbons is usually more complete, producing less carbon monoxide than gasoline. Longer chain hydrocarbons are more difficult to burn completely and can result in the formation of particulate residues such as carbon "soot."

Despite these drawbacks, fossil fuels are relatively abundant, easy to handle, and economical. Thus, these fuels will continue to represent a significant source of mechanical power and pollution for years to come. Moreover, the pervasiveness of the internal combustion engine indicates how fossil fuels will continue to be a necessary source of energy.

There are at least three markets of internal combustion engines that produce air significant pollution: 1) mobile, on-road engines, equipment, and vehicles 2) mobile, non-road engines, equipment, and vehicles and 3) stationary or "point" sources. In each of these markets, government agencies and other organizations have dictated restrictions on levels of air pollution. These restrictions have become increasingly stringent as the number of internal combustion engines in use proliferates and more is learned about the harm caused by air pollution. The ever-tightening regulations have required industries to continuously research, develop, and invest in new emissions control technologies, from fuel formulations to engine redesign, to after treatment devices. These technologies vary in both effectiveness and cost but have become essential in order for companies to comply with regulations. No single emissions control technology has been able to remove all relevant pollutants, so multiple technologies often have to be used together in order to enable a particular type of vehicle or equipment to meet regulatory emission limits. These markets, their regulations, and the technologies on which they rely are described in the following paragraphs. The technologies, including their benefits and drawbacks, are described in more detail following this section. While the sections focus on U.S. engines, equipment, and vehicles, other geographies have similar products and regulations. For instance, the EU has similar market sizes but focuses more on selective catalytic reduction than exhaust gas recirculation as a diesel emission control technology, uses catalytic converters in a greater percentage of its small, off-road engines, and has a much larger percentage of diesel engines in light duty vehicles. Other geographies have their own characteristic differences from the U.S., but essentially use the same types of equipment and restrict the same types of air pollutants.

The mobile, on-road engines, equipment, and vehicles include, but are not limited to, passenger cars, pickup trucks, minivans, sport-utility vehicles (SUVs), buses, delivery trucks, semi-trucks, passenger vans, and two or three-wheeled motorcycles designed for on-road use. These markets historically have lead the way in emissions control and continue to do so today by following regulations that dictate lower levels of air pollutants.

The car and truck markets are divided by weights. Those under 8,500 pounds Gross Vehicle Weight Rating (GVWR) are considered light duty vehicles. Vehicles between 8,500 and 10,000 lbs GVWR that are designed for passenger transport are considered medium duty vehicles. Vehicles over 8,500 lbs GVWR that are not designed for personal use are labeled as heavy-duty vehicles.

Passenger cars and light-duty vehicles were previously regulated by vehicle weight and fuel type but will be regulated in one group in future standards. Less than 1% of ~17 million new passenger cars and light-duty vehicles produced in the United States use diesel engines. Passenger cars and light-duty vehicles includes those made by manufacturers such as Ford, General Motors (GM), DaimlerChrysler, BMW, Honda, Hyundai, Daewoo, First Automobile Group, Toyota, Nissan, SAIC-Chevy and Subaru.

Regulations on passenger cars and light-duty vehicles have existed for decades but have recently become much more stringent. The Tier 2 standards, phasing in from model year (MY) 2004-2009, require original equipment manufacturers (OEMs) to certify their fleet into certain "bins" of standards and to maintain a corporate average for NOx emissions. Vehicles under 6,000 lbs GVWR must be fully compliant by 2007, those from 6,000-8,500 lbs and MDVs must be compliant by 2009. Pollutants included in the standards include: NOx, formaldehyde (HCHO), CO, PM, and non-methane organic gases. California has historically had tighter regulations than the EPA, and other states, including New Jersey, New York, Vermont, Maine, and Massachusetts, have joined in California's even lower emissions levels for new and used vehicles. Manufacturers who do not meet the standards are essentially prohibited from producing their vehicles in these markets, and are fined for ones discovered on the market. In the aftermarket, states regulate cars and light duty vehicles' emissions through inspection and maintenance (I/M) programs. These programs are often created from state implementation plans (SIPs) required in national ambient air quality (NAAQ) non-attainment areas. Meeting both new vehicle and aftermarket standards requires the use of emission control technologies, often in parallel.

Historically, three-way catalytic converters have had widespread use in cars and light-duty vehicles. Recent improvements in these converters (such as increased substrate porosity, an optimized washcoat, reduced catalyst loading, etc), have yielded incremental improvements in emissions control. To meet the newest set of U.S. regulations, manufacturers will likely increase catalyst loading or the number of substrates per vehicle. Cars in use that do not meet inspection/maintenance standards have to replace the faulty technology or purchase additional devices. Other emission control devices include, but are not limited to, advanced injection systems (such as injection timing, injection pressure, rate shaping, common rail injection, and electronic controls), changed combustion chamber design (such as higher compression ratios, piston geometry, and injector location), variable valve timing, catalytic converters, and filters.

Heavy-duty vehicles (HDV) include both private and commercial trucks and buses over 8,500 lbs GVWR. The vast majority of these engines run on diesel fuel; over 300,000 are produced each year in the U.S. Manufacturers and engine suppliers include, but are not limited to, Cummins, Caterpillar, Detroit Diesel, GM, Mack/Volvo, International/Navistar, Sterling, Western Star, Kenworth, and Peterbilt. Other companies offering other emission control technologies for the aftermarket include, but are not limited to, Donaldson, Engelhard, Johnson Matthey, Lubrizol, Fleetguard, Cleaire, Clean Air Partners, and Engine Control Systems.

Heavy-duty trucks are facing rigorous emissions-reducing standards for PM, NOx, CO, and non-methane hydrocarbons (NMHC). The PM standard takes effect in 2007, while NOx and NMHC standards phase-in from 2007-2010. Similar to light duty vehicles, California, along with certain other states and metropolitan areas, has often enacted tighter emissions standards than the EPA. For vehicles that do not meet standards, the manufacturers are prohibited from selling them. Non-compliance penalties for NOx range up to $12,000 per vehicle, based on size and compliance effort. While other industries, such as locomotive, marine, agriculture, and construction use highly similar engines to those in heavy-duty vehicles, the HDV market has faced the tightest emission standards. Meanwhile, some states and metropolitan areas (such as California, New York City, and Seattle) require additional retrofits or offer incentives for retrofits to further bring down pollution levels. These areas have certified technologies that meet the approved levels and qualifications. Examples include Donaldson's diesel oxidation catalyst muffler and diesel particulate filter, Cleaire's diesel oxidation catalyst and diesel particulate filter, and Johnson Matthey's continuously regenerating technology particulate filter.

Emissions control technologies used to meet these standards and for retrofits include, but are not limited to, advanced injection systems (injection timing, injection pressure, rate shaping, common rail injection, electronic controls), exhaust gas recirculation, changes in combustion chamber design (higher compression ratios, piston geometry, and injector location), advanced turbocharging, ACERT, diesel particulate filters, NOx adsorbers, selective catalytic reduction, conventional catalytic converters, catalytic exhaust mufflers, and diesel oxidation catalysts. Meeting the 2007 standards has initiated new research and development on many of these emission control technologies. There has been tremendous cost and effort put into determining an emissions control solution for 2007 HDVs.

Motorcycles are another type of mobile, on-road vehicle and include both two and three-wheeled motorcycles designed for on-road use. Motorcycles primarily use gasoline fuel. Manufacturers include, but are not limited to: Harley Davidson, BMW, Honda, Kawasaki, Triumph, Tianjin Gangtian, Lifan Motorcycle, and Yamaha. Regulations for on-road motorcycles were adopted in 1978 and then left unrevised through 2003, when new standards following those in California were agreed upon. Pollutants monitored in the new standards include HC, NOx, and CO.

Emissions control technologies for motorcycles include, but are not limited to, conversion of 2-stroke engines to 4-stroke, advanced injection systems (injection timing, injection pressure, rate shaping, common rail injection, and electronic controls), pulse air systems, changed combustion chamber design (higher compression ratios, piston geometry, and injector location), and use of catalytic converters. Limitations in motorcycles' emissions control technologies are different than those in light or heavy-duty vehicles. Motorcycles focus more on the appearance, placement, and heat of aftertreatment devices, as there are fewer places to "hide" the device and the passenger is in much closer proximity to the exothermic oxidation reaction.

The mobile, non-road engines, equipment, and vehicles category includes, but is not limited to, engines for agriculture, construction, mining, lawn and garden, personal watercraft, boats, commercial ships, locomotives, aircraft, snowmobiles, off-road motorcycles, and ATVs.

Small engines emit significant levels of air pollution for their size; they are the largest single contributor to nonroad HC inventories. Small engine equipment includes, but is not limited to, leaf blowers, trimmers, brush cutters, chainsaws, lawn mowers, engine riding mowers, wood splitters, snowblowers, and chippers. Engine and equipment manufacturers include, but are not limited to, John Deere, Komatsu, Honda, Ryobi, Electrolux (Husqvarna and Poulan, also supplies Craftsman), Fuji, Tecumseh, Stihl, American Yard Products, and Briggs and Stratton.

The EPA began regulating small engines in 1993 (Phase I) with standards that went into effect in 1997 and continued to reduce emission levels with new standards in 2002 (Phase II). The standards divide the equipment into handheld and non-handheld categories and categorize it based on different engine displacements. The regulations focus on hydrocarbons and nitrogen oxides emissions.

Emissions control technologies include, but are not limited to, use of a catalyst (i.e., John Deere's LE technology and Komatsu's "Stratified Scavenged" design), converting 2-stroke engines to 4-stroke, advanced injection systems (injection timing, injection pressure, rate shaping, common rail injection, electronic controls), or changing combustion chamber design (higher compression ratios, piston geometry, and injector location).

The recreational vehicle markets include off-highway motorcycles, snowmobiles, and all-terrain vehicles (ATVs). These are made by manufacturers and engine suppliers such as: Caterpillar, Cummins, Detroit Diesel, Ford Power Products, GM, Honda, John Deere, Kawasaki, Mitsubishi Motors, Nissan, Toyota, Yanmar, Arctic Cat, Bombardier, Brunswisk, International Powercraft, Polaris, Suzuki, and Yamaha.

The EPA began regulating recreational vehicles later than many other markets, though California had regulations in place beforehand. EPA has phase-ins from 2006-2009 for snowmobiles, and 2006-2007 for off-highway motorcycles and ATVs. The regulated pollutants include HC, CO, and NOx. Emission control technologies for recreational vehicles include, but are not limited to, converting 2-stroke engines to 4-stroke, advanced injection systems (injection timing, injection pressure, rate shaping, common rail injection, electronic controls), pulse air, or changing combustion chamber design (higher compression ratios, piston geometry, and injector location).

In mining, regulations are established by the Mine Safety and Health Administration. Mining is often considered one of the most taxing environments for equipment, due to the high levels of vibration, impact, and dust. Temperature and flammability are also larger concerns in mining. Diesel oxidation catalyst have been retrofitted on some mining equipment, while diesel particulate filters are becoming more common.

In the agriculture and construction markets, the EPA regulates both spark-ignition and compression-ignition engines. These can be used in tractors, forklifts, bulldozers, electric generators, pavers, rollers, trenchers, drill rigs, mixers, cranes, balers, compressors, etc. Manufacturers of engines and equipment include, but are not limited to: Agco, Komatsu, CNH Global, Caterpillar, Cummins, Daewoo, John Deere & Co, Dueutz, Detroit Diesel, and Kubota.

The EPA began regulating the diesel portion of these engines in 1994 (Tier 1) and has more recently increased the standards with Tier 2 (phased in from 2001-2006). The standards are slated to increase again with Tier 3 levels from 2006-2008. The Tier 3 levels will likely require the use of emissions control devices similar to those used on heavy-duty vehicles (such as tractor-trailers). The gasoline, liquid propane gas, or compressed natural gas (CNG) engines used in agriculture and construction applications have also had recent changes in regulations. Tier 1 levels began in 2004 and match those adopted earlier by CARB; Tier 2 levels are expected to start in 2007. A voluntary program for vehicles with lower emissions than the standards exists, named "Blue Skies Series." Based on engine size and fuel type, the levels of particulates, carbon monoxide, nitrogen oxides, and non-methane hydrocarbons all must be significantly reduced for current phase-ins and for shortly forthcoming standards.

Emissions control technologies are similar to those used on heavy-duty vehicles and includes, but is not limited to, advanced injection systems (injection timing, injection pressure, rate shaping, common rail injection, electronic controls), exhaust gas recirculation, changes in combustion chamber design (higher compression ratios, piston geometry, and injector location), advanced turbocharging, ACERT, diesel particulate filters, NOx adsorbers, selective catalytic reduction, conventional catalytic converters, catalytic exhaust mufflers, and diesel oxidation catalysts. Exhaust gas recirculation (EGR) has been problematic due to its tendency to create sulfuric acid formation in the engine's intake. It also requires cooling, which necessitates a larger radiator, and thus a larger nose on the vehicle, creating aerodynamic and fuel economy constraints.

In marine applications, engines can generally be divided by use of gasoline or diesel fuel, personal or commercial use, or by engine size. Marine units range from personal watercraft, to yachts, to ferries, to tugs and ocean-going ships. Manufacturers and engine suppliers include, but are not limited to: Bombardier (Evinrude, Johnson, Ski Doo, Rotax, etc), Caterpillar, Cummins, Detroit Diesel, GM, Isuzu, Yanmar, Alaska Diesel, Daytona Marine, Marine Power, Atlantic Marine, Bender Shipbuilding, Bollinger Shipyards, VT Halter Marine, Eastern Shipbuilding, Gladding-Hearn, JeffBoat, Main Iron Works, Master Boat, Patti Shipyard, Quality shipyards, and Verret Shipyard, MAN B&W Diesel, Wartsila, Mitsubishi, Bath Iron Works, Electric Boat, Northrop Grumman (includes Avondale, Ingalls, and Newport News Shipyards).

The EPA regulates boats whether they are recreational, private, or commercial. The major category divisions are based on engine displacement, from recreational vehicles to tankers. Diesel marine non-recreational boats under thirty liter (30 L) displacement, including fishing boats, tugboats, towboats, dredgers, and cargo vessels, have new standards for NOx and PM going into effect between 2004 and 2007, depending on engine size. Diesel marine non-recreational boats over 30 L, including container ships, tankers, bulk carriers, and cruise ships, have NOx standards going into effect in 2004 (Tier 1) and additional HC, PM, and CO standards in 2007 (Tier 2). Diesel marine recreational boats, including yachts, cruisers, and other types of pleasure craft, have standards matching those of diesel marine non-recreational boats under 30 L displacement, but have later implementation dates, ranging from 2006-2009 based on engine size. Gasoline and diesel boats only have regulations currently applying HC emissions in outboard engines, personal watercraft, and jetboats. Sterndrive and inboard engines are inherently cleaner and are not yet regulated.

Emissions control technologies are similar to those used on heavy-duty vehicles and include, but are not limited to, using "green terminals" when the boat is at dock, conversion from 2-stroke to 4-stroke engines, water aftercooling, exhaust gas recirculation, diesel particulate filters, selective catalytic reduction, diesel oxidation catalyst, catalytic converters, advanced fuel injection (injection timing, injection pressure, rate shaping, common rail injection, electronic controls), advanced turbocharging, variable valve timing, and changing the combustion chamber design (higher compression ratios, piston geometry, and injector location). Using smaller engines for auxiliary power (e.g., auxiliary power unit, APU) also helps to control emissions. While salt water and its associated pollutants and cooling effect on boats present difficulties in aftertreatment, the APU may work well with an aftertreatment device.

The locomotive market relies principally on diesel fuel (coal and wood-fired have limited use) and includes trains used in freight and passenger rail, line-haul, local, and switch yard service. There are over 600 trains produced each year in the U.S. Manufacturers and engine suppliers include, but are not limited to, GM's Electromotive Division, GE Transportation Systems, Caterpillar, Detroit Diesel, Cummins, MotovePower, Peoria Locomotive Works, Republic Locomotives, Trinity, Greenbrier, and CSX.

Regulations on trains began in 2000 and largely imitated those of heavy-duty vehicles. The standards include levels for newly produced engines, as well as for engines that are remanufactured (which occurs approximately ever 4-8 years) and vary based on whether the engine is for switch or line-haul purposes. Tier 0 applies to engine model years (MY) from 1973-2001, Tier 1 to MY2002-2004, and Tier 2 to MY2005 and later. A non-compliance penalty can range up to $25,000 per engine per day. The pollutants regulated include particulate matter, NOx, HC, CO, and smoke opacity.

Emissions control technologies are similar to those used on heavy-duty vehicles and include, but are not limited to, advanced injection systems (injection timing, injection pressure, rate shaping, common rail injection, electronic controls), exhaust gas recirculation, changes to combustion chamber design (higher compression ratios, piston geometry, and injector location), selective catalytic reduction, diesel oxidation catalysts, and aftercoolers, split cooling, zeolite sieves, and NOx reduction catalysts. Using a smaller, auxiliary power unit is also becoming an emissions control strategy, one which has fewer restrictions around the use of an aftertreatment device The aircraft market includes all types of aircraft, including planes made by Boeing, Airbus, Cessna, Gulfstream, and Lockheed Martin, among others. Both the EPA and European Union follow the International Civil Aviation Organization's (ICAO) emissions standards. The EPA adopted ICAO's current standards for CO and NOx in gas turbine engines in 1997, having adopted their HC levels in 1984. In the U.S., the FAA monitors and enforces these standards. Much of the emissions control is done through engine technologies and fuel changes.

Stationary sources include those sources of pollution that are non-mobile. The EPA has issued rules covering over 80 categories of major industrial sources, including power plants, chemical plants, oil refineries, aerospace manufacturers, and steel mills, as well as categories of smaller sources, such as dry cleaners, commercial sterilizers, secondary lead smelters, and chromium electroplating facilities. Power plants can use stationary diesel engines, stationary gas turbines, and nuclear power, among other sources. Each of these sources produces different pollutants; for instance, nuclear power plants produce iodine and hydrogen, gas turbines produce NOx, CO, SOx, CH4, and VOCs, and refineries produce gaseous vapors, CO, NOx, VOCs, CO2, CH4, and PM. Each industry requires different control technologies to reduce air emissions.

EPA regulations cover the six criteria pollutants and the additional 188 toxic air pollutants. Specific programs implemented include the Acid Rain Program, designed to reduce sulfur emissions and the Ozone Transport Commission's NOx Budget Program, designed to reduce NOx emissions. RECLAIM is a program established for trading NOx and SOx credits. In addition, cap and trade programs have been implemented in some industries and geographies, allowing companies to trade their emission credits.

The technology used to control emissions from stationary sources varies widely, but examples include filters, scrubbers, sorbents, selective catalytic reduction (SCR), precipitators, zero-slip catalysts, catalysts for turbines, or oxidation catalysts. Some of the suppliers of emissions control systems to stationary markets include: M+W Zander, Crystall, Jacobs E., Takasogo, IDC, ADP, Marshall, Bechtel, Megte, Angui, Adwest, Eisenmann, Catalytic Products, LTG, Durr, Siemens, Alston. Catalyst suppliers include: Nikki, BASF, Cormetech, W. R. Grace, Johnson Matthey, UOP, and Sud Chemie.

Due to the importance of improving air quality and complying with relevant laws and regulations, substantial time, money, and effort have been invested in technologies capable of reducing emissions. Three general areas of technology include, a) engine improvements, b) fuel improvements, and c) after-treatments. These approaches are typically not mutually exclusive or stand-alone solutions. Engine improvements include, but are not limited to, such technologies as: advanced injection systems, exhaust gas recirculation, electronic sensors and fuel controls, combustion chamber designs, advanced turbocharging, and variable valve timing. Fuel improvements include, but are not limited to, such formulations as: high cetane, low aromatics, low sulfur fuel, fuel borne catalysts, liquefied petroleum gas (LPG), oxygenation of fuels, compressed natural gas (CNG) and biodiesels. Aftertreatment technologies include, but are not limited to: catalytic converters (2, 3, and 4-way), particulate traps, selective catalytic reduction, NOx adsorbers, HC adsorbers, NOx reduction catalysts, and many others. Some systems incorporate various pieces of these and other technologies; ACERT by Caterpillar or catalyzed diesel particulate traps are examples of combination systems and devices. There are also some technologies that are currently limited in use, either by technological or commercial restrictions.

Advanced injection systems include changes in injection timing, injection pressure, rate shaping, air-assisted fuel injection, sequential multi-point injection, common rail injection, resizing or moving the injector holes, and some electronic controls. In the common-rail system, a microcomputerized fuel pump controls the flow and timing of fuel (e.g., the Mercedes-Benz E320 uses this system). Secondary air injection can promote HC and CO combustion in the manifold. Changing the injection system can reduce a variety of emissions and can also increase fuel economy; however, this requires significant work on the engine to ensure efficiency.

Exhaust gas recirculation (EGR) directs some of the exhaust gases back into the intake of the engine. By mixing the exhaust gases with the fresh intake air, the amount of oxygen entering the engine is reduced, resulting in lower nitrogen oxide emissions. EGR does not require regular maintenance and works well in combination with high swirl, high turbulence combustion chambers. EGR also has drawbacks, such as reduced fuel efficiency and engine life, greater demands on the vehicle's cooling system, limited to no effect on pollutants other than NOx, and it requires control algorithms and sensors. For these reasons, EGR is often used in parallel with another control technology. Companies involved in EGR technology include Doubletree Technologies, ETC, STT Emtec, Cummins, Detroit Diesel, Mack, and Volvo.

Optimizing the combustion chamber, or making incremental improvements to it, is another way manufacturers and developers are controlling emissions. Reducing the crevice volumes can limit trapping of unburned fuel (and thus HC formation), while reducing the amount of lubricating oil can also reduce HC formation and can limit catalyst poisoning. Other measures include: improving the surface finishes of cylinders and pistons, improving piston ring design and material, and improving exhaust valve stem seals. Also, a "fast burn" combustion chamber can be made by: increasing the rate of combustion, reducing the spark advance, adding a diluent to the air-fuel mixture, and/or increasing turbulence in the chamber. While optimizing the combustion chamber can lead to reduced emissions, it is another technology that requires reworking of the engine, which can be an expensive process.

Variable valve timing involves calibrating the engine valves to open and close for maximum fuel and engine efficiency. Often, a sensor is used to detect the engine's speed and to adjust the valve openings and closings accordingly. This technology can increase engine torque and horsepower and can improve swirl and intake charge velocity, thus improving the efficiency of combustion. Variable valve technology does not reduce emissions as much as some other technologies and often leads to reductions in fuel efficiency.

Reformulating or using different fuels is another emissions control technique, as some fuels naturally pollute more than others, while some tend to poison the catalysts that would otherwise clean the exhaust air. For instance, the shift from leaded to unleaded fuel in the U.S. greatly decreased lead emissions. Lowering the sulfur content in fuel reduces SOx emissions and increases the efficiency of many catalytic converters, as sulfur can poison catalysts. Another type of fuel, natural gas, typically produces less particulate pollution than diesel fuel and also can reduce NOx and combustion noise. Conversely, natural gas also can increase vehicle weight (due to the need for high pressure tanks) and has refueling limitations.

Using an aftertreatment device—equipment that is used after the fuel is combusted—is very common in certain industries affected by emissions control regulations. One example of an aftertreatment device is a catalytic converter. Catalytic converters can vary widely and can have different functions, but the general description is a device that treats exhaust with the use of catalysts. The composition of the substrates and the catalysts that are on it have changed throughout the years, as has the placement and the number of converters.

A two-way catalytic converter performs oxidation of gasphase pollution, such as the oxidation of HC and CO to $CO_2$ and $H_2O$. Diesel oxidation catalysts (DOCs) are another type of two-way catalytic converter used with diesel engines. While these converters are effective at controlling HC and CO and require little maintenance, they can increase NOx emissions and are sensitive to sulfur.

A three-way catalytic converter performs both oxidation (conversion of CO and HC to $CO_2$ and $H_2O$) and reduction (conversion of NOx to $N_2$ gas) reactions. Since the 1970s, three-way catalytic converters have reduced vehicle emissions. Further performance improvements by these devices are limited by a number of factors, such as the temperature range and surface area of their substrates and by catalyst poisoning. To meet increasingly stringent regulations, some cars require multiple catalytic converters.

A four-way catalytic converter performs oxidation and reduction reactions, and traps particulates to burn them off (regeneration can occur in active or passive mode).

Suppliers of catalytic converters and their associated parts include, but are not limited to, Corning, NGK, Denso, Tbiden, Emitec, Johnson Matthey, Engelhard, Catalytic Solutions, Delphi, Umicore, 3M, Schwäbische Hütten-Werke GmbH (SHW); Hermann J. Schulte(HJS), Clean Diesel Technology, Cleaire, Clean Air Systems, ArvinMeritor, Tenneco, Eberspacher, Faurecia, Donaldson, and Fleetguard.

Particulate traps or filters are another type of aftertreatment device commonly used in diesel applications, as diesel fuel generates more particulate matter than gasoline or some alternative fuels. In a diesel particulate trap (DPT), particles in the exhaust stream pass through a filter that collects them. The removal of particulate matter that is collected on the trap is referred to as "regeneration" and can occur in multiple ways.

One method uses external heaters to raise the temperature of the filter to a level necessary for the PM to "burn off." Another method releases small amounts of diesel fuel in the exhaust stream. When the fuel particles come in contact with the filter, the fuel burns off at an elevated temperature. This higher temperature burns the PM off the filter as well. Yet another means is to use fuel borne catalysts to facilitate regeneration. In another approach, called a "catalyzed diesel particulate trap," a catalyst is applied directly to the filter itself, which reduces the temperature necessary for the PM to burn off. Finally, an oxidation catalyst can be used in front of the filter to facilitate burn off of the PM. Johnson Matthey's Continuously Regenerating Trap (CRT) is such a system. Diesel particulate traps can reduce PM by as much as 85% in some applications. Traps utilizing a catalyst can also reduce other pollutants besides PM (e.g., HC, CO, and PM) with use of a catalyst (as mentioned earlier). Conversely, these traps can become clogged with PM, soot, and ash and catalyzed versions can be poisoned. They also add cost and weight to vehicles.

Diesel particulate traps can use a number of different types of filters, including: ceramic monolithic cell fiber (Corning, NGK), fiber-wound filter (3M), knitted fiber (BUCK), woven fiber (HUG, 3M), sintered metal fiber (SHW, HJS) or filter paper, among others. Suppliers of these devices and their related technologies include, but are not limited to, Donaldson, Engelhard, Johnson Matthey, HJS, Eminos, Deutz, Corning, ETG, Paas, and Engine Control Systems.

Selective catalytic reduction (SCR) is another example of an aftertreatment system. In this technology, a chemical capable of acting as a reducing agent, such as urea, is added before the exhaust reaches the catalyst chamber. Urea hydrolyzes to form ammonia. The ammonia then reacts with the NOx of the exhaust gas to yield $N_2$ gas, thereby decreasing NOx emissions. The ammonia may be directly injected or be held in the form of solid urea, urea solution or in crystalline form. An oxidation catalyst is often used in parallel with SCR to reduce CO and HC. Unfortunately, while SCR is effective in reducing NOx and has low catalyst deterioration with good fuel economy, it requires an additional tank on the vehicle and an infrastructure for refilling the tank. It is also dependent on end user compliance; companies and drivers are required to refill the tank in order to maintain the emissions control. Suppliers of SCR or its components include, but are not limited to, Engelhard, Johnson Matthey, Miratech Corporation, McDermott, ICT, Sud Chemie, SK Catalysts, and PE Systems. While only used in the U.S. on a limited basis, SCR is expected to be widely used in Europe to reduce emissions, particularly in the heavy duty truck market.

NOx adsorbers are materials that store NOx under lean conditions and release and catalytically reduce it under fuel rich conditions (typically every few minutes). This technology can work in both gas and diesel applications, though gas provides a better fuel rich, high temperature environment. NOx adsorbers reduce the levels of HC, NOx, and CO, but have little to no effect on PM. They can function under a wide range of temperatures. Conversely, NOx adsorbing capacity decreases based on temperature, requires engine controls and sensors, and is functionally hindered or disabled by the sulfur content in fuel. In diesel applications, there are additional constraints, including the quantity of oxygen present in the exhaust, the HC utilization rate, the temperature range, and smoke or particulate formation.

A NOx reduction catalyst can also be used to control emissions by 1) actively injecting reductant into the system ahead of the catalyst and/or 2) using a washcoat with a zeolite that adsorbs HC, thus creating an oxidizing region conducive to reducing NOx. While this technology can reduce NOx and PM, it is more expensive than many other technologies and can lead to poor fuel economy or sulfate particulates.

HC adsorbers are designed to trap VOCs while the catalyst is cold and then release them once the catalyst is heated. This can be done by 1) coating the adsorber directly onto the catalytic converter substrate, which allows for minimal changes but less control, 2) locating the adsorber in a separate, but connected exhaust pipe before the catalytic converter and having the air switch channels once the converter is heated, and/or 3) placing the adsorber after the catalyst. The last two options require a cleaning option for the adsorber. While this technology reduces cold start emissions, it is difficult to control and adds cost.

Since emissions have proven difficult to control, emissions control technologies are often combined in a system. Examples of combination systems include: a DeNOx and DPT (such as HJS' SCRT system), a catalytic converter placed in the muffler, SCR integrated with the muffler, or a catalyzed diesel particulate filter.

ACERT is another example of a system incorporating multiple emissions control technologies. ACERT, from Caterpillar, targets four areas—intake air handling, combustion, electronics, and exhaust aftertreament. Key components include single and series turbocharging for cooling intake air; variable valve actuation for improving fuel burns; electronic multiplexing for integrating computer control; and catalytic conversion for reducing tailpipe particulate emissions. Working in concert, these subsystems allow the company to increase fuel savings. A significant weakness of this technology is the high volume of catalyst needed.

There are many other emissions control technologies, some of which are not yet technically feasible.

Catalytic Converters

The concerns of pollution caused partly by the automobile led to the Clean Air Act of 1970 which required 90 percent reductions in auto exhaust. The mandatory reduction was considered controversial by some but generally recognized as an advance for clean air and better health.

The automobile industry initially offered resistance to the new proposed regulations. Part of the resistance may have stemmed from the industries' development of improved fuels. From the mid 1920's until the mid 1980's, motor gasoline fuel contained an additive, tetraethyllead (TEL). TEL improved fuel performance by preventing pre-ignition in the cylinders of the engine. Pre-ignition results when the fuel/air mixture ignites prematurely in the combustion chamber of an engine. This results in damage to the engine and efficiency and power reducing caused by knocking.

To attain the reduced emission standards set by the government, engineers invented the catalytic converter. The catalytic converter was added to vehicle exhaust systems starting about 1976. The catalytic converter was effective in reducing emissions to a certain degree. However, the common gasoline formulations containing TEL interfered with the function of the catalytic converter. Because the TEL in the fuel poisoned the metal catalysts of the catalytic converter, TEL was eventually removed from fuel.

While many people may be aware that many vehicles have a catalytic converter, it is generally an unappreciated piece of technology. The purpose of the catalytic converter is to convert, or change, exhaust gases that are pollutants to less harmful compounds, such as nitrogen ($N_2$, which makes up about 78% of the atmosphere), water ($H_2O$), and carbon dioxide ($CO_2$, a product of photosynthesis in plants).

The catalytic converter is used to facilitate the conversion of the unwanted pollutants to relatively harmless molecules such as $N_2$, $H_2O$, and $CO_2$. Basically, the catalytic converter provides a surface on which the pollutants are converted into the relatively harmless products. A catalyst allows the reaction to proceed faster (or at a lower temperature) by lowering the activation energy required. However, a catalyst is not used up in the reaction and can be used again (unless the catalyst is poisoned).

Typical pollutants in exhaust include nitrogen oxides (NOx), unburned hydrocarbons, carbon monoxide, and particulate matter. The nitrogen oxides can be reduced to form nitrogen. When an NO or $NO_2$ molecule contacts the catalyst, the catalyst facilitates removal of nitrogen from the molecule, freeing oxygen in the form of $O_2$. Nitrogen atoms adhering to the catalyst then react to form $N_2$ gas: 2 NO=>$N_2$+$O_2$ and 2 $NO_2$=>$N_2$+2 $O_2$.

The carbon monoxide, unburned hydrocarbons, and particulate matter can be further oxidized to form nonpollutants. For example, carbon monoxide is processed as shown: 2 $CO+O_2$=>2 $CO_2$.

The overall result of the catalytic converter is to complete the combustion of fuel into nonpollutants.

Conventional catalytic converters have a number of limitations on their effectiveness of eliminating pollutants. For example, if they are located too close to an engine, they can crack from overheating or a quick change in temperature. As such, the filters of the conventional catalytic converters cannot be placed immediately next to or inside an engine exhaust manifold, which is an optimal location to take advantage of the in situ high temperatures before the temperature decreases due to radiant cooling from the high thermal conducting properties of exhaust pipe material. Engine vibration and the quick change in temperatures that exist near and within the exhaust manifold would cause conventional filter material to fatigue and dramatically shorten the life of the filters. In addition, some catalysts applied to conventional filters work less efficiently or even cease to function at high temperatures, i.e., above 500 degrees Celsius. Accordingly, the conventional catalytic converter filters are usually placed in the exhaust path in a location away from the engine.

Structures of Catalytic Converter and Particulate Filter

The components and materials of a catalytic converter are shown schematically in FIGS. 4a and 4b. The catalyst substrate is held within the converter shell (also called a canister) using packaging mat (most often made of ceramic fibers). The converter is connected to the vehicle's exhaust system through the end cones, which can be either welded to the shell or be formed as one part together with the shell, depending on converter packaging technology. The other components shown in the schematic—end seals and/or steel support rings—are optional; they are usually not present in modern passenger car converters, but may be required in more demanding applications, such as close-coupled converters, large converters for heavy-duty engines, or diesel particulate filters. Catalytic converters, especially those in gasoline applications, can be also equipped with steel heat shields (not shown in the schematic) to protect adjacent vehicle components from exposure to excessive temperatures.

Generally, a catalytic converter is composed of at least five main components: 1) a substrate; 2) a catalytic coating; 3) a wash-coat; 4) a matting; and 5) a canister. A general catalytic converter is shown in Figure X. In certain applications, as discussed in more detail below, the catalytic coating is optional.

Substrate

The substrate is a solid surface on which the pollutants can be converted to the nonpollutants. Physically, a substrate provides the interface for several molecular species, in any physical state such as solid, liquid, or gas, to react with each other. The substrate generally has a large surface area to provide a large area on which the pollutants can be converted to nonpollutants.

Over the past decades, many different materials and designs have been tested to act as the substrate for chemical reactions. For example, main physical structures include honeycomb monoliths and beads. (See FIG. 1). The honeycomb structure contains numerous channels, usually running parallel to each other along the length of the substrate. The substrate has channels that run the length of the substrate. The width of channels varies, often depending on the substrate material and applications for which it is used. These channels allow the exhaust gas to flow from the engine through the catalytic converter and out through exhaust pipe. While the exhaust gas flows through the channels of the substrate, the pollutant molecules are converted into nonpollutant molecules via chemical reactions and physical changes.

In the bead structure, the substrate is made of a collection of small beads (similar to putting a bunch of jelly beans in a tube). The exhaust can flow around the beads (through the channels and crevices). The pollutants are converted to nonpollutants as the exhaust gas hits the beads. The bead structure was one of the early attempts to maximize the surface area of substrate to which the exhaust molecules were exposed.

A number of different materials have been used as the substrate. These include ceramic, Fiber Reinforced Ceramic Matrix Composites (FRCMC), foam, powder ceramic, nano-composite, metals, and fiber mat-type substrates. The most commonly used is a ceramic called cordierite, which is produced by Corning. Cordierite is a ceramic formed from refractory powders. FRCMC is an open celled foam wherein catalyst is disposed on the walls of the cells, the foam being disposed within a catalytic chamber such that exhaust gas must pass through a cell path of the foam to exit. Foams are solids containing numerous pores that are formed by bubbles from gas and burned-off voids. Powder ceramic substrates are different than cordierite and related ceramics in that the powder ceramic is formed from sintered ceramic powders. Nano-composites are materials that use nano-powders and/or nano-fibers. Metals can also be used as a substrate. Generally, thin sheets of corrugated metal foil, such as steel, are rolled into a honeycomb-like structure. Fiber mat-type substrates are materials that are woven on a small scale. Certain fiber mat-type substrates utilize NEXTEL fibers, produced by 3M. Additionally, "two-dimensional" non-woven fibrous composites have also been tried where honeycomb structures were formed using rolled up pleating and/or corrugation. For example, see U.S. Pat. Nos. 4,894,070; 5,196,120; and 6,444,006 B1.

Catalytic Coating

The third component of current catalytic converters is a catalytic coating. As the name implies, the catalytic coating is the component which actually catalyzes the conversion of pollutants to non-pollutants.

A catalyst is usually defined as a substance which influences the rate of a chemical reaction but is not one of the original reactants or final products, i.e., it is not consumed or altered in the reaction. In several known catalytic reaction mechanisms, the catalyst forms intermediate compounds with reactants but is recovered in the course of the reaction.

Many other catalytic processes are not explained fully or understood in their entirety. Neither are the principles governing the selection and preparation of catalysts for specific purposes. Many of the developments in this field are achieved through elaborate exploration programs involving trials of countless materials. Catalysts are widely used in chemical and petrochemical processing to facilitate reactions which otherwise are too slow, or which require high temperatures to yield good efficiencies. Catalysts are also used to convert harmful components of engine exhaust gases, such as hydrocarbons and carbon monoxide, into harmless substances, such as carbon dioxide and water vapor.

Catalysts are substances that have the ability to accelerate certain chemical reactions between exhaust gas components. In emission control catalysis, solid catalysts are used to catalyze gas phase reactions. The catalytic effect and the observed reaction rates are maximized by providing good contact between the gas phase and the solid catalyst. In catalytic reactors, this is usually realized by providing high catalytic surface area through finely dispersing the catalyst on high specific surface area carrier (support).

The catalytic coating is added to the substrate after the substrate is formed. The coating forms a layer on the surface of the substrate, the layer containing the catalyst. Different types of catalysts are needed depending, for example, on the chemical reaction, application needed, temperature conditions, economic factors, etc. A number of metal catalysts are known in the art. For example, the most commonly used are platinum, palladium and rhodium. Significant research has been done to develop new catalysts.

The rate of chemical reactions, including catalytic reactions, generally increases with temperature. A strong dependency of conversion efficiency on temperature is a characteristic feature of all emission control catalysts. The conversion, nearzero at low temperatures, increases slowly at first and then more rapidly, to reach a plateau at high gas temperatures. When discussing combustion reactions, the term light-off temperature is commonly used to characterize this behavior. The catalyst light-off is the minimum temperature necessary to initiate the catalytic reaction. Due to the gradual increase of the reaction rate, the above definition is not very precise. By a more precise definition, the light-off temperature is the temperature at which conversion reaches 50%. That temperature is frequently denoted T50. When comparing activities of different catalysts, the most active catalyst will be characterized by the lowest light-off temperature for a given reaction.

In some catalyst systems, increasing the temperature may increase the conversion efficiency only up to a certain point, as illustrated by the dashed line (B) in FIG. 4. Further temperature increase, despite increasing reaction rates, causes a decrease in the catalyst conversion efficiency. The declining efficiency is usually explained by other competing reactions which deplete the concentrations of reactants or by thermodynamic reaction equilibrium constrains.

The temperature range corresponding to the high conversion efficiency is frequently called the catalyst temperature window. This type of conversion curve is typical for selective catalytic processes. Good examples include selective reduction of NO by hydrocarbons or ammonia.

Another important variable influencing the conversion efficiency is the size of the reactor. The gas flow rate through a catalytic reactor is commonly expressed, relative to the size of the reactor, as space velocity (SV). The space velocity is defined as the volume of gas, measured at standard conditions (STP), per unit time per unit volume of the reactor, as follows: (3)$SV=V/V_r$, where V is the volumetric gas flow rate at STP, $m^3/h$; $V_r$ is the reactor volume, $m^3$, and SV has the dimension of reciprocal time which is commonly expressed in $1/h$ or $h^{-1}$.

In various catalytic emission control applications, the space velocities range from 10,000 1/h to 300,000 1/h. Space velocities for monolithic reactors are calculated on the basis of their outside dimensions, e.g., diameter and length of a cylindrical ceramic catalyst substrate. Since this method does not take into account the geometric surface area of the substrate, cell density, wall thickness, or catalyst loading, it is not always appropriate for catalyst comparisons. Nevertheless, it is a commonly used and widely accepted industry standard.

Typical platinum loadings in filters used for off-road engines through the 1990's were between 35 and 50 $g/ft^3$. These filters, installed on relatively high polluting engines, required minimum temperatures of nearly 400° C. for regeneration. Later, when catalyzed filters were applied to much cleaner urban bus and other highway vehicle engines, it was found that they were able to regenerate at much lower temperatures. However, higher platinum loadings were needed to support the low temperature regeneration. Filters used in clean engine, low temperature applications have typically platinum loadings of 50-75 $g/ft^3$.

Wash Coat

In most cases, the catalytic coating includes a wash coat as a fourth component. The washcoat is applied to the surface of the substrate, thereby increasing surface area of the substrate. The washcoat also provides a surface to which the catalyst adheres. The metal catalyst may be impregnated on this porous, high surface area layer of inorganic carrier, (i.e., washcoat—the term "catalyst support" may be used to denote the ceramic/metallic substrate, as well as the carrier/washcoat material).

A number of substances can be used as a washcoat. Substances which are widely used for catalyst carriers include activated aluminum oxide and silicone oxide (silica).

The washcoat is a porous, high surface area layer bonded to the surface of the support. Its exact role, which is certainly very complex, is not clearly understood or explained. The main function of the washcoat is to provide very high surface area, which is needed for the dispersion of catalytic metals. Additionally, the washcoat can physically separate and prevent undesired reactions between components of a complex catalytic system.

Washcoat materials include inorganic base metal oxides such as $Al_2O_3$ (aluminum oxide or alumina), $SiO_2$, $TiO_2$, $CeO_2$, $ZrO_2$, $V_2O_5$, $La_2O_3$ and zeolites. Some of them are used as catalyst carriers. Others are added to the washcoat as promoters or stabilizers. Still others exhibit catalytic activity of their own. Good washcoat materials are characterized by high specific surface area and thermal stability. The specific surface area is determined by nitrogen adsorption measurement technique in conjunction with mathematical modeling known as the BET (Brunauer, Emmet, and Teller) method. Thermal stability is evaluated by exposing samples of given material to high temperatures in a controlled atmosphere, usually in the presence of oxygen and water vapor. The loss of BET surface area, which is remeasured at different time intervals during the test, indicates the degree of thermal deterioration of the tested material.

The washcoat can be applied to the catalyst support from a water based slurry. The wet washcoated parts are then dried and calcined at high temperatures. The quality of the catalyst washcoat can significantly influence the performance and durability of the finished catalyst. Since the noble metal is subsequently applied to the washcoated parts by impregnation, i.e., "soaking" the washcoat porosity with the catalyst solution, the washcoat loading will determine the noble metal catalyst loading in the finished product. Therefore, it is extremely important that the washcoating process produces a very repeatable and uniform washcoat layer. The details on the washcoating process and its parameters are guarded as trade secrets by all catalyst makers.

Canister

The substrate is packaged into a canister, e.g., a steel shell, to form a catalytic converter. The canister performs a number of functions. It holds the catalyzed substrate and protects the substrate from the external environment. Additionally, the canister forces exhaust gas to flow through and/or over the catalyzed substrate.

The catalyzed substrate can be also packaged inside mufflers, which are then referred to as "catalyst mufflers" or "catalytic mufflers." In this case, one steel canister holds both the catalyst and the noise attenuation components, such as baffles and perforated tubing. Catalyst mufflers can offer more space saving design compared to the combination of a catalytic converter and a muffler.

The catalyzed substrate is usually placed inside the canister having a configuration made according to one of several methods, including: clamshell, tourniquet, shoebox, stuffing, and swaging, as shown in FIG. 36.

Matting

In addition to the canister, a matting material is often used to package the catalytic substrate in the canister. The packaging mats, usually made of ceramic fibers can be used to protect the substrate and to distribute evenly the pressure from the shell. The mats often include vermiculite, which expands at high temperatures, thus compensating for the thermal expansion of the shell and providing adequate holding force under all operating conditions.

For example, ceramic monoliths are wrapped in a special packaging material which holds them securely in the steel housing, uniformly distributing pressure and preventing cracking. Ceramic fiber mats are most commonly used for packaging of catalytic converters for both gasoline and diesel applications. These packaging mats can be classified as follows: intumescent (heat-expandable) mats; conventional (high vermiculite); reduced vermiculite; non-intumescent mats; or hybrid mats.

Heat Insulation

In many applications, the catalytic converter must be heat insulated to avoid damage to surrounding vehicle components (e.g., plastic parts, fluid hoses) or—in converters mounted closer the engine—to prevent an increase of engine compartment temperature. One of the methods of converter thermal management is to employ a steel heat shield positioned around the converter body. An alternative method is to provide an insulation layer inside the shell by either (1) increasing the thickness of the mounting mat, or (2) providing an additional layer of dedicated, low thermal conductivity insulation. While heat shields have been traditionally used in the underfloor location, it has been suggested that increased mat thickness offers the best solution for converters installed in the engine compartment (Saïd Zidat and Michael Parmentier, "Heat Insulation Methods for Manifold Mounted Converters," Delphi Automotive Systems, Technical Centre Luxembourg, SAE Technical Paper Series 2000-01-0215). One of the advantages of using thicker mat rather than the heat shield is the lower average mat temperature, which minimizes the risk of destroying vermiculite mats in close-coupled gasoline engine applications.

Particulate Trap

Another device for removing pollutants from an exhaust gas is a particulate trap. A common particulate trap used on diesel engines is a diesel particulate trap (DPT). A main purpose of a particulate trap is to filter and trap particulate matter of various sizes from a stream of fluid, such as an exhaust gas flow. The effectiveness of a particulate filter is generally measured in its ability of filtering PM of different size, e.g., PM-2.5 and PM-10.

Diesel traps are relatively effective at removing carbon soot from the exhaust of diesel engines. The most widely used diesel trap is the wall-flow filter which filters the diesel exhaust by capturing the soot on the porous walls of the filter body. The wall-flow filter is designed to provide for nearly complete filtration of soot without significantly hindering the exhaust flow.

As the layer of soot collects on the surfaces of the inlet channels of the filter, the lower permeability of the soot layer causes a pressure drop across the filter and a gradual rise in the back pressure of the filter against the engine, causing the engine to work harder, thus affecting engine operating efficiency. Eventually, the pressure drop becomes unacceptable and regeneration of the filter becomes necessary. In conventional systems, the regeneration process involves heating the filter to initiate combustion of the carbon soot. In certain circumstances, the regeneration is accomplished under controlled conditions of engine management whereby a slow burn is initiated and lasts a number of minutes, during which the temperature in the filter rises from about 400-600° C. to a maximum of about 800-1000° C.

In certain applications, the highest temperatures during regeneration tend to occur near the exit end of the filter due to the cumulative effects of the wave of soot combustion that progresses from the entrance face to the exit face of the filter as the exhaust flow carries the combustion heat down the filter. Under certain circumstances, a so-called "uncontrolled regeneration" can occur when the onset of combustion coincides with, or is immediately followed by, high oxygen content and low flow rates in the exhaust gas (such as engine idling conditions). During an uncontrolled regeneration, the combustion of the soot may produce temperature spikes within the filter which can thermally shock and crack, or even melt, the filter. The most common temperature gradients observed are radial temperature gradients where the temperature of the center of the filter is hotter than the rest of the substrate and axial temperature gradients where the exit end of the filter is hotter than the rest of the substrate.

In addition to capturing the carbon soot, the filter also traps metal oxide "ash" particles that are carried by the exhaust gas. Usually, these ash deposits are derived from unburnt lubrication oil that accompanies the exhaust gas under certain conditions. These particles are not combustible and, therefore, are not removed during regeneration. However, if temperatures during uncontrolled regenerations are sufficiently high, the ash may eventually sinter to the filter or even react with the filter resulting in partial melting.

It would be considered an advancement in the art to obtain a filter which offers improved resistance to melting and thermal shock damage so that the filter not only survives the numerous controlled regenerations over its lifetime, but also the much less frequent but more severe uncontrolled regenerations.

Continuous Regeneration Trap

One conventional method for catalytic conversion is a diesel particulate trap ("DPT"). A DPT is a filter that collects particulate matter in the exhaust. The collected particulate matter must then be burned off before the filter becomes clogged. Burning off the particulate matter is referred to as "regeneration." Several conventional methods exist for regeneration of DPTs. First, an application of precious metal catalysts or base-metal catalyst to the surface of the filter can reduce the temperature needed for oxidation of particulate matter. Second, the filter can be preceded with a chamber containing oxidation catalyst that creates $NO_2$, which helps to burn off particulate matter. Third, the system can utilize fuel-born catalysts. Finally, external source of heat may be employed, wherein soot burns at 550 degrees Celsius without catalysts or approximately 260 degrees Celsius with precious metal catalysts. Regeneration leaves behind ash residue as the carbon burns, requiring constant maintenance to clean the filter.

Yet another conventional method utilizes diesel oxidation catalysts ("DOCs"). DOCs are catalytic converters that oxidize CO and hydrocarbons. Hydrocarbon activity extends to the polynuclear aromatic hydrocarbons ("PAHs") and the soluble organic fraction ("SOF") of particulate matter. Catalyst formulations have been developed that selectively oxidize the SOF while minimizing oxidation of sulfur dioxide or nitric oxide. However, DOCs may produce sulfuric acid and increase the emission of $NO_2$.

The function of the catalyst in the catalyzed diesel particulate filter (CDPF) is to lower the soot combustion temperature to facilitate regeneration of the filter by oxidation of diesel particulate matter (DPM) under exhaust temperatures experienced during regular operation of the engine/vehicle, typically in the 300-400° C. range. In the absence of the catalyst, DPM can be oxidized at appreciable rates at temperatures in excess of 500° C., which are rarely seen in diesel engines during real-life operation. Reported substrates used in these catalyst applications include cordierite and silicon carbide wall-flow monoliths, wire mesh, ceramic foams, ceramic fiber media, and more. The most common type of a CDPF is the catalyzed ceramic wall-flow monolith.

Catalyzed ceramic traps were developed in early 1980's. Their first applications included diesel powered cars and, later, underground mining machinery. Catalyzed filters were commercially introduced for Mercedes cars sold in California in 1985. Mercedes models 300SD and 300D with turbocharged engines were equipped with 5.66" diameter×6" filters fitted between the engine and the turbocharger.

The use of diesel traps on cars was later abandoned, due to such issues as insufficient durability, increased pressure drop, and filter clogging. Today, even though not all of these problems have been solved, catalyzed ceramic traps remain one of the most important diesel filter technologies. CDPFs are increasingly used in a number of heavy-duty applications, such as urban buses and municipal diesel trucks. For a number of years, limited quantities of catalyzed filters have been also used in underground mining (North America and Australia) and in certain stationary engine applications.

Catalyzed ceramic filters are commercially available for a number of highway, off-road, and stationary engine applications as both OEM and aftermarket (retrofit) product. The list of suppliers includes Engelhard, OMG dmc2, as well as several smaller emission control manufacturers who specialize primarily in the off-road markets.

The main component of conventional filters is a ceramic (typically cordierite or SiC) wall-flow monolith. The porous walls of the monolith are coated with an active catalyst. As the diesel exhaust aerosol permeates through the walls, the soot particles are deposited within the wall pore network, as well as over the inlet channel surface. The catalyst facilitates DPM oxidation by the oxygen present in exhaust gas.

Pressure Drop

The flow of exhaust gas through a conventional catalytic converter creates a substantial amount of backpressure. The backpressure buildup in a catalytic converter is an important attribute to catalytic converter success. If the catalytic converter is partially or wholly clogged, it will create a restriction in the exhaust system. The subsequent buildup of backpressure will cause a drastic drop in engine performance (e.g., horsepower and torque) and fuel economy, and may even cause the engine to stall after it starts if the blockage is severe. Conventional attempts to reduce pollutant emissions are very expensive, due to both the cost of materials and retrofitting or manufacturing an original engine with the appropriate filter.

High filtration efficiencies of wall-flow filters are obtained at the expense of relatively high pressure drop which increases with the filter soot load. Initially, the filter is clean. As the particulate start depositing within the pores in monolith walls (depth filtration), the pressure drop starts increasing with time in a non-linear manner. This phase is called the initial loading phase, during which pore attributes like permeability and filter porosity continuously change due to the increasing soot deposit inside the pore network. After the filtration capacity of the pores becomes saturated, soot starts depositing as a layer inside the inlet monolith channels (cake filtration phase). A linear increase in pressure drop with time (and with soot load) is observed during this period. One property that changes is the thickness of the soot layer. Some authors also distinguish an intermediate short transition phase, from the moment the particulates start depositing on the channel surface until the soot layer is fully established (Tan, J. C., et al., 1996, "A Study on the Regeneration Process in Diesel Particulate Traps Using a Copper Fuel Additive", SAE 960136; Versaevel, P., et al., 2000, "Some Empirical Observations on Diesel Particulate Filter Modeling and Comparison Between Simulations and Experiments", SAE 2000-01-0477).

Pressure drop modeling in clean filter substrates has been done. Relatively simple models that have been developed show excellent agreement with experimental results (Masoudi, M., et al., 2000, "Predicting Pressure Drop of Wall-Flow Diesel Particulate Filters—Theory and Experiment", SAE 2000-01-0184; Masoudi, M., et al., 2001, "Validation of a Model and Development of a Simulator for Predicting the Pressure Drop of Diesel Particulate Filters," SAE 2001-01-0911). Most of the filter pressure drop in real applications, however, is created by the soot deposit. In practical applications, the pressure drop of the clean wall-flow filter can be in the range of 1 to 2 kPa, while a loaded filter pressure drop of 10 kPa can be considered in certain circumstances low to moderate.

The total pressure drop of the particulate loaded filter, can be divided into the following four components: pressure drop due to sudden contraction and expansion at the inlet and outlet from the filter; pressure drop due to channel wall friction; pressure drop due to permeability of particulate layer; and pressure drop due to wall permeability.

Pressure drop due to sudden contraction and expansion at the inlet and outlet from the filter is similar to the same component in the clean filter, except that the effective channel size (hydraulic diameter) is now smaller due to the soot layer, resulting in more gas contraction.

Pressure drop due to channel wall friction also increases relative to the clean filter scenario, due to the decrease in the channel hydraulic diameter. With thick soot layers, $\Delta P$channel can become a very significant contributor to the total pressure drop.

Pressure drop due to permeability of particulate layer ($\Delta P$particulate) is can be a significant contributor to the total pressure drop.

Pressure drop due to wall permeability ($\Delta P$wall) is now also higher than in the clean filter, because the wall pores are partly filled with soot. The increase in P wall that can be attributed to the initial soot loading phase in the pores is represented by $\Delta P$ in FIG. 23.

The total pressure drop can be expressed as follows:

$$\Delta P = \Delta P\text{in/out} + \Delta P\text{channel} + \Delta P\text{particulate} + \Delta P\text{wall}$$

Mathematical modeling of the pressure drop in soot loaded diesel filters becomes a complex and difficult task. Important properties of soot, such as the permeability and packing density, depend on the application, engine operating conditions, and other parameters. There is an ongoing effort to simulate pressure drop in wall-flow filters and increasingly more sophisticated models are being developed. Predicting the actual soot loading may require a theoretical model of the regeneration process itself.

Types of Catalytic Converters and Particulate Filters

Catalytic converters can be classified based on a number of factors including: a) the type of engine on which the converter is used, b) its location relative to the engine, c) the number and type of catalysts used in the converter, and d) the type and structure of the substrate used. In addition each of these catalytic converters are often used in conjunction with other emission-control devices, such as CRT, EGR, SCR, ACERT, and other devices and methods.

Engine

Catalytic converters are used on at least two types of engines: gasoline and diesel. Within these two general classes, there are numerous types of specific gasoline and diesel engines. For example, gasoline and diesel engines are manufactured having varying displacements and horsepower. Certain engines are equipped with a turbocharger and/or an intercooler. Most car and truck engines are water-cooled, while many motorcycle engines are air-cooled. Certain utilities require high available horsepower, while others maximize fuel economy. All of these variables, in addition to others, may affect the level of pollutants produced during combustion of the fuel. Moreover, depending on the use of the engine, e.g., on-road, off-road, or stationary, there are different regulatory requirements with respect to emissions standards.

Location

The catalytic converter can theoretically be placed anywhere along the exhaust stream of an engine. However, physical characteristics of conventional catalytic converters limit their location. Most commonly in vehicles, the catalytic converter is placed some distance from the engine block, closer to the muffler and underneath the body of the car. The catalytic converter is usually not placed close to the engine because the catalytic converter can fail for several reasons. Such reasons include extreme temperatures, thermal shock, mechanical vibration, mechanical stress, and space limitations near the engine. Also, physical setups of stationary engines may limit the location of a catalytic converter or particular filter.

For example, in its 2004 FOCUS™, Ford Motor Company managed to deploy a mani-cat as did Honda Motor Corporation in one of its offerings. These systems are in actuality adjacent to, rather than part of, the manifold. The higher temperatures and the extreme vibrational energy generated by cylinder explosions and moving parts would subject current catalytic converters, if placed in a manifold, to extremes in thermal and physical shock. Additionally, a design for a mani-cat was proposed by Northup Grumman Corporation in U.S. Pat. No. 5,692,373. It is believed that even the current cordierite substrate would find such an environment challenging to endure.

In other applications, for example such as motorcycles (e.g., Harley-Davidson), the presence of a catalytic converter in certain locations can cause serious injury to the user. Because of the high operating temperatures of a catalytic converter, it would be preferable to use a catalytic converter that is less prone to causing injury to a user, e.g., a smaller catalytic converter, a converter that does not get as hot, etc.

In certain instances, the exhaust system (for example, in a car) may contain more than one catalytic converter or particular filter along its exhaust flow. (See FIG. 4). For example, an exhaust system may have an additional catalytic converter between the engine and the main catalytic converter. This configuration is referred to as a pre-cat. The pre-cat may have denser configuration. Another set-up is a back-cat, which has second catalytic converter behind (or after) the main catalytic converter. The back-cat is also sometimes used for a retrofit catalytic converter.

Two Way vs. Three Way vs. Four Way

Catalytic converters can generally be classified as being a two-way, three-way, or four-way converter. There are at least the following types of converters commercially available: oxidation converters, three-way converters (no air), three-way-plus oxidation converters, and four-way converters.

Oxidation (two-way) converters represent the early generation of converters that were designed to oxidize hydrocarbons (HC) and carbon monoxide (CO). Although these units represent the most basic form of catalytic converter technology, they remain a viable pollution reduction option in some areas. Oxidation converters usually contain platinum or palladium. However, other non-noble metals can be used as well.

In the early 1980s, most vehicle manufacturers began using converters designed to reduce NOx, in addition to oxidizing HC and CO. These three-way converters, which were used in conjunction with computer controlled engine systems and oxygen sensors, were employed to more precisely control the air to fuel ratio. These converters are referred to as three-way converters because they deal with three compounds: HC, CO and $NO_x$.

Most modern cars are equipped with "three-way" catalytic converters typically having one or more substrates in tandem using Corning's clay extrusion technology. "Three-way" refers to the three regulated emissions the converter helps to reduce: carbon monoxide, volatile organic compounds (VOCs, e.g., unburned hydrocarbons), and NOx molecules. Such converters use two different types of catalysts, a reduction catalyst and an oxidization catalyst.

In a three-way catalytic converter, the reduction catalyst is usually found in the first stage of the catalytic converter and serves to reverse the oxidation of nitrogen that occurred in the combustion chamber. It commonly uses platinum and rhodium to help reduce NOx emissions. The oxidation catalyst, which can be composed of metals such as platinum and/or palladium, is commonly located in a second region of the catalytic converter.

Three-way converters that have a reduction and an oxidation catalyst together in one housing are sometimes called three-way-plus-oxidation converters. These converters use air injection between the two substrates. This air injection aids the oxidation chemical reaction.

Four-way converters process carbon monoxide, nitrogen oxide, unburnt hydrocarbons, and particulate matter. These include, for example, the QuadCAT Four-Way Catalytic Converter manufactured by Ceryx. It is a catalytic converter that that, according to its manufacturer, reduces four of the major sources of air pollution—NOx, hydrocarbons, carbon monoxide and particulate matter—to levels that will allow diesel engines to meet 2002/2004 emissions standards. Others include those described in U.S. Pat. Nos. 4,329,162; and 5,253,476.

The catalytic converter, like other catalysts, facilitates reactions by lowering the activation energy required to accomplish the desired reaction. For example, if particulates require a temperature of 550° C. before reacting with oxygen in the presence of catalysts, to burn off, this same reaction might require a temperature of only 260° C. This lower energy threshold permits one physically to locate a catalytic system downstream from the engine where space is more abundant, even though temperatures are cooler. Otherwise, the catalytic system will need to be placed upstream where temperatures are higher. However, this is impractical with current technology because there is more potential to damage the substrate when it is placed closer to the engine.

Diesel engines produce emissions that are high in NOx and particulate matter due to the high temperature and pressure, while relatively low CO and hydrocarbon production. The compression combustion is less complete than with a spark of a gasoline engine. However, because of the relatively lean mixture with high air content, diesel is able to provide better gas mileage than a gasoline engine. Three-way catalysts do not work well in diesel exhaust due to the excess air. NOx reduction catalysts typically require a well-maintained stoichiometric ratio of fuel-to-air which cannot be easily done in diesel combustion engines.

Catalytic converter technology may be applied to various applications, including internal combustion engines and stationary combustion engines. The internal combustion engine is the most common engine used for vehicles. A catalytic converter is installed as a device in the vehicle's exhaust system, so the entire exhaust gas stream passes through the substrate, contacting the catalyst before being discharged from the tailpipe. However, catalytic converters can be also part of fairly complex systems involving various active strategies, such as injection of reactants in front of the catalyst or sophisticated engine control algorithms. Examples include a number of diesel catalyst systems being developed for the reduction of NOx. The attributes of simplicity and passive character which have been listed among the advantages of catalysts may no longer apply to those systems.

Conventional attempts to reduce pollutant emissions can be very expensive, due partly to both the cost of materials and, in certain applications, to retrofitting or manufacturing an original engine with the appropriate filter.

Advances in Catalytic Converter and Particulate Filter Technology

An invention that lead to progress in catalytic converters was Corning's development of extruded cordierite honeycomb monoliths. (See U.S. Pat. No. 4,033,779). Since the 1970's, more than a billion pounds of pollutants have been removed from exhaust streams using this approach which employs catalysts (platinum, palladium, rhodium, etc.) from the noble and base metal families firmly lodged in a washcoat on the surface of a rugged substrate (generally cordierite) that can withstand the extreme environment of an engine exhaust system. Variations and improvements to this core technology have evolved in the years since, including variations in the placement of catalytic converters as well as in their composition and methods of manufacture. Still, however, there remain fundamental inadequacies that, to date, have not been overcome. Currently, the state of technology is reaching physical and economical limits with only minor improvements being made at great expense.

Limitations of Current Substrates

While the present state of catalytic converter and particulate matter filter technology is useful to some degree for reducing emission pollution, there are certainly drawbacks to the current technology. There are also characteristics that are not met by the present catalytic converters. Some inadequacies are inherent to the type of substrate used. Accordingly, an improved substrate for use in a catalytic converter or particulate filter would be a significant advance in the fundamental physical and chemical attributes of the materials used as catalyst substrates in the catalytic converter. Moreover, an improved substrate would dramatically enhance the quality and would enable manufacturers and users to meet more easily the emissions standards of 2007, and 2010, and later years.

The conventional monolithic catalytic converter substrate is generally formed through an extrusion process. This process, which is both complicated and relatively expensive, has been used for the past twenty-five years. However, there are limitations to the extrusion process. There is a limit as to how small channels can be created within the material and still maintain quality control. The extrusion process also limits the shapes of the catalytic converters to cylinders or parallelograms, or shapes that have sides parallel to the extrusion axis. This shape limitation has not been an issue with previous emission standards. However, the need to design a catalytic converter and particulate filter able to reach near-zero emissions performance may require non-linear and/or non-cylindrical filter design and vehicle integration.

Decreasing the wall thickness increases the surface area, e.g., in certain instances, decreasing wall thickness from 0.006 inches to 0.002 inches increases surface area by 54%. By increasing the surface area, more particulate matter may be deposited in less volume. FIG. 1 shows a prior art honeycomb configuration 102 formed within a ceramic filter element 100 configured to increase the surface area for a catalytic converter. The honeycomb configuration 102 is formed using an extrusion process in which long channels with their major axis parallel to the extrusion action are created. The opening of these channels faces the incoming exhaust airflow.

Progress in technology has allowed the manufacture of ceramic cordierite substrates with decreased wall thickness. The once standard configuration for passenger car applications, 400/6.5, of 400 cpsi cell density and of 0.0065" (or about 0.17 mm) was gradually replaced with substrates of thinner walls (0.0055 to 0.004 mil). However, the physical limitations of this material have been approached. Because of the physical characteristics of ceramics, in particular cordierite, using substrates made of cordierite ceramics with even thinner walls is not practical. The thinner-walled material is not able to meet other necessary characteristics (e.g., durability, heat resistance).

Diesel catalysts, in part because of their larger sizes, often have thicker walls than their automotive counterparts. Because diesel wall flow filters generally have thicker walls, there are physical limitations on the channels per square inch these filters can have. Generally, there are no commercially available diesel wall flow filters having more than 200 channels per square inch.

Another limitation of currently available substrates is their decreased catalytic efficiency at lower temperatures. When a converter system is cold, such as at engine start up, temperatures are not sufficiently high to commence the catalytic reactions. The cordierite, silicon carbide, and various metal substrates employed in catalytic converters and marketed by Corning, NGK, Denso, and other companies today are fashioned from very tough, dense materials with excellent mechanical strength and tolerances for thermal shock and vibration. However, these materials require time to absorb heat after start up to reach temperatures sufficient for catalytic reactions. Due to the delay in the catalysis reaction start-up, it is estimated that approximately 50% of all of the emissions from modern engines are released to the atmosphere during the first 25 seconds of engine operation. Even a small improvement during these critical "cold start" seconds could drastically improve the amount of pollutants successfully treated annually. While effort has been invested to address this problem, there remains a need for a catalytic converter that can reduce emissions during this critical cold start period. Even the most advanced and expensive state of the art, cordierite-based catalytic converter requires approximately 20 seconds to start up.

To more quickly achieve reaction temperatures, attempts have been made to move the converters closer to the engine exhaust manifold where higher temperatures are more quickly available and also serve to drive reactions more vigorously during operation. Because usable space under the hood of a vehicle is limited, the size of converter systems, and therefore the amount of throughput that can be successfully treated, is limited. Current substrates cannot be effectively used in the engine compartment of vehicles. Moreover, adding additional weight to the engine compartment is undesirable, and many current substrates are dense and have limited porosity (roughly 50% or less), requiring systems that are both weighty and voluminous to treat large scale exhaust output. Additionally, substrates such as cordierite are susceptible to melting under many operating conditions, thereby causing clogs and increased back pressure.

Other methods of compensating for cold starts include elaborate adsorption systems to store NOx and/or hydrocarbons temporarily so that they might be treated once the converter has reached critical temperatures. Some of these systems require parallel piping and elaborate adsorption surfaces, additional valves and control mechanisms, or multiple layers of differing washcoats used to adhere catalysts to substrates and to segregate reaction environments. This problem is especially challenging in diesel engines where large volumes of soot particulates, NOx, and SOx may need to be trapped. In some large, industrial diesel engines, rotating banks of diesel particulate traps are used to collect, store, and subsequently treat particles. (In still other systems, NOx is stored and used as an oxidizing agent to convert CO into $CO_2$ while it is reduced to $N_2$.)

Given regulatory restrictions on total emissions, a system that could readily curtail even some of the 50% of emissions that occur during cold start might obviate the need for some of the expensive and elaborate work-arounds described above. Used in conjunction with these work arounds, such a system could result it in substantially decreased emissions. However, as explained above, conventional systems are generally complicated and expensive and also tend to misfire and/or work unpredictably.

Another inherent limitation of conventional systems is the typical "residence time" required to burn off particulates. When one considers the large volume of exhaust gas throughput during operation and the speed at which the gas must flow, it is important that a converter be capable of rapid light off. Thus, a catalytic converter capable of rapid light off, of enduring extreme thermal and vibrational shocks, and capable of rapid internal temperature build up during cold starts, would greatly enhance the capability of industry to reduce emissions, meet upcoming environmental standards for 2007 and 2010, and produce cleaner operating cars, trucks, buses, and heavy industrial engines.

If the substrate were also lightweight, it would also result in improved mileage statistics on new vehicles. To date, however, no substrate has been identified capable of addressing many or all of these problems.

Design Considerations for a Substrate for a Catalytic Converter or Particulate Filter Catalyst substrate is a crucial component influencing performance, robustness, and durability of catalytic converter systems. Furthermore, filtering substrates significantly affect the operating performance of particulate filters. Ideally, the substrate used in a catalytic converter or particulate filter should have a number of attributes. These attributes include, but are not necessarily limited to, one or more of the following aspects: a) surface area; b) porosity/permeability; c) emissivity; d) heat conductance; f) thermal attributes such as shock resistance, expansion, and conductance; g) density; h) structural integrity; i) efficiency of pollutant treatment; j) amount of catalyst required; and k) weight of the system. A catalytic or filtering substrate that optimizes one or more attributes would be an advance in the field of filtering fluids and catalyzing reactions.

BRIEF SUMMARY OF THE INVENTION

Various embodiments are described in this summary. These, as well as other embodiments of the invention, are described in the following Detailed Description section.

The inventor has discovered that a non-woven Sintered Refractory Fibrous Ceramic (nSiRF-C) composite, as described herein, can be used as and shaped into an improved substrate for catalytic converters, particulate filters, and related devices.

The inventor has also discovered that an improved catalytic substrate and improved filtering substrate can be prepared from a material having particular attributes as described herein. For example, suitable attributes include high melting point, low heat conductance, low coefficient of thermal expansion, ability to withstand thermal and vibrational shock, low density, and very high porosity and permeability. An exemplary material in one embodiment that has these attributes is a nSiRF-C.

One example of a material having suitable attributes is a nSiRF-C composite. An example of a nSiRF-C is an alumina enhanced thermal barrier ("AETB") material or a like material, which can be used in accordance with embodiments of the present invention as a catalytic substrate or a filtering substrate. AETB materials are known in the art and comprise aluminaboriasilica (also known as alumina-boria-silica, aluminoborosilicate, and aluminoboriasilicate) fibers, silica fibers, and alumina fibers. One commonly known application for AETB is as an exterior tile on the Space Shuttle, ideal for shuttle re-entry. AETB has not been used as a filtering substrate or a catalytic converter substrate.

It has been realized by the present inventor that the attributes that make AETB desirable to the space industry are also preferred in combustion technology. Among other attributes, AETB has a high melting point, low heat conductance, low coefficient of thermal expansion, ability to withstand thermal and vibrational shock, low density, and very high porosity and permeability. This combination of desired attributes is lacking in current filtering and catalytic converter substrates.

It has also been discovered that nSiRF-C composites, such as AETB and similar suitable substrates, can be prepared, shaped, molded, cut, and/or fashioned (or otherwise modified physically) into new forms suitable for use as particulate filter and catalytic converter substrates.

The present invention has a number of advantages over current technology. First, the present invention will lead to improved air quality and respiratory health. The present invention may substantially reduce the potential for carbon monoxide poisoning.

Embodiments of the present invention can be used as a direct substitute for currently used catalytic and filtering substrates, as well as catalytic converters and particulate filters, and exhaust and engine systems. As described in fine detail below, the substrates of the present invention provides a number of advantages over prior art substrates and further solves a number of problems left unsolved by the prior art substrates. This can translate into significant cost savings on the part of the manufacturers. Because it is possible to use the present invention as a direct substitute for current technology, there is no need to redesign exhaust systems. Thus, enhanced exhaust filtering and cleaning can be obtained without the need to retool manufacturing plants and lines and with only minimal investment in time.

The improved catalytic and filtering characteristics of the present invention require, in certain embodiments, the use of less catalyst. Because most catalysts used for the relevant applications are expensive, this advantage leads to another cost-saving.

The preferred thermal attributes of some embodiments of the present invention reduce and/or eliminate the need for certain parts of the exhaust system that deal with the heat build-up associated with current catalytic converters and particulate filters. Heat shields and insulation may not be needed in certain embodiments of the present invention. Elimination of these components from exhaust systems and vehicles reduces cost only directly (components are not used, thus lower costs of production) but also indirectly (the weight of a vehicle is reduced, thus reducing fuel costs). Other benefits may include better performance, better mileage, and/or better horsepower.

In certain embodiments, a conventional catalytic converter or particulate filter can be replaced with the present invention that is smaller but has the same or better efficiency of removing pollutants. With a smaller catalytic converter or particulate filter, more space is available on the vehicle for other purposes. Furthermore, because the filter or converter of the present invention is smaller, the overall weight of the vehicle is reduced.

Another aspect of some embodiments of the present invention is a catalytic substrate suitable for use in a catalytic converter that is placed, either wholly or in part, in the head of an engine Said catalytic converter, referred to herein as head cat, has numerous advantages over the prior art. For example, conventionally such a head cat is not practical because of the limitations of currently available catalytic substrates. The common substrate cordierite would absorb too much heat. Because of the preferred thermal characteristics of the substrate of the present invention, a head cat comprising said substrate would reduce turbo thermal stress on a turbocharger and/or intercooler if present.

Also a head cat does not require additional external hardware such as heat shields. The use of a head cat permits the maintenance of preferred appearances of engines and products, such as in motorcycles. In certain embodiments, the use of a head cat also reduces external discoloration of the exhaust system, such as mufflers and header pipes. A number of additional advantages of the head cat in certain embodiments include one or more of the following: increased safety; filters particles that intercooler would otherwise pick up, hence improving life of inter-cooler and providing a cost saving; no matting required in certain embodiments; rattling sounds in heat shields can be reduced or eliminated with the use of a head-cat; and the head cat can reduce the size of the requisite muffler.

In other embodiments of the head cat; smaller particulate matter is more efficiently burnt off. In case of failure of a head-cat, only one small cat may need replacement. Head-cats are also provide these advantages to for boats, watercraft, motorcycles, leaf-blowers etc.

More, different embodiments of the present invention provide one or more of the following advantages over the prior art: improved appearance; avoidance of additional hardware; additional hardware (that might be required due to tighter regulations) would not be necessary with the present invention; decreased or eliminated discoloration of muffler and exhaust pipes due to exothermic chemical reactions. The present invention allows in certain embodiments a smaller substrate, and thus a smaller muffler or canister in certain systems. The substrate of the present invention provides increased safety for systems using a catalytic converter or particulate filter because the substrate of the present invention has improved thermal properties and does not absorb as much heat as certain conventional substrates. Moreover, the substrate of the present invention cools off faster than many conventional substrates, leading to increased safety. Certain embodiments of the present invention provide for improved resistance to temperature change and therefore will not crack, fracture, or become damaged as much as certain conventional substrates if there is a sudden temperature change. In certain embodiments, the substrate is easier to manufacture than conventional substrates (e.g., a nSiRF-C wall flow substrate can be manufactured from a single piece of material rather than plugging channels). This attribute saves not only time but also money.

In other embodiments, a nSiRF-C weighs less than conventional aftertreatment devices. This attribute is not only important for cars, but also crucial in markets where weight is a factor (e.g., small engines, motorcycles, personal watercraft, and performance cars).

In some embodiments, the substrate of the present invention exhibits a less backpressure than competing aftertreatment devices. This lower backpressure can results in increased vehicle performance, increased horsepower, and increases fuel economy.

Other embodiments of the invention are directed to, for example, a method catalyzing reaction, a method of filtering a fluid, a process of preparing a catalytic substrate, a process of preparing a filtering substrate, a substrate prepared according to said processes, and others as described in more detail below.

BRIEF DESCRIPTION OF THE DRAWINGS

FIGS. 2a and 2b show micrographs of cordierite. In FIG. 2b, sphere 210 represents a PM-10 sized particle and sphere 225 represents a PM-2.5 sized particle.

FIGS. 13a-13c show hexagonal channels 1310, triangular 1320, and square channels 1330, respectively. These embodiments are all successful in carrying out the present invention because the walls 1315, 1325, 1335 of the channels 1310, 1320, 1320 are substantially parallel to each other.

FIGS. 14c and 14d illustrate the fibers 1420, 1421 present in the material. These fibers show the porosity, which is superior to the platelets of cordierite in conventional systems.

FIG. 16 also provides exemplary physical dimensions in inches of comb 1600.

FIG. 17 provides fluid flow 1704 entering channel openings 1702 on the frontal surface. Fluid exits the rear surface of the substrate at 1704 on the right hand side. The substrate shown in FIG. 17 exemplifies a substrate having a wall-flow configuration, wherein the channels gradually decrease in size as the channel extends from the channel opening through the substrate to the channel terminus.

FIGS. 27a-c shows a catalytic converter or particulate filter 2700 having stacked membrane configuration substrates 2710. The inlet port 2720 and outlet port 2730 are fashioned at different heights. FIGS. 27b and 27c show alternative embodiments.

FIG. 41 is a chart that contains various examples of wash coatings.

DETAILED DESCRIPTION OF EMBODIMENTS OF THE INVENTION

Overview

Figure 1:
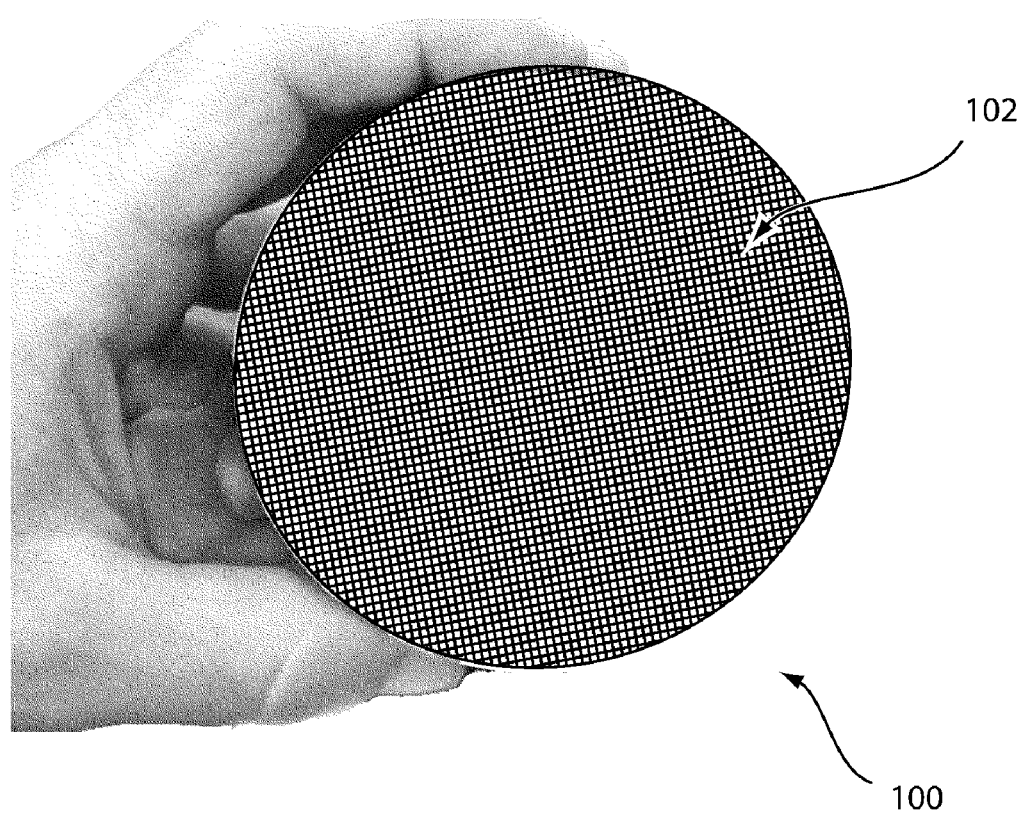
FIG. 1 is a cross-sectional view of a conventional cordierite substrate incorporating a honeycomb structure. The honeycomb configuration 302 is formed within the cordierite filter element 300. The honeycomb structure 302 is formed using an extrusion process in which long channels (or tubes) with their major axis parallel to the extrusion action are created. The openings of these channels face the incoming exhaust airflow. As the emissions enter the channels, the particulate will deposit along the interior septum of the tubes.

The present invention in certain embodiments is directed to a catalytic substrate suitable for use in a number of applications, including as a substrate in a catalytic converter. Another aspect of the present invention is a filtering substrate suitable for use in a number of applications, including as a substrate in a particulate filter, such as a diesel particulate filter (DPF), or diesel particulate trap (DPT). The invention also provides an improved substrate for removing and/or eliminating pollutants from the exhaust of combustion engines. The catalytic substrate and filtering substrate provide, in certain embodiments, improvements in removing pollutants from an exhaust gas. The improvements include, but not limited to, one or more of the following: faster light-off period, increased depth filtration of PM, less back pressure, lower probability of clogging, increased ability to be placed in multiple locations in the exhaust system including the manifold or the head itself, high probability of catalytic reaction, high conversion ratios of NOx, HC, and CO, a faster burnoff of PM, minimization of catalyst material use, reduced weight of the after-treatment exhaust system, and the like.

Other embodiments of the invention include catalytic converters, particulate filters, diesel particulate filters, diesel particulate traps, and the like. The present invention also provides a process of making or preparing the catalytic and filtering substrates, catalytic converters, particulate filters, catalytic mufflers, and exhaust systems. Other embodiments of the present invention include a pre-cat, a back-cat, a head-cat, and a mani-cat, each of which comprises a substrate of the present invention. Additionally, the present invention, in alternative embodiments, is directed to a substrate made according to the process described herein.

In another aspect, the present invention includes a catalytic substrate or filtering substrate that offers one or more of the following attributes: a faster light-off period, increased depth filtration of PM, a lower backpressure, a lower probability of clogging up, an ability to be placed in multiple locations in the exhaust system including the manifold or the head itself, a higher probability of catalytic reaction, a higher conversion ratios of pollutants such as NOx, HC, CO, faster burnoff of PM, a lower amount of catalyst material needed, faster light-off in for cold starts, lower external wall temperature of the substrate, and the like.

Using a substrate, catalytic converter, particulate filter, or exhaust system of the present invention provides a number of advantages and improvements over the prior art. In certain embodiments, these improved catalytic converters and/or particulate filters are able to remove and/or eliminate pollutants from the exhaust of combustion engines with a number of specific advantages, as described in more detail below. Improved exhaust systems are likewise an additional aspect of the invention described herein. The improved exhaust system reduces the amount of pollutants emitted from the operated engine.

The present invention, including nonlimiting embodiments and examples, are described in more detail below. The embodiments discussed herein are provided for illustrative purposes only. The invention is not limited to these embodiments.

Catalytic Substrate

The present invention is directed to a catalytic substrate comprising, or alternatively consisting of or consisting essentially of, a non-woven Sintered Refractory Fibrous Ceramic (nSiRF-C) composite, as described herein, that can be used in catalytic converters, particulate filters, and related devices; and optionally further comprising an effective amount of a catalyst, such as a catalytic metal. Preferably, the catalytic substrate comprises a catalyst. The nSiRF-C composite can be shaped into configurations suitable for uses described herein.

The nSiRF-C composite is non-woven. In certain embodiments, the nSiRF-C composite is a material having a definitive, rigid three-dimensional shape. The fibers of the nSiRF-C composite are not arranged in an organized pattern but are arranged three-dimensionally in a random, haphazard, or omnidirectional fashion. In some embodiments, the nSiRF-C is in the form of a matrix.

The nSiRF-C is a sintered composite. In one embodiment, a sintered composite is a cohesive mass formed by heating without melting. However, the process of sintering a ceramic material is well-known in the art, and thus the scope of the present invention is not necessarily limited to specific embodiments and descriptions described herein. Sintering creates bonds without resin residue. With reference to the present invention, the sintered ceramic is a cohesive mass of dispersed fibers formed by heating without melting.

The nSiRF-C is a refractory fibrous ceramic composite. The nSiRF-C of certain embodiments is composed of high grade refractory fibers of various lengths and compositions as exemplified in nonlimiting embodiments herein.

In one embodiment, the present invention is directed to a catalytic substrate suitable for use in a number of applications as described herein. Such a substrate includes a number of materials which have one or more, preferably a plurality of attributes as described herein. The substrate of the present invention is made of a non-woven, fibrous ceramic composite made from refractory grade fibers. Such a material is disclosed in U.S. Pat. No. 4,148,962, which is incorporated herein by reference in its entirety. Other suitable materials are disclosed in U.S. Pat. No. 3,953,083.

In one embodiment, the catalytic substrate of the present invention comprises, or alternatively consists or consists essentially of, an alumina enhanced thermal barrier ("AETB") material or a like material known to one of ordinary skill in the art. AETB material is known in the art and more fully described in Leiser et al., "Options for Improving Rigidized Ceramic Heatshields", Ceramic Engineering and Science Proceedings, 6, No. 7-8, pp. 757-768 (1985) and Leiser et al., "Effect of Fiber Size and Composition on Mechanical and Thermal Properties of Low Density Ceramic Composite Insulation Materials", NASA CP 2357, pp. 231-244 (1984), both of which are hereby incorporated by reference.

In another embodiment, the catalytic substrate comprises Ceramic tiles, such as alumina enhanced thermal barrier (AETB) with toughened unipiece fibrous insulation (TUFI) and/or reaction cured glass (RCG) coatings. Such materials are known in the art.

Another suitable material is Fibrous Refractory Ceramic Insulation (FRCI). In one embodiment, AETB is made from aluminaboriasilica (also known as alumina-boria-silica, aluminoborosilicate, and aluminoboriasilicate) fibers, silica fibers, and alumina fibers. One commonly known application for AETB is as an exterior tile on the Space Shuttle, ideal for shuttle re-entry. AETB has a high melting point, low heat conductance, and coefficient of thermal expansion, ability to withstand thermal and vibrational shock, low density, and very high porosity and permeability. Thus, in a preferred embodiment, the catalytic substrate has a high melting point, low heat conductance, coefficient of thermal expansion, an ability to withstand thermal and vibrational shock, a low density, a high porosity, and a high permeability.

In one embodiment, a first component of AETB is alumina fibers. In preferred instances of the present invention, the alumina ($Al_2O_3$ or aluminum oxide, e.g., SAFFIL), is typically about 95 to about 97 weight percent alumina and about 3 to about 5 weight percent silica in commercial form. In other embodiments, alumina having a lower purity are also useful, e.g., 90%, 92%, and 94%. In other embodiments, alumina having a higher purity are also useful. Alumina can be produced by extruding or spinning. First, a solution of precursor species is prepared. A slow and gradual polymerization process is initiated, for example, by manipulation of pH, whereby individual precursor molecules combine to form larger molecules. As this process proceeds, the average molecular weight/size increases, thereby causing the viscosity of the solution to increase with time. At a viscosity of about ten centipoise, the solution becomes slightly adhesive, allowing fiber to be drawn or spun. In this state, the fiber may also be extruded through a die. In certain embodiments, the average fiber diameter ranges from about one to six microns, although larger and smaller diameter fibers are also suitable for the present invention. For example, the fiber diameters in other embodiments range from 1-50 microns, preferably 1-25 microns, more preferably 1-10 microns.

In one embodiment, a second component of an AETB is silica fiber. Silica ($SiO_2$, e.g., Q-fiber or quartz fiber), in certain embodiments, contains over 99.5 weight percent amorphous silica with very low impurity levels. Silica of lower purities, e.g., 90%, 95%, and 97%, are also useful for the invention. In certain embodiments, an amorphous silica is used that has a low density (e.g., 2.1 to 2.2 $g/cm^3$), high refractoriness (1600 degrees Celsius), low thermal conductivity (about 0.1 W/m-K), and near zero thermal expansion.

In one embodiment, a third component of an AETB is aluminaboriasilica fibers. In certain instances, aluminaboriasilica fiber ($3Al_2O_3 \cdot 2SiO_2 \cdot B_2O_3$, e.g., NEXTEL 312) is typically 62.5 weight percent alumina, 24.5 weight percent silica, and 13 weight percent boria. Of course, the exact percentages of the constituents of the aluminaboriasilca may vary. It is largely an amorphous product but may contain crystalline mullite. Suitable aluminaboriasilica fibers and methods of making the same are disclosed, for example, in U.S. Pat. No. 3,795,524, the teachings of which are herein incorporated by reference in their entirety.

Another suitable material for use as a substrate of the present invention includes Orbital Ceramics Thermal Barrier (OCTB), available from Orbital Ceramics (Valencia, Calif.).

Other suitable materials for use as a nSiRF-C in the present invention include: AETB-12 (having a composition of about 20% $Al_2O_3$, about 12% (14% $B_2O_3$, 72% $Al_2O_3$, 14% $SiO_2$; NEXTEL™ fiber), and about 68% $SiO_2$); AETB-8 (having a composition of about 20% $Al_2O_3$, about 12% (14% $B_2O_3$, 72% $Al_2O_3$, 14% $SiO_2$ NEXTEL™ fiber), 68% $SiO_2$); FRCI-12 (having a composition of about 78% wt. silica ($SiO_2$), and 22% wt. aluminoborosilicate (62% $Al_2O_3$, 24% $SiO_2$, 14% $B_2O_3$); and FRCI-20 (having a composition of about 78% wt. silica ($SiO_2$) and about 22% wt. aluminoborosilicate (62% $Al_2O_3$, 24% $SiO_2$, 14% $B_2O_3$).

In a preferred embodiment, the components of the inorganic fibers consists, or consists essentially of, fibrous silica, alumina fiber, and aluminoborosilicate fiber. In this embodiment, the fibrous silica comprises approximately 50-90(%) percent of the inorganic fiber mix, the alumina fiber comprises approximately 5-50(%) percent of the inorganic fiber, and the aluminoborosilicate fiber comprises approximately 10-25(%) percent of the inorganic fiber mix. The fibers used to prepare the substrate of the present invention may have both crystalline and glassy phases in certain embodiments.

Other suitable fibers include aluminoborosilicate fibers preferably comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively). The aluminoborosilicate fibers preferably are at least 50 percent by weight crystalline, more preferably, at least 75 percent, and most preferably, about 100% (i.e., crystalline fibers). Sized aluminoborosilicate fibers are commercially available, for example, under the trade designations "NEXTEL 312" and "NEXTEL 440" from the 3M Company. Further, suitable aluminoborosilicate fibers can be made as disclosed, for example, in U.S. Pat. No. 3,795,524, which is incorporated herein by reference in its entirety.

Additional suitable fibers include aluminosilicate fibers, which are typically crystalline, comprising aluminum oxide in the range from about 67 to about 77, e.g., 69, 71, 73 and 75, percent by weight and silicon oxide in the range from about 33 to about 23, e.g., 31, 29, 27, and 25, percent by weight. Sized aluminosilicate fibers are commercially available, for example, under the trade designation "NEXTEL 550" from the 3M Company. Further, suitable aluminosilicate fibers can be made as disclosed, for example, in U.S. Pat. No. 4,047,965 (Karst et al.), the disclosure of which is incorporated herein by reference.

In other embodiments, the fibers used to prepare the substrate of the present invention comprise $\alpha$-$Al_2O_3$ with $Y_2O_3$ and $ZrO_2$ additions, and/or $\alpha$-$Al_2O_3$ with $SiO_2$ added (forming $\alpha$-$Al_2O_3$/mullite)

Various specific materials can be used to prepare the catalytic substrate. In one embodiment, the material used to prepare a substrate of the present invention comprises, or alternatively consists or consists essentially of, refractory silica fibers and refractory aluminumborosilicate fibers. In another embodiment, the material used to prepare the catalytic substrate comprises refractory silica fibers, refractory grade alumina fibers, and a binding agent, preferably a boronoxide or a boron nitride powder. In another embodiment the fibers are high grade.

In another embodiment, the substrate comprises a refractory composite consisting essentially of aluminosilicate fibers and silica fibers in a weight ratio within the range of about 19:1 to 1:19, and about 0.5 to 30% boron oxide, based on the total weight of the fibers. Alternatively, the weight ratio of aluminosilicate fibers to silica fibers is selected from 16:1, 14:1, 12:1, 10:1, 8:1; 6:1, 4:1, 2:1, 1:1, 1:2, 1:4, 1:6, 1:8, 1:10, 1:12, 1:14, and 1:16. The boron oxide is present in other embodiments in about 5%, 10%, 15%, 20%, 25%, or 30%. In a further embodiment, the boron oxide and aluminosilicate fibers are present in the form of aluminoborosilicate fibers. In a further embodiment, the catalytic substrate comprises a nSiRF-C composite wherein the aluminosilicate fiber to silica fiber ratio ranges from 1:9 to 2:3 and the boron oxide content is about 1 to 6% of the fiber weight.

In another embodiment, fibers suitable for preparing the substrate of the present invention include the refractory fibers produced by 3M such as NEXTEL™ Ceramic Fiber 312, NEXTEL™ Ceramic Fiber 440, NEXTEL™ Ceramic Fiber 550, NEXTEL™ Ceramic Fiber 610, and NEXTEL™ Ceramic Fiber 720. The composite grade fibers Nextel™ Fibers 610, 650, and 720 have more refined crystal structures based on alpha-$Al_2O_3$ and do not contain any glassy phases. This allows them to retain strength to higher temperatures than the industrial fibers. Nextel™ Fiber 610 has essentially a single-phase composition of $\alpha$-$Al_2O_3$. It has the lowest strength retention at temperature even though it starts with the highest strength at room temperature. Both Nextel™ Fiber 650, which is $\alpha$-$Al_2O_3$ with $Y_2O_3$ and $ZrO_2$ additions, and Nextel™ Fiber 720 which is alpha-$Al_2O_3$ with $SiO_2$ added (forming $\alpha$-$Al_2O_3$/mullite) have better strength retention at temperature and lower creep.

In another suitable embodiment, a nSiRF-C is made from or comprises (or alternatively, consists of or consists essentially of) ceramic fibers comprising $Al_2O_3$, $SiO_2$, and $B_2O_3$, having the following attributes: 1) melting point of about 1600° C. to about 2000° C., preferably about 1800° C.; 2) a density of about 2 to about 4 g/cc, preferably about 2.7 to about 3 g/cc; 3) a refractive index of about 1.5 to about 1.8, more preferably selected from 1.56, 1.60, 1.61, 1.67, and 1.74; 4) a filament tensile strength (25.4 mm gauge) of about 100 to about 3500 MPa, more preferably from about 150 to about 200 or from about 2000 to about 3000, or selected from 150, 190, 193, 2100, or 3100; 5) a thermal expansion (100-1100° C.) from about 2 to about 10, preferably about 3 to about 9, more preferably selected from 3, 4, 5.3, 6, and 8; 6)

and a surface area of less than about 0.4 m²/g, more preferably less than about 0.2 m²/g. In other embodiments, the crystal phase of the fibers are mullite and amorphous, substantially amorphous, $\gamma$-$Al_2O_3$, or amorphous $SiO_2$. In still other embodiments, the dielectric constant of a fiber that is suitable for use in preparing a substrate according to the present invention is about 5 to about 9 (at 9.375 GHz), or preferably selected from the group consisting of 5.2, 5.4, 5.6, 5.7, 5.8, 6, 7, 8, and 9.

In certain embodiments, the substrate of the present invention is substantially "shot-free" meaning free of particulate ceramic (i.e., crystalline ceramic, glass, or glass-ceramic) from the fiber manufacture process.

In certain embodiments, the nSiRF C composite is "non-flexible." In one embodiment, nonflexible refers to a substrate that cannot be bent more to an angle of 1, 2, 3, 4, 5, 6, 7, 8, 9, 10, 15, 20, or 25 degrees (with respect to the point of bending) without breaking, cracking, or becoming permanently deformed or misshaped.

The diameter of the fibers used different embodiments of the invention may vary. In certain embodiments, the average diameter is from about 1 to about 50 microns, preferably 1 to about 20 microns. In other embodiments, the average diameter is about 6, 7, 8, 9, 10, 11, 12, 13, 14, or 15 microns. In other embodiments, the average fiber diameter for aluminiaboriasilica fibers is from about ten to about twelve microns.

In another embodiment, the catalytic substrate of the present invention further comprises a binding agent such as boron nitride. In another embodiment of the present invention, boron nitride is added to replace the aluminaboriasilica fiber when it is not used. That is, in some embodiments, the substrate comprises (or consists of or consists essentially of or is made from) silica fiber, alumina fiber, and boron nitride in similar weight percentage as described above. In a further embodiment, the substrate comprises silica fiber, alumina fiber, and a boron binder. Each of these may, in certain embodiments, contain small amounts of other material such as organic binders, inorganic binders and some fibrous or non-fibrous impurities. In other embodiments, the substrate does not contain an organic binder. Furthermore, in other instances, the binder that is used to create the nSiRF-C is materially changed during the process of making, as is known in the art.

Additional suitable materials for use in preparing the substrate of the present invention are disclosed in U.S. Pat. No. 5,629,186 which describes low density fused fibrous ceramic composites prepared from amorphous silica and/or alumina fibers with 2 to 12% boron nitride by weight of fibers. In another embodiment, a thickening agent is added. Suitable thickening agents are known in the art.

In other embodiments, the ceramic fibers used to prepare the nSiRF-C have an average tensile strength greater than about 700 MPa (100,000 psi), preferably greater than about 1200 MPa (200,000 psi), more preferably, greater than about 1800 MPa (300,000 psi), and most preferably, greater than about 2100 MPa (350,000 psi).

In another embodiment, a dispersant is added. Suitable dispersants are known in the art.

In other embodiments, the catalytic substrate is treated with, altered, modified, and/or enhanced in one or more aspects as described herein and/or as is known in the art.

In still other embodiments, minor impurities of various sources are present. In these cases, the impurities do not substantially affect the nSiRF-C and/or its attributes.

A substrate according to the present invention does not include a NEXTEL™ woven fabrics or mat.

Catalyst

In another aspect, the present invention is directed to a substrate as described above comprising a catalyst. Any number of catalysts can be used with the substrate to form a catalytic substrate. The catalyst may be coated onto the surface of the substrate. That is, the catalyst, in one embodiment, is adsorbed onto the surface (e.g., the walls of the channels) of the catalytic substrate. Catalyst could also reside on the inside of the core of the substrate and attached to the individual fibers of the substrate. In certain embodiments, the present invention can function at the same or better levels compared to current technology but require a smaller amount of catalyst.

In another embodiment, the catalyst is deposited only on the channel wall surfaces and not inside the channel walls. In another embodiment, the catalyst is deposited on the ingress channel walls, on the egress channel walls, within the walls, or combinations thereof. In yet a further embodiment, a first catalyst lines, coats, or permeates a beginning, or proximal, portion of the channel wall; a second catalyst lines, coats, or permeates a middle portion of the channel wall; and yet a third catalyst at a terminal section of the channel wall.

In one embodiment, the catalytic substrate of the present invention preferably contains a catalytic metal. In another metal, the catalytic substrate does not contain a catalytic metal. However, under certain conditions, the substrate is able to catalyze suitable reactions without the need for a separate catalytic metal, for example, in certain embodiments, a washcoat as described below may function as a catalyst.

Any catalyst capable of being applied to the substrate can be used. Such a catalyst includes but is not limited to platinum, palladium (such as palladium oxide), rhodium, derivatives thereof including oxides, and mixtures thereof. In addition, the catalysts are not restricted to noble metals, combinations of noble metals, or only to oxidation catalysts. Other suitable catalysts include chromium, nickel, rhenium, ruthenium, silver, osmium, iridium, platinum, and gold, iridium, derivatives thereof, and mixtures thereof. Other suitable catalysts include binary oxides of palladium and rare earth metals as disclosed in U.S. Pat. Nos. 5,378,142 and 5,102,639, the disclosures of which are hereby incorporated herein by reference. These binary oxides may result from the solid state reaction of palladium oxide with the rare earth metal oxides, to produce, e.g., $Sm_4PdO_7$, $Nd_4PdO_7$, $Pr_4PdO_7$ or $La4PdO_7$. Other catalysts that can be used in the present invention include those disclosed in U.S. Pat. No. 6,090,744 (assigned to Mazda Motor Corporation). Other suitable catalysts include non-metallic catalysts, organic catalysts, base metal catalysts, precious metal catalysts, and noble metal catalysts.

Other suitable catalysts are disclosed in U.S. Pat. No. 6,692,712 (assigned to Johnson Matthey Public Limited Company). Catalysts that do not comprise precious metals may be used in the present invention. Such catalysts are shown in U.S. Pat. No. 5,182,249.

Another suitable platinum catalyst developed by Engelhard is composed of Pt/Rh at 5:1 ratio (applied in an amount of about 5-150 g/ft³) and MgO (applied in an amount of about 30-1500 g/ft³).

In other embodiments, vanadium and derivates thereof, e.g., $V_2O_5$, are useful catalysts, in particular for diesel particulate filters. Such catalysts have been used in commercially available in diesel particulate filters.

Catalysts were developed that utilized vanadium compounds other than $V_2O_5$, for example silver or copper vanadates. An example copper vanadate base metal catalyst was developed by Heraeus (Strutz 1989). The catalyst can be prepared by doping and calcining copper vanadate $Cu_3V_2O_8$ with potassium carbonate in the molar ratio Cu:V:K about 3:2:0.13. The catalyst loading was between 10 and 80 g/m² of the filtration surface area. Another suitable catalyst is Cu/ZSM5, which can be used as a DeNox catalyst.

Precious metals such as platinum, palladium, and rhodium are the most common and are preferred, although other catalysts known in the art can be used. These three precious metals have been known as excellent and highly efficient catalysts with internal combustion engine emissions. In over twenty-five years of catalytic converters, there has not really been a meaningful substitute for this trinity. However, there are thousands of combinations of these catalysts configured according to the original equipment manufacturer, vehicle, vehicle load, environmental regulations, engine, transmission, etc. Throughout the truck and automotive manufacturing industry, various combinations and formulations of catalysts are employed. A catalytic substrate according to the present invention comprises any one or more of these catalyst combinations. Many combinations are considered proprietary material. Manufacturers such as Ford, GM, and Toyota have a unique catalyst formula for each vehicle, due to the varying vehicle weights and engine performance demands. Manufacturers also have different catalyst formulas for the same vehicle depending upon where the vehicle will be sold or licensed, e.g., Canada, United States, California, Mexico. Currently, these formulations may change two to three times per vehicle per model year, due to the strict governmental regulations. For these reasons, most manufacturers handle the application of the catalytic coatings themselves.

In a further embodiment, the catalytic substrate comprises a nSiRF C and a catalyst that is used in a commercially available catalytic environment.

In one aspect, once the substrate has been shaped to its final dimensions and a washcoat is applied and cured, one or more catalysts are applied using known techniques and methods, such as the manner of applying a palladium-platinum based catalyst as disclosed in U.S. Pat. Nos. 5,224,852 and 5,272,125, the teachings of which are both incorporated herein by reference in their entirety.

In one embodiment, the catalyst is in an amount sufficient for the catalytic action to take place effectively. For example, the amount sufficient, in one embodiment, refers to an amount of catalyst, e.g., a precious metal, interacting with and in the path of the emission sufficient to react with as much of the emission as possible, such as 80%, 85%, 90%, 95%, 97%, 98%, and 99%, and the like.

In one embodiment, the catalyst is deposited on or impregnated into the washcoat, preferably as individual crystals. In this embodiment, the catalysts are not applied as a veneer-like coating over the washcoat (like paint on a wall). When the catalysts are impregnated onto the washcoat, they are applied so the end product is partially or substantially a colony of individual crystals. This can be visualized as salt crystals on a pretzel. It is preferable that sufficient spacing is provided between the catalysts. At the same time, there should be enough precious metals in the fluid path, e.g., the exhaust path, at the optimum catalytic activity operating temperature, i.e., light off, and the precious metals must fit within the physical restraints, i.e., space, permitted by the functionality and design of a vehicle and engine.

A manufacturing goal is to maximize the pollutants removed while minimizing the amount of catalyst required on the substrate. Each vehicle produces a different amount of pollutant, and as such, the substrate is in some embodiments customized to address that level of pollutants and minimize the amount of precious metals.

In another embodiment, the catalyst addition to the catalytic substrate can occur during the slurry process when making of the substrate, or it can occur after the machining process (as described below). In this case, the catalyst is mixed with the slurry of fibers prior to any heating step.

Single and multiple catalyst formulations can be applied to a single substrate, or due to the small size of the filter relative to the existing catalytic converters and exhaust systems, the placement of multiple substrates is possible. Thus, the catalytic substrate of the present invention in one embodiment comprises or consists of or consists essentially of one or more zones, wherein each zone has a different catalyst. Alternatively, one or more of the zones may be uncatalyzed. For example, a catalytic substrate of the present invention may include an oxidation catalyst in one zone which contains the front surface of the substrate, and a reducing catalyst in another zone which contain the rear surface.

If the substrate is to be used as a flow through configuration, then it is preferable, although not required, for the catalysts, or the majority of the catalysts, to reside along the surface of the channels. If the substrate is machined into a wall flow configuration, then it is preferable for the catalysts to be evenly distributed throughout the substrate as the gases are going to be traveling through all of the substrate and not just passing through.

For example, the substrate of the present invention can be used in a catalyzed diesel particulate filters (CDPF). A CDPF utilizes catalysts deposited directly on the substrate. Both precious and base metal catalysts can be used, such as platinum, silver, copper, vanadium, iron, molybdenum, manganese, chromium, nickel, derivatives thereof (such as oxides) and others. Depending on the type of filter, the catalyst can be impregnated directly into the media or an intermediate washcoat layer can be used. A CDPF can utilize exhaust temperatures of about 325-420° C. for regeneration, depending on engine technology (PM emissions) and fuel quality (sulfur content).

Platinum is one of the most active and most commonly used noble metal catalysts, but palladium, rhodium, or ruthenium catalysts, usually in mixtures, are also suitable for use in the present invention. The list of common non platinum-group metals used in catalytic converters includes vanadium, magnesium, calcium, strontium, barium, copper and silver. In one embodiment, platinum is the preferred catalyst for use with diesel engines. In another embodiment, palladium and rhodium suitable for use with a gasoline engine.

Catalysts are typically quite expensive. It is therefore desirable to achieve the maximum reduction in pollution with the minimum amount of catalyst used. Platinum and palladium, two common catalysts, are both expensive precious metals. A substrate having a porous, permeable nature with a large surface area on which catalysts can reside as evenly distributed crystals or layer allow for achieving that objective. An advantage of the present invention is a lower amount of catalyst needed compared to conventional substrates.

Typical platinum loadings in filters used for off-road engines through the 1990's were between 35 and 50 g/ft³. These filters, installed on relatively high polluting engines, required minimum temperatures of nearly 400° C. for regeneration. Later, when catalyzed filters were applied to much cleaner urban bus and other highway vehicle engines, it was found that the catalyzed filters were able to regenerate at much lower temperatures. However, higher platinum loadings were needed to support the low temperature regeneration. Filters used in clean engine, low temperature applications have typically platinum loadings of 50-75 g/ft³.

In one embodiment, the catalytic substrate comprises a catalyst in the amount of about 1 to about 100, about 1 to about 50, about 1 to about 30, or about 10 to about 40 $g/ft^3$.

In another embodiment, the catalytic substrate, preferably an nSiRF-C such as AETB, OCTB, and FRCI, comprises catalyst of platinum and rhodium in a ratio of about 5:1 and an amount of about 30 $g/ft^3$.

Filtering Substrate

The present invention is directed to a catalytic substrate comprising a non-woven Sintered Refractory Fibrous Ceramic (nSiRF-C) composite, as described herein, that can be used in particulate filters, and related devices. The filtering substrate is fashioned into particular shapes, designs, sizes, and configurations that are useful for filtering, in particular for filtering particulate matter. The filtering substrate is particularly useful for filtering particulate matter under extreme conditions (temperature, pressure, etc), such as filtering a flow of exhaust gas. The filtering substrate can be used in additional applications in which the filtering of small particulate matter is required.

In one embodiment, the filtering substrate comprises, or alternatively consists of or consists essentially of, a nSiRF-C composite as described above for the catalytic substrate. The filtering substrate does not contain a catalyst. All variations, embodiments, and examples of materials suitable for use as the substrate of a catalytic substrate are likewise suitable for the filtering substrate of the present invention.

The filtering substrate is shaped into configurations suitable for uses described herein, in particular for use in particulate traps such as diesel particulate traps and diesel particulate filters.

In one embodiment, a filtering substrate of the present invention is alumina enhanced thermal barrier ("AETB") material or a like material known to one of ordinary skill in the art. AETB is made from aluminaboriasilica (also known as alumina-boria-silica, aluminoborosilicate, and aluminoboriasilicate) fibers, silica fibers, and alumina fibers. One commonly known application for AETB is as an exterior tile on the Space Shuttle, ideal for shuttle re-entry. The attributes that make AETB unique and desirable to the space industry are also preferred in organic combustion technology. AETB has a high melting point, low heat conductance and coefficient of thermal expansion, ability to withstand thermal and vibrational shock, low density, and very high porosity and permeability.

The filtering substrate of the present invention is optionally treated with one or more chemical additives.

In another embodiment, the present invention is directed to a diesel particulate trap comprising a filter as described herein without any catalyst applied to it.

In another embodiment, the present invention is directed to a diesel particulate trap comprising a filter as described herein in combination with a CRT® diesel particulate trap (NOX, HC adsorbers).

In another embodiment, the present invention is directed to a diesel particulate trap comprising a filter as described herein in combination with SCR.

In another embodiment, the filtering substrate comprises a plurality of channels as described in more detail below. Furthermore, the filtering substrate can be modified, altered, and/or enhanced in one or more aspects as described herein and/or as known in the art.

Attributes of a Catalytic and Filtering Substrates

The present invention has one or more, preferably at least three, four, five, six, seven, eight, nine, or ten, attributes which are advantageous over conventional catalytic or filtering substrates.

Suitable for Use

The invention is directed in certain embodiments to a catalytic substrate or filtering substrate comprising nSiRF-C and a catalyst, suitable for use in a catalytic converter. The substrate is suitable for use in any number of catalytic converters, filtering devices and applications thereof.

For example, the catalytic substrate and filtering substrate of the present invention is suitable of use in any of the applications generally used for prior art substrates. Suitable uses include, but are not limited to, the use of a substrate of the present invention in an exhaust system any 1) Mobile On-Road Engines, Equipment, and Vehicles, including cars and light trucks; highway and street motorcycles, three-wheeled motorcycle (e.g., motorized tricycles, autorichshaws), motorized tricycles; heavy-duty highway engines, such as trucks and buses; 2) Mobile Non-Road Engines, Equipment, and Vehicles, including compression-ignition engines (farm, construction, mining, etc.); small spark-ignition engines (lawn mowers, leaf blowers, chainsaws, etc.); large spark-ignition engines (forklifts, generators, etc.); marine diesel engines (commercial ships, recreational diesel, etc.); marine spark-ignition engines (boats, personal watercraft, etc.); recreational vehicles (snowmobiles, dirt bikes, all-terrain vehicles, etc.); locomotives; aviation (aircraft, ground support equipment, etc.); and 3) Stationary Sources, including hundreds of sources, such as power plants, refineries, and manufacturing facilities.

In another embodiment, a catalytic substrate of the present invention is suitable for use in a particular vehicle if the substrate as described herein, when a part of a catalytic converter, functions so that the vehicle meets the emissions standards of any one of 1990, 2007, and 2010, as defined by the EPA.

In another embodiment, the catalytic substrate catalyzes the reaction of pollutants to nonpollutants at a high level. For example, the conversion of pollutants to nonpollutants is catalyzed at an efficiency of greater than 50%. In another embodiment, the conversion of pollutants to nonpollutants is catalyzed at an efficiency of greater than 60%. In still other embodiments, the conversion rate is selected from the group consisting of 70%, 80%, 90%, 91%, 92%, 93%, 94%, 95%, 96%, 97%, 98%, 99%, and 99.9%. In certain embodiments, the conversion rate refers to the total conversion of non-particulate pollutants. In other embodiments, the conversion rate refers to the conversion of specific non-particulate pollutants, e.g., NOx to $N_2$, CO to $CO_2$. or HCs to $CO_2$ and $H_2O$. In other embodiments, the conversion rate refers to the percentage of particulate matter removed from an exhaust gas.

In another embodiment, a catalytic substrate of the present invention is suitable for use in a particular application if the catalytic substrate passes certain OEM-prescribed and preferred tests, such as U.S. Federal Test Protocol 75 (U.S. FTP75). Such tests are known in the art. (See for example Document No. EPA420-R-92-009, published by the U.S. EPA, available at http://www.epa.gov/otaq/inventory/r92009.pdf, which is herein incorporated by reference in its entirety). Additionally, as a back-cat or DPT in retrofit applications, EPA and/or state/local agencies may have to approve of the products for use, including the substrate contained therein.

Surface Area

The available surface area of a substrate is an important characteristic of filtering substrate or catalytic substrate. One characteristic of a suitable substrate for a catalytic converter is for it to have a high geometric surface area (GSA). The high GSA allows for maximum reaction probability.

A large open frontal area (OFA) allows for greater amount of gas to pass through without obstructing its flow and causing back-pressure. Open frontal area (OFA) is defined as the part of the total substrate cross-section area which is available for the flow of gas (i.e., the cross-section area of the filter inlet channels). It is typically expressed relative to the total substrate cross-section.

An attribute of the substrate of the present invention is its high surface area or high GSA. The surface area of the substrate is an important characteristic for catalysis application. Surface area is the sum amount of surface that exhaust emissions must pass across when traveling through an exhaust filter. Increased surface area translates into an increased surface for chemical reactions to take place between pollutants and catalytic and thermal processes, making a catalytic converter process quicker and more efficient. Speed and efficiency can result in little to no clogging, which can cause failure of the exhaust system. Furthermore, the increased surface area of the substrate of certain embodiments also includes increased filtering efficiency and/or capability.

Geometric surface area is the total surface area that precious metals can be impregnated onto in one cubic inch. A substrate having a high gross surface area is preferred. Certain embodiments of the present invention have a much higher geometric surface area that can be impregnated with catalyst, compared to conventional substrates, such as cordierite and SiC.

Gross wall volume is the total amount of wall volume that exists in a one inch cube of configured substrate. Gross wall volume is calculated as each wall surface area multiplied by each respective thickness and summed. A substrate having a lower gross wall volume is preferred. In certain embodiments, the gross wall volume of the substrate of the present invention is lower than that of conventional substrate materials, such as cordierite and SiC.

In certain embodiments, the gross wall volume of the catalytic substrate is from about 0.5 to about 0.1, from about 0.4 to about 0.2, or about 0.3 in$^3$/in$^3$ (cubic inches per cubic inch). In a preferred embodiment, the gross wall volume substrate is about 0.25 to about 0.28, more preferably about 0.27, more preferably about 0.272 in$^3$/in$^3$.

Due to the lower gross wall volume of the present invention in certain embodiments, a lower amount of catalyst, such as palladium, is needed to perform the catalytic action with the present invention than a cordierite of a similar size.

Porosity and Permeability

Pore attributes also affect mechanical and thermal attributes of the substrate. A trade-off can exist between porosity and mechanical strength: substrates of smaller pore size and lower porosity are stronger than those of higher porosity for certain conventional substrates. Thermal attributes, both specific heat capacity and thermal conductivity may decrease with increasing porosity in certain materials (Yuuki 2003).

The first wall-flow monoliths, introduced in the late 1980's, had channels as large as 35 µm in diameter. In order to maximize filtration efficiency, channels were made smaller, typically in the range of 10-15 µm in filters used in the 1990's. In the development of new materials, filter manufacturers differentiate their target pore attributes, primarily in consideration of the catalyst system to be applied (Ogyu, K., et al., 2003. "Characterization of Thin Wall SiC-DPF", SAE 2003-01-0377; Yuuki, K., et al., 2003, "The Effect of SiC Properties on the Performance of Catalyzed Diesel Particulate Filter (DPF)," SAE 2003-01-0383). The applications can be classified as follows:

Non-catalyzed filters, such as those used in fuel additive regenerated systems: The main requirement is a high soot holding capacity. Certain conventional filters have a porosity that is about 40-45% with pores between 10-20 µm.

Catalyzed filters, such as those in passively regenerated systems require more porosity and possibly larger pore size to enable coating with increasingly more complex catalyst systems (as opposed to the simple catalysts used in the 1990's, which often had very little or no washcoat material). The substrates should have acceptably low pressure loss after being coated with catalyst/washcoat systems at about 50 g/dm$^3$ loading. Certain prior art filters have a porosity of about 45-55% range. Additional heaters may also be applied.

Filter/NOx adsorber devices, such as the DPNR system or CRT (continuous regeneration trap) incorporate NOx storage/reduction systems and require high washcoat loadings, possibly above 100 g/dm$^3$. Certain prior art substrates have a porosity of about 60% (a 65% porosity substrate has been reported, with mechanical strength being the main limitation in increasing porosity (Ichikawa, S., et al., 2003, "Material Development of High Porous SiC for Catalyzed Diesel Particulate Filters," SAE 2003-01-0380).

Another attribute of certain embodiments of the catalytic or filtering substrate of the present invention is its high porosity. In certain embodiments, the porosity of a substrate of the present invention is from about 60%, 70%, 80%, or 90%. In other embodiments, the substrate has a porosity of about 91%, 92%, 93%, 94%, 95%, 96%, 97%, 98%, or 99% (expressed as a percent of pore space relative to the solid substrate).

In one embodiment, the porosity of an exemplary embodiment of the present invention is approximately 97.26%. By comparison, cordierite is about 18-42%. In this embodiment, the material of the present invention only has about 2.74% material to obstruct the flow of exhaust gas. This fine web of material actively catches the particulate and burns it off very effectively. Due to the trapping of particulates in depth filtration mode and not only along channel walls, considerable PM buildup does not occur under situation where regeneration time is longer than PM build-up time. High porosity translates into better and more effective interaction between pollutants and the catalyzed or non-catalyzed substrate surface. At the same time, gas flow buildup can be released laterally as well as along the intended gas flow direction.

Figure 2B:
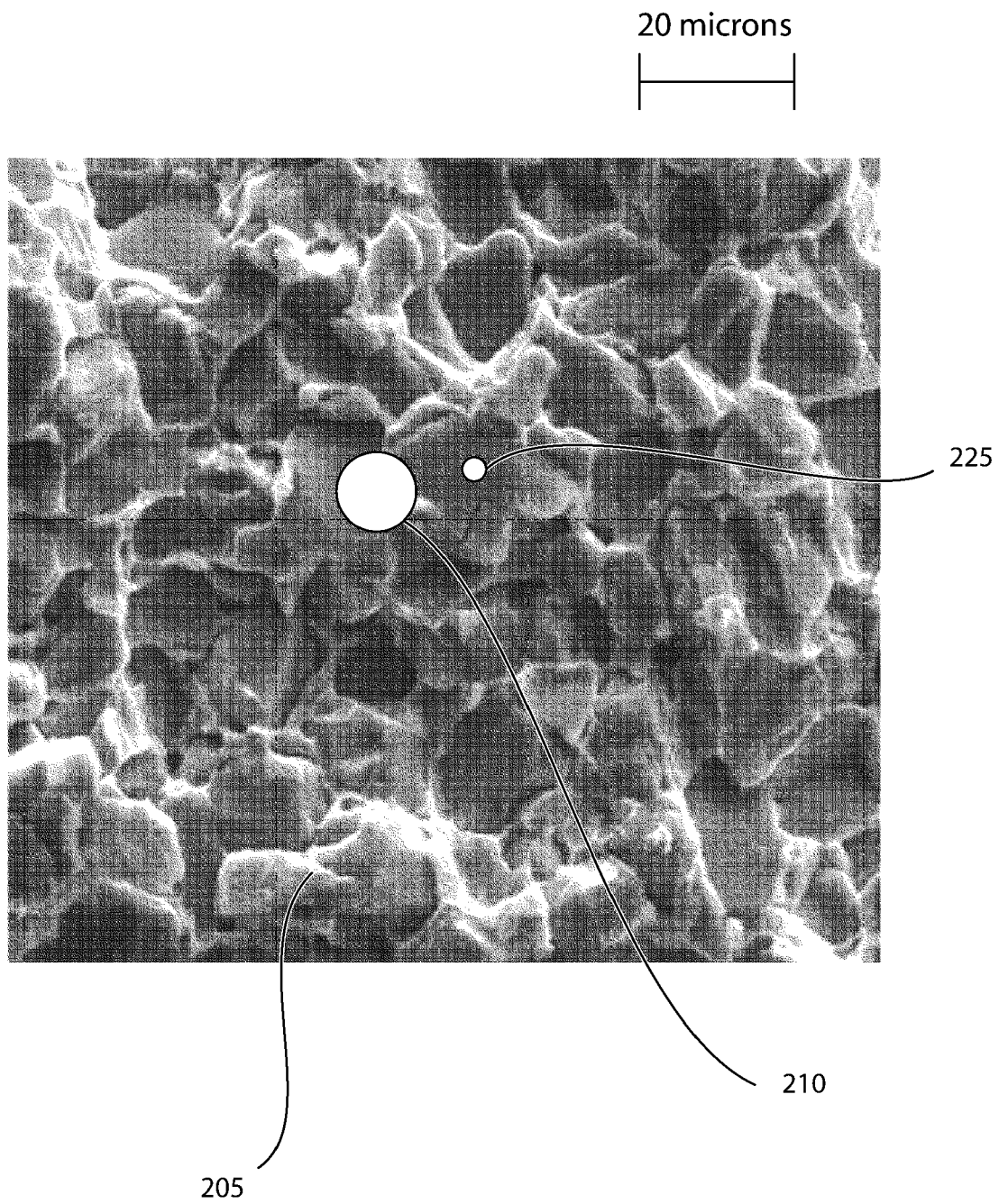
Figure 3:
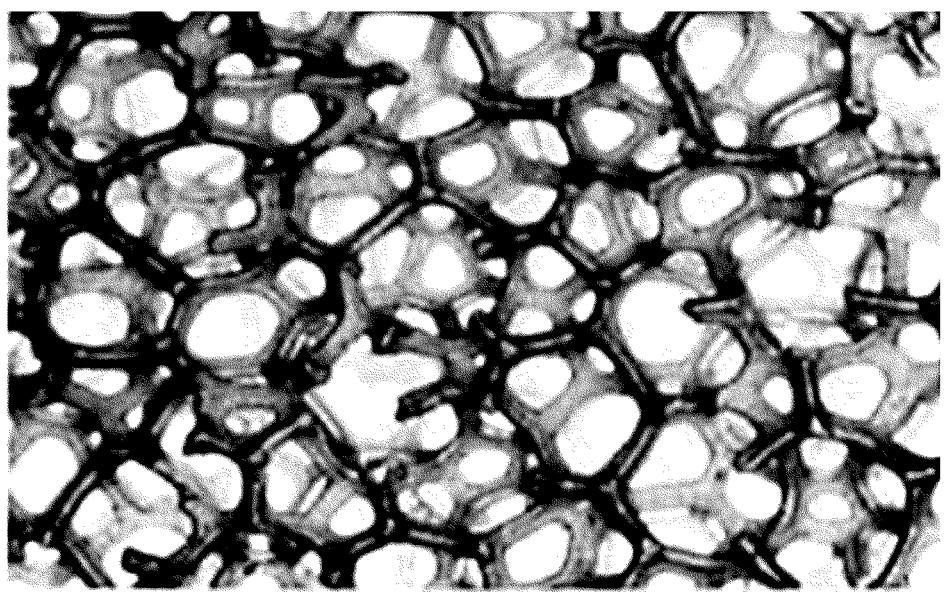
FIG. 3 is a micrograph of SiC 300.
Figure 22A:
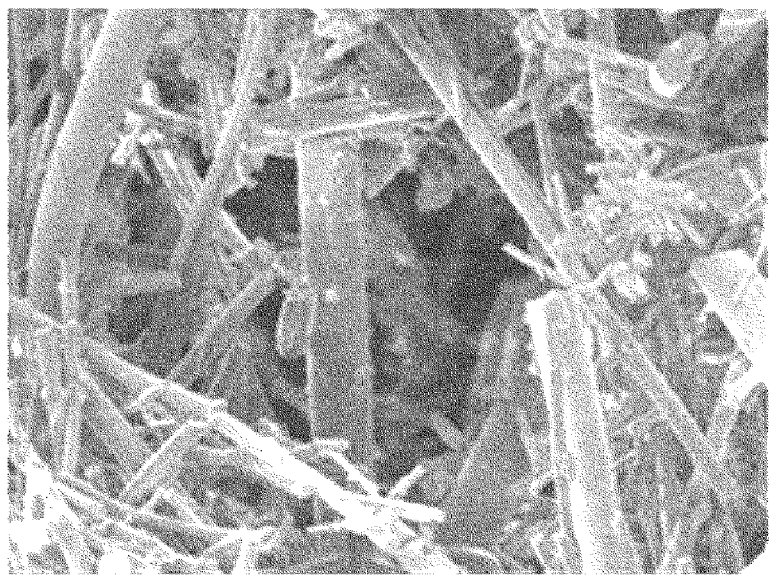
FIG. 22a is a photomicrograph of a substrate of the present invention, specifically AETB.
Figure 22B:
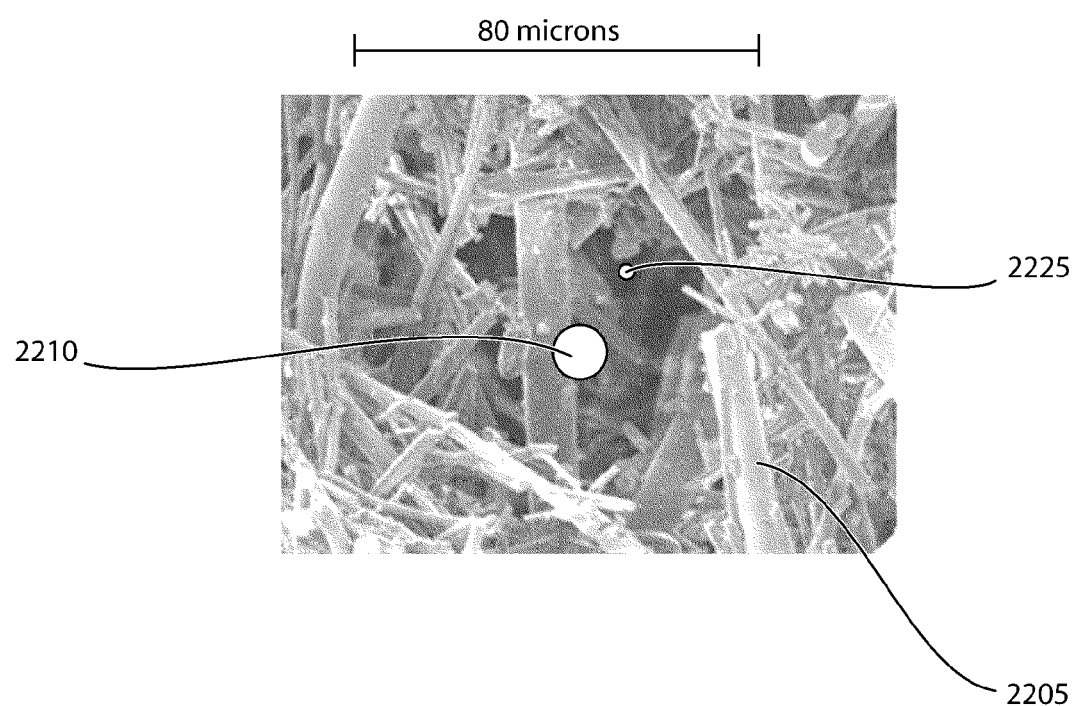
FIG. 22b is a photomicrograph of a substrate of the present invention, specifically AETB. Fiber 2205 can be seen. Sphere 2210 illustrates a PM-10 sized particle, and Sphere 2225 illustrates a PM-2.5 sized particle.
Figure 23:
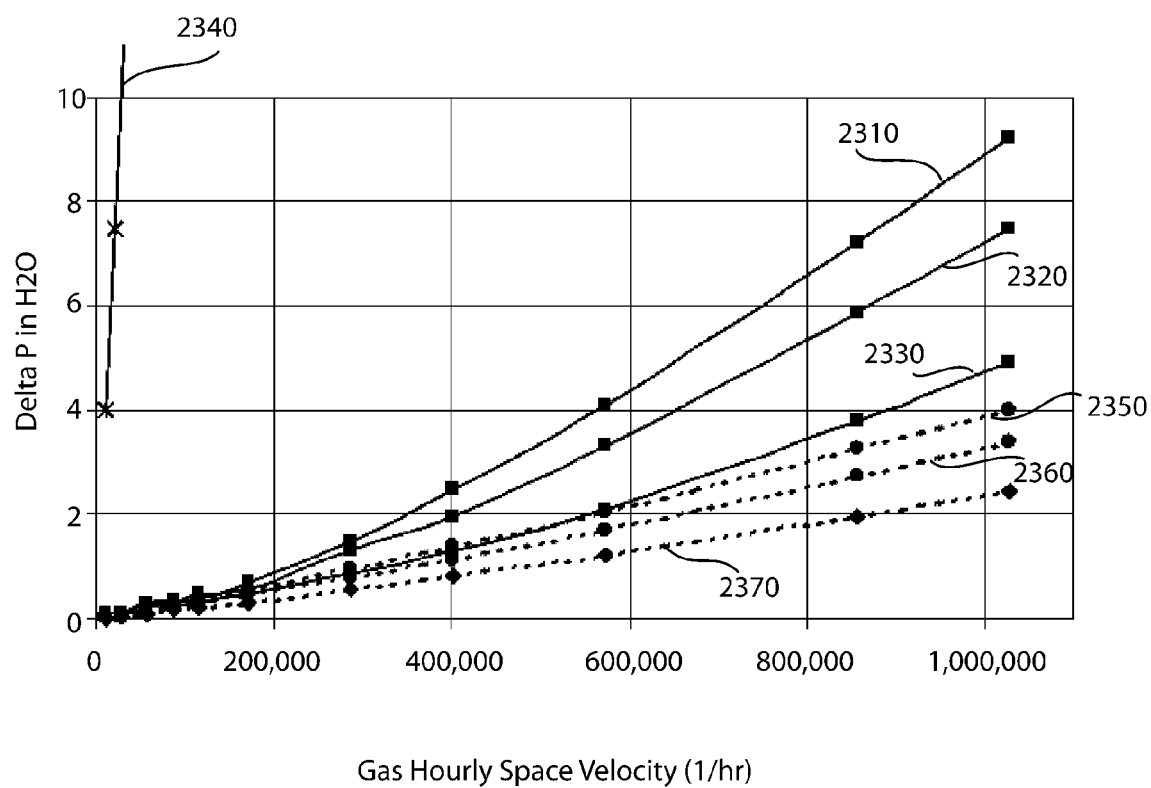
FIG. 23 is a graph showing pressure drop (delta P) as a function of gas hourly space velocity ($hr^{-1}$) for seven materials: Corning 200/12 DPT at 932 F (2340); AETB-11 having 600 cpsi; 6 mil wall thickness and 11 $lb/ft^3$; 1100 F (2310); AETB-11 having 600 cpsi, 6 mil wall thickness and 11 $lb/ft^3$ at 932 F (2320); AETB-11 having 600 cpsi, 6 mil wall thickness and 11 $lb/ft^3$ at 662 F (2330); cordierite having 400 cpsi and 6 mil wall thickness at 1100 F (2350); cordierite having 400 cpsi and 6 mil wall thickness at 932 F (2360); and cordierite having 400 cpsi and 6 mil wall thickness at 662 F (2370). Data for cordierite are calculated.

Referring to FIGS. 22a and 22b, an exemplified substrate 2200, 2205 of the present invention is shown. Substrate 2200, 2205 is approximately ninety-seven percent porous. As compared to the samples of cordierite in FIGS. 2a and 2b and silicon carbide in FIG. 3, all being substantially the same scale, substrate 1200, 1205 is more porous and less dense. In FIG. 22b, particular matter PM-10 2210 and PM-2.5 2225 is illustrated to scale. The particulate matter PM-10 2210 and PM-2.5 2225 can easily permeate the fibers of substrate 2205, as compared to the cordierite sample 205 exemplified FIG. 2b. Also, compared to the silicon carbide 300 of FIG. 3, the density of silicon carbide is about thirty to fifty times that of substrate 2200, 2205.

The higher porosity in certain embodiments of the present invention provides a higher surface area and lowers the back-pressure. As a result, the present invention is more efficient at NOx reduction, hydrocarbon and CO oxidation, and particulate matter trapping.

Pore characteristics, including volume percent porosity, size distribution, structure, and interconnectivity determine the monolith ability to filter particulates. Additionally, if gas molecules can diffuse into a porous substrate, the probability of a catalytic reaction increases dramatically. Together with the cellular geometry, porosity characteristics also influence the monolith's hydraulic resistance to flow and the pressure drop. Some attributes which are desired for high filtration efficiency (e.g., low porosity and small pore size) are opposite to those required for low pressure drop. Others, such as good pore interconnectivity and absence of closed, "dead end" pores, are desired for both low pressure drop and high efficiency. The substrates of the present invention in another embodiment provide both high filtration efficiency and low pressure drop.

Emissivity and Heat Conductance

Another property of substrates used in catalytic converters and particulate filters is emissivity. Emissivity is the tendency to emission heat; comparative facility of emission, or rate at which emission takes place, as of heat from the surface of a heated body.

An ideal substrate takes into consideration the temperature that (1) the fastest ramp-up to high conversion efficiency; (2) is safest from thermal harm (e.g., due to thermal shock or due to high-temperature melting/cracking of substrate); (3) uses a minimal amount of auxiliary energy; and (4) is inexpensive to produce. Increasing temperature requires additional energy and expense. Further, certain amounts of the energy source are conducted, drawn, or channeled away through thermal conductivity.

Emissivity is a ratio of reflectance with values between 0 and 1, with one being perfect reflection. Different substrates used for catalytic converters and particulate filters have different emissivity values. High emissivity allows the catalyst substrate to minimize heat transfer out of the system, thereby heating the air inside the catalytic converter or particulate filter faster. The emissivity is a measure of the heat reflectance property of the material and a high value is desirable.

In certain embodiments, a substrate of the present invention preferably has an emissivity of about 0.8 to 1.0. In another embodiment, the emissivity of the substrate of the present invention is about 0.82, 0.84, 0.86, 0.88, and 0.9. Further suitable values for emissivity of a substrate of the present invention include 0.81, 0.83, 0.85, 0.87, and 0.89. In other embodiments, the emissivity is about 0.9, 0.92, 0.94, 0.96, or 0.98. Reflectivity of heat allows the gaseous material in the pores to heat up much faster since little heat is retained by the substrate material itself. That results in quicker lightoff and little temperature rise of the outside surface of the substrate.

The thermal conductivity of a material is the quantity of heat that passes in unit time through unit area of a plate, when its opposite faces are subject to unit temperature gradient (e.g., one degree temperature difference across a thickness of one unit). Thermal conductivity has the units of Watts of energy per meter thick and Kelvin changed (W/m-K). In preferred embodiments, the substrate of the present invention have a low thermal conductivity. For example, in one embodiment, the thermal conductivity of a substrate of the invention is less than about 0.1, 0.2, 0.3, 0.4, 0.5, 0.6, 0.7, 0.8, or 0.9. In another embodiment, the thermal conductivity of a substrate of the invention is less than about 0.01, 0.02, 0.03, 0.04, 0.05, 0.06, 0.07, 0.08, or 0.09. In another embodiment, the thermal conductivity of a substrate of the invention is from about 0.1 to about 0.01, from about 0.2 to about 0.02, from about 0.3 to about 0.03, from about 0.4 to about 0.04, from about 0.5 to about 0.05, from about 0.6 to about 0.06, from about 0.7 to about 0.07, from about 0.8 to about 0.08, or from about 0.9 to about 0.09. In another embodiment, the thermal conductivity of the present invention is approximately 0.0604 W/m-K.

By comparison, a sample of cordierite is about 1.3 to 1.8 W/m-K. These results indicate that, by way of example of a particular embodiment, if 1000 Watts of heat energy is lost from a given volume of cordierite material, only 33 Watts would be lost from the same volume of the material from the present invention. Thus, the material of the present invention has a thermal conductivity thirty times greater than cordierite.

Additionally, in other embodiments, the process of preparing the substrate further comprises preparing a catalytic substrate or filtering substrate further comprising an emissivity enhancing agent, said process comprising applying an emissivity enhancing agent to said substrate, preferably to a nSiRF-C, more preferably an AETB, OCTB, or FRCI material. Other preferred substrates include any of the specific substrates disclosed herein. In further embodiments, the catalytic substrate further comprises an emissivity enhancing agent and a catalyst selected from the group consisting of palladium, platinum, rhodium, derivatives thereof, and mixtures thereof. Other physical and chemical modifications as described herein can be applied to such embodiments. Emissivity enhancing agents are known in the art.

Thermal Attributes

A substrate having a low coefficient of thermal expansion allows for the substrate to withstand rapid changes in temperature without significant expansion or contraction. A suitable coefficient of thermal expansion also allows for the substrate to expand with heat at the same rate as the protective matting around it and the canister.

It is also preferable for the substrate material to withstand a high range of temperatures so that it does not cause a catalytic converter or particulate filter meltdown if the temperature rises to a high value, for example, during occasional fuel burning. Additionally, if the substrate material can withstand high temperatures, the catalytic converter or filter can be placed closer to the engine.

Related properties include low thermal mass and heat capacity. A material that has a low thermal heat mass and heat capacity allows for less heat energy to be wasted in raising the temperature of the catalyst substrate. If the catalyst substrate heats up quickly, more of the heat energy coming via the exhaust gas is used to trigger the light-off of the catalyst components.

Thermal conductivity is the capability of the material to conduct heat as a consequence of molecular motion. More specifically, thermal conductivity is also a measure of the quantity of heat that passes in unit time through unit area of a plate whose thickness is unity, when its opposite faces differ in temperature by one degree. The more a material conducts heat, the more energy is needed to overcome loss and reach the required temperature. Preferably, a material reflects heat, rather than conducts. A lower thermal conductivity value is preferred so more heat energy is utilized in the pore spaces and not lost from the absorption by the substrate. The chemistry of different substances determines the level of thermal conductivity. Additionally, the thermal conductivity of the filter medium is a major influence on the efficiency of an exhaust emission filter, since loss of temperature negatively impacts reactivity. A low thermal conductivity is preferred because more of the heat energy generated is reflected back at the particulates, and will remain in the pore space. In other words, the lower the thermal conductivity, the lower the loss of heat. Lower heat loss translates into less energy needed to obtain the desired temperature range for catalytic conversion and higher energy efficiency.

Specific heat is the heat in calories required to raise the temperature of one gram of a substance one degree Celsius. A substrate with a high specific heat will reflect ambient heat, e.g., from an exhaust or an auxiliary source, back into the pore space where combustion or catalytic reduction and oxidation processes require the heat. For instance, under extreme conditions, e.g., the Arctic, it will take longer to heat up a low specific heat filter and cool hot filters, increasing the chance for external heat damage. A lower specific heat is preferable because is reaches operating temperature faster and with less energy.

In certain embodiments, a substrate of the present invention has a number of preferred thermal attributes. Preferably, the material is such that heating of the air in the pore space occurs preferentially compared to the heating of the substrate. Preferably, the substrate of the present invention has a high melting point, and in certain embodiments, a higher melting point than conventional substrates. A high melting point is preferred, in part, due to the extreme temperatures to which a catalytic substrate or filtering substrate is exposed.

In a preferred embodiment, a substrate of the present invention preferably has a high melting point. In one embodiment, the melting point is greater than about 1500° F. In another embodiment, the melting point is greater than about 2000° F. In another embodiment, the melting point is greater than about 2500° F. In a further embodiment, the melting point of the substrate is about 2000 to about 4000° F. In a further embodiment, the melting point of the substrate is about 3000 to about 4000° F. Other suitable melting point ranges include from about 3000 to about 3100, from bout 3100 to about 3200, from about 3200 to about 3300, from about 3300 to about 3400, from about 3400 to about 3500, from about 3500 to about 3600, from about 3600 to about 3700, from about 3700 to about 3800, from about 3800 to about 3900, and from about 3900 to about 4000. In another preferred embodiment, the substrate has a melting point of approximately 3632 degrees Fahrenheit.

In one embodiment of the present invention, the substrate has a melting point of approximately 3,632 degrees Fahrenheit. For example, if a vehicle is situated in below freezing temperatures, a blast of 1,500 degree Fahrenheit exhaust fumes will not cause the substrate to crack or fracture. Similarly, certain embodiments of the substrate will not overheat and crack. Certain samples of cordierite have a melting point of about 1,400 degrees Celsius.

The specific heat of an exemplary embodiment of the present invention is approximately 640 J/kg-K (Joules per kilogram-Kelvin). A sample of cordierite is about 750 J/kg-K. Even though the cordierite has a greater specific heat, cordierite filters have a greater mass to heat up. The result is more heat energy is needed to reach operating temperature making the cordierite less efficient.

A multiple use temperature limit is the maximum temperature in which a substance can be subjected a plurality of times without substantial degradation. The higher the temperature a substrate can continue to operate without micro-fractures or spallation, the less chance of the substrate breaking or cracking over time. This in turn means the substrate is more durable over a wider temperature range. A higher multiple use temperature limit is preferred. A suitable multiple use temperature limit for certain embodiments of the catalytic or filtering substrates of the present invention is one selected from the group consisting of about 2000° C., 2100° C., 2200° C., 2300° C., 2400° C., 2500° C., 2600° C., 2700° C., 2800° C., 2900° C., 3000° C., and 3100° C.

The multiple use temperature limit of an exemplary embodiment of the present invention is 2,980 degrees Celsius. A sample of cordierite is about 1,400 degrees Celsius. The embodiment of the present invention can withstand more than twice the temperature than cordierite before breaking down. This permits the material to function in a greater range of exhaust environments.

The coefficient of thermal expansion is a ratio of the increase of the length (linear coefficient), area (superficial), or volume of a body for a given rise in temperature (usually for zero to one degree Celsius) to the original length, area, or volume, respectively. These three coefficients are approximately in the ratio 1:2:3. When not specifically expressed, the cubical coefficient is usually intended. The less a substrate will expand when heated, the less chance of leaking, fracturing, or damage to filter assembly. A lower thermal expansion is preferred to ensure that the substrate keeps its dimensions even when heated or cooled.

The coefficient of thermal expansion for an exemplary embodiment of the present invention is approximately $2.65 \times 10^{-7}/°$ C. A sample of cordierite is about $2.5 \times 10^{-6}/°$ C. to $3.0 \times 10^{-6}/°$ C. The thermal expansion of a material of the present invention is less than ten times that of cordierite.

The coefficient of thermal expansion of the substrate is preferably compatible with the coefficient of thermal expansion of any washcoat.

In one embodiment, a catalytic or filtering substrate of the present invention, compared to certain prior art substrates such as cordierite, has an increased resistance to damage by thermal or mechanical stress; has a lower risk of clogging with soot and/or ash; is more tolerant to additive ash accumulation when used with fuel additive regeneration; and has good efficiency for particle number reduction.

Density

When considering substrates to be used in catalytic converters or diesel particulate filters, it is preferable to use a substrate that has a low density. The material having a low density reduces the weight of the substrate and hence the overall weight of the vehicle. Furthermore, low density is complimentary to high porosity and permeability Higher density translates into a higher weight. Weight is a large factor pertaining to any engine in motion. The heavier the part, the more energy is needed to move it. In order for these filters to accommodate the increased volume of particulate generated by a engine, the filter sizes have to increase, which adds to vehicle weight and manufacturing and operating costs. Thus, a lower density material is desired. Of course, the density is not so low that structural integrity is insufficient.

Another attribute of the substrate of the present invention is its density. The density of the substrate is lower than that of certain conventional filters and substrates used for filtering and as catalytic substrate. Density is the ratio of mass of a portion of matter to its volume. For materials with the same specific heat, greater density requires more energy to reach operating temperature. In other words, more energy is needed to heat up a dense material than a less dense material. Greater density directly translates into greater weight for set volume. Weight is detrimental to a vehicle's mileage and performance, as the engine must work harder to move heavier equipment. Increased density also translates into more heat required to achieve the proper temperature for catalytic activity or "light off" to occur. The density of some materials currently used as substrates or filters are higher than optimal. For example, a sample of cordierite is about 2.0 to 2.1 g/cm$^3$. Thus, there is a need for a substrate and a filter having a lower density. The density of the substrate of the present invention is lower than that of cordierite.

In one embodiment, the catalytic substrate of the present invention preferably has a low density. The density of the substrate of the present invention may be in the range from about 2 to about 50 pounds per cubic foot (lb/ft$^3$). In a preferred embodiment, the density of the substrate is in the range of about 5 to about 30 pounds per cubic foot, more preferably, from about 8 to 16 pounds per cubic foot. Other preferred embodiments include catalytic substrate that has a density of about 8, 9, 10, 11, 12, 13, 14, 15, or 16 lb/ft$^3$. A low density that still imparts structural integrity is preferred.

In one embodiment, the substrate of the invention has a density of about 8 lbs/ft$^3$ and 22 lbs/ft$^3$, preferably from about 8 lbs/ft$^3$ and 22 lbs/ft$^3$. In another embodiment, the substrate comprises AETB-8 or AETB-16, having densities of about 8 lbs/ft$^3$ and about 16 lbs/ft$^3$ respectively. Other suitable densities include a density selected from about 9, 10, 11, 12, 13, 14, 15, and 16 lbs/ft$^3$.

In another embodiment, the density of the substrate is approximately 0.10 to approximately 0.25 g/cm$^3$ (grams per cubic centimeter).

Structural Integrity

The structural integrity of the substrate material is a characteristic that is important to consider. Structural integrity refers to the material's ability to withstand vibrational and mechanical stresses, i.e., shake and bake. For example, substrate strength is important for withstanding packaging loads and subsequent use in the engine exhaust stream with the related exposure to various stresses, including engine vibrations, road shock, and temperature gradients. High-strength substrates are desirable for robust catalytic converter systems and particulate filters. The strength of the substrate material may be controlled by the type of intra- and intercrystalline bonding, the porosity, pore size distribution, and flaw population. Additionally, substrates can be strengthened by the application of chemical/material coatings on the inside of outside. The strength of the cellular structure of the substrate may further determined by its dimensions, cross-sectional symmetry, and its cellular attributes, such as cell density, channel geometry, and wall thickness. Substrate strength must exceed the stress to which the material is exposed during both packaging and operation. If the stress exceeds the strength, the substrate will crack.

Structural integrity of a material may be measured by the material's tensile modulus. Tensile modulus is a material's resistance to rupture. Specifically, the greater longitudinal stress a material can bear without tearing asunder. Tensile modulus is usually expressed with a reference to a unit area of cross section, the number of pounds per square inch, or kilograms per square centimeter necessary to produce rupture. Tensile modulus is relevant in whether the substrate can withstand the force generated by violent, exhaust gas flow pressure.

Additionally, a substrate should have a good coatability so that the washcoat and/or a catalytic coat can be applied to the substrate. Likewise, the substrate should have washcoat compatibility, allowing for the catalysts to mount well onto the substrate so that catalysts are not displaced from their location during normal wear and tear of the system. Good coatability and washcoat compatibility also enhances the long-term effectiveness of the catalytic converter system. Good coatability and washcoat compatibility also increases the lifetime of the catalyst.

Another attribute of the substrate of the invention is its structural integrity. Structural integrity of a material may be measured by the material's tensile modulus. Tensile modulus is a material's resistance to rupture. Specifically, the greater longitudinal stress a material can bear without tearing asunder. Tensile modulus is usually expressed with a reference to a unit area of cross section, the number of pounds per square inch, or kilograms per square centimeter necessary to produce rupture. Tensile modulus is relevant in whether the substrate can withstand the force generated by violent, exhaust gas flow pressure.

A catalytic substrate according to the present invention preferably has a higher tensile modulus. For example, in one embodiment, the substrate of the present invention has an axial strength of about 2.21 MPa. Of course, higher axial strengths are suitable as well. Other suitable values include 1, 2, 3, 4, 5, 6, 7, 8, 9 and 10 MPa.

Furthermore, structural integrity of the catalytic substrate of the invention is such that it can withstand the conditions encountered during its use in a catalytic converter in commercial vehicles.

In another embodiment, the substrate of the invention, e.g., nSiRF-C, preferably has a high structural integrity and a low density.

Reduction of Pollutants

The substrate plays an important role in enhancing the catalytic activity of the catalyst materials coated on it. Additionally substrates are used to trap particulate material which is then burnt off as volatile gases.

Another advantage of the substrate of the present invention is its increased ability to reduce the amount of pollutants in an exhaust gas. The present invention has enhanced catalytic and filtering capabilities as compared to certain conventional technologies.

In certain embodiments, the substrate of the present invention is capable of reducing CO emission from an exhaust gas by at least about 50%. In one embodiment, the substrate of the present invention is capable of reducing CO emission from an exhaust gas by at least about 60%, 70%, 80%, or 90%. In another embodiment, the substrate is capable of reducing CO emission by at least 91%, 92%, 93%, 94%, 95%, 96%, 97%, 98%, 99%, 99.5%, 99.9%, or 100%.

In certain embodiments, the substrate of the present invention is capable of reducing NOx emission from an exhaust gas by at least about 50%. In one embodiment, the substrate of the present invention is capable of reducing NOx emission from an exhaust gas by at least about 60%, 70%, 80%, or 90%. In another embodiment, the substrate is capable of reducing NOx emission by at least 91%, 92%, 93%, 94%, 95%, 96%, 97%, 98%, 99%, 99.5%, 99.9%, or 100%.

In certain embodiments, the substrate of the present invention is capable of reducing HC emission from an exhaust gas by at least about 50%. In one embodiment, the substrate of the present invention is capable of reducing HC emission from an exhaust gas by at least about 60%, 70%, 80%, or 90%. In another embodiment, the substrate is capable of reducing HC emission by at least 91%, 92%, 93%, 94%, 95%, 96%, 97%, 98%, 99%, 99.5%, 99.9%, or 100%.

In other embodiments, the substrate of the present invention is capable of reducing VOC emission from an exhaust gas by at least 50%. In one embodiment, the substrate of the present invention is capable of reducing VOC emission from an exhaust gas by at least about 60%, 70%, 80%, or 90%. In another embodiment, the substrate is capable of reducing VOC emission by at least 91%, 92%, 93%, 94%, 95%, 96%, 97%, 98%, 99%, 99.5%, 99.9%, or 100%.

In other embodiments, the substrate of the present invention is capable of reducing PM-10 emission from an exhaust gas by at least 50%. In one embodiment, the substrate of the present invention is capable of reducing PM-10 emission from an exhaust gas by at least about 60%, 70%, 80%, or 90%. In another embodiment, the substrate is capable of reducing PM-10 emission by at least 91%, 92%, 93%, 94%, 95%, 96%, 97%, 98%, 99%, 99.5%, 99.9%, or 100%.

In other embodiments, the substrate of the present invention is capable of reducing PM-2.5 emission from an exhaust gas by at least 50%. In one embodiment, the substrate of the present invention is capable of reducing PM-2.5 emission from an exhaust gas by at least about 60%, 70%, 80%, or 90%. In another embodiment, the substrate is capable of reducing PM-2.5 emission by at least 91%, 92%, 93%, 94%, 95%, 96%, 97%, 98%, 99%, 99.5%, 99.9%, or 100%.

Reduced Weight

It is a goal of the vehicle manufacturers to reduce the overall weight of the vehicle to improve its fuel economy and engine efficiency. Heavy substrates add un-necessary weight to the vehicle. Additionally, if substrates are not efficient enough in reducing pollution, more than one substrates may be required to play in line to reach target pollution levels. This greatly enhances the overall weight of the vehicle.

Additionally, current catalytic converters require the use of additional devices which are often heavy and clunky. Some of these devices, such as heat shields and particular matting, are used to deal with the temperature of the catalytic converter. Others, such as oxygen sensors, are required to meet certain government regulations.

In certain embodiments of the present invention, the catalytic substrate or filtering substrate has reduced weight in comparison to a conventional catalytic or filtering substrates. This is due, in part, to the lower density of the substrate of the present invention compared to certain conventional substrates. Alternatively, the lower weight may be due to the need for a smaller amount of catalytic or filtering substrate because of the improved filtering and catalytic function of some embodiments of the present invention compared to conventional technologies. A lower weight of a catalytic or filtering substrate has a number of benefits. For example, a lower weight of a substrate may translate into improved fuel efficiency for vehicles. Furthermore, a lower weight would translate into easier to handle and possible safer handheld engine devices.

In a preferred embodiment, the exterior surface of the substrate does not heat up to the same extent as conventional catalytic converter substrates during use. In some embodiments, the need for a heat shield and/or insulation is reduced.

Acoustical Attributes

Acoustic attenuation may be defined as either the diminution of thickness, thinness, emaciation; diminution of density; diminution of force or intensity; or weakening of acoustic energy (sound). In one embodiment of the present invention, the acoustic attenuation is the substrate's ability to attenuate or dampen acoustic energy in engine exhaust. A substrate of the present invention can replace or compliment an engine's muffler assembly, as disclosed herein, thus decreasing exhaust noise and exhaust system costs. A higher acoustic attenuation is preferred.

In another embodiment the porosity, density and size of the substrate may be varied to 'tune' the acoustical attenuation for desired applications.

In another embodiment, the acoustical attenuation of the substrate maybe coupled with standard metal-muffler based techniques to dampen and/or 'tune' the sound existing the exhaust system.

Type of Flow

Flow-through

In one aspect, the substrate is structured for a flow-through use. The flow-through configuration is known in the art. In one embodiment, the channels (or pores) are essentially aligned parallel to each other across the entire length of the substrate. Gas flow enters the substrate at one end and runs down the through the channels through the entire length of the substrate to exit on the other side.

Any number of flow-through configurations are useful and suitable for the catalytic substrate of the present invention. Flow through configurations that are known in the art can be applied to the catalytic substrate of the present invention.

In one embodiment, the flow through configuration comprises a plurality of substantially parallel channels that extend fully through the length of the substrate.

In another embodiment, the walls of the channels are not parallel to the lateral or surface of the substrate.

Wall-flow

Another embodiment of the invention is a catalytic substrate or filtering substrate of the present invention configured in the wall flow configuration. It has been surprisingly determined that a catalytic substrate comprising an nSiRF-C of the present invention can be configured in the wall flow configuration.

In another aspect of the invention, the substrate has a wall-flow configuration. For example, the substrate is used in a wall-flow catalytic converter or a wall-flow particulate filter. The wall-flow configuration can take any one of a number of physical arrangements. A substrate having a wall flow configuration can have one or more the attributes described herein. Further, a substrate having a wall flow configuration may further comprise one or more of the following: a catalyst, a washcoat, an oxygen-storing oxide, and an emissivity enhancer Additionally, a substrate consisting of a wall flow configuration may be further modified, enhanced, or altered as described herein.

In one embodiment, the channel wall thickness is any value described below. Preferred channel wall thickness from about 2 mils to about 6 mils. In other embodiments, the channel wall thickness ranges from about 10 mils to about 17 mils. Other suitable values include 2, 3, 4, 5, 6, 7, 8, 9, 10, 11, 12, 13, 14, 15, 16, 17, 18, 19 and 20 mls.

In other embodiments of the wall-flow substrate, the cell density of the substrate is about 400 cpsi (cells per square inch) with a wall thickness of about 6 mils, or the cell density is about 900 cpsi with a channel wall thickness of about 2 mils. Additional embodiments include those in which the cpsi is about 50, 100, 150, 200, 250, 300, or 350.

Ceramic wall-flow monoliths, which are derived from the flow-through cellular supports used for catalytic converters, became the most common type of diesel filter substrate. They are distinguished, among other diesel filter designs, by high surface area per unit volume and by high filtration efficiencies. Monolithic diesel filters consist of many small parallel channels, typically of square cross-section, running axially through the part. Diesel filter monoliths are obtained from the flow-through monoliths by plugging channels. Adjacent channels are alternatively plugged at each end in order to force the diesel aerosol through the porous substrate walls which act as a mechanical filter. To reflect this flow pattern, the substrates are referred to as the wall-flow monoliths. Wall-flow monoliths are most commonly available in cylindrical shapes, although oval cross-section parts are also possible for space constrained applications.

Wall-flow filter walls have a distribution of fine pores which have to be controlled in the manufacturing process. Filtration mechanism on monolith wall-flow filters is a combination of cake and depth filtration. Depth filtration is the dominant mechanism on a clean filter as the particulates are deposited in the inside of pores. As the soot load increases, a particulate layer develops at the inlet channel walls and cake filtration becomes the prevailing mechanism. Certain conventional monolith filters have filtration efficiencies of about 70% of total particulate matter (TPM). Higher efficiencies can be observed for solid PM fractions, such as elemental carbon and metal ash.

According to certain embodiments of the present invention, it is preferred to have material which is porous so more gases can pass easily through the pores, interacting with catalysts deposited in the core of the fibrous composite. Additionally, having porous walls allows in certain embodiments for higher degree of depth filtration which would also be a desirable attribute.

Substrates of the present invention in a wall flow configuration comes in much more direct contact with the exhaust gas. Material pore characteristics (size, percent porosity, pore connectivity, open vs closed pores, etc.) influence the physical interaction between gas and filter material and affect such attributes as filtration efficiency and pressure drop. Furthermore, substrate durability depends on the material resistance to chemical attack by exhaust gas components. In particular, materials need to be resistant to corrosion by metal ash which may be part of diesel particulates. Resistance to sulfuric acid corrosion is also required, especially if filters are used with fuels of higher sulfur content. Additionally, due to the possibility of the release of high quantities of heat during filter regeneration, filter materials are required to demonstrate excellent thermal attributes in terms of resistance to both high temperatures and high temperature gradients. Insufficient temperature tolerance may result in melting of the material, while insufficient thermal shock resistance causes cracking. Other potential problems include microcracking and spallation. In particular embodiments, the filtering substrate and catalytic substrate of the present invention solves one or more of these problems.

Important considerations in designing the exact geometry of a wall-flow monolith is includes the following parameters: cell density, repeat distance (even distribution of pressure drop over the entire wall flow filter), wall thickness, open frontal area, specific filtration area, and mechanical integrity factor.

In specific embodiments of the present invention, the wall flow configuration has half of the channels blocked. In another configuration, the substrate of the invention has a wall flow configuration wherein the blocking wall of the channel is located at the beginning or end of a channel. In another configuration, the blocking wall is located at the middle of a channel, or alternatively is located anywhere between the beginning and end of a channel.

Additionally, any percentage of the channels may be included in a wall flow configuration, e.g., 10%, 25%, 50%, 75%, 90%, 95%, etc.

Channels and Channel Openings

In one embodiment, the catalytic or filtering substrate does not contain a plurality of channels extending through the length of the substrate. In certain embodiments, the catalytic or filtering substrate, given its porosity and permeability, does not need to have the channels placed in the substrate for the substrate to function in its intended uses, e.g., in a catalytic converter. Any potential back pressure is relieved by the porosity and permeability alone by placing the emissions in the path of a catalytic substrate. If a membrane configuration without channels is used, a preferred use is in a low flow-rate environment so as to reduce the chance of the substrate failing structurally. The thin membrane configuration would preferably be used in a "low flow-rate" environment such as in a fireplace or possibly a power plant. Here the flow rate is low and in some instances constant (power plant). It is understood, of course, that such a configuration is suitable for use in other applications as well, including vehicles and stationary engines.

In another embodiment, a catalytic or filtering substrate of the invention, in one embodiment, has a plurality of channels extending longitudinally through at least a portion of the substrate. The plurality channels allow a fluid medium, e.g., a gas or a liquid, to flow through the substrate. The plurality of channels extend from the frontal surface towards the rear surface. Other channels may extend from the rear surface to the frontal surface.

The channels can extend through the entire length of the substrate. In such an embodiment, a channel will have a first channel opening on the frontal surface of the substrate and a second channel opening on the rear surface. Alternatively, a channel extends through a portion of the substrate. In certain embodiments, the channel extends through about 99%, 97%, 95%, 90%, 85%, 80%, 70%, 60%, or 50% of the length of the substrate.

The channel holes, or channel openings, of a substrate can be formed in any number of shapes. For example, the channel openings may be circular, triangular, square, hexagonal, etc. In preferred embodiments, the channel openings are triangular, square, or hexagonal.

In one embodiment, the channel openings are formed such that the thickness of the substrate material between adjacent channels is substantially uniform throughout the substrate. Variation in wall thickness may be from about 1% to about 50% in certain embodiments.

In another embodiment, the channels are arranged so that the walls of adjacent channels are parallel to each other. For example, the triangular, square, or hexagonal channels may be formed such that the walls of adjacent channels are parallel to each other.

The diameter or cross-sectional distance of the channels in the substrate of the present invention can vary. In certain embodiments, the channels have a diameter or cross-sectional distance of about 5 cm to about 100 nm. In certain embodiments, a channel has a diameter of about 100 nanometers. Other suitable values include a distance or diameter selected from about 1, 2, 3, 4, 5, 6, 7, 8, 9, 10, 11, 12, 13, 14, 15, 16, 17, 18, 19, and 20 mils.

A channel may vary in size along its length. For example, the channel may be about 0.04 inch across at its opening but then gradually decrease in size approaching either the end wall or point of the channel or the opening at the end of the channel. In one embodiment, the channel is a square shape opening at the frontal surface of sides of about 10 mils. The channel extends through the length of the substrate and has a second opening on the rear surface. The channel opening of the rear surface has a square shape with sides of about 4 mils. The channel becomes gradually smaller along its length from the frontal surface to the rear surface. Other similar configurations of course are contemplated.

The size of the channel opening may vary as well. For example, in certain embodiments, the diameter or (cross sectional distance) is from about 1 mil to about 100 mils. Other suitable ranges for the sized of the channel opening include, but are not necessarily limited to, about 1 to about 500 mils, from about 1 to about 100 mils, from about 1 to about 10 mils. Other suitable sizes include a distance or diameter selected from about 1, 2, 3, 4, 5, 6, 7, 8, 9, 10, 11, 12, 13, 14, 15, 16, 17, 18, 19, and 20 mils. The substrate of the invention may also have channels of varying sizes. That is, some channels of an embodiment of a substrate has a first plurality of channels having a first diameter or cross-sectional distance and a second plurality of channels having a second diameter or cross-sectional distance. By way of example, a substrate of the present invention comprises, in one embodiment, one or more channels having a cross-sectional distance of about 5 mils and further comprises one or more channels having a cross-sectional distance of about 7 mils. Other variations of these embodiments are understood to be within the scope of the present invention.

In other embodiments, the channel diameter or cross-sectional distance can be about 5 cm, 4 cm, 3 cm, 2 cm, or 1 cm. Substrates having channels of larger diameter or cross-sectional distance are preferred for larger exhaust systems which may have exhaust pipes of one or more feet in diameter.

The thickness of the channel wall may vary as well. For example, the channel wall may be less than 1 mil thick. Other suitable values for the channel wall thickness include 1, 2, 3, 4, 5, 6, 7, 8, 9, and 10 mils.

The channels can be measured in terms of the number of channels per square inch. In certain embodiments, a substrate of the present invention has from about 50 to about 100,000 channels per square inch. Other suitable values include 100, 200, 300, 400, 500, 600, 700, 800, 900, and 1000. Other embodiments include a catalytic or filtering substrate having 2000 channels per square inch.

In one embodiment, the substrate of the present invention comprises 600 cpsi and a wall thickness of 6 mils. The cell density of a sample substrate of the present invention is compared with two samples of cordierite. The first and second cordierite samples are 100 cpsi with 17 mil wall thickness and 200 cpsi with 12 mil wall thickness, respectively. In comparison, the substrate of the present invention in this embodiment has 600 cpsi with 6 mil walls.

In an exemplary embodiment, the substrate is drilled with 0.04 inch diameter channels spaced every 0.06 inches across the entire filter. These channels are smaller than conventional cordierite wall flow channels. The result is vastly increased surface area as compared to cordierite, even without taking into consideration the surface area existing in the massive pore space of the substrate material. The channels are preferably "blind" channels. Exhaust emission is forced to pass through the channel walls, rather than flowing in and out of the channels without reacting with the catalyst.

A further embodiment is directed to a catalytic or filtering substrate comprising a plurality of channels having a pyramidal shape. The pyramidal shapes of the channels are such that they can be applied to any number of substrate materials, including and in addition to the substrates of the present invention, such as nSiRF-C. The pyramidal channels can be configured such that each channel has two channel openings, e.g., a flow through configuration having one on the frontal surface of the substrate and one on the rear surface of the substrate. Alternatively, the pyramidal channels can be configured such that each channel has only one opening, e.g., a wall flow configuration. In this embodiment, the opening of certain channels is situated on the frontal surface, whereas the opening of other channels is situated on the rear surface. Preferably, the channels are positioned so that adjacent channels have the opposite configuration with respect to the location of the channel opening. Furthermore, in certain embodiments of the pyramidal wall flow configuration, the channel terminates at an undrilled portion of the substrate. This undrilled portion of the substrate may be either flat or pointed. If the undrilled portion is flat, the longitudinal cross-sectional area of the channel appears trapezoidal. If the undrilled portion is pointed, the longitudinal cross area of the channel appears triangular.

Shapes and Forms

The catalytic and filtering substrates comprise a number of suitable, and heretofore, unknown configurations. The substrates are three-dimensional and generally have a front surface (or area or face) and a rear surface (or area or face) connected by the body of the substrate to one or more lateral surfaces. The front and rear surfaces can be any number of shapes as described herein. The front surface refers to the surface through which the fluid enters the substrate. The rear surface refers to the surface through which the fluid exits the substrate. Generally the surface is flat but may, in certain embodiments, be non-flat.

In certain embodiments, the substrate has the shape of a cylinder. The cylinder composed of the substrate is used, for example, to catalyze the reduction of NO in a exhaust gas.

Any number of suitable lengths and widths or diameters are suitable for the substrate of the present invention. Suitable lengths include 1, 2, 3, 4, 5, 6, 7, 8, 9, 10, 11, 12, 13, 14, 15, 16, 17, 18, 19, and 20 inches. Of course, longer lengths may be preferred in diesel applications and for use in stationary engines, such as those used in pharmaceutical and chemical plants, manufacturing plants, power plants, and the like. In another respect, the shape of the substrate can be described based on its frontal surface shape. The substrate of the present invention can be prepared such that the frontal surface has one of several physical configurations. The frontal surface shape can be any number of shapes, including but not limited to circular, triangular, square, oval, trapezoidal, rectangular, and the like. Three-dimensionally, the substrates may be in the form of a cylinder or a substantially flat disc. Commerically available substrates generally exist as one of these three designs. Substrates can have squared corners or rounded corners. Rounded corners are preferable on the frontal surface shape of the substrate. Thus, in one embodiment, the substrate of the present invention has a square shape with rounded corners. In another embodiment, the substrate has a rectangular frontal shape with rounded corners. In another embodiment, the substrate has a trapezoidal frontal shape with rounded corners.

Exemplary dimensions for a catalytic substrate according to the present invention include but are not limited to, those having a circular cross-sectional shape and having a diameter of about 3.66, about 4.00, about 4.16, about 4.66, about 5.20, about 5.60, or about 6.00 inches. In other embodiments, the catalytic substrate has the shape of a oval cylinder with cross-sectional dimensions (minor and major axis respectively) of about 3.15 by about 4.75 inches, about 3.54 by about 5.16 inches, or about 4.00 by about 6.00 inches.

In another embodiment, the catalytic substrate has a shape and size that is suitable for use in a head cat. Generally, a head cat will be smaller in size than conventional catalytic converters found on exhaust systems of engines. The determination of a suitable size and shape of the head cat is within the ability of one of ordinary skill in the art. The size and shape of the head cat is configured based on the particular head and engine with which the head cat will be used. For example, a conventional cordierite round substrate that is approximately 4½ inches in diameter has a front surface area of about 28.27 square inches. On a Ford 4.6 V-8, for example, there are two pre-cats having a substrate of approximately this dimension. These two conventional pre-cats can be replaced by eight head-cats comprising a nSiRF-C substrate comprising a diameter of about 1.13 inches.

Alternatively, the cylinder is used to catalyze the oxidation of carbon monoxide and unburned hydrocarbons in an exhaust gas. The length of the cylinder may be greater than, equal to, or less than the diameter of the cylinder.

Different shapes and configurations of the filtering substrate and catalytic substrate can be used based on the particular application, e.g., stationary engine, on-road vehicle, off-road vehicle, etc.

In another embodiment, the catalytic substrate is shaped to replace the commercially used substrate of a commercially available catalytic converter. In this embodiment, the substrate of the invention will have a shape and dimensions that are substantially identical to substrates of available cataltyic converters that use a different substrate. For example, many catalytic converters currently used contain a substrate that is made from cordierite. The shape and size of the cordierite of catalytic converters is known or can be determined by analysis. The substrate of the present invention is then prepared, either by machining or molding as described below, such that the shape and size of the substrate of the present invention is substantially identical to that of the known cordierite substrate.

Membrane Configuration

Alternatively, the substrate has a membrane configuration. In such a configuration, the length of the substrate is substantially less than the width or diameter of the substrate. A longer travel length for exhaust through a substrate corresponds to a build up of backpressure in certain conventional catalytic converters and particulate filters. In the thinner substrate of certain embodiments of the present invention, backpressure will be minimized, and the exhaust gas will move through the filter system with less effort and increased filtering capabilities. This reduction in backpressure results in the engine running more efficiently meaning better gas mileage and more power.

In one embodiment of the present invention, the substrate is two inches in diameter and $\frac{1}{16}$th inches thick and has 400 times the surface area of a conventional cordierite filter that has a four inch diameter and is six inches long. Since the substrate itself has been reduced in size, a canister can also be reduced in size, resulting in just a small bulge in the exhaust line. Alternatively, the substrate can be housed in the exhaust manifold.

In another embodiment, the substrate is in the form of a membrane. In this instance, the membrane comprising the substrate material as described herein having any number of shapes as described above, and wherein the length of the substrate is substantially less than the width or diameter. The dimension can be described as a ratio of, e.g., width to length, or diameter to length. Suitable diameter to width ratios include, but are not limited to, about 20:1, 19:1, 18:1, 17:1, 16:1, 15:1, 14:1, 13:1, 12:1, 11:1, 10:1, 9:1, 8:1, 7:1, 6:1, and 5:1.

Furthermore, a substrate having a membrane configuration can be stacked together with one or more separate substrate embodiments. With a membrane configuration, a number of catalytic or filtering substrates having a membrane configuration can be stacked together. For example, a plurality, e.g., 5, of catalytic or filtering substrates having a cylinder (or disc) shape with a diameter of about 1 inch and a length of about 0.2 inch can be stacked together to form a substrate pile having a certain length, e.g., about 1 inch.

In the case of a membrane configuration, in one embodiment, the catalytic substrate does not contain a plurality of channels running through the substrate. Because of the shorter distance through which the gas must travel and because, in part, of the high porosity of and low drop pressure caused by the present invention, it is possible to form a substrate pile comprising a plurality of catalytic substrates having a membrane configuration.

Furthermore a stacked membrane configuration also includes stacked membrane configurations in which the individual substrates are not perpendicular to the floor of the catalytic converter or particulate filter. In this embodiment, the substrate may be machined or molded so that the angle between the side(s) (lateral surface) of the substrate and the face (front or rear surface) is about 90° or is less than or greater than 90°, e.g., 80°, 70°, etc.

Pre-sintering Addition of Catalyst

In another embodiment, the catalytic substrate as described herein further comprises a catalyst, wherein the catalyst is added to the substrate material prior to the sintering process. In this case, the catalyst is generally added to the slurry before the green billet is produced. In other embodiments, the catalyst is added to the fibers in the mixer. Alternatively, the catalyst, if in the form of a liquid, is added to the slurry in certain embodiments. The substrate may be formed from a slurry that comprises one or more catalysts. In one embodiment, the catalyst, upon sintering, adheres to the fibers of the substrate. In another embodiment, the catalyst is located within the pores of channel walls as opposed to be adhered mainly to the surface of the channel walls.

Zonation of Substrate

In another embodiment, the catalytic substrate as described herein is prepared such that different zones in the substrate have different attributes. In other words, one or more physical characteristics or attributes of the catalytic substrate are not uniform, or the same, throughout the entirety of the substrate. For example, in certain embodiments, different zones or regions of the substrate have different densities, different catalysts, different catalyst mixtures, different channel configurations, different porosities, different permeabilites, and/or different thermal attributes. By way of example, in one embodiment, a catalytic substrate of the present invention comprises a nSiRF-C composite and a first and second catalyst, wherein said first catalyst is applied to a first zone of said substrate and said second catalyst is applied to a second zone of said substrate. In a further embodiment, the substrate has a different degrees of structural integrity through the body of the substrate. For example, as described herein, a densification coating may be added to the surface of the substrate to increase hardness of its surface which would lessen possible damage.

Washcoat

Another aspect of the present invention is directed to a catalytic or filtering substrate as described herein further comprising a washcoat. In other embodiments, the catalytic substrate further comprises a catalytic washcoat, e.g., the washcoat comprises a catalyst in addition to a washcoat material. Alternatively, in another embodiment, the washcoat material has catalytic activity.

Suitable washcoats include silica, titania, unimpregnated zirconia, zirconia impregnated with a rare earth metal oxide, ceria, co-formed rare earth metal oxide-zirconia, and combinations thereof. Other suitable washcoats are disclosed in, e.g., U.S. Pat. Nos. 6,682,706; 6,667,012; 4,529,718; 4,722,920; 5,795,456; and 5,856;263, all of which are herein incorporated by reference in their entirety.

Generally, a washcoat can be applied in certain embodiments, from an aqueous slurry. The alumina powder and/or other washcoat oxides are milled to the required particle size. The particle size distribution of the washcoat powder affects the mechanical strength of the finished washcoat and its adhesion to the substrate, as well as the rheological attributes of the slurry during the washcoating process. Alumina, a very hard material, is, in certain embodiments, milled using air-jet or ball mills.

In the next step, the materials are dispersed in acidified water in a tank with a high-shear mixer. The solid content in the slurry is typically 30-50%. After prolonged mixing, the alumina suspension becomes a stable colloidal system.

The amount of washcoat deposited on the substrates depends on, and can be controlled by, the Theological attributes (viscosity) of the slurry. The aluminum oxide slurry, in certain instances, is a nonnewtonian fluid which changes its viscosity with time and with the amount of mechanical energy supplied to the system (shear rate). At any steady sheer rate, the viscosity of the slurry is a function of its pH. In certain embodiments, the viscosity can be controlled by pH adjustment. Precise viscosity control, however, is probably the biggest challenge in the washcoating process due to the nonnewtonian character of alumina systems.

The washcoat slurry can be applied to the substrates using any known methods and procedures, including dipping or pouring over the parts, and/or in a specialized coating machine. Excess slurry is cleared from channels with compressed air. The substrates can then be dried and calcined to bond the washcoat to the monolith walls.

In certain embodiments, the washcoat can be applied in one, two, or more layers. Each layer can be dried and calcined before the processing of next layer. There are several reasons for the application of multi-layer washcoats: (1) the catalyst design may require a different chemical formulation for each layer, and (2) coating/process equipment constraints, e.g., an inability to handle very viscous slurries which are needed to apply a thick washcoat in one-pass operation.

Typical thickness of the washcoat layer is 20-40 µm but values outside of the range can also be used in the present invention. These numbers correspond, for example, to a washcoat loading of about 100 g/L on a 200 cpsi substrate, up to about 200 g/L on a 400 cpsi substrate. The specific surface area of catalyst washcoat materials is in certain embodiments between 100 and 200 $m^2/g$. Of course, other values are useful in the present invention.

Noble metals and other catalysts in a complex catalyst system may react with each other, with washcoat components, or with the support material and produce undesired, catalytically inactive compounds. If such reactions occur in a given catalytic system, they are difficult to prevent in the conventional washcoat technology. Since the catalytic metals are impregnated onto the finished washcoat layer, the contact between reacting components cannot be avoided.

Segregated washcoat technologies have been developed to physically separate noble metals by fixing them on a particular base metal oxide of the washcoat before the washcoat is applied to the substrate. Through the use of washcoat layers with different oxides and/or noble metals, the components of a catalytic system can be separated. Additional benefit of this technology include a control of the noble metal/base metal ratio and an improved noble metal dispersion. Such technology can be applied to the present invention. Thus, in a preferred embodiment, the present invention is directed to a catalytic substrate comprising a nSiRF-C, at least two catalytic metals, and a washcoat, wherein said two catalytic metals are physically separated.

Segregated Washcoat Schematic: Segregated washcoats were first applied for automotive 3-way catalysts. An example of such a catalyst is a tri-metal system which includes platinum, palladium and rhodium. The first layer of the catalyst is composed of $Pd/Al_2O_3$. The second (surface) layer is composed of Rh/Pt/Ce—Zr. That design prevents the formation of palladium-rhodium alloys which otherwise could cause catalyst deactivation.

Aluminum oxide or alumina is the basic material for emission control catalyst washcoat. The high surface area gamma crystalline structure ($\gamma$-$Al_2O_3$) is used for catalyst applications. It is characterized by high purity. Presence of certain elements in the $Al_2O_3$ can influence its thermal stability, both negative and positive. Small amounts of $Na_2O$ present in $Al_2O_3$ act as a flux, enhancing the sintering of alumina. In contrast, several metal oxides, including $La_2O_3$, $SiO_2$, BaO, and $CeO_2$ have a stabilizing effect on alumina surface area and reduce its sintering rate. Stabilized aluminas are commercially available.

In other embodiments, cerium dioxide, or ceria, is a component of the catalyst washcoat, added, for example, in quantities of up to 25%. In other embodiments, ceria is add in quantities of about 5%, 10%, 15%, 20%, and 25%. Ceria is an important promoter in the automotive emission control catalyst. One function of ceria in the three-way catalyst is oxygen storage, which is possible through a cycling between $Ce^{4+}$ and $Ce^{3+}$. Other effects attributed to ceria include stabilization of alumina, promotion of the steam reforming reaction, promotion of noble metal dispersion, and promotion of noble metal reduction.

Certain diesel oxidation catalyst formulations include high loadings of ceria. The function of ceria is catalytic oxidation/cracking of the soluble organic fractions of diesel particulates.

High surface area cerium oxide can be produced, for example, by calcination of cerium compounds. The BET surface area of ceria can be as high as 270 $m^2/g$. In other embodiments, for example in a three-way catalyst, ceria of about 150 $m^2/g$ surface area is used. High temperature stabilized varieties, which are capable of withstanding 900-1000° C., have surface areas of about 6-60 $m^2/g$ and are suitable for use in the present invention.

A catalytic substrate or filtering substrate of the invention in other embodiments further comprises zirconium oxide. In certain embodiments, the zirconium oxide increases the thermal stability of the substrate.

Titanium dioxide is used with some diesel catalysts as an inert, non-sulfating carrier. Two important crystal structures of titanium dioxide include anatase and rutile. The anatase form is important for catalyst applications. It has the highest surface area of 50-120 $m^2/g$ and is thermally stable up to 500° C. The rutile structure has a low surface area of below 10 $m^2/g$. A conversion of anatase into rutile, which takes place at about 550° C., leads to catalyst deactivation. In another embodiment of the present invention, the catalytic substrate comprises a nSiRF-C, preferably an AETB or OCTB, a catalyst, and titanium oxide.

Zirconium oxide can be used as a thermal stabilizer and promoter of ceria in the automotive three-way catalyst and also as a non-sulfating component of diesel oxidation catalyst washcoats. Zirconium oxide has a BET surface area of 100-150 $m^2/g$. It rapidly looses its surface area at 500-700° C. Better thermal stability can be achieved by the use of a wide range of dopants including La, Si, Ce, and Y.

Zeolites are synthetic or naturally occurring alumina-silicate compounds with well defined crystalline structures and pore sizes. The dimensions of zeolite pores are typically between 3 and 8 Å, which falls into the range of molecular sizes. Any molecule of a larger cross-sectional area is prevented from entering the channel of the zeolite cage. For this reason, zeolites are often referred to as molecular sieves.

Zeolites are characterized by high specific surface areas. For example, the ZSM-5 zeolite has surface area of about 400 $m^2/g$. Zeolite mordenite has a surface area of about 400-500 $m^2/g$. Most zeolites are thermally stable up to 500° C.

Zeolites for some catalytic applications are ion exchanged with metal cations. The acid form of zeolite (HZ) is first treated with an aqueous solution containing $NH^{4+}$ ($NH_4NO_3$) to form the ammonium exchanged zeolite ($NH^{4+}Z^-$). This is then treated with a salt solution containing a catalytic cation forming the metal exchanged zeolite (MZ).

Zeolites, due to their repeatable and well defined pore structure, are excellent adsorption materials. They have been used as adsorbents in numerous applications including drying, purification and separation. Synthetic zeolites are also used as catalysts in petrochemical processing.

In recent years, zeolites have been increasingly used for diesel emission control, both as catalysts (SCR, lean $NO_x$ catalyst) and adsorbers (hydrocarbon traps in diesel oxidation catalysts).

It is understood that further embodiments of the invention include any of the specific substrate embodiments described herein, further comprising any of the specific washcoat embodiments.

Oxygen-storing Oxide

In another embodiment, the catalytic substrate or filtering substrate of the present invention further comprises an oxygen-storing oxide. The oxygen-storing oxide, for example $CeO_2$, has an oxygen storing capacity (hereafter abbreviated as "OSC"), that is, the capacity to occlude gaseous oxygen and to release the occluded oxygen. More specifically, $CeO_2$ is added for adjusting the oxygen concentration of gaseous atmosphere, so that excess oxygen in the gaseous atmosphere is occluded into the crystalline structure of $CeO_2$ in an oxygen-rich state (i.e., fuel-lean state which may be simply referred to as "lean state") for assisting the catalytic converter in reducing $NO_x$ to $N_2$ while releasing the occluded oxygen into the gaseous atmosphere in a CO— and/or HC-rich state (i.e., fuel-rich state which may be simply referred to as "rich state") for assisting the catalytic converter in oxidizing CO and HC to $CO_2$ and $H_2O$. Thus, the catalytic activity of the catalytic substrate is enhanced by the addition of $CeO_2$. Other oxygen-storing oxides include $Pr_6O_{11}$ and the like, as disclosed in U.S. Pat. No. 6,576,200. Further embodiments include any specific substrate embodiment described herein, further comprising an oxygen-storing oxide, e.g., $CeO_2$.

SOx Oxidation

In the presence of certain metal catalysts, especially platinum, sulfur present in the fuel, for example in diesel fuel, is converted to SOx which can then create environmentally harmful sulfuric compounds, such as sulfuric acid fumes, in the exhaust. Most sulfates are typically formed over platinum catalysts at relatively high exhaust temperatures of about 350-450° C. While there is a dire need to remove sulfur from the gasoline and diesel fuel formulations, in the interim, catalyst formulations have tried to reduce that problem to their best possible extent.

An exemplary platinum catalyst developed by Engelhard is composed of 5-150 $g/ft^3$ Pt/Rh at 5:1 ratio and 30-1500 $g/ft^3$ of MgO (U.S. Pat. No. 5,100,632 (Engelhard Corporation)). The catalyst can be impregnated onto substrates from water based solutions. A filter coated with the catalyst preferably is used for exhaust temperatures of 375-400° C. to regenerate. The function of rhodium in the above formulation is to suppress the catalytic oxidation of $SO_2$ and, thus, the sulfate mask in the catalyst.

A catalytic substrate of the present invention may, in certain embodiments, provide solutions to these problems by, for example, having an improved thermal profile and thereby reducing thermal breakdown of the catalyst.

Catalyst poisoning is a significant source of catalyst deactivation. It can occur when substances which are present in exhaust gases chemically deactivate the catalytic sites or cause fouling of the catalytic surface. Poisons in exhaust gases from internal combustion engines may be derived from lube oil components or from the fuels.

Interactions between different catalyst species or between catalyst species and carrier components are another temperature-induced mode of catalyst deactivation. An example is the reaction between rhodium and $CeO_2$ in an automotive three-way catalyst. This type of problem can be reduced by using alternative carriers and special washcoat technologies which physically separate the reacting components and are known in the art.

A further advantage of the present invention is that a nSiRF-C can be pumped with different zones to separate physically incompatible components, or alternatively can be utilized as a stacked membrane configuration with incompatible components in separate membrane substrates.

Catalyst deactivation may also occur due to a physical washcoat loss through erosion and attrition. That mechanism may also be important for emission control catalyst because of the high gas velocities, temperature changes, and differences in thermal expansion between the washcoat and substrate materials.

Catalyst Cover

In certain applications, adsorber catalysts are used to convert $NO_x$ into salts which can then be manually removed in a regenerative process. However, the presence of sulfur in the fuel can lead to the formation of insoluble $SO_4$ salts, such as barium sulfate, which can form a protective coating on top of the catalysts and reduce their efficiency. An advantage of certain embodiments of the present invention is that the catalytic substrate is less susceptible to reduced efficiency due to the coating from sulfate salts.

In another embodiment, the catalytic substrate or filtering substrate of the present invention further comprises a protective coating suitable for ceramics. For example, such a suitable protective coating is disclosed in U.S. Pat. No. 5,296,288, which is incorporated herein by reference in its entirety. This coating is also known as Protective Coating for Ceramic Materials (PCC). Another suitable, and related coating, is available as Emisshield™ coating (Wessex Incorporated, Blacksburg, Va.). The emissivity agents in Emisshield™ enhance the emissivity of materials, especially at high temperatures. Additionally, a protective coating may lessen damage from external impact and wear forces. Suitable coatings are disclosed in U.S. Pat. Nos. 5,702,761 and 5,928,775, issued to DiChiara, Jr. et al. and U.S. Pat. No. 5,079,082, issued to Leiser, et al., the disclosures of which are incorporated herein by reference. Said coating can be used with one or more of the specific filtering and catalytic substrates described herein.

In certain embodiments, the catalytic substrate or filtering substrate is resistant to damage from thermal shock and thermal cycling. However, certain substrates are relatively soft and can be damaged by external impact and wear forces. To lessen such damage, in a preferred embodiment, the catalytic or filtering substrate of the present invention further comprises one or more protective coatings to the surface, preferably the exterior surface, of the substrate. Examples of suitable protective coatings are disclosed in U.S. Pat. Nos. 5,702, 761 and 5,928,775, and 5,079,082, the disclosures of which are incorporated herein by reference. Thus, in a preferred embodiment, the invention provides a substrate having, among other attributes, a higher porosity, a higher permeability, and a sufficient hardness compared to conventional substrates. Said coating can be used with one or more of the specific filtering and catalytic substrates described herein.

Pressure Drop

The present invention also provides a substrate that provides for an improved pressure drop for catalytic converters and particulate filters. Thus, in certain embodiments, a substrate of the present invention permits one to provide a means for removing and/or filtering an exhaust gas without a substantial buildup of back pressure, or alternatively with a lower buildup of back pressure compared to conventional catalytic and particulate filters.

The flow of exhaust gas through a conventional catalytic converter creates a substantial amount of backpressure. The backpressure buildup in a catalytic converter is an important attribute to catalytic converter success. If the catalytic converter is partially or wholly clogged, it will create a restriction in the exhaust system. The subsequent buildup of backpressure will cause a drastic drop in engine performance (e.g., horsepower and torque) and fuel economy, and may even cause the engine to stall after it starts if the blockage is severe. Conventional attempts to reduce pollutant emissions are very expensive, due to both the cost of materials and retrofitting or manufacturing an original engine with the appropriate filter.

A substrate of the present invention has, in certain embodiments, the attribute of producing a lower or smaller pressure drop than conventional substrates used in catalytic converters or particulate filters. The present invention in some embodiments provides a lower buildup of soot in the particulate filter and in some instances allows less frequent need for replacement of the filter compared to conventional particulate filters.

Specific Embodiments

The present invention is also directed to specific embodiments of the catalytic and filtering substrates described above. Specific embodiments include a substrate comprising, or alternatively consisting of or consisting essentially of, a nSiRF-C and a catalyst. An additional embodiment is a filtering substrate comprising a nSiRF-C and a plurality of channels.

For example, certain embodiments of the substrate have a plurality of the attributes described above. In other embodiments, the substrate of the invention has 2, 3, 4, 5, 6, 7, 8, 9, or 10 of the attributes described above. The specific embodiments can comprise any combination of attributes. The catalytic substrate is further illustrated by the following nonlimiting specific embodiments.

In one embodiment, the substrate of the invention comprises a nSiRF-C composite having a porosity of about 96% to about 99%; a density of about 10 to about 14 $lb/ft^3$; a plurality of channels having a wall-flow configuration; and optionally a catalyst.

In one embodiment, the substrate of the invention comprises a nSiRF-C composite comprising aluminaboriasilica fibers, silica fibers, and alumina fibers having a porosity of about 96% to about 99%; a density of about 10 to about 16 $lb/ft^3$, preferably about 10, 11, 12, 13, 14, 15, or 16 $lb/ft^3$; a plurality of channels having a wall-flow configuration; and optionally a catalyst. In other embodiments, the substrate further comprises a washcoat, preferably of aluminaoxide or a derivated thereof.

In another embodiment, the substrate of the invention comprises a substrate having one or more of the following attributes: tensile strength of from about 100 to about 150, preferably about 130 to about 140, more preferably about 133 psi; thermal conductivity of about 0.5 to about 0.9, preferably about 0.7 to about 0.8, more preferably about 0.770 BTU-ft*/hr $ft^2$ °F.; a thermal coefficient of expansion of about 1 to about $5\times10^{-6}$, from about 1 to about $3\times10^{-6}$, more preferably about $1.95\times10^{-6}$ (tested from 77° F.-1000° F.); an average density of from about 15.5 to about 17, preferably about 16 to about 16.8, more preferably about $16.30/lb/ft^3$; and optionally a catalyst.

In another embodiment, the substrate of the invention comprises a substrate having one or more of the following attributes: tensile strength of about 50 to about 70, preferably about 60 to about 65, more preferably about 63 psi; thermal conductivity of about 0.5 to about 0.9, preferably about 0.7 to about 0.8, more preferably about 0.770 BTU-ft*/hr $ft^2$ °F.; a thermal coefficient of expansion of about 1 to about $5\times10^{-6}$, from about 1 to about $3\times10^{-6}$, more preferably about $1.77\times10^{-6}$ (tested from 77° F.-1000° F.); an average density of from about 7 to about 9, preferably about 8.2 to about 8.6, more preferably about $8.40/lb/ft^3$; and optionally a catalyst.

In another embodiment, the substrate of the invention comprises a substrate having one or more of the following attributes: tensile strength of about 60 to about 80, preferably about 70 to about 79, more preferably about 74 psi; thermal conductivity of about 0.5 to about 0.9, preferably about 0.7 to about 0.8, more preferably about 0.765 BTU-ft*/hr $ft^2$ °F.; a thermal coefficient of expansion of about 1 to about $5\times10^{-6}$, from about 1 to about $3\times10^{-6}$, more preferably about $1.84\times10^{-6}$ (tested from 77° F.-1000° F.); an average density of from about 9 to about 11, preferably about 9.5 to about 10.5, more preferably about 10 $lb/ft^3$; and optionally a catalyst.

Another suitable catalytic substrate of the present invention is a nSiRF-C as described herein; and a catalyst comprising: a carrier pre-doped with copper oxide (CuO); at least one precious metal as a main catalyst selected from the group consisting of platinum (Pt), palladium (Pd), rhodium (Rh) and rhenium (Re), wherein the at least one precious metal is doped on the surface of the pre-doped carrier; and at least one metal oxide as a co-catalyst selected from the group consisting of antimony trioxide ($Sb_2O_3$), bismuth trioxide ($Bi_2O_3$), tin dioxide ($SnO_2$), and mixtures thereof, wherein the at least one metal oxide is doped on the surface of the pre-doped carrier. Such a catalyst is described in U.S. Pat. No. 6,685,899, which is incorporated by reference in its entirety.

In one embodiment, the substrate is suitable for being used in a catalytic converter that is placed inside the engine head before the exhaust manifold in relation to the flow of exhaust gas.

Additional embodiments of the catalytic substrate include a catalytic substrate comprising an nSiRF-C composite having the approximate attributes shown in the following table.

|  | Embodiment 1 | Embodiment 2 | Embodiment 3 |
|---|---|---|---|
| Thermal Conductivity | 4-100 × $10^{-2}$ W/m-K | 5-7 × $10^{-2}$ W/m-K | 6.04 F-02 W/m-K |
| Specific Heat | 10-150 J/mol K | 600-700 × $10^{-2}$ J/kg-K | 640 × $10^{-2}$ J/kg-K |
| Density | .05-5 gm/cc | 0.1-0.3 gm/cc | 0.2465 gm/cc |
| Emissivity | .68-.97 | 0.7-0.92 | 0.88 |
| Axial Strength | 1.5 to 3.5 MPa | 2-3 MPa | 2.21 MPa |
| Noise Attenuation at 3500 rpm | 40-100 db | 70-80 db | 74 db |

-continued

|  | Embodiment 1 | Embodiment 2 | Embodiment 3 |
|---|---|---|---|
| Porosity | 80-99% | 97-98% | 97.26% |
| Permeability | At least 600 | 900-∞ cd | 1093-∞ cd |
| Regeneration Time | 0.5 to 1.5 sec | 0.6-0.9 | 0.75 sec |
| Surface Area |  | 70,000-95,000 in$^2$ | 88,622 in$^2$ |
| Melting Point | 1700-5000 | 3000-4000° C. | 3,000° C. |
| Thermal Expansion (CTE) | $0.001 \times 10^{-6}$ to $9 \times 10^{-6}$ | $0.1 \times 10^{-7}$ to $0.4 \times 10^{-7}$ | $0.25 \times 10^{-7}$ 1/C |

Another specific embodiment is directed to a catalytic substrate comprising an nSiRF-C as described in Table 1; and a catalyst selected from the group consisting of palladium, platinum, rhodium, derivatives thereof, and combinations thereof.

A preferred substrate comprising high-grade non-woven refractory fibers is 90% to 98% porous and has an emissivity value between 0.8 and 1.0.

In one embodiment, the filtering substrate of the present invention comprises or consists essentially of a nSiRF-C and further includes a frontal inlet end and an outlet end, a matrix of thin, porous, intersecting vertically extending walls and horizontally extending walls, which define a plurality of channels extending in a substantially longitudinal and mutually parallel fashion between the frontal inlet end and the outlet end; the frontal inlet end includes a first section of cells plugged along a portion of their lengths in a non-checkered pattern and a second section of cells plugged in checkered pattern, the first section of non-checkered plugged cells being smaller than the second section of checkered plugged cells. Such a configuration is further described in U.S. Pat. No. 6,673,414, which is herein incorporated by reference in its entirety. Up to three-fourth of the cells of the first section may be unplugged. Alternatively, up to one-half of the cells of the first section may be unplugged. Alternatively, up to one-fourth of the cells of the first section may be unplugged.

It is further understood that the invention is directed to embodiments consisting of or consisting essentially of the limitations of the various embodimetns. Thus, for example, having described one embodiment as a catalytic substrate comprising a nSiRF-C and a catalyst, it is understood that the invention further encompasses a catalytic substrate consisting of or consisting essentially of a nSiRF-C and a catalyst.

Methods of Catalyzing a Reaction and Filtering

Another aspect of the invention is directed to a method of catalyzing a reaction comprising providing a catalytic substrate of the present invention; and directing a flow of a fluid over and/or through the catalytic substrate at a temperature sufficient to catalyze said reaction. Preferably, the reaction converts pollutants to non-pollutants. For example, the catalytic substrate in one embodiment converts carbon monoxide to carbon dioxide.

The method of catalyzing is performed using a substrate comprising alumina enhanced thermal barrier as described herein. A number of substrates In a preferred embodiment, the substrate contains a suitable catalysis.

In one embodiment, the present invention is directed to a method of filtering an exhaust gas comprising providing a filtering or catalytic substrate of the present invention as described above, and directing a flow of a fluid, e.g., a gas or liquid, through the substrate, wherein said gas contains particulate matter.

In another embodiment, the method further comprises burning off of the filtered particulate matter. The burning off of the filtered particulate matter converts the accumulated particulate matter mainly into nonpollutant matter, such as for example gaseous compounds.

This aspect of the present invention is of particular use with diesel engines. In another aspect, the invention is directed to a method of filtering wherein the filtering utilizes a diesel particulate filter.

Diesel engines (where compression alone ignites the fuel) have recently come under worldwide scrutiny for their exhaust emissions, which contain a large number of harmful particulates in addition to toxic gases. Manufacturers's response has been to apply known catalytic converter technology to diesel engines. Unfortunately, regulations regarding emission standards have exceeded the physical and economic limitations of conventional catalytic converters. Diesel emissions differ from gasoline emissions in that a greater amount of particulate matter is generated. For this reason, existing technology for exhaust emission capture, combustion, and oxidation will not comply sufficiently with the most stringent emission standards.

A majority of buses are manufactured with or are retrofitted with 85% efficient diesel particulate traps ["DPTs"]. DPTs have a high cost, are highly complex, lower fuel economy, and have low durability. Further regulations require 100 percent compliance by 2010 and DPTs alone cannot satisfy these reguatory requirements. The high temperature of an engine or exhaust gas permits the particulate matter to combust with a shorter residence time. Moving the filter closer to the combustion chamber of the engine or adding an auxiliary heat source can provide increased heat. Therefore, what is needed is a filter that (1) can be placed in extremely high temperatures, i.e., above 500 degrees Celsius, such as near the combustion chamber; (2) is more resistant to vibration degradation; and (3) still maintains or improves particulate matter burning effect. The ability to achieve particulate matter burning even without a catalyst would also provide significant savings on catalyst and coating costs.

Once a filter captures particulate matter (e.g., soot), the particulate matter needs to be completely combusted by raising its temperature sufficiently in the presence of oxygen. Combustion of the particulate matter can be accomplished by utilizing the existing temperature of the exiting exhaust and/or providing an auxiliary source of heat. The time it takes to burn the particulate matter at this temperature is referred to as the required "residence time," "regeneration time," or "burn-off" period. A shorter residence time of particulates in the substrate pores translates into a reduced occurrence of pore-clogging build up, which buildup can cause increased gas flow backpressure requiring excessive energy to operate efficiently. Lower residence time is, therefore, preferred.

One conventional DPT is exemplified in U.S. Pat. No. 5,611,832 (Isuzu Ceramics Research Institute Co., Ltd.), which discloses a DPT for collecting particulates from exhaust gas discharged from a diesel engine. The DPT filter is constituted of a woven inorganic fiber covered with a silicon carbide ceramic, and metallic wire nets disposed there between.

Additional uses of a filtering substrate or catalytic substrate includes ability to clean or filter from a fluid flow such pollutants and impurities as: dust/soot, smoke, pollen, fluids, bacteria/viruses, odor, oil, volatile organic compounds, liquids, methane, ethylene, and a wide variety of other chemicals, including those chemicals listed as the EPA's 188 "toxic air pollutants."

A method of catalyzing a reaction and/or filtering a fluid may be useful in any number of industries or applications, in particular one or more of the following: Aerospace Industry; Asbestos; Asphalt Roofing and Processing; Auto and Light Duty Truck (surface coating); Benzene Waste Operations; Boat Manufacturing; Brick and Structural applications; Clay Products Manufacturing; Cellulose Products Manufacturing; Caroxymethylcellulose Production; Cellulose Ethers Production; Cellulose Food Casing Manufacturing; Cellophane Production; Chromium Electroplating; Coke Oven: Pushing, Quenching,& Battery Stacks; Coke Ovens; Combustion Turbines; Degreasing Organic Cleaners; Dry Cleaning; Engine Test Cells/Stands; Fabric Printing, Coating& Dyeing; Ferroalloys Production; Flexible Polyurethane Foam; Fabrication Operation; Flexible Polyurethane Foam Production; Friction Products Manufacturing; Gasoline Distribution (Stage 1); General Provisions; Generic MACT; Hazardous Waste Combustion; Hazardous Organic NESHAP; Hydrochloric Acid Production; Industrial, Commercial and Institutional Boilers; Industrial Cooling Towers Process Heaters; Integrated Iron & Steel; Iron Foundries (surface coating); Leather Finishing Ops.; Lime Manufacturing; Magnetic Tape; Manufacturing Nutritional Yeast; Marine Vessel Loading Operations; Mercury Cell Chlor-Alkali Plants; Metal Coil (surface coating); Metal Can (surface coating); Metal Furniture (Surface Coating); Mineral Wool Products; Misc. Coating Manufacturing; Misc. Metal Parts and Products; Municipal Solid Waste Landfills; Natural Gas Transmission and Storage; Off-Site Waste Recovery Operations; Oil & Natural Gas Production; Organic Liquids Distribution (non-gasoline); Paper & Other Web (Surface Coating); Pesticide Active Ingredient Production; Petroleum Refineries; Pharmaceuticals Production; Phosphoric Acid/Phosphate Fertilizer; Plastic Parts (Surface Coating); Polymers and Resins; Polyether Polyols Products; Polybutadiene Rubber; Polysulfide Rubber; Phenolic Resins; Polyethylene Terephthalate; Polyvinyl Chloride and Copolymers Production; Portland Cement Manufacturing; Primary Aluminum Production; Primary Lead Smelting; Primary Copper; Primary Magnesium Refining; Printing/Publishing; Publicly Owned Treatment Works (POTW); Pulp & Paper (non-combust) MACT I; Pulp & Paper (non-chem) MACT III; Pulp and Paper (combustion sources) MACT II; Pulp & Paper Mills; Reciprocating Int. Combust. Engine; Refractory Products Manufacturing; Reinforced Plastic Composites Production; Secondary Aluminium; Secondary Lead Smelters; Semiconductor Manufacturing; Shipbuilding & Ship Repair; Site Remediation; Solvent Extraction for Vegetable Oil Production; Steel Pickling-HCL Process; Taconite Iron Ore Processing; Tetrahydrobenzaldehyde Manufacturing; Tire Manufacturing; Wet Formed Fiberglass; Mat Production; Wood Building Products; Wood Furniture; and Wool Fiberglass Manufacturing. Such industries and applications often utilize EPA-regulated stationary sources of emissions.

Other suitable uses include a filtering or catalytic process in one or more of the following applications: Cars (dust/soot, odor, oil filtration, VOC, methane, other chemicals (gaseous, solid, or liquid)); Water Jets (dust/soot, odor, oil filtration, VOC, methane, other chemicals (gaseous, solid, or liquid)); Snowmobiles (dust/soot, odor, oil filtration, VOC, methane, other chemicals (gaseous, solid, or liquid)); Small engine (dust/soot, odor, oil filtration, VOC, methane, other chemicals (gaseous, solid, or liquid)); Motorcycles (dust/soot, odor, oil filtration, VOC, methane, other chemicals (gaseous, solid, or liquid)); Mobile Diesel Engines (dust/soot, odor, VOC, methane, other chemicals (gaseous, solid, or liquid)); Stationary Diesel Engines (dust/soot, odor, VOC, methane, other chemicals (gaseous, solid, or liquid)); Power Stations (dust/soot, odor, VOC, methane, other chemicals (gaseous, solid, or liquid)); Refineries (VOC, other chemicals (gaseous, solid, or liquid)); and Chemical and Pharmaceutical Manufacturing (dust/soot, bacteria/virus, odor, oil filtration, VOC, methane, other chemicals (gaseous, solid, or liquid).

Furthermore, additional catalytic and/or filtering applications include the use of a substrate according to the present invention in one or more of the following areas: Agricultural & Forestry Incineration Emissions; Bakeries (dust/soot, smoke, odor, VOC, other chemicals (gaseous, solid, or liquid)); Bio-Medical Fluid Filtration; Breweries and wineries (odor); Cabin air (car, submarine, space industry, airplane) (dust/soot, smoke, pollen, bacteria/viruses, odor, VOC, other chemicals (gaseous, solid, or liquid)); Clean room applications (dust/soot, smoke, pollen, bacteria/viruses, odor, oil, VOC, methane, other chemicals)); Commercial Incineration Emissions (odor, VOC, other chemicals (gaseous, solid, or liquid)); Commercial Toxic Organic Emissions; Dry cleaners (VOC, other chemicals (gaseous, solid, or liquid)); Evaporative Emissions (such as Fuel Evaporation Management); Fireplaces); Flame grilling (fast food) (dust/soot, smoke, odor, VOC, other chemicals (gaseous, solid, or liquid); Fitness Centers); Fluid Filtration in General (Drinking water treatment)); Food processing and storage (odor, other chemicals (gaseous, solid, or liquid); Foundries (odor); Fuel Cells (VOC, methane, other chemicals (gaseous, solid, or liquid); Gas Masks (dust/soot, smoke, pollen, bacteria/viruses, odor, VOC, other chemicals (gaseous, solid, or liquid); General VOC applications for processing/manufacturing (wood products, coating industry, textile industry, etc); Glass/ceramics; Greenhouses; Home appliances—cold (Rechargeable appliances ) (odor, oil, VOC, other chemicals (gaseous, solid, or liquid)); Home appliances—hot (Water Heaters & Domestic Heaters Appliances) (odor, oil, VOC, other chemicals (gaseous, solid, or liquid)); HVAC Sanitation); Hydrogen Reformation (VOC, methane, other chemicals (gaseous, solid, or liquid)); Medical Growth Medium; Office buildings; Oil/petrol transport; Other Electro-Magnetic Insulation (Electro-Magnetic Shield); Paint usage; Petrol stations (odor, VOC); Polymer processing (odor, VOC, other chemicals (gaseous, solid, or liquid); Recovery of precious metals/catalysts from hot gases and liquids; Restaurant Fumes; Sewage and biowaste (bacteria/viruses, odor, VOC, methane, other chemicals (gaseous, solid, or liquid)); Slaughter houses; Smoke Houses (dust/soot, smoke); Sound Insulation; Swimming pools; Tanning studios; Tunnels and car parks (dust/soot, odor, VOC, methane, other chemicals (gaseous, solid, or liquid)); and Waste Incineration (dust/soot, odor, VOC, other chemicals (gaseous, solid, or liquid)).

Process of Preparing a Catalytic or Filtering Substrate

In another aspect, the present invention is directed to a process of preparing any one of the substrates (catalytic or filtering) as described herein. The present invention is also directed to a process of preparing a catalytic substrate of the present invention. In another aspect, the present invention is directed to process of preparing a diesel particulate filter. A number of methods as described below can be used to prepare the substrate.

In one aspect of the present invention, a catalytic substrate as described herein can be prepared using a commercially available billet of nSiRF-C. The commercially available billet of nSiRF-C is machined into a suitable shape, form, and size. A substrate of the invention can be prepared by as large brick of suitable substrate material by machining the brick into a shape suitable for use in the present invention. The crude block can be easily cut or sawed into a preformed shape, and then sanded, turned or machined into the final desired shaped "slug." Although the composition of the substrate material is very resilient to chemical, heat, thermal, and vibrational shock, the hardness is the substrate material is low. This low hardness permits machining with little or minimal amount of resistance or wear on tools. Despite the fact that the block has a low hardness and is soft, it is very durable and easy to machine, sculpt, or shape. For example, in certain embodiments, a substrate material is, on a Moh's hardness scale, usually between 0.5 and 1.0 (or 1-22 on the Knoop hardness scale) with talc being the softest at 1 (1-22 Knoop hardness) and diamond being the hardest at 10 (8,000-8,500 Knoop hardness). Other suitable values Certain prior art substrate materials are harder. For example, silicon carbide has a Moh's hardness of 9-10 (2,000-2950 Knoop hardness).

With reduced effort compared to certain conventional substrates such as cordierite, the billet is shaped, sanded, turned, or machined, providing unlimited shaping capabilities of slug formation. The machining can range from turning a cylinder on a lathe, sawing to shape with a keyhole saw, band saw or jig saw, sanding the shape or smoothing the surface, or any other method of machining commonly used on other solid materials and known in the art. The billet can be machined down to very exacting tolerances with the same accuracy as machining metals, woods, or plastics. If the billet is cast in cylindrical molds with the desired diameter of the final shape, the machining would simply require cutting and sanding the cylindrical billet to the desired thickness. This process also reduces substrate loss due to excessive machining, and speeds up the preforming process as well.

Figure 5:
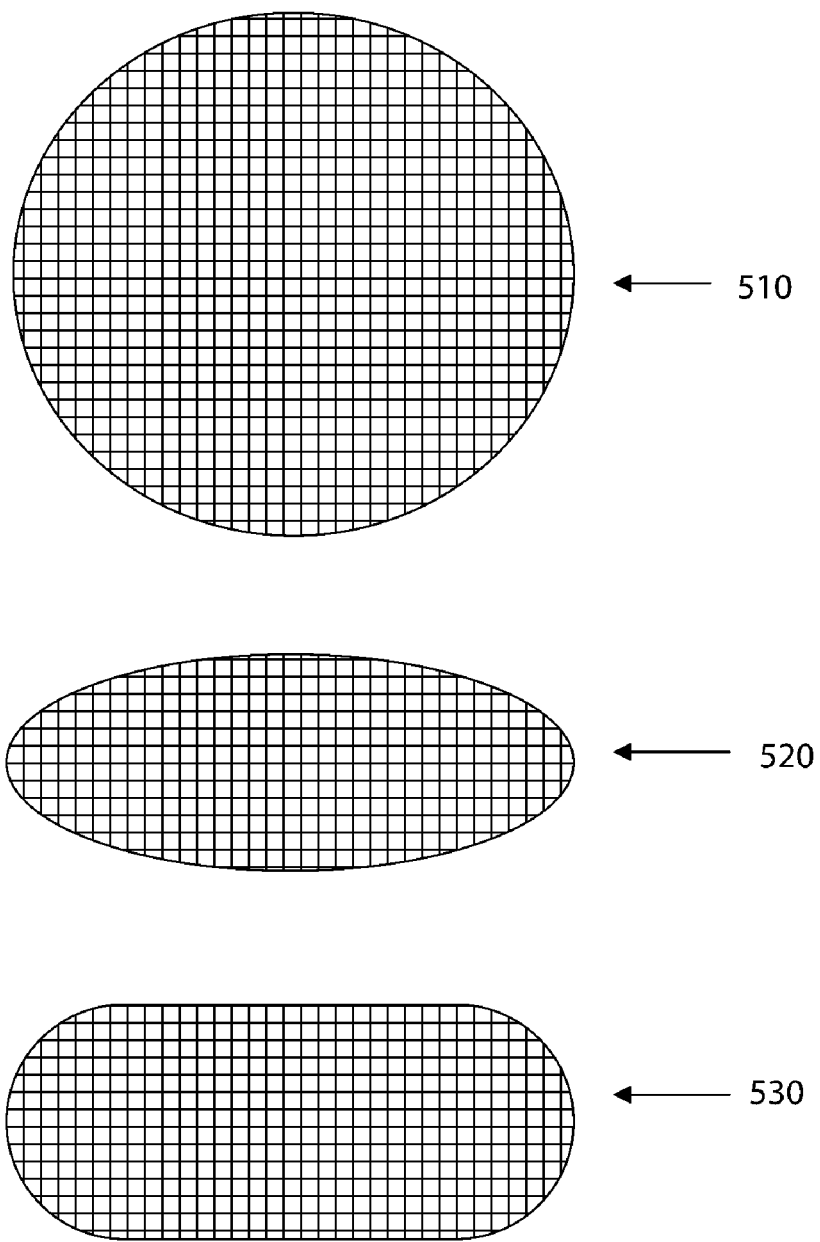
FIG. 5 is a cross-sectional view of a schematic of three substrates of having three different frontal surface shapes.
Figure 6:
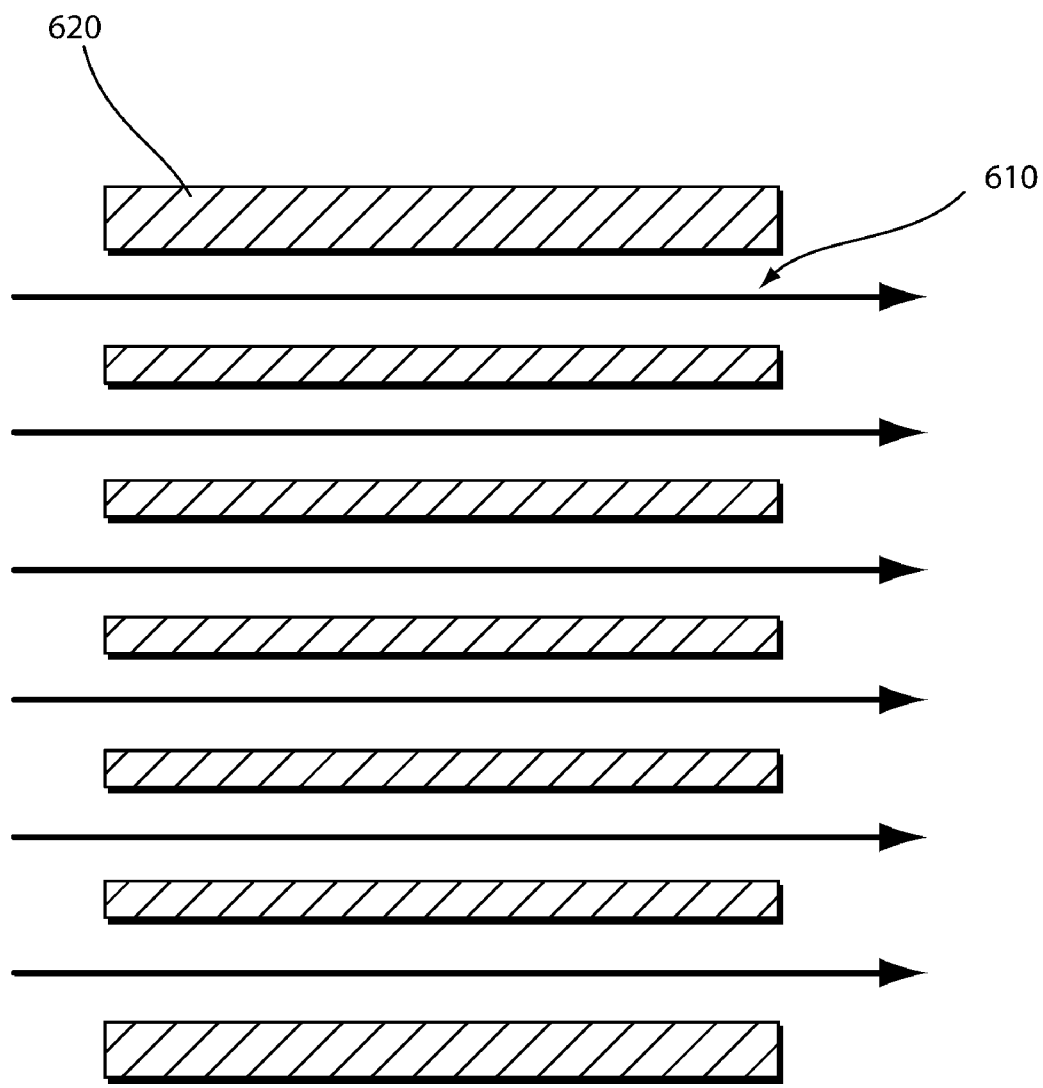
FIG. 6 is an example schematic diagram of a flow-through configuration of a catalytic or filtering substrate. The substrate has a plurality of channels 610 formed by channel walls 620. The fluid flow 630 enters the frontal surface and travels through the channels 610 and exits the rear surface.
Figure 7:
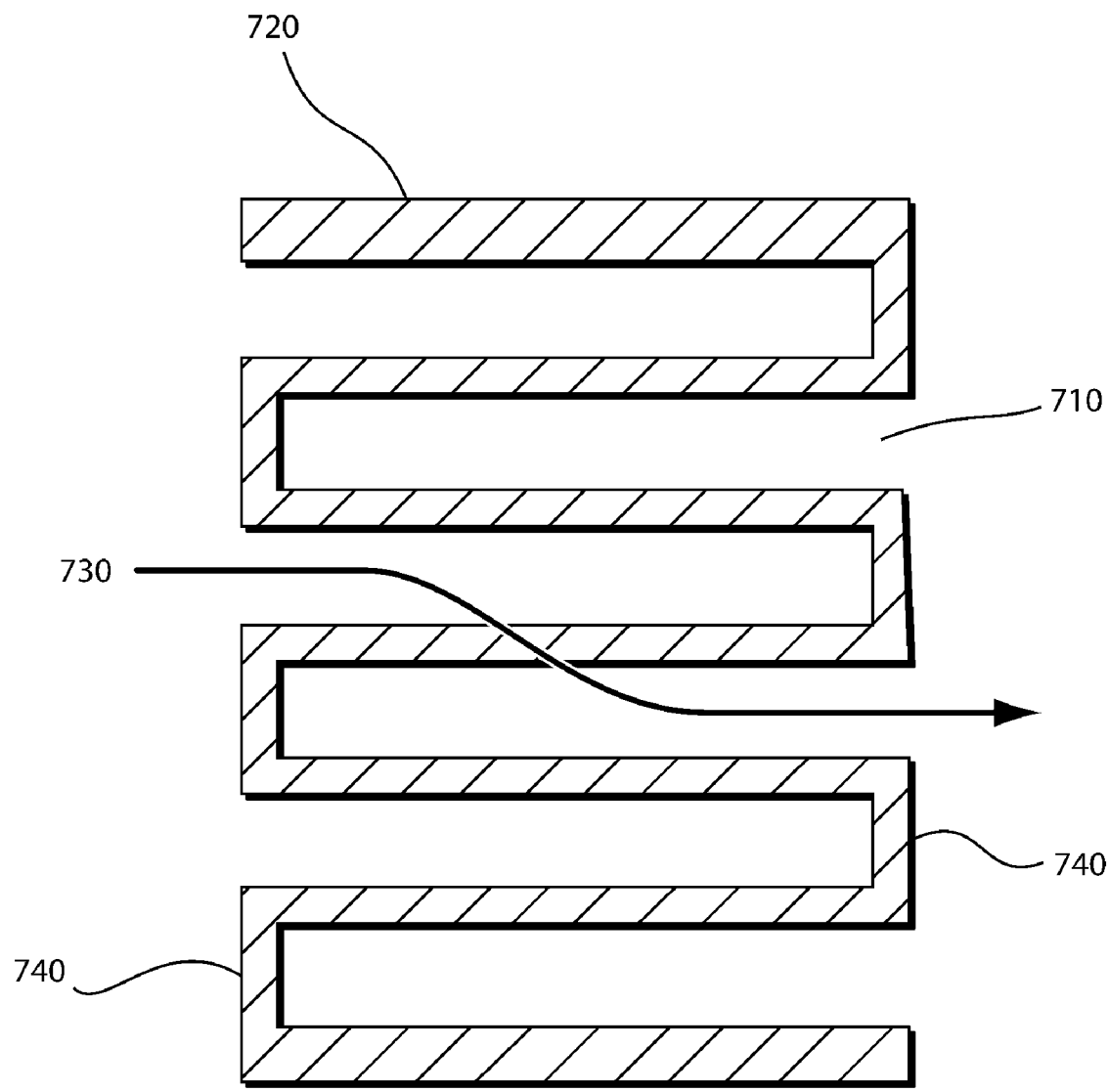
FIG. 7 is an example schematic diagram of a wall-through configuration of a catalytic or filtering substrate. A wall-flow pattern is composed of the same substrate material 720 and channels 710, except the channels 710 do not connect completely to the other side. Instead, the channels 710 are formed as blind holes, leaving an undrilled portion 740 of substrate 720 at the end of the channel 710. The fluid flow 730 than passes through a channel wall 720 before exiting the substrate at the rear surface. One particular advantage of the present invention is that fluid flow 730 in the wall-flow pattern has substantially the same characteristics as the flow-through pattern.

In certain embodiments, the frontal shape of the substrate is circular 510, oval 520, and racetrack 530, as shown in FIG. 5. As is readily understood, the shapes do not have to be exact. Three-dimensionally, the substrates may be in the form of a cylinder or a substantially flat disc. Designs with squared corners, in certain applications, are not as effective. Although easy to machine, square or angular designs have proven to be a trap for rust and corrosives, e.g., road salt. Therefore, rounded corners are preferable on the frontal surface shape of the slug in certain embodiments.

The billet may be shaped by a band saw, jig saw, CNC, or other method known to one of ordinary skill in the art. The billet may be further shaped by a hand rub, lathe sanding, belt sanding, or orbital sanding. Airborne particles are preferably vacuumed to prevent them from clogging the pores of the material. Further, these particles can enter the bearings of the drill press and destroy it, grinding away and scoring the bearings. The ceramic dust is also very fine and can be easily inhaled by operator.

In another embodiment, the present invention is directed to a method of preparing a catalytic or filtering substrate according to the present invention comprising preparing a billet of a nSiRF-C composite; and optionally machining said billet to form a substrate of the present invention. If the billet is prepared in a shape suitable for use in one or more processes of the present invention, the billet does not necessarily need to be machined to a different shape. In this instance, the billet is prepared with a mold, as described below, having a suitable shape. Alternatively, the billet or substrate may be machined to a suitable shape. Further, as described in more detail below, a plurality of channels are machined into the substrate.

The step of preparing the billet (or substrate) comprises known methods of preparing these materials. Any known method of preparing a suitable billet or substrate can be used. For example, suitable processes are disclosed in U.S. Pat. Nos. 4,148,962 and 6,613,255, each of which is incorporated by reference herein in its entirety.

By way of a non-limiting example, in one embodiment, the steps of preparing a suitable substrate comprise:
heating a plurality of refractory silica fibers, refractory alumina fibers; and refractory aluminoborosilicate fibers;
mixing said fibers;
washing said fibers;
optionally chopping said fibers to one or more lengths;
blending or mixing the chopped fibers into a slurry;
adjusting the viscosity of said slurry, preferably by adding thickening agent;
adding a dispersant;
adding the slurry to a mold;
removing water the slurry to form a green billet;
removing the green billet from the mold;
drying the green billet in oven, preferably drying at a temperature of about 250° F. to about 500° F.; and
heating, preferably prewarming and incrementally heating, the green billet in an oven at approximately 2000-25000° F.

As stated above, the billet is then optionally machined to form a substrate of the present invention.

In another embodiment, the process further comprises machining a plurality of channels in the substrate.

In another embodiment, the process further comprises adding a washcoat to the substrate.

In another embodiment, the process further comprises adding a catalytic coating to the substrate.

In a further embodiment, the mixing of the fibers is performed after the washing and heating of the fibers.

In further embodiment, boron nitride is used in the process of making a substrate of the present invention. $BN => B + N_2$ In yet an additional embodiment, a thickening agent is used. Preferably, the thickening agent and dispersant used in the process are substantially removed from the substrate during a heating step. For example, the thickening agent and dispersant may be combusted during the sintering process.

The substrate 2510 is derived from a billet created by forming a rigid configuration of chopped and/or non-woven inorganic fiber and a binding agent. The billet is machined or worked into the desired external dimensions for the substrate 2510. The interior of the substrate 2510 is then machined or worked to provide the desired surface area enhancement configuration, e.g., channels, washcoat, or catalyst. A durable inorganic hardened coating 2511 may be applied to the substrate 2510 by brushing, spraying, dipping, or any other common application method. In addition, the substrate 2510 may include an oxidation or reduction catalyst applied by brushing, spraying, dipping, or any other common application method.

In one embodiment, the catalytic or filtering substrate of the present invention comprises a nSiRF-C; and a coating comprising, in admixture, silicon dioxide power in an amount of from 23.0 to 44.0 wt %; collodial silicon dioxide in an amount from 25.0 to 45.0 wt %, water in an amount from 19.0 to 39.0 wt %; and one or more emittance agents selected from the group consisting of silicon tetraboride, silicon hexaboride, silicon carbide, molybdenum disilicide, tungsten disilicide and zirconium diboride; wherein said coating has a solids content of from 45 to 55 wt %. Such a coating is disclosed in U.S. Pat. No. 5,296,288.

The present invention utilizes a plurality of high-grade non-woven sintered inorganic refractory fibers, such as those present in AETB. Other suitable materials for use as a nSiRF-C in the present invention include: AETB-12 (having a composition of about 20% $Al_2O_3$, about 12% (14% $B_2O_3$, 72% $Al_2O_3$, 14% $SiO_2$; NEXTEL™ fiber), and about 68% $SiO_2$); AETB-8 (having a composition of about 20% $Al_2O_3$, about 12% (14% $B_2O_3$, 72% $Al_2O_3$, 14% $SiO_2$ NEXTEL™ fiber), 68% $SiO_2$); FRCI-12 (having a composition of about 78% wt. silica ($SiO_2$), and 22% wt. aluminoborosilicate (62% $Al_2O_3$, 24% $SiO_2$, 14% $B_2O_3$); and FRCI-20 (having a composition of about 78% wt. silica ($SiO_2$) and about 22% wt. aluminoborosilicate (62% $Al_2O_3$, 24% $SiO_2$, 14% $B_2O_3$).

In a preferred embodiment, the components of the inorganic fibers consists, or consists essentially of, fibrous silica, alumina fiber, and aluminoborosilicate fiber. In this embodiment, the fibrous silica comprises approximately 50-90 (%) percent of the inorganic fiber mix, the alumina fiber comprises approximately 5-50 (%) percent of the inorganic fiber, and the aluminoborosilicate fiber comprises approximately 10-25 (%) percent of the inorganic fiber mix. The fibers used to prepare the substrate of the present invention may have both crystalline and glassy phases in certain embodiments.

Other suitable fibers include aluminoborosilicate fibers preferably comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively). The aluminoborosilicate fibers preferably are at least 50 percent by weight crystalline, more preferably, at least 75 percent, and most preferably, about 100% (i.e., crystalline fibers). Sized aluminoborosilicate fibers are commercially available, for example, under the trade designations "NEXTEL 312" and "NEXTEL 440" from the 3M Company. Further, suitable aluminoborosilicate fibers can be made as disclosed, for example, in U.S. Pat. No. 3,795,524, which is incorporated herein by reference in its entirety.

Additional suitable fibers include aluminosilicate fibers, which are typically crystalline, comprising aluminum oxide in the range from about 67 to about 77, e.g., 69, 71, 73 and 75, percent by weight and silicon oxide in the range from about 33 to about 23, e.g., 31, 29, 27, and 25, percent by weight. Sized aluminosilicate fibers are commercially available, for example, under the trade designation "NEXTEL 550" from the 3M Company. Further, suitable aluminosilicate fibers can be made as disclosed, for example, in U.S. Pat. No. 4,047,965 (Karst et al.), the disclosure of which is incorporated herein by reference.

In other embodiments, the fibers used to prepare the substrate of the present invention comprise $\alpha$-$Al_2O_3$ with $Y_2O_3$ and $ZrO_2$ additions, and/or $\alpha$-$Al_2O_3$ with $SiO_2$ added (forming $\alpha$-$Al_2O_3$/mullite)

Various specific materials can be used to prepare the catalytic substrate. In one embodiment, the material used to prepare a substrate of the present invention comprises, or alternatively consists or consists essentially of, refractory silica fibers and refractory aluminumborosilicate fibers. In another embodiment, the material used to prepare the catalytic substrate comprises refractory silica fibers, refractory grade alumina fibers, and a binding agent, preferably a boronoxide or a boron nitride powder.

In one embodiment, the catalytic substrate of the present invention comprises, or alternatively consists or consists essentially of, an alumina enhanced thermal barrier ("AETB") material or a like material known to one of ordinary skill in the art. AETB material is known in the art and more fully described in Leiser et al., "Options for Improving Rigidized Ceramic Heatshields", Ceramic Engineering and Science Proceedings, 6, No. 7-8, pp. 757-768 (1985) and Leiser et al., "Effect of Fiber Size and Composition on Mechanical and Thermal Properties of Low Density Ceramic Composite Insulation Materials", NASA CP 2357, pp. 231-244 (1984), both of which are hereby incorporated by reference.

In another embodiment, the catalytic substrate comprises Ceramic tiles, such as alumina enhanced thermal barrier (AETB) with toughened unipiece fibrous insulation (TUFI) and/or reaction cured glass (RCG) coatings. Such materials are known in the art.

Another suitable material is Fibrous Refractory Ceramic Insulation (FRCI). In one embodiment, AETB is made from aluminaboriasilica (also known as alumina-boria-silica, aluminoborosilicate, and aluminoboriasilicate) fibers, silica fibers, and alumina fibers. One commonly known application for AETB is as an exterior tile on the Space Shuttle, ideal for shuttle re-entry. AETB has a high melting point, low heat conductance, and coefficient of thermal expansion, ability to withstand thermal and vibrational shock, low density, and very high porosity and permeability.

In one embodiment, a first component of AETB is alumina fibers. In preferred instances of the present invention, the alumina ($Al_2O_3$ or aluminum oxide, e.g., SAFFIL), is typically about 95 to about 97 weight percent alumina and about 3 to about 5 weight percent silica in commercial form. In other embodiments, alumina having a lower purity are also useful, e.g., 90%, 92%, and 94%. In other embodiments, alumina having a higher purity are also useful. Alumina can be produced by extruding or spinning. First, a solution of precursor species is prepared. A slow and gradual polymerization process is initiated, for example, by manipulation of pH, whereby individual precursor molecules combine to form larger molecules. As this process proceeds, the average molecular weight/size increases, thereby causing the viscosity of the solution to increase with time. At a viscosity of about ten centipoise, the solution becomes slightly adhesive, allowing fiber to be drawn or spun. In this state, the fiber may also be extruded through a die. In certain embodiments, the average fiber diameter ranges from about one to six microns, although larger and smaller diameter fibers are also suitable for the present invention In one embodiment, a second component of an AETB is silica fiber. Silica ($SiO_2$, e.g., Q-fiber or quartz fiber), in certain embodiments, contains over 99.5 weight percent amorphous silica with very low impurity levels. Silica of lower purities, e.g., 90%, 95%, and 97%, are also useful for the invention. In certain embodiments, an amorphous silica is used that has a low density (e.g., 2.1 to 2.2 $g/cm^3$), high refractoriness (1600 degrees Celsius), low thermal conductivity (about 0.1 W/m-K), and near zero thermal expansion.

In one embodiment, a third component of an AETB is aluminaboriasilica fibers. In certain instances, aluminaboriasilica fiber ($3Al_2O_3.2SiO_2.B_2O_3$, e.g., NEXTEL 312) is typically 62.5 weight percent alumina, 24.5 weight percent silica, and 13 weight percent boria. Of course, the exact percentages of the constituents of the aluminaboriasilca may vary. It is largely an amorphous product but may contain crystalline mullite. Suitable aluminaboriasilica fibers and methods of making the same are disclosed, for example, in U.S. Pat. No. 3,795,524, the teachings of which are herein incorporated by reference in their entirety.

Other suitable materials for use as a nSiRF-C in the present invention include: AETB-12 (having a composition of about 20% $Al_2O_3$, about 12% (14% $B_2O_3$, 72% $Al_2O_3$, 14% $SiO_2$; NEXTEL™ fiber), and about 68% $SiO_2$); AETB-8 (having a composition of about 20% $Al_2O_3$, about 12% (14% $B_2O_3$, 72% $Al_2O_3$, 14% $SiO_2$ NEXTEL™ fiber), 68% $SiO_2$); FRCI- 12 (having a composition of about 78% wt. silica ($SiO_2$), and 22% wt. aluminoborosilicate (62% $Al_2O_3$, 24% $SiO_2$, 14% $B_2O_3$); and FRCI-20 (having a composition of about 78% wt. silica ($SiO_2$) and about 22% wt. aluminoborosilicate (62% $Al_2O_3$, 24% $SiO_2$, 14% $B_2O_3$).

In a preferred embodiment, the components of the inorganic fibers consists, or consists essentially of, fibrous silica, alumina fiber, and aluminoborosilicate fiber. In this embodiment, the fibrous silica comprises approximately 50-90 (%) percent of the inorganic fiber mix, the alumina fiber comprises approximately 5-50 (%) percent of the inorganic fiber, and the aluminoborosilicate fiber comprises approximately 10-25 (%) percent of the inorganic fiber mix.

Similar fibers to those fibers of AETB, as described herein, may be utilized in addition to or in the place of the AETB fibers.

Fiber production via melting can be performed in two general methods. The first method involves a combination of centrifugal spinning and gaseous attenuation. A glass stream of the appropriate viscosity flows continuously from a furnace onto a spinner plate rotating at thousands of revolutions per minute. Centrifugal forces project the glass outward to the spinner walls containing thousands of holes. Glass passes through the holes, again driven by centrifugal force, and is attenuated by a blast of heated gas before being collected.

In the second melting technique, molten gas is fed into a heated tank whose bottom surface is perforated by hundreds or thousands of holes, depending on the application. Glass flows and is drawn through these holes, forming individual fibers. The fibers are merged into strands and collected on a mandrel.

In one embodiment, the AETB fiber mix in the slurry preferably comprises three ingredients including fibrous glass, alumina fiber, and aluminaboriasilica fibers. The fibrous silica will comprise approximately 50-90 percent of the inorganic fiber mix; the alumina fiber will comprise approximately 5-50 percent of the inorganic fiber mix; and the aluminaboriasilica will comprise approximately 10-25 percent of the inorganic fiber mix. In other embodiments, the slurry comprises any mixture of fibers that can be used make a substrate according to the invention as described above.

In a preferred embodiment, the fibrous component of the substrate is a mixture of 64% amorphous silica, 21% alumina, and 15% aluminaboriasilica fiber, with trace amounts, e.g., 0.3 to 1.0 mg/m$^2$, of a surface active agent employed to aid in the dispersion of bulk fiber in the slurry prior to and during casting.

In one embodiment, the fibers in the slurry are only primarily inorganic fibers. Preferably, in one embodiment, the present invention does not use any carbon in formation of the substrate.

Alumina-zirconia fibers may be added to the inorganic fiber mix as a fourth component or replacement component for other fibers.

Mix Fibers

In one step of an embodiment of the present invention, the fibers are mixed. Any number of known methods of mixing the fibers can be used to mix the fibers. An example is high-shear mixing which can be employed.

Heat Fibers

In one step of the present invention, the fibers are heated according to known methods. The fibers are first heated to allow for the fibers to be more evenly chopped. The heat-treated fibers are washed to remove all of the dust, debris, and loose particles, leaving only the fibers to process.

In a preferred embodiment, the fibers are heat cleaned

Wash Fibers

In one step of the present invention, the fibers are washed. In a preferred method, the fibers are washed so that the fibers are substantially free of dust and particles. In one embodiment, the silica fibers are washed in acid to remove impurities, rinsed, dried, and subsequently heat treated to impart structural integrity.

Chop Fibers

In another step of the present invention, the fibers are chopped. Fiber for use in the present invention can typically be obtained as bulk or chopped fiber. Methods of chopping fibers are known in the art. Most methods are continuous processes capable of handling multiple fibers or strands simultaneously. Typically, the product is fed between a set of rotating wheels or drums, one of which supports regularly spaced cutting blades. As the fiber is drawn through the cutter, it is chopped to length. Although specific manufacturing details remain proprietary for forming a blank from the chopped fiber, the art typically involves one of two production mechanisms: melting and sol gel. Preferably, the fibers are heat treated before the final chopping.

Preferably, the fibers are then chopped to size. Suitable lengths of the fibers include, but are not limited to, about 0.1, 0.2, 0.3, 0.4, 0.5, or 0.6 inches. Other suitable lengths include ⅛", ¼", and ½". It is preferred that the fibers are relatively uniform in size. In another embodiment, the fibers that compose the catalytic substrate or the filtering substrate are an average ¼ inch (approximately 1 hundredth of a meter) in length and about one to 12 microns in diameter, alternatively, one to six, or 10 to 12 microns with a median fiber diameter of three microns. In a preferred embodiment, particulate material is not added as it may clog pore space. Suitable fibers for use in the present invention are available commercially, e.g., from 3M. Of course, in other embodiments, longer fibers are used.

Slurrying

In another step of the process of the invention, a slurry comprising the fibers is prepared. Rather than extruding a ceramic or wrapping a yarn or fabric around a perforated tube, the substrate may be made by a common sol-gel process. This is accomplished by first pulling (via a vacuum or gravity-drawn) a well mixed sol of inorganic fibers and colloidal solution into a fiber mold which creates the sol blank or green billet or billet.

Alternatively, a squeeze-cast pressurizing process may be used where pressure is reduced to negative value or a vacuum process. The vacuum process allows the inorganic fiber blank to be formed with super low densities while maintaining its strength. The sol-gel process in conjunction with the pressurized process or vacuum process helps to produce exceptionally low densities, which is extremely beneficial to the filtration of particulates.

The fibers are blended together in a slurry. In certain embodiments, a slurry may contain 1 to 2 weight percent solids and is nearly as fluid as water. Alternatively, the slurry may contain from about 0.5 to about 5 weight percent solids. Other weight percentages are acceptable as well, as is known in the art.

The chopped fibers are mixed together in a slurry using a high-shear mixer. Preferably, deionized water is used in the slurry to avoid impurities that may act to flux or destabilize the fiber in service. In one embodiment, the slurry can be pumped through a centrifugal cyclone to remove shot glass and other contaminants, including high soda particles.

Alternatively, organic fibers or particulate may be added to the fiber slurry in proportions up to thirty percent by weight. During the firing stage of production, the organic fiber is volatilized or burned out of the article. Burning the fiber leaves a void that allows a path for gases to escape. By varying the type and proportion of polymeric fiber, the permeability of the tile can be tailored.

Adjusting Viscosity

In another embodiment, viscosity is adjusted to a suitable range. A higher viscosity prevents fibers from "laying down," i.e., laying flat or becoming oriented only in a substantially horizontal direction. Boron nitride may be added as a thickening agent to coat the fibers in preparation for high-strength sintering. In one embodiment of the present invention, boron nitride is added and aluminaboriasilica fiber is not utilized in the slurry.

Adding Dispersant

In one embodiment, the process comprises adding one or more dispersants to the mixture or slurry.

In one embodiment of the present invention, one or more surface active agents are added to the slurry during the process of the invention. The surface active agent is used in quantities of about 5 to about 10 weight percent. The surface active agent is employed to aid in the dispersion of bulk fiber in the slurry prior to and during casting to prevent the fibers from bundling together.

In one embodiment of the present invention, one or more catalysts as described above are added to the slurry. By adding a catalyst at this stage of the process, a substrate having the catalyst impregnated within the porous material is made. In one embodiment, this configuration eliminates the need for further washcoating or catalyzing.

Molding

In one embodiment, the slurry is poured into a mold to form a billet. The shape of the mold may take any shape desired. In certain embodiments, the shape of the mold will produce a substrate having a shape suitable to be used in a catalytic converter or particulate filter. For example, the mold may be in the shape of a cylinder. Alternatively, the mold is in the shape of a pentagon. Preferably, the slurry is not allowed to settle in the mold because the fibers may lay down. In one embodiment, a vacuum suction method is employed to keep the fibers from settling down and to maintain uniform porosity and density of the material throughout the billet. The vacuum suction technique may be employed from any number of directions to control the fiber arrangement and density with the green billet.

By way of example, a billet of the material of the catalytic or filtering substrate is produced in a mold of 24 inches by 24 inches ($576$ in$^2$)×4 inches having rounded corners. Of course, billets may be produced of larger or smaller sizes.

The material of the mold can be any material that is stable with water, including but not limited to, metal or plastic. Other suitable materials include aluminum, PLEXIGLAS, and other synthetic materials. Aluminum is very durable over the long term whereas PLEXIGLAS material is cheap and easy to machine. Suitable permeable surfaces are available in the form of a fine metallic mesh screen. Semi-permeable surfaces larger than about 50 in$^2$ may under certain circumstances preferably use a backing or support structure to prevent sagging.

There are embodiments in which an anaerobic, i.e., oxygen free, environment may be desirable during casting. The oxygen-free atmosphere creates an environment which minimizes metal oxidation and uniquely strengthens the fiber bonds. The soaked billet is placed into a chamber, e.g., a large plastic bag, filled with ammonia gas. Ammonia is most commonly used because of its low cost and availability. Nitrogen and/or hydrogen gas may also be introduced. Nitrogen is preferred to hydrogen, since hydrogen is volatile. In fact, any gas may be introduced as long as a reducing and oxygen free environment is maintained. Preferably, the gas is provided at a constant flow until the soaked sol billet has formed into a gel billet. At that point, the gas is turned off and the gel billet is exposed to the open air, allowing the gases to escape.

Carbon or organic-based shape-formers may be used as hole-forming rods which are introduced into the green billet during the molding stage. Upon high temperature sintering, these rods may disintegrate and leave behind the desired plurality of channels.

Dewatering the Slurry

In one embodiment of producing the billet, the slurry is placed in the enclosed mold where at least one dimension is adjustable and at least one wall is semi-permeable. Compressive force is applied via the adjustable wall and water is expelled from the slurry via the semi-permeable wall where fiber collects and felts. Compression is continued until the desired preform, i.e., billet, dimensions are achieved. This method is generally limited to simple geometries like blocks or cylinders.

Gravity is typically not a sufficient driving force, therefore requiring the use of a vacuum pump. The vacuum pump uses very little to no pressure. In some instances, a vacuum is employed to dewater, but the suction using is very slight. The vacuum is used as a means to speed up the drying process with great sensitivity to avoid increasing the density. Preferably, only mild vacuum assistance is used.

More complicated-shaped billets can be prepared by an alternative method, for example, in which a head of slurry is placed and maintained over a semi-permeable mold form. Low pressure is established outside the permeable form via the vacuum pump. The differential pressure drives water through the permeable form where fiber collects and felts. The differential pressure is sustained until the desired thickness is achieved. This process is suited to applications where the desired substrate is highly curved, as billets can be produced near-net-shape or close to their final form.

Injecting or mixing multiple (two or more) slurry recipes and varying the vacuum rate of pull (a plurality of times) provides a billet with some areas denser than others and/or areas with different physical properties. The billets can have graduated or different layers or cores with different chemical compositions and densities. The billets can have one or a plurality of zones, each with a unique shape, location, and physical properties as needed. Each zone can change as needed for changing the strength, heat or electrical conductivity, catalyst adhesion capability, thermal expansion, vibrational or thermal shock, weight, porosity and permeability, sound dampening, or any other preferable property.

By using different slurry recipes and molding techniques, the billets can also be layered. In addition, the billet is not restricted only to parallel planar layers, such as layers on a cake, but the billets can be formed with horizontal, angled, spherical, pyramidal, and free-form layers, or any other configuration known in the art. It should also be noted that the density of the billet could be chemically and physically altered, if desired, during this process.

The billets can also be formed by placing a plurality of billets, of different chemistry and in any configuration, whether cured or uncured, inside or within another billet. The core billets can be manually placed into the billet or injected into the core. The result is a core or a plurality of cores of less or more density. The shape or form of these cores and billets is unlimited as is the combination of layering the cores. Cores may even be created inside cores. The process can be repeated an unlimited number of times as needed yielding a unique number of combinations of billets in unlimited shapes.

Drying the Green Billet

In one step of an embodiment, the slurry in the mold is oven-dried long enough to dewater, i.e., drive off any water it may contain. Water can be drained out by gravitational forces. Slight vacuum assistance may be utilized. Other methods known in the art can of course be used.

Remove Green Billet from Mold and Drying Green Billet

In one step of an embodiment of the invention, the green billet is removed from the mold. Generally, the billet can be removed when it is dry enough to handle. Alternatively, the billet is removed when it is dry enough to be manipulated by a machine.

For example, when the billet is dry enough to be handled, it is removed from the mold. The billet is then dried in an oven. A low enough temperature is used so as to complete dewatering process and permit fibers to remain substantially in their intended configuration. Most preferably, the temperature is sufficient to dry the billet as required but insufficient to cause any or substantially any sintering of the billet. In another preferred embodiment, a temperature of about 250 to 500 degrees Fahrenheit is used in this step. In a further embodiment, the billet is dried at a temperature of about 180° C. for about 2 to about 6, preferably about 4 hours. Other times and temperatures as are known in the art may be used.

A dried billet is then optionally soaked in a sol-gel binder, preferably an alumina sol gel binder, for a period of time, e.g., a few days, at various temperatures, as is known in the art, as the billet "wicks" (i.e., soaks up) the binder solution into the billet. A suitable binder is known in the art and may be required to impart preform structural integrity as well as to promote sintering. The billet may utilize a single or multiple binder process to vary the strength and conductivity of the billet. Applying a binder several times will increase the strength of the billet but may also reduce or plug up the pore spaces. Any suitable binder may be used. The binder may be an oxide binder such as $SiO_2$ or $Al_2O_3$. The oxide binder may also be a glass configuration, a crystalline configuration, or other inorganic binder. A binder may be applied using known techniques and methods, such as those disclosed in U.S. Pat. No. 3,549,473, the teachings of which are incorporated herein by reference in their entirety.

Drying the Green Billet (Sintering)

In another step of an embodiment of the present invention, the green billet is heat cured. The temperature for heat-curing, or sintering, is generally a higher temperature than that used for drying the green billet. In one embodiment, the temperature is incrementally increased over one or more hours, preferably several hours, until the desired temperature is reached. In one embodiment, the oven is pre-warmed and incrementally heated to approximately 2000-2500° F. Other temperatures known in the art are suitable.

In a preferred embodiment, after gelling the binder, the billet is cured by heating the billet to about 200 degrees Fahrenheit for about four hours, and then slowly increasing the temperature to about 600 degrees Fahrenheit over about a five hour period. After achieving and maintaining the maximum temperature, the billet is quickly quenched. The end result is a rigid inorganic fiber billet. Once again, the process of heat curing the blanks can vary in the temperatures used, length of time to cure, the temperature and time of quenching, the temperature incremental increases, and the incremental temperature increase timing.

Billets are fired to supply the necessary energy to sinter fiber-to-fiber contacts, thereby forming bonds that impart strength to the substrate. For example, strength can be increased by increasing the number of fiber-to-fiber contacts. Increasing the number of contacts increases density and tortuosity. The more tortuous a pore network becomes, the lower the permeability. Sintering does not cause the fibers to melt together, but instead binds them chemically. The billet is progressively heated in a high temperature furnace. The billet is pre-warmed and then incrementally heated to approximately 2000 to 2500 degrees Fahrenheit until a desired density and fusion are obtained. Secondary chemicals such as the thickening agent are combusted away in preferred embodiments. A substrate comprising, or alternatively consisting of or consisting essentially of, the sintered fibers remains.

In a preferred embodiment, the viscosity (thickening agent) chemicals and dispersant are combusted away.

In other embodiments, multiple curing steps are performed. This can be done to increase hardness of the substrate.

The variables in the drying and curing processes can be adjusted according to the desired density, strength, porosity, or permeability, or resistance to high temperatures, of the fiber blank. In certain embodiments, the curing process can use a plurality of curing applications and can vary the heating and cooling intervals and approaches. The billet can also be rapidly cooled to quench or temper the billet. The slurry may undergo additional heat or other treatments, such as densification coatings or multiple curing and sintering.

Physical Modification

In certain embodiments of the process, the billet is coated with a catalyst. In one method of applying catalysts to a substrate, the substrate may be formed from a slurry that contains catalysts. Other suitable methods of applying a catalyst may be used. Another advantage of the present invention is that it has been surprisingly discovered that a catalyst can be applied to the nSiRF-C material using methods that can apply catalyst to other materials.

In another embodiment in the present invention, catalyst is added to the slurry prior to molding. In this instance, a catalytic substrate is formed having the catalyst reside directly onto the individual fibers that constitute the substrate. This method of adding catalyst to the substrate, in certain embodiments, provides an efficient method of dispersing catalyst into the core of the catalyst substrate and not have the catalyst reside only along the channel walls. In this embodiment, a washcoat is not necessary.

Machining

A billet in the form of a crude block can be cut or sawed into a specified shape, and then sanded, turned or machined into the final desired shaped "slug." Although the composition of the material is very resilient to chemical, heat, thermal and vibrational shock, in preferred embodiments, the hardness is very low. This low hardness permits machining with little or a minimal amount of resistance or wear on tools. Despite the fact that the billet in certain embodiments has a low hardness and is soft, it is very durable and easy to machine, sculpt, or shape. On a Moh's hardness scale, the material is usually between 0.5 and 1.0 (or 1-22 on the Knoop hardness scale)—with talc being the softest at 1 (1-22 Knoop hardness) and diamond being the hardest at 10 (8,000-8,500 Knoop hardness). For example, silicon carbide has a Moh's hardness of 9-10 (2,000-2950 Knoop hardness). In relation to other known substances, the billet is very soft and effortless to machine or sculpt as Styrofoam or Balsa wood.

The billet can be shaped, sanded, turned, or machined, providing unlimited shaping capabilities of slug formation. The machining can range from turning a cylinder on a lathe, sawing to shape with a keyhole saw, band saw or jig saw, sanding the shape or smoothing the surface, or any other method of machining commonly used on other solid materials and known in the art. The billet can be machined down to very exacting tolerances with the same accuracy as machining metals, woods, or plastics. If the billet is cast in cylindrical molds with the desired diameter of the final shape, the machining would simply require cutting and sanding the cylindrical billet to the desired thickness. This process also reduces substrate loss due to excessive machining, and speeds up the preforming process as well.

There many possible frontal and rear surface shapes including circular 510, oval 520, and racetrack 530, as shown in FIG. 5. Three-dimensionally, the substrates may be in the form of a cylinder or a substantially flat disc. Conventional substrates exist as one of these three designs. Designs with squared corners are not as effective. Although easy to machine, square or angular designs have proven to be a trap for rust and corrosives, e.g., road salt. Therefore, rounded corners are preferable on the frontal surface shape of the slug.

The billet or substrate or slug may be shaped by a band saw, jig saw, CNC, or other method known to one of ordinary skill in the art. The slug may be further shaped by a hand rub, lathe sanding, belt sanding, or orbital sanding. Airborne particles must be vacuumed to prevent them from clogging the pores of the material. Further, these particles can enter the bearings of the drill press and destroy it, grinding away and scoring the bearings. The ceramic dust is also very fine and can be easily inhaled by operator.

The shaped slug is utilized as a substrate in the present invention. The surface area of the substrate is an important characteristic for catalysis application. Surface area is the sum amount of surface that exhaust emissions must pass across when traveling through an exhaust filter. Increased surface area translates into more room for chemical reactions to take place between pollutants and catalytic and thermal processes, making a catalytic converter process quicker and more efficient. Speed and efficiency can result in little to no clogging, which can cause failure of the exhaust system.

In one embodiment, the substrate of the present invention has a gross surface area of 83.58 square inches per cubic inch. This translates into a much higher area that can be impregnated with precious metals, as compared to the cordierite samples having comparable macrodimensions (e.g., diameter, length and width).

In one exemplary embodiment of the present invention, the substrate is used in an exhaust filter system for a diesel engine. The substrate is created using AETB formulation and formed in approximately 13"×13"×5" billets with a density between 8 and 25 pounds per cubic foot. From the billet, a five inch tall cylinder slug which is six inches in diameter or an oval right-cylinder slug is cut from the billet using a diamond tipped or tungsten-carbide band saw. This slug is further machined to exact tolerances on a spinning lathe (for right circular cylinders) or on a belt sander forming the substrate.

Preparing Holes and Channels in Substrate

In an embodiment of the present invention, a plurality of channels are formed in the filtering or catalytic substrate substantially longitudinal to the intended gas flow. The channels extend through the length of the substrate, either partially or fully. FIGS. 5-14 show schematic diagrams exemplifying certain embodiments of the present invention having a plurality of channels. In certain embodiments, the channels extend at an angle to the flow of fluid.

The inside surfaces of these channels can be chemically coated so as to capture and treat more pollutants in a small volume of substrate. When channels are formed in the substrate, smaller diameter channels, e.g., small channels having 200, 400, 500, 600, 700, 800, 900, 1000, 1100, 1200, 1300, 1400, 1500, 1600, 1700, 1800, 1900, 2000, 2100, 2200, 2300, 2400, or 2500 cpsi, are preferred to retain a high surface area.

In another embodiment, the channels extend through the entire length of the substrate. Such a substrate has a flow through configuration.

Figure 8:
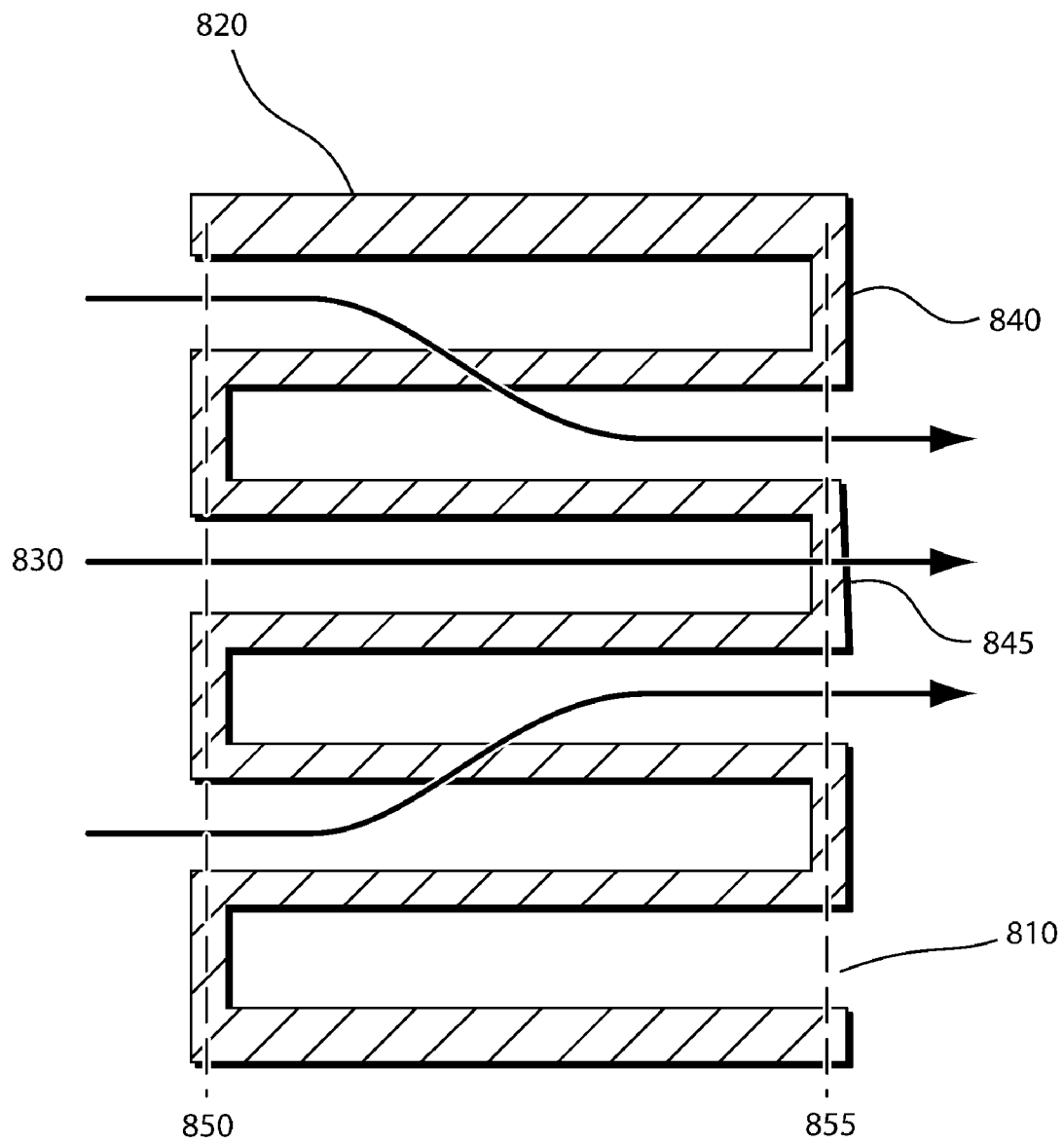
FIG. 8 is an example schematic diagram of a wall-through configuration of a catalytic or filtering substrate. In this instance, fluid flow 830 enters the substrate at the frontal surface. Some of the fluid exits the substrate at the rear surface by flowing through an undrilled portion 845. Some channels
Figure 9:
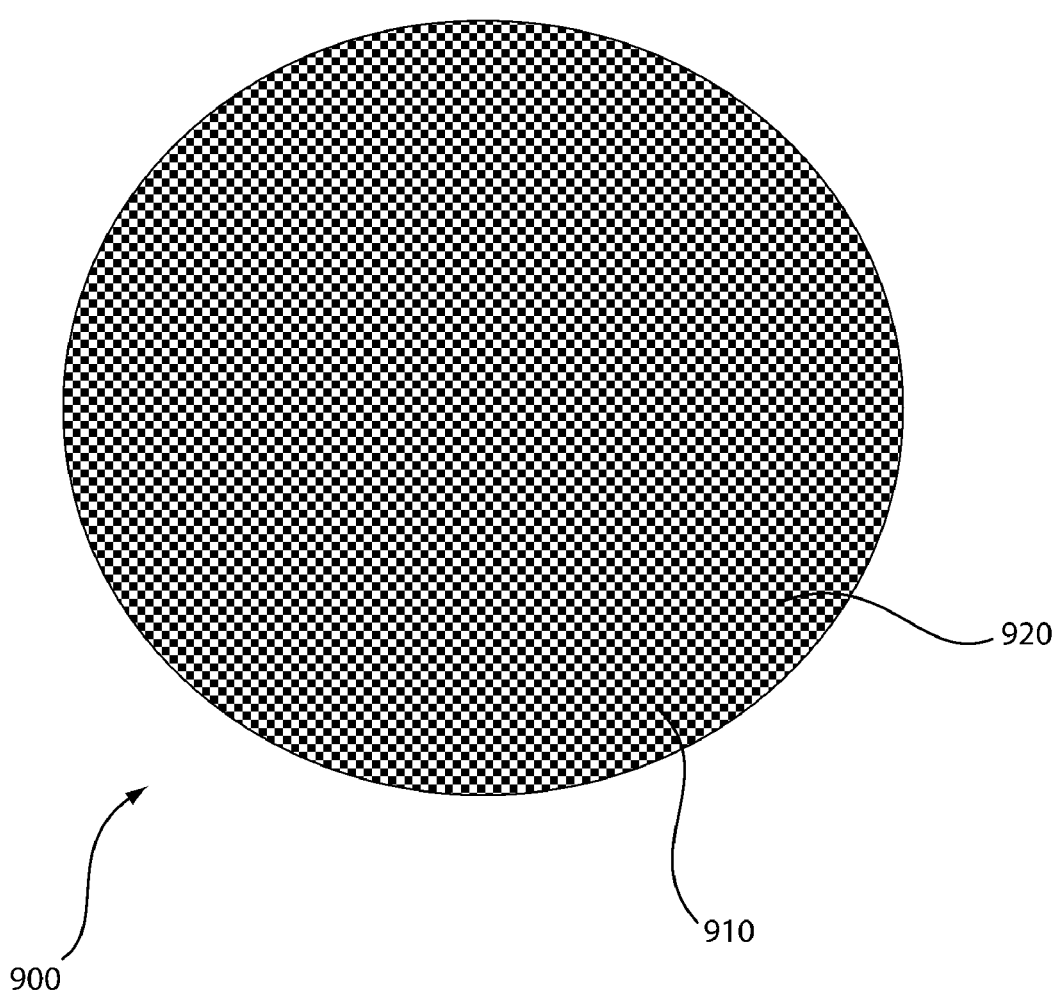
FIG. 9 is an end view of an embodiment of a substrate 900 that employs wall flow channels. Alternating channels have an undrilled portion 920 at either the ingress or egress. Drilled channels 910 alternate with undrilled portions 920 of channels drilled from the opposing side. As a result, the substrate appears to have a "checkerboard" pattern of channels.
Figure 10A:
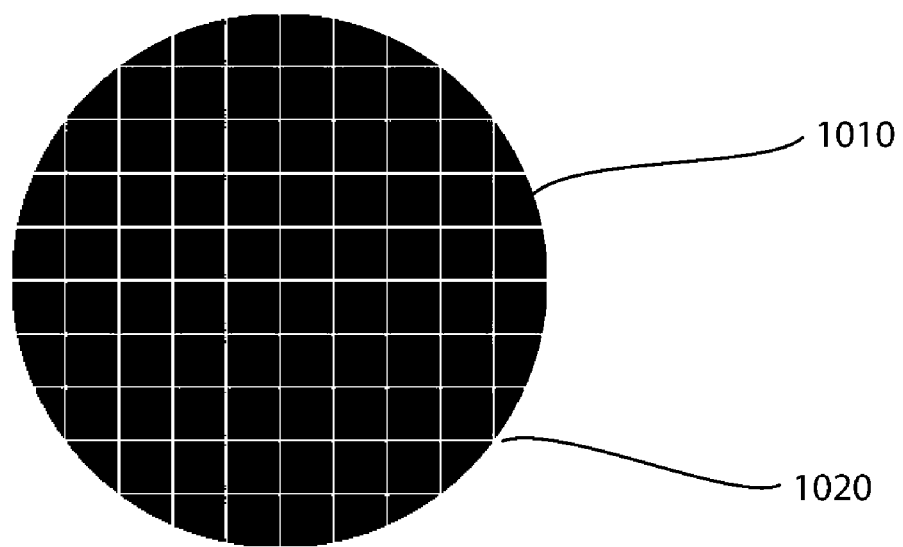
FIGS. 10a-10d show a comparison of frontal surface area 1020, 1021, 1022, 1023 and number of cells 1010, 1011, 1012, 1012 is shown. In a comparison of FIGS. 10a and 10c, each embodiment has the same cell density, i.e., number of channels or cells. However, FIG. 10c has a much higher frontal surface area. Ideally, the frontal surface area is minimized such that structural integrity still remains. A similar comparison may be made between the embodiments of FIGS. 10b and 10d. Regarding FIGS. 10a-10d, the embodiment of FIG. 10b has the preferable structure; cell density is maximized and frontal surface area is minimized.
Figure 10B:
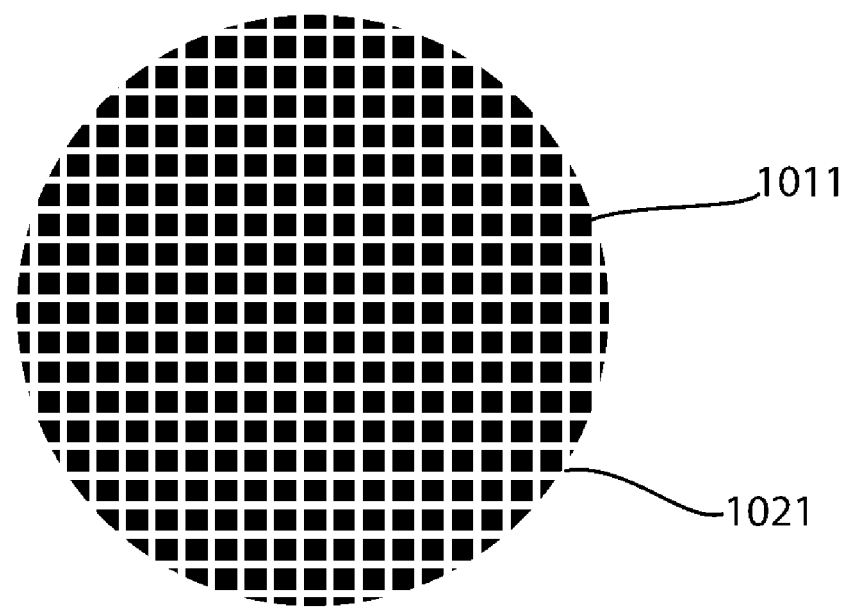
Figure 10C:
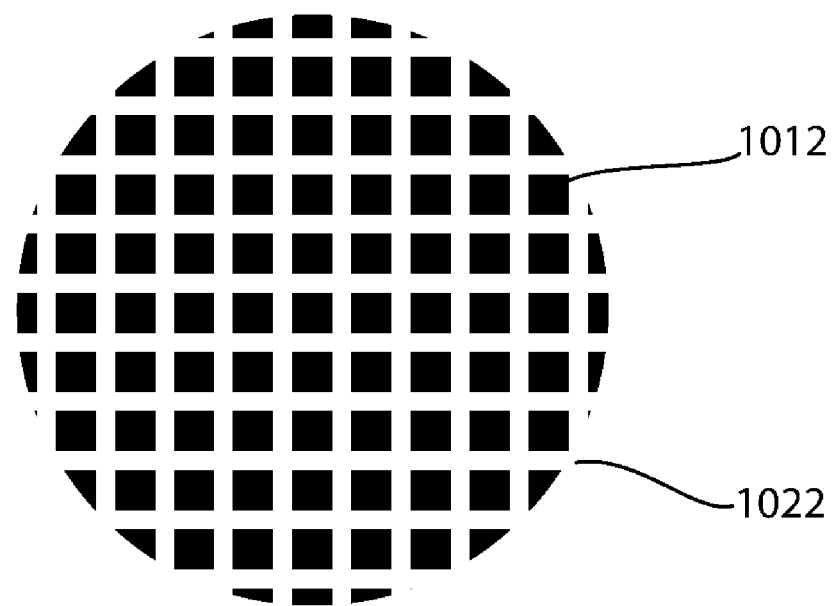
Figure 10D:
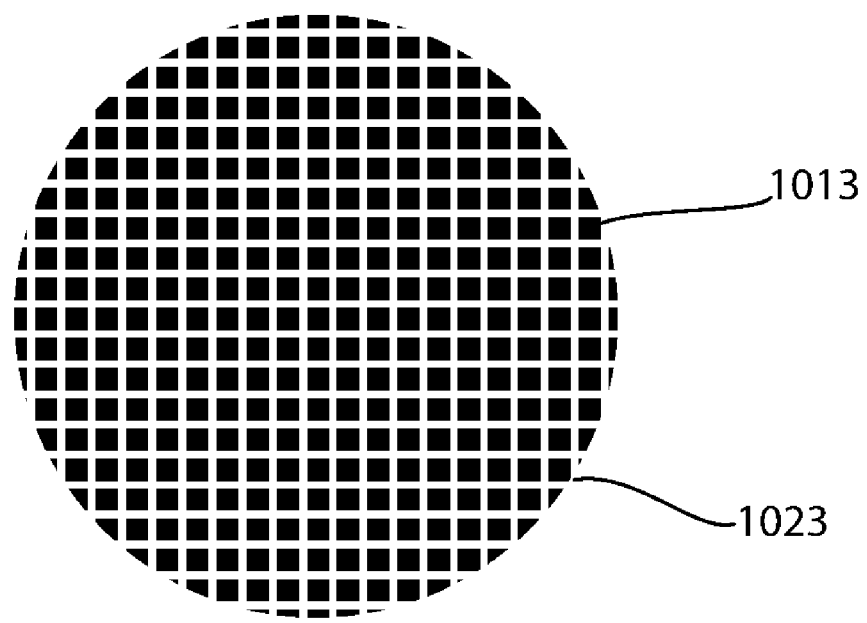
Figure 11:
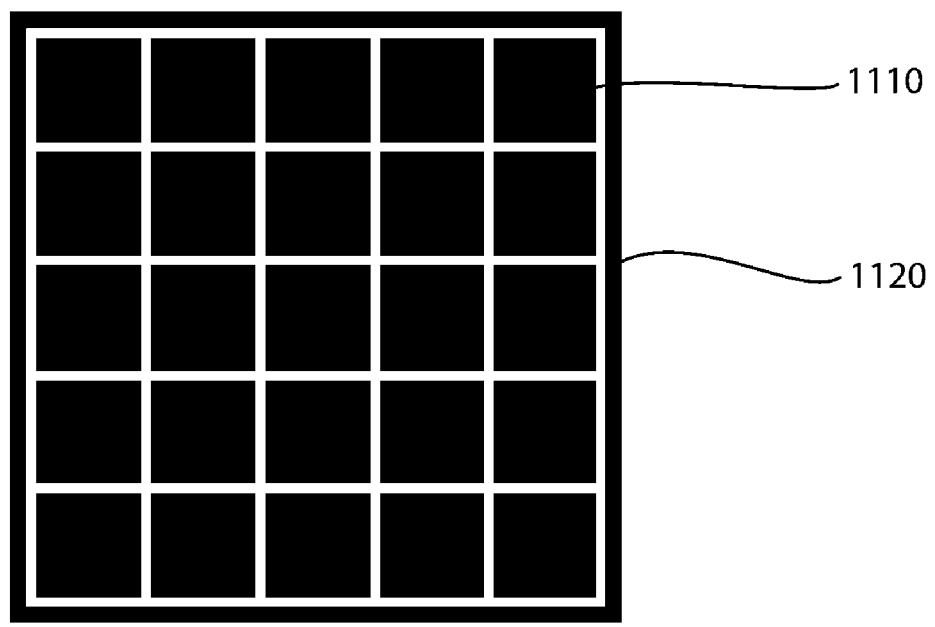
FIG. 11 shows an embodiment of square channels to scale. In this embodiment, the cell void 1110 to cell wall 1120 ratio is 31.83:1.5, or approximately 20:1.
Figure 12:
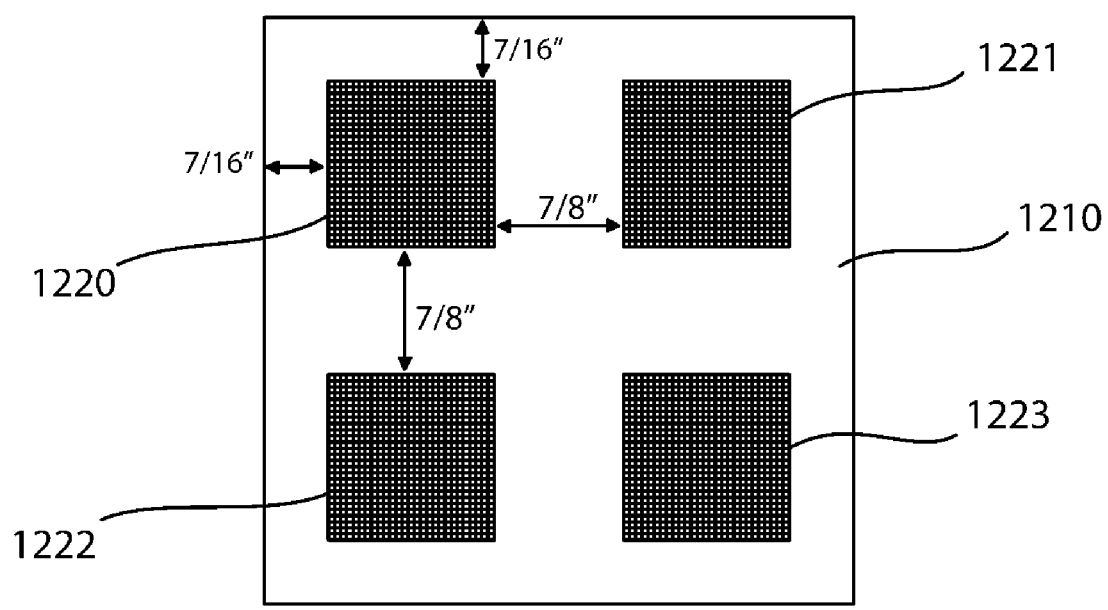
FIG. 12 shows an embodiment of a substrate 1210 having an exemplified cell void to cell wall ratio shown to scale. The substrate 1210 is four square inches in length and width and comprises four squares 1220, 1221, 1222, 1223 of 1⅛ inches by 1⅛ inches. Each of the four squares 1220, 1221, 1222, 1223 is drilled to have a cell density of 900, for a total substrate cell density of 3600. The wall thickness between the cells is 1.5 mil. The spacing between each square 1220, 1221, 1222, 1223 on the substrate 1210 is ⅞ inches and the squares 1220, 1221, 1222, 1223 are each approximately 7/16 inches from the closest edge of substrate 1210.
Figure 13A:
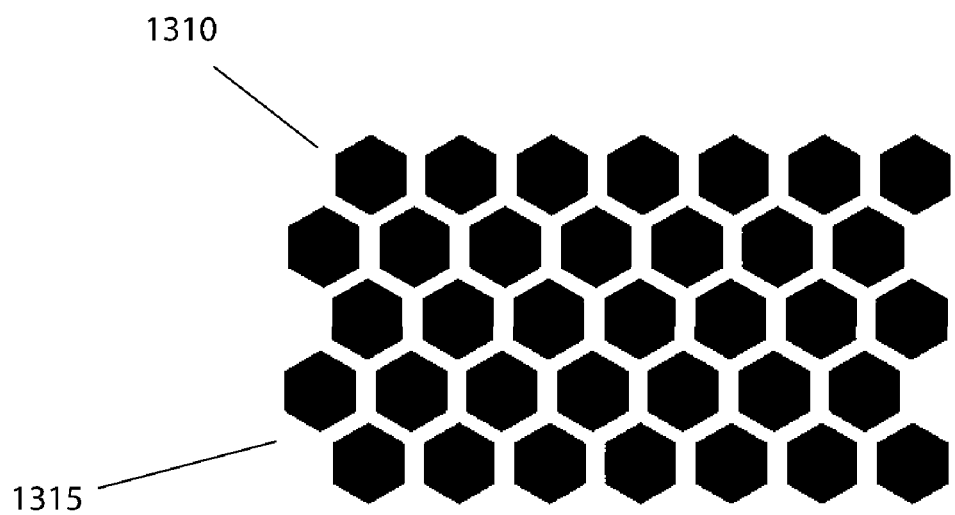
FIGS. 13a-c is show several embodiments of the channels structure
Figure 13B:
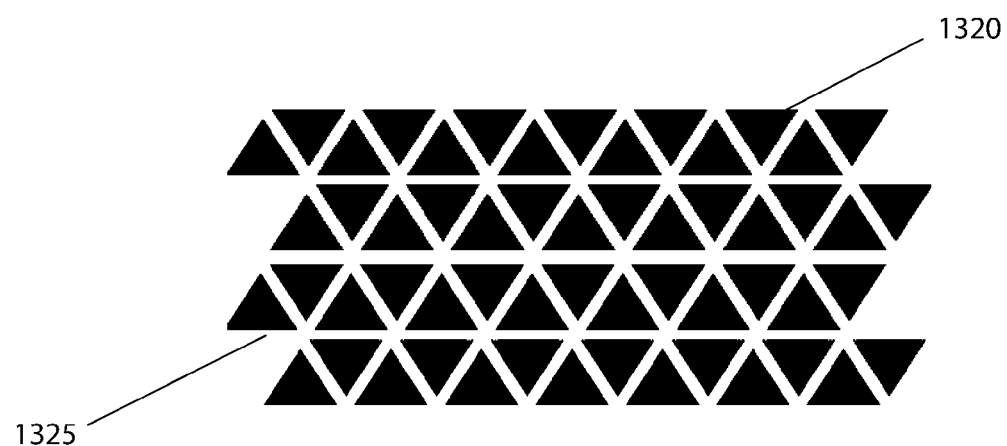
Figure 13C:
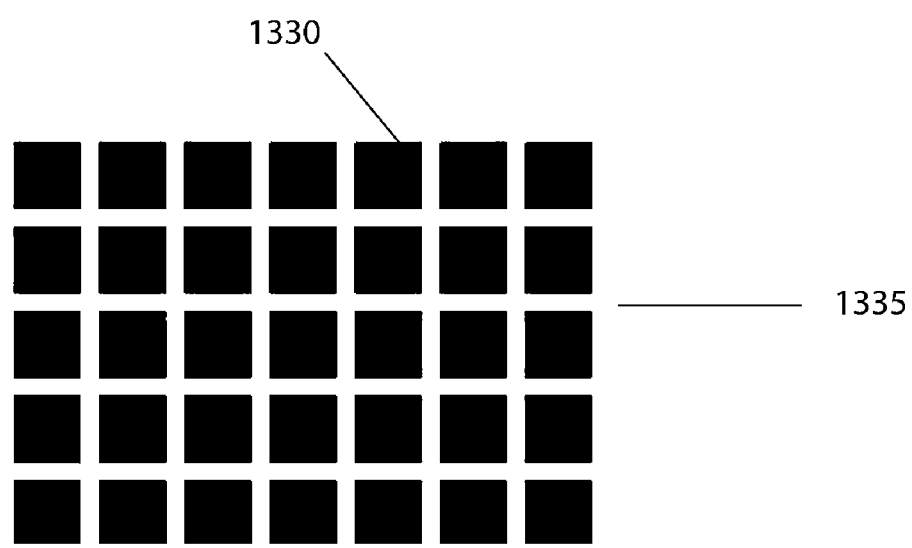
Figure 14A:
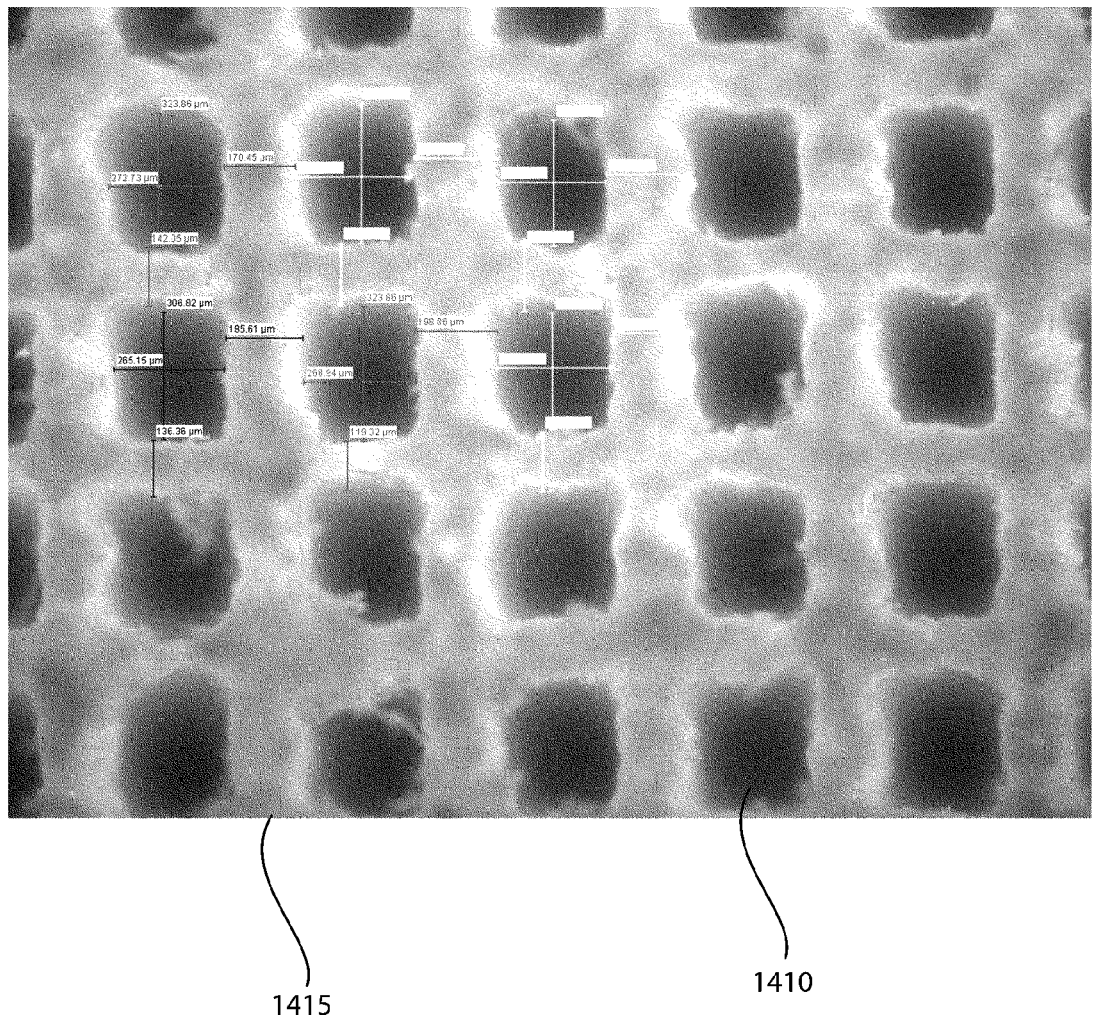
FIGS. 14a-d shows an embodiment of the present invention. The microscopic view shows the substantially similar dimensions of rectangular shaped channels 1410, 1411, 1412, 1413 in a substrate 1415, 1416, 1417, 1418.
Figure 14B:
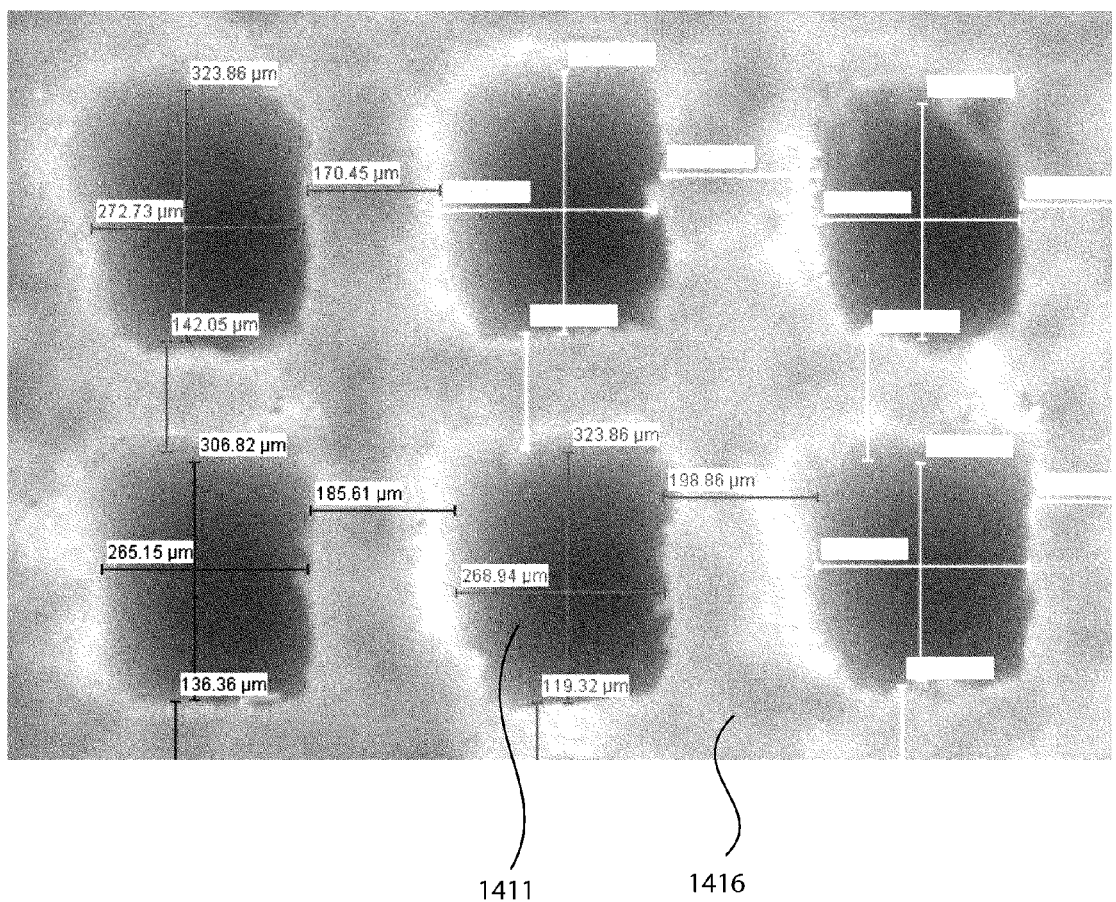
Figure 14C:
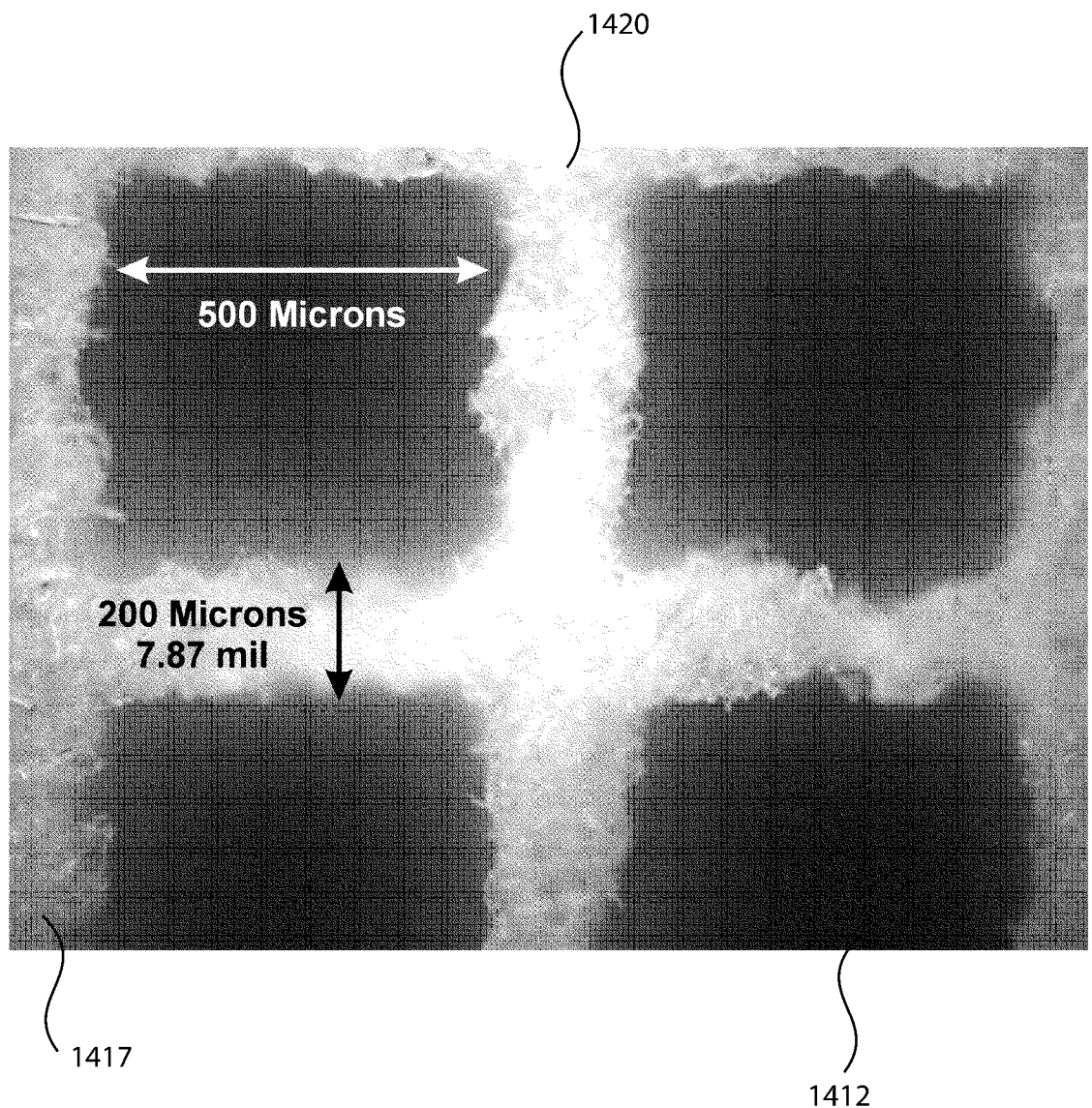
Figure 14D:
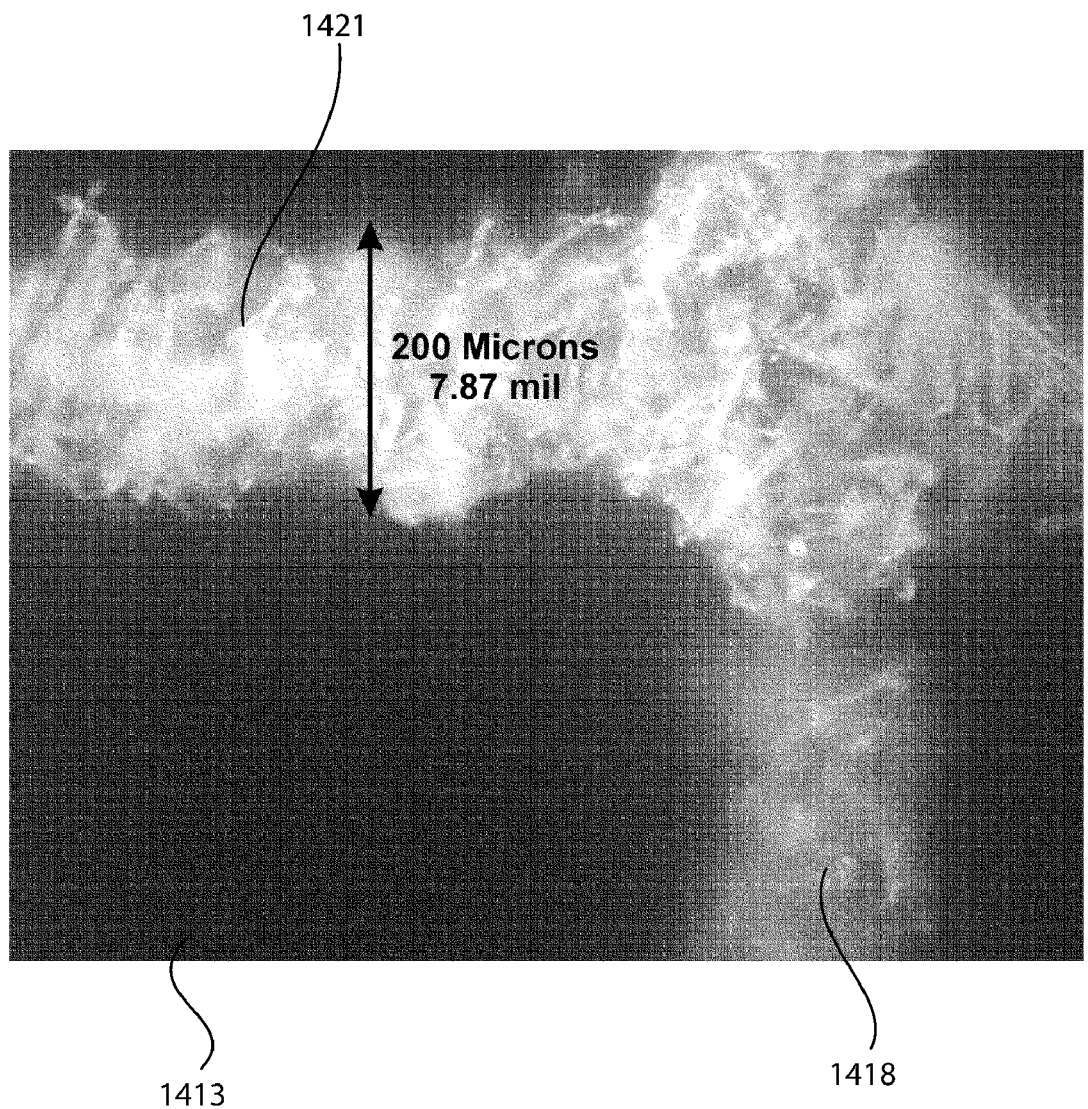

Alternatively, the channels do not extend through the entire length of the substrate but extend from about 50% to about 99% through the length of the substrate. Such a substrate is considered a wall-flow configuration. The undrilled portion remaining in the channels of the wall-flow substrate may have a varied thickness. FIG. 8 shows a wall-flow pattern substrate 820 according to an embodiment of the present invention with an undrilled portion 840, 845 of varied wall thickness. In this embodiment, alternating entering channels have a wider wall thickness than other entering channels as well as the exit channels. However, the varied undrilled portion thickness may be configured in any combination such that the entering or exit channels have a thinner or thicker undrilled portion, and wherein the all of the undrilled portions may or may not be substantially similar in thickness. The wall thickness is so thin and porous that the exhaust gas 830 passes from emission entering channels through the walls into exit channels, trapping emission particulate. The length between the inner edges 850 and 855 of the undrilled portions is known as a crossover region. Where the undrilled portion 840 is thicker in some or all entering channels, emission flow 830 is likely to go through the channel walls of the substrate in the crossover region and exit the substrate 820. The emission flow 830 may still pass through thinner undrilled portion 845. In another embodiment of the present invention, the undrilled portion of the channel has a selective impregnation of catalysts, such that the amount of catalysts differs from that on the channel walls.

The thickness of this undrilled portion is limited. Gas flow increases by increasing the surface area of the walls with equivalent thicknesses. If the undrilled portion is too thin, it could rupture from excessive backpressure.

Mechanical Drilling

Once an embodiment of a substrate is cut from the billet and machined, it can be inserted into a drilling holder for drilling. A plurality of channels can be drilled into the substrate in the direction substantially parallel to the major axis of the cylinder and the flow of exhaust emission. The smaller the channel diameter, the more channels can fit into the substrate.

In an alternative embodiment, channels are drilled into a substrate. The substrate is placed in a metal holder for drilling. The holder can be for example a pair of large metal arms that firmly holds the substrate slug in place and keeps it from moving while not crushing the substrate. The holder engages the substrate and holds it steady for drilling. After drilling one side of the substrate, the holder rotates precisely 180 degrees to allow for drilling in the opposite side of the substrate. If the rotation is not precisely 180 degrees, the drilled channels will not be properly aligned or parallel. Further, the pressure at the ingress needs to be substantially identical or similar to the pressure at the egress. Preferably, in order to ensure parallel walls, the holder must not move the substrate in an more than 0.0001 inches in any unwanted direction.

The channels of the substrate of the invention can be prepared using a mechanical drilling process. In one embodiment, computer number control ("CNC") drilling is used, which is common among machine shops and is the preferred method. CNC drilling is much slower and is not as economically feasible in mass manufacturing environments requiring production of thousands of filters per day. CNC drilling performs with high precision and accuracy. CNC drilling is done by making multiple passes with the drill bit. The CNC drills a little further into the substrate on each pass, removing fibrous material as the bit comes out.

The drill bit can be tungsten carbide due to its tough and brittle nature, or can be a similar material known to one of ordinary skill in the art.

The drill bit penetrates at a feed rate of about ten feet per minute. The slow feed rate is necessary in order to prevent the drill bit from melting. When the drill bit penetrates at a feed rate of twenty-five feet per minute, the drill bit melts. Also, due to the tremendous pore space, the drill bit has a tendency to "walk" or move around. A slower penetration rate cures this, problem.

Rotating the drill bit at a slow rate is preferable. The drill bit should rotate at approximately 200 revolutions per minute. Rotating the drill bit at higher rate, such as about 10,000 revolutions per minute, may cause the drill bit to melt. The drill bit is kept cool throughout the drilling with lubrication such as water, alcohol, or glycerin.

Once the substrate is cut and sanded to final dimensions, channels are cut or drilled into the substrate. In this exemplary embodiment, the channels are cut using a DPSSL. Since the substrate is so porous and permeable, the substrate does not need to as thick as conventional filters. In addition, thinner or smaller substrates are less costly to produce because cutting one billet can produce multiple substrates and requires a reduced amount of any coatings or catalysts to be applied.

Water Drilling

In another embodiment, water cutting (or water drilling) is used for forming channels. Water cutting uses a fine spray of water with very high pressure and cuts holes in the substrate. However, the water jet cannot be stopped during the cutting process to leave a blind hole (i.e., a channel that does not go through the substrate completely). The physical characteristics of the water jet limit the size of the channel opening to a diameter no smaller than the diameter of the jet. In certain embodiments, a rectangular hole could be created with the jet.

Gas-drilling

In another aspect of the invention, a gas drilling method is used to prepare the substrate. Gas-drilling is known in the art and can be applied to substrates of the present invention to prepare channels in the substrate.

Combing

In another embodiment, the channels are formed or shaped using a comb process. The comb is a preferably a metal device with a plurality of tines that can be forced into (e.g., broaching) the substrate. The combs used for broaching comprise a plurality of tines. Tine length, width, thickness, and shape may be varied according to the desired properties, configurations, and dimensions of the channels.

In certain embodiments, the comb is forced into the substrate substantially perpendicular to the surface of the substrate. In other embodiments, the comb is forced into the substrate at an angle to the surface of the substrate. Using a comb is a preferred method, in particular for forming blind channels. It is understood that a suitable comb can also be made so that the comb is made of a rows and columns of tines e.g., 4×4, or 16 by 16.

In general, the comb process comprises repeatedly forcing the comb into the substrate material a plurality of times until most or all of the channel is shaped. This process is referred to herein as pecking. Optionally the comb may be removed from the channel after each forcing into so that excess substrate material can be cleared from the channel by, for example, air. It is preferable to prevent fiber build-up during the pecking/broaching steps. Fiber build up may cause walls to rupture or the entire. To manage this property, a vacuum and/or compressed air can be employed to clear the channels and drill bit surfaces.

In one embodiment, the comb is forced into the substrate with a force sufficient to displace or dislodge an amount of substrate material from the channel wall. In a preferred embodiment, a sufficient amount of force is applied to the comb so that the tines extend about 0.1 inches into the channel. Other suitable values include 0.05 0.15, and 0.2. Preferably, the amount of force applied to form or shape the channels is an amount sufficient to form or shape the channel without substantially damaging the channel wall. The process comprises forcing the tines into the substrate repeatedly until the channels is produced of desired length and shape.

The shape of the tines dictates the shape of the channels. For example, a rectangular-shaped tine on the comb is used to create rectangular shaped channels with a rectangular shaped channel opening.

Figure 17:
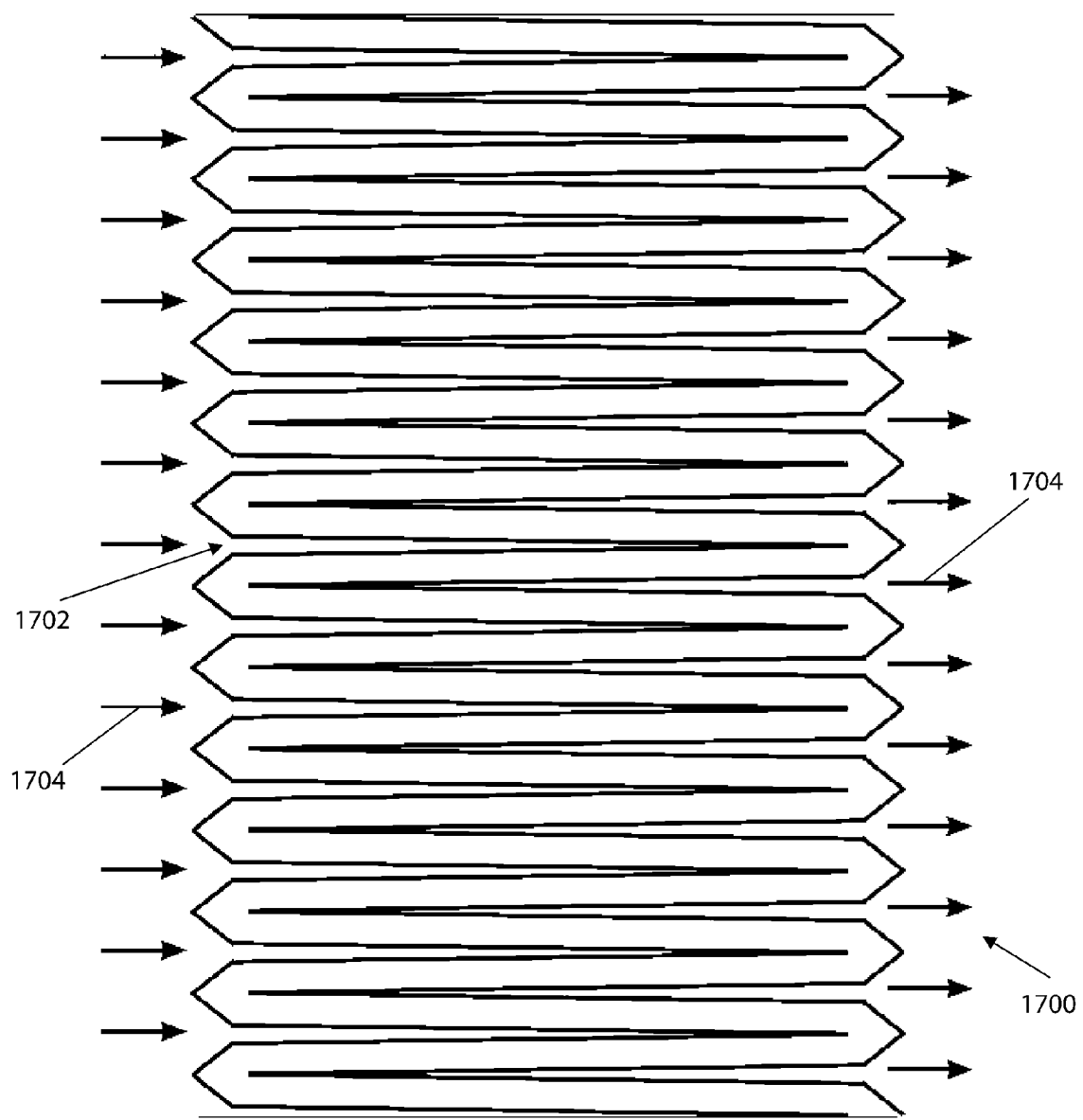
FIG. 17 is a schematic diagram of the surface area enhancements and entry and exit tubes which can be formed in the filter element of embodiments of the present invention.
Figure 18:
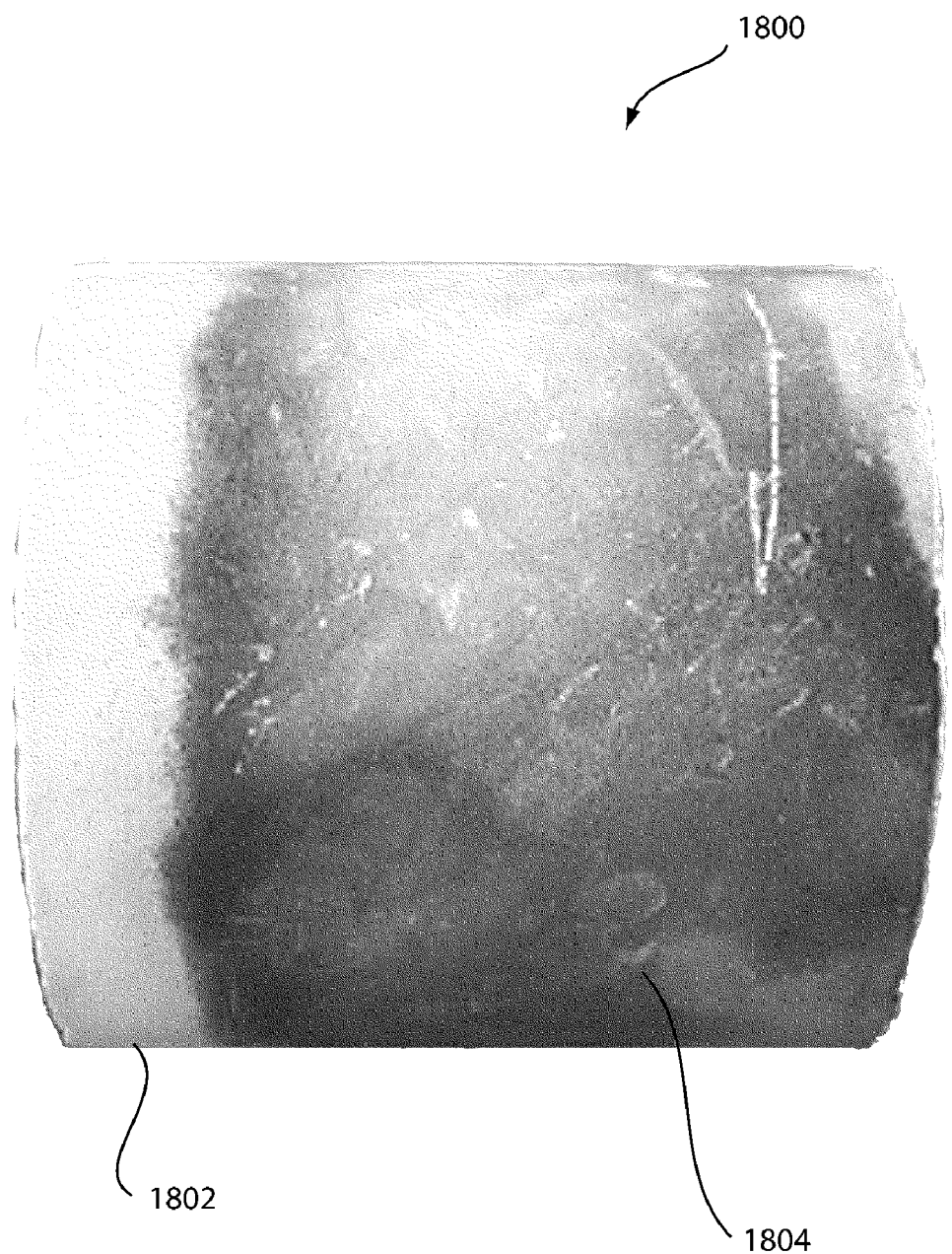
FIG. 18 is a longitudinal view (photograph) of an embodiment substrate embodiment of the present invention. A filter substrate 1800 of the present invention is shown. The substrate 1800 has a hard coating 1804 on the outside wall 1802. For the sample shown in FIG. 18, the hard coating consists of finely crushed cordierite and inorganic fibers. A powder was also painted on the filter foundation 1800 and cured as described herein. The hard coating protects and insulates the filter foundation while not changing the dimensions.

A wedge-shaped tine on the comb is used to create wedge-shaped channels. Utilizing a wedge-shaped tine produces channels wherein the walls are parallel with a square-shaped opening. As shown in FIG. 17, a substrate 1700 incorporates parallel wedge-shaped "blind" channels 1702, i.e., channels with no exit hole. The blind channels 1702 force gases 1704 to pass through the pore space channels walls prior to exit.

A four-sided pyramid-shaped tine on the comb is used to create a pyramidal-shaped channel. The walls are parallel and opening is substantially square-shaped. However, the wall thickness at the channel opening is minimal as the channels meet at a point, rather than being adjoined by a wall with a flat front. This results in a decrease in frontal surface area, and thus a decrease in backpressure. With four-sided pyramid-shaped shaped tines, shims are not needed to separate the combs. In this embodiment, with reference to FIG. 16, a suitable comb has tines which come to a point rather than have a flat end. Of course, various other shapes of tines are encompassed by the present invention.

A tent-shaped tine on the comb is used to create a polygonal-shaped channel. Frontal surface area is minimized with polygonal-shaped channels.

Figure 16:
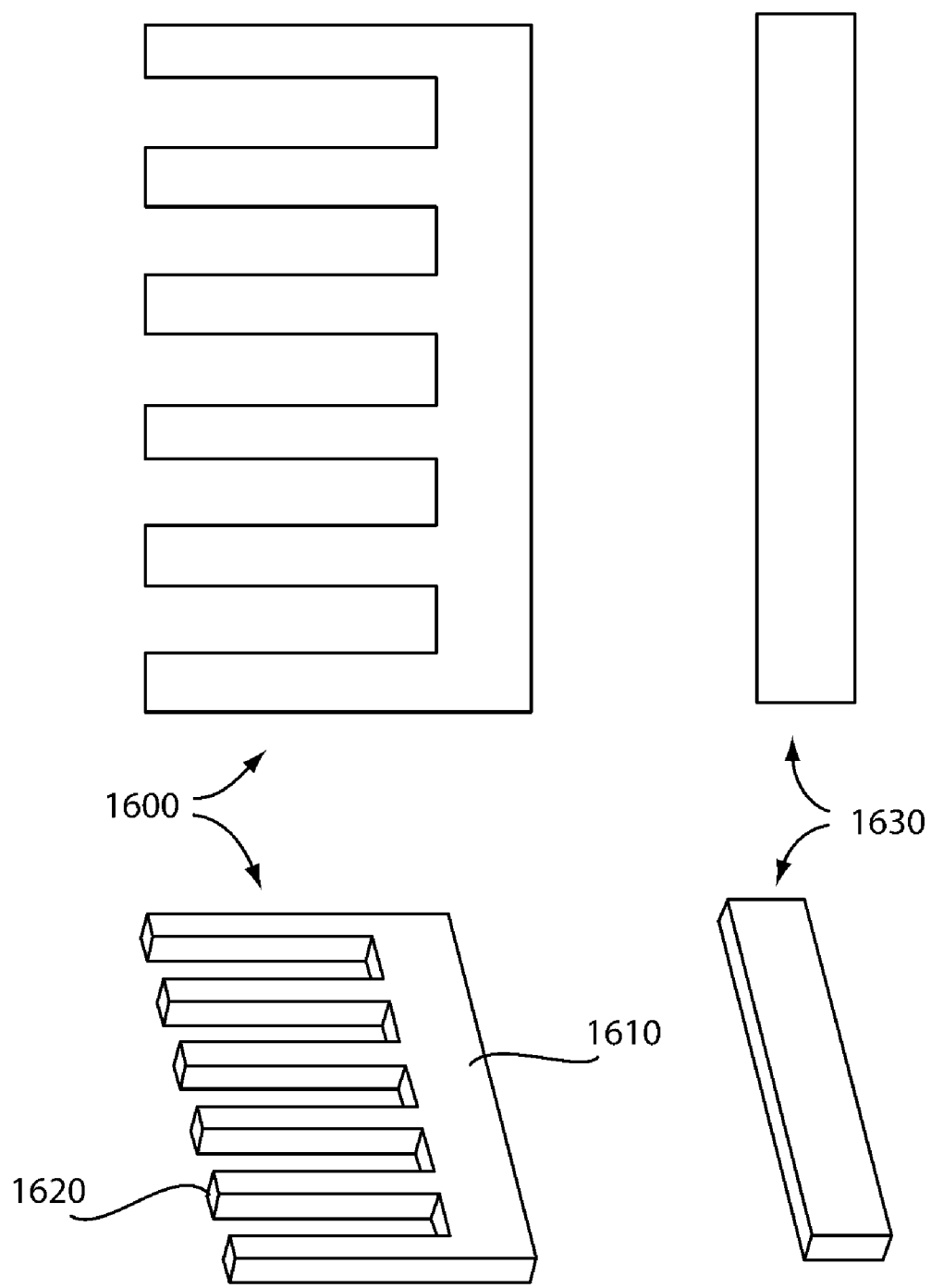
FIG. 16 shows various views of a comb 1600 (or portion thereof) that can be used in certain embodiments of the present invention.

Referring to FIG. 16, the dimensions of an exemplary comb 1600 are shown according to an embodiment of the present invention. The comb 1600 is approximately 6.000 inches long and 0.0308 inches wide. The comb 1600 comprises a base 1610 from which a plurality of tines 1620 extend. The base 1610 is 0.4375 inches high. The plurality of tines 1620 are 1.250 inches long and 0.0308 inches wide, and spaced by 0.010 inches.

Figure 15:
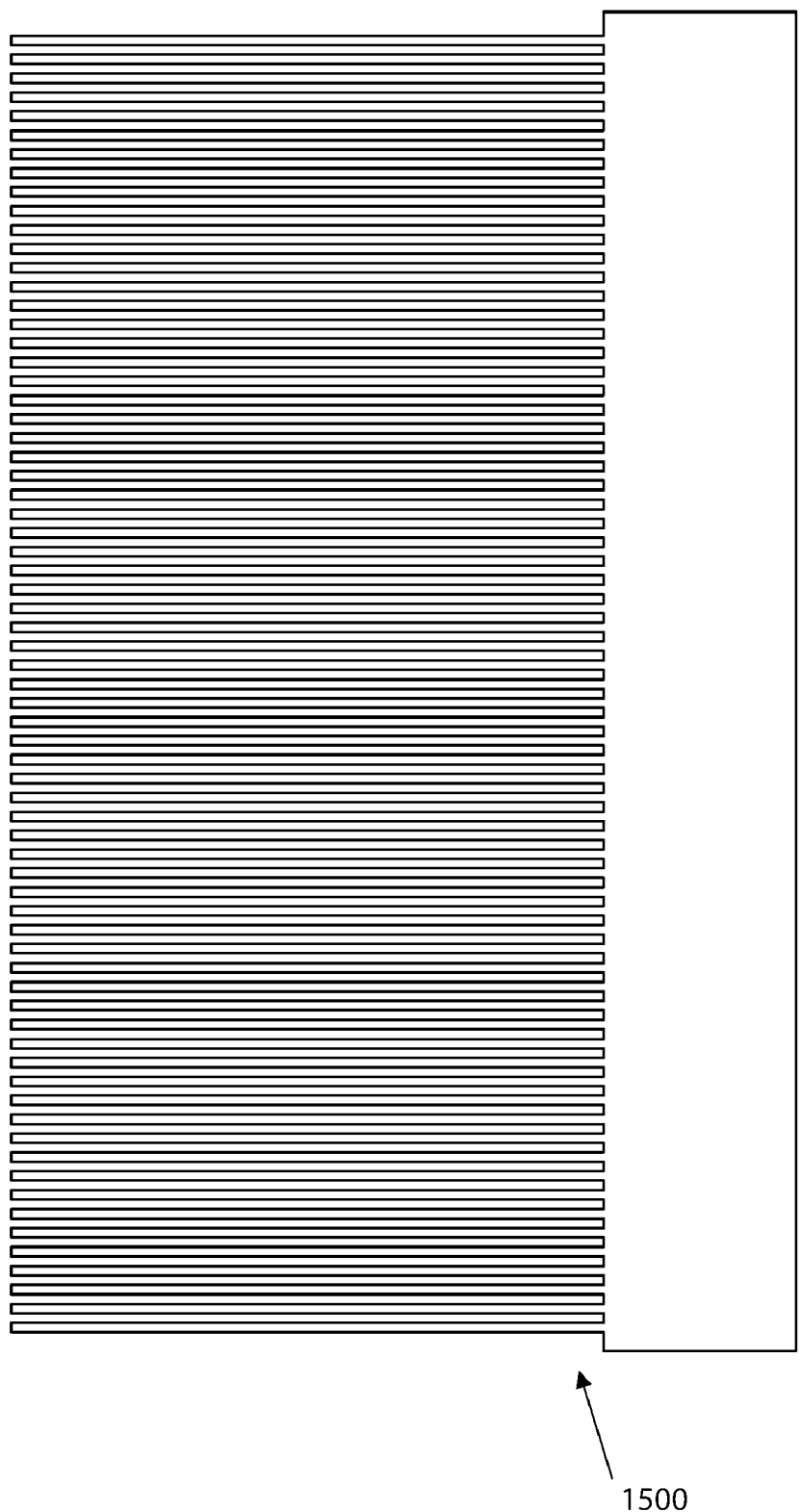
FIG. 15 is a two-dimensional diagram of a comb 1500 that can be used in a combing method of preparing a catalytic or filtering substrate of the present invention.

In one embodiment of the comb process, the channels are first formed by a drill bit and are circular. In order to produce shaped channels with parallel walls, according to one embodiment of the present invention, tines of combs broach (i.e., press or stamp) the circular channels to create the shaped channel. An embodiment of a comb 1500 is shown in FIG. 15. Preferably, broaching is done on a CNC press. The impression left behind is shaped channels and channel openings. The cell wall thickness may be varied as described above. In certain embodiments, the combing process produces a catalytic or filtering substrate having a channel wall thickness of about 4 mils to about 20 mils, preferably about 6 mils to about 10 mils.

In the comb process, metal combs may be placed in a box called a jig and mounted in the CNC press for broaching. Within the jig, the combs are separated by shims. The spacing between the combs is a low tolerance, requiring the combs to be held tightly in the jig to restrict movement during broaching. Referring to FIG. 16, a shim 1630 is utilized as a spacer for comb 1600. Shim 1630 has dimensions of 0.010 inches wide, 6.000 inches in length, and 0.4375 inches high.

Preferably, at least one screen is provided over the combs to keep the tines aligned. Preferably, the screens are floating to distribute alignment as needed. Additionally, the screens are helpful for tines of varying lengths, for example from about 0.5 inches to about 6.0 inches long. The at least one screen may be located anywhere along the tines, such as floating, spring-loaded, or fixed. The at least one screen may be floating along the tines. The tines are not affixed to the at least one screen, rather the screens are placed on the tines such that the screens are adjustable. The at least one screen may be spring-loaded on the tines. By spring-loading the screen, the pressure of the substrate against the screen maintains the distance between the tines at approximately the edge of the substrate. The at least one screen may also be fixed to the tines, at any position along the length of the tines.

Another embodiment of the present invention is directed to a process of preparing a catalytic or filtering substrate having a plurality of channels, comprising using a comb to peck at the substrate to form the plurality of channels. This process, in preferred embodiments, is a stepwise process. That is, the entire channel is not formed with one insertion of the tine of the comb. Rather, the tines of the comb are repeatedly inserted and removed in small increments until the desired length of the channel is obtained. Preferably, the channels are cleared of dislodged substrate material between each peck or every other peck In another embodiment, the comb process is an automated process utilizing machines and/or robots to form the channels.

Method of Making Combs

There are a number of methods of making combs for use in the present invention. The combs may be made of a material including, but not limited to, stainless steel, tungsten, or key stock. Methods of shaping the comb include laser cutting, water cutting, and electronic discharge machining, or utilizing other shaping methods available to one of ordinary skill in the art.

DPSSL may be used to manufacture combs. Water cutting may also be employed to manufacture the combs. For example, thirty to forty combs are made with one cutting using a water cutting process in one embodiment.

Electronic discharge machining ("EDM") is an alternative method to manufacturing combs. EDM is a thermal erosion process whereby conductive material is removed by a series of recurring electrical discharges between an electrode and a conductive workpiece, in the presence of a dielectric fluid. EDM may similarly be used on the substrate if the substrate is made electroconductive. There are at least two types of EDM: (1) ram and (2) wire.

Using the EDM ram, i.e., die sinking, an electrode/tool is attached to a ram which is connected to one pole, usually the positive pole, of a pulsed power supply. The workpiece is connected to the negative pole. The workpiece is then positioned so that there is a gap between the workpiece and the electrode. The gap is then flooded with the dielectric fluid. Once the power supply is turned on, thousands of direct current, or DC, impulses per second cross the gap, beginning the erosion process. The spark temperatures generated can range from 14,000 degrees to 21,000 degrees Fahrenheit. As the erosion continues, the electrode advances into the work while maintaining a constant gap dimension.

Preferably, the wire EDM method is preferred for comb manufacture. The wire method uses a consumable, electrically charged wire as an electrode to make intricate cuts as it moves in preset patterns around the workpiece.

When walls are too thin, any rough edges on the tines may tear the walls entering or exiting during broaching. Accordingly, the combs are be polished to remove any burrs or sharp edges that could catch on the fibers. Cutting and polishing the combs can generate heat, which may warp the comb. A tolerance is preferably maintained of approximately 0.0001 inches in order to insure the hole generated is parallel and not ruptured.

The combs used for broaching comprise a plurality of tines. Tine length, width, thickness, and shape may be varied according to the desired attributes of the channels. Referring to FIG. 16, the dimensions of a comb 1600 are shown according to an embodiment of the present invention. The comb 1600 is approximately 6.000 inches long and 0.0308 inches wide. The comb 1600 comprises a base 1610 from which a plurality of tines 1620 extend. The base 1610 is 0.4375 inches high. The plurality of tines 1620 are 1.250 inches long and 0.0308 inches wide, and spaced by 0.010 inches.

Laser Machining

Other methods include diode-pumped solid-state laser ("DPSSL") drilling; chemical lasers, e.g., $CO_2$; electron beam ("EB") drilling; or electrode drilling machines ("EDM"), or utilizing other methods known to one of ordinary skill in the art. Any laser suitable for cutting the material of the combs may be used.

The substrate may be cut using laser drilling, such as DPSSL drilling. This method drills with a laser programmed using a CAD program. The CAD program is loaded into a CAM program. The laser cuts with oxygen or, preferably, nitrogen in fine pulses. The DPSSL allows channels to be cut at a rate of about 2,000 channels per minute. In one embodiment, the channels have an approximate diameter of 100 nanometers. Laser drilling may be employed using known techniques and methods as disclosed in U.S. Pat. No. 4,686,128, the teachings of which are incorporated herein by reference in their entirety. In one embodiment, the process uses laser drilling to prepare channels having a depth (or length) of about 0.5 inch or less.

In one embodiment, the channels produced are large enough for the particulates to enter but small enough that the majority of the particulates are removed from the exhaust gas flow.

In addition, in one embodiment, the substrate material is about ninety-seven porous, which means that there is a tremendous amount of room for gases to pass through the substrate. This large porosity also provides an additional surface area for the particulate to deposit onto.

Pulsed Lasers

|  | Gator Series | | |  |
| --- | --- | --- | --- | --- |
|  | G355-3 | G532-5 | G532-10 |  |
| Wavelength | 355 | 532 | 1064 | nm |
| Average Output Power[1] | 3 | 5 | 10 | W |
| Pulse Repetition Rate[2] | 0-15,000 | 0-15,000 | 0-15,000 | Hz |
| Pulse Energy[1] | 0.3 | 0.5 | 1 | mJ |
| Pulse Duration (FWHM)[1] | 15 ± 3 | 15 ± 3 | 15 ± 3 | ns |
| Beam Diameter $(1/e^2)$[1] | 1.0* | 1.0 | 0.7 | mm |
| Spatial Mode | $TEM_{00}$ | $TEM_{00}$ | $TEM_{00}$ |  |
| $M^2$ [1] | <1.2 | <1.2 | <1.2 |  |

[1] Measured at 10 kHz reptition rate;
[2] Externally triggered from 0-15,000 Hz (attenuated power). Internally triggered from 7500 Hz to 15,000 Hz. Real Random Firing Mode for external triggering between 0 and 15,000 Hz in full power mode is optional;
[3] Gator lasers utilize a closed loop water system for temperature control.

Preferably, the substrate material is substantially free of impurities, such as carbon, when being machined by a laser.

Molding Holes

In an alternative embodiment, the substrate of the present invention is prepared with channels preformed in the billet. In this embodiment, the use of channel formers produces channels in the billet. The channel formers are rods having a suitable size and shape to form a desired channel when the green billet is formed.

Various types of material can be used for said channel formers. For example, the channel formers may be a strong durable material, such as metal or polymer that is able to withstand the temperatures of the drying process. Once the green billet or the final billet is formed, the rods are removed to leave the channels. The channels may be further machined as described above.

Alternatively, in other embodiments, the rods are made of a material that can evaporate or disintegrate upon exposure to a suitable source of radiation or heat, such as laser or heat. In another embodiment, the channel formers are made of carbon, carbon derivatives, or the like.

Specific Embodiments

In certain embodiments, the channels are drilled using a CNC drill, which is computer controlled to maintain uniformity, as described below. The drilling process is performed under a constant water shower to prevent dust from becoming airborne, which is an OSHA hazard, and may get into the bearings of the drill and destroy it.

The drilled substrate is optionally oven dried to drive or bake off any water or other liquid that may reside in the pore space before any catalytic applications. Baking time is not critical. A sufficient time is used to remove the majority or substantially all water. Evaporation of the water can be determined by simply weighing the substrate. Baking time primarily speeds up the dewatering process. After heating the filter element for several different intervals, the weight will level off and the substrate is ready for any catalyst or coating application.

In a preferred embodiment, the channels of the substrate are first prepared by drilling and then shaped using the comb method. Due to the low heat conductance nature of preferred substrates, when the substrate is drilled, most heat generated during drilling and cutting process is reflected back at the drill bit and away from the substrate. For this reason, the drill bits may absorb some of the heat and expand, overheat, and/or melt. Preferably, cooling the drill bit is performed, preferably with water. In another embodiment, the drill operated at a reduced drill speed, e.g., 200 RPM, to minimize the generation of heat. Of course, other drill speeds, both faster and slower are suitable. In another preferred embodiment, the drilling uses two or four or six faceted drills with modified twists and head (drill tip) configurations Additionally, in a preferred embodiment, the channel is drilled over a plurality of drilling attempts. For example, a channel that is about one inch in length may be prepared by drilling into the substrate at depths of about 0.1 inch at a time until the final length is attained. The channel can be cleared of drilled substrate material between drilling attempts.

In one embodiment, a pecking methodology is utilized because vacuuming of cut fibers must be removed.

In a preferred embodiment, the blind channels were drilled a fraction deeper than our intended depth to allow the fibers to be packed into that extra area during the combing process. The combs were programmed to go the depth of the wall flow configuration indicated and that extra void accommodates any loose substrate material remaining in the channels.

Product by Process

In another embodiment, the present invention is directed to a product prepared according to the process described herein. Specifically, the invention is directed to a catalytic substrate prepared according to any one of the specific embodiments described herein. In another aspect, the present invention is directed to a filtering substrate prepared according to any one of the specific embodiments described herein.

Applications

Various embodiments and applications of the invention are discussed below. These example applications are discussed for illustrative purposes only and are not limiting of the scope of the invention. Any of the embodiments of the catalytic substrate and filtering substrate described above can be used in the various applications.

Catalytic Converter

In another embodiment, the present invention is directed to a catalytic converter comprising a catalytic substrate of the present invention. The catalytic converter of the present invention can be used in an engine exhaust system in a similar manner in which known catalytic converters are used. Of course, the catalytic converter of the present invention has advantages over prior art catalytic converters. Because of these advantages, the catalytic converter can be used in ways in which known catalytic converters cannot be used.

Any of the specific embodiments of the substrate of the invention, as described above, may used in one or more of the specific applications, e.g., catalytic converters. In a specific embodiment, the catalytic converter comprises a catalytic substrate of the present invention; a matting surrounding said catalytic substrate; and a canister, preferably a metal canister; and optionally further comprises a washcoat.

Another aspect of the present invention is directed to a catalytic converter that is position in or adjacent to the exhaust manifold of an exhaust system of the engine, said converter comprising a catalytic substrate of the present invention. Such a catalytic converter is referred to as a manifold catalytic converter (other terms include mani-cat, manifold converter, and the like). A mani-cat of the present invention includes mani-cats known in the art, wherein the catalytic substrate of the present invention is used in place of the prior art substrate. Such mani-cats are disclosed in, e.g., U.S. Pat. Nos. 6,605,259; and 5,692,373.

In another embodiment, the invention is directed to an improved catalytic converter, the improvement comprising the novel substrate as described herein. Any one of the specific embodiments of the substrate can be used in the improved catalytic converter.

In another embodiment, the invention is directed to an improved catalytic converter for treating internal combustion engine exhaust comprising a substrate, a metal oxide washcoat, and at least one catalyst adhered to the metal oxide particles, the improvement comprising the substrate comprising a nSiRF-C composite and a catalytic metal.

In another embodiment, the invention is directed to an improved catalytic converter for treating internal combustion engine exhaust comprising a substrate, a metal oxide washcoat, and at least one catalyst adhered to the metal oxide particles, the improvement comprising the substrate comprising a nSiRF-C composite and a catalytic metal.

In another embodiment, the invention is directed to an improved catalytic converter for treating internal combustion engine exhaust comprising a substrate, a metal oxide washcoat, and at least one catalyst adhered to the metal oxide particles, the improvement comprising the substrate comprising an AETB composite In another embodiment, the present invention is directed to a main-cat having a catalytic substrate comprising a nSiRF-C composite and a catalyst. The main-cat (sometimes referred to as an underfloor catalytic converter) is located partially or totally within the head of an engine. In one embodiment, the main-cat comprises a catalytic substrate of the present invention, wherein said substrate has a density of about 12 lb/ft$^3$, has a porosity of about 97%, has a low thermal expansion, has a high structural integrity, and has low heat conductance. In a preferred embodiment, the main-cat comprises about 600 cpsi and having a wall thickness of about 6 mils. The main-cat in this embodiment has a wall-flow configuration. In a preferred embodiment, the main-cat has a channel shape of substantially box (varying lengths through the substrate) with substantially square openings (or holes). In a preferred embodiment, the catalytic substrate of the main-cat is made using the comb method. Additionally, in this embodiment, the catalytic substrate comprises an alumina washcoat. In this embodiment, the main-cat is capable of catalyzing both oxidation and reduction of pollutants, e.g., it has a catalyst capable of oxidizing pollutants and it has a catalyst capable of reducing pollutants. The canister of the main-cat is prepared by a swagging method. In a preferred embodiment, the main-cat comprises two substrate units. The main-cat, in certain embodiments is used alone, or alternatively is used in combination with a pre-cat. In a preferred embodiment, the main-cat comprises an intumescent matting. The main-cat can be used in all internal combustion engines. The main-cat can be used with fuel-borne catalysts. Moreover, the substrate of the main cat may be protection enhanced The main catalytic converter of the present invention, as described above, is also used, in certain embodiments with one or more aftertreatment systems. Such aftertreatment systems include an NOx adsorber, a HC adsorber, a SCR systems, and the like Furthermore an embodiment having the same or similar configurations and attributes as the main catalytic converter described above can be used for a membrane catalyst. The membrane catalyst comprises a catalytic substrate having a membrane configuration as described above.

In another embodiment, the present invention is directed to a head-cat having a catalytic substrate comprising a nSiRF-C composite and a catalyst. The head-cat is located partially or totally within the head of an engine. In one embodiment, the head-cat comprises a catalytic substrate of the present invention, wherein said substrate has a density of about 12 lb/ft$^3$, has a porosity of about 97%, has a low thermal expansion, has high structural integrity, and has low heat conductance. In a preferred embodiment, the head-cat comprises about 600 cpsi and having a wall thickness of about 6 mils. The head-cat in this embodiment has wall-flow configuration. In a preferred embodiment, the head-cat has a channel shape of substantially pyramidal with substantially square openings (or holes). In a preferred embodiment, the catalytic substrate of the head-cat is made using the comb method. In this embodiment, the head-cat is capable of catalyzing both oxidation and reduction of pollutants, e.g., it has a catalyst capable of oxidizing pollutants and it has a catalyst capable of reducing pollutants. The head-cat, in certain embodiments is used alone, or alternatively is used in combination with a pre-cat. In a preferred embodiment, the head-cat comprises a hybrid matting. The head-cat can be used in all internal combustion engines. The head-cat can be used with fuel-borne catalysts.

One or more head cats can be used with the same engine. The use of a head cat in accordance with the present invention would also have one or more of the following advantages: reduce weight of the under-floor exhaust system; increased filtration of exhaust particulate matter that an intercooler would otherwise pick up, thereby improving the life of intercooler; no matting is required; rattling sounds in heat shields reduced; reduced muffler size; enhanced burn-off of particulate matter; in case of a failure of one head cat, in certain embodiments, the exhaust gas would still be effectively treated with the other functioning head cats, e.g., the other three on a 4-cylinder engine. Head-cats are advantageous for boats, watercraft, motorcycles, small handheld engines, leaf-blowers, and related engines, and in other applications in which a nonexposed catalytic converter is preferred.

Figure 42:
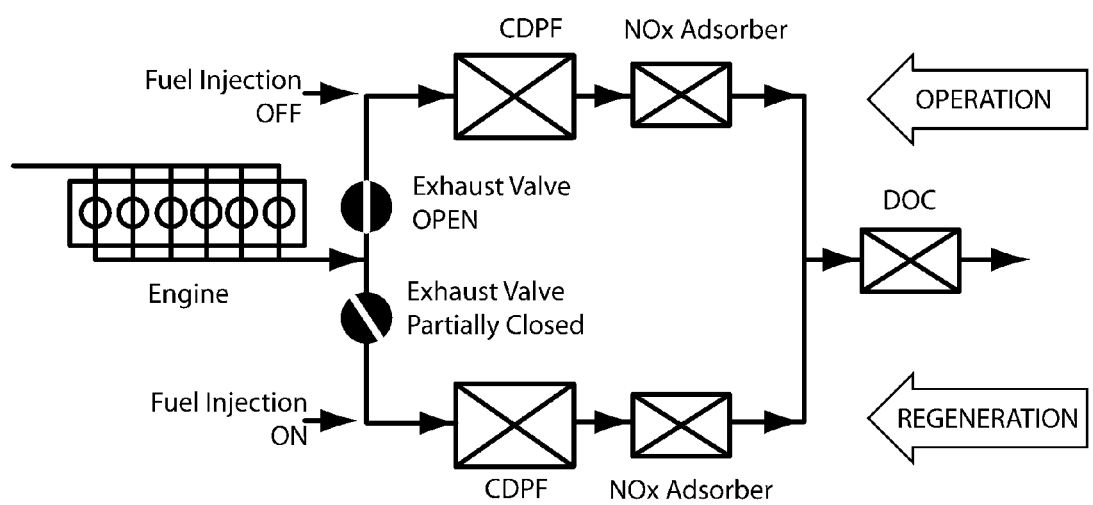
FIG. 42 is a schematic that illustrates a NOx adsorber system.
Figure 43:
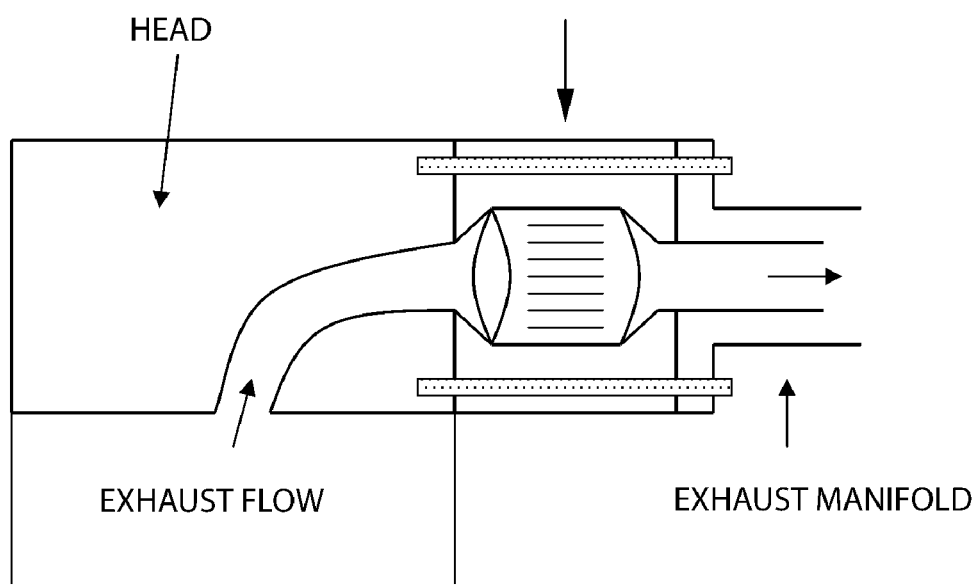
FIG. 43 is a schematic that illustrates an embodiment of the present invention positioned between an engine head and an exhaust manifold.

In another embodiment, a catalytic converter of the present invention could be placed between the head and the exhaust manifold as shown in FIG. 42. In this embodiment, the catalytic converter section is placed between the engine head and the exhaust manifold. An advantage over conventional systems is that the converter is very close to the combustion chamber, thus increasing efficiency. For instance, this embodiment could put these on the Ford 4.6 liter and it would fit all of their engines. This in turn means that it would fit on the Ford Explorer, Mustang, Crown Victoria, Econoline, 150/250/350 pickup, Expedition, and every other product that Ford puts the engine on, such as Lincoln products. It would also fit in certain embodiments on the various model years that used it those many years. That one 4.6 casting would be useful for millions of vehicles in the U.S. alone. It is also friendly for the oxygen sensors to go into as well.

In another embodiment, the present invention is directed to a back-cat having a catalytic substrate comprising a nSiRF-C composite and a catalyst. In another embodiment, the catalytic converter of the present invention is a back-cat. The back-cat is located after the main catalytic converter. In one embodiment, the back-cat comprises a catalytic substrate of the present invention, wherein said substrate has a density of about 12 lb/ft$^3$, has a porosity of about 97%, has a low thermal expansion, has high structural integrity, and has low heat conductance. In a preferred embodiment, the back-cat comprises about 600 cpsi and having a wall thickness of about 6 mils. The back-cat in this embodiment has wall-flow configuration. In a preferred embodiment, the catalytic substrate of the back-cat is made using the comb method. In a preferred embodiment, the back-cat has channel holes of varying shapes, including triangular, square, and hexagonal. Likewise the channel shape can vary. In this embodiment, the back-cat is capable of catalyzing both oxidation and reduction of pollutants, e.g., it has a catalyst capable of oxidizing pollutants and it has a catalyst capable of reducing pollutants. The back-cat, in certain embodiments, is used alone, or alternatively is used in combination with a pre-cat. In a preferred embodiment, the back-cat comprises a non-intumescent matting. The back-cat can be used in all internal combustion engines. In another embodiment, the back-cat is used in conjunction without fuel-borne catalysts. Generally, the back-cat of the embodiment is place near the standard muffler location, although other locations are possible. In an alternative embodiment, the back-cat is integrated into a muffler. Such an embodiment may comprise: a) the substrate itself acting as and replacing a muffler, or b) the substrate is placed inside the typical metal muffler assembly so it is integrated into the muffler.

In another embodiment, the invention is directed to a diesel oxidation catalyst (DOC), wherein the substrate of the DOC is a catalytic substrate as described herein. In a preferred embodiment, the substrate of the DOC of the invention is an AEBT or an OCBT, preferably AEBT-10, AEBT-12, AEBT-16, or OCBT-10. The embodiment of the DOC has a catalyst selected from the group consisting of palladium, platinum, rhodium, mixtures thereof, and derivatives thereof.

Other suitable embodiments include a catalyzed DPF comprising a catalytic substrate of the present invention, preferably the substrate comprising an AETB material such as AETB-12, and further comprising a catalyst.

Particulate Filter (DPF, DPT)

In another embodiment, the present invention is directed to a particulate filter comprising a catalytic substrate of the present invention. The particulate filter of the present invention can be used in an engine exhaust system in a similar manner in which known catalytic converters are used. Of course, the particulate filter of the present invention has advantages over prior art catalytic converters. Because of these advantages, the catalytic converter can be used in ways in which known catalytic converters cannot be used.

In another embodiment, the invention is directed to an improved particulate filter, the improvement comprising the novel substrate as described herein. Any one of the specific embodiments of the substrate can be used in the improved particulate filter.

In another embodiment, the invention is directed to an improved particulate filter for treating internal combustion engine exhaust comprising a filtering substrate, the improvement comprising the substrate comprising a nSiRF-C composite having a plurality of channels extending into and optionally through the substrate. The configuration of the channels can vary as provided for above.

In another embodiment, the invention is directed to an improved particulate filter for treating internal combustion engine exhaust comprising a filtering substrate, the improvement comprising the substrate comprising a nSiRF-C composite having about 100 to about 1000, preferably about 600 channels extending partially through the substrate, and wherein said substrate has a wall-flow configuration.

In another embodiment, the invention is directed to an improved particulate filter for treating internal combustion engine exhaust comprising a substrate, and a metal oxide washcoat, the improvement comprising the substrate comprising AETB.

In another embodiment, the present invention is directed to a diesel particulate filter (DPF) having a filtering substrate comprising a nSiRF-C composite as described above. The filtering substrate is configured to be suitable for use in the DPF. The DPF is located partially or totally within the head of an engine. In one embodiment, the DPF comprises a filtering substrate of the present invention, wherein said substrate has a density of about 12 lb/ft$^3$, has a porosity of about 97%, has a low thermal expansion, has a high structural integrity, has low heat conductance. In a preferred embodiment, the main-cat comprises about 600 cpsi and having a wall thickness of about 6 mils. The main-cat in this embodiment has wall-flow configuration. In a preferred embodiment, the main-cat has a channel shape of substantially box (varying lengths through the substrate) with substantially square openings (or holes). In a preferred embodiment, the catalytic substrate of the main-cat is made using the comb method. Additionally, in this embodiment, the catalytic substrate comprises an alumina washcoat. In this embodiment, the main-cat is capable of catalyzing both oxidation and reduction of pollutants, e.g., it has a catalyst capable of oxidizing pollutants and it has a catalyst capable of reducing pollutants. The canister of the main-cat is prepared by a swagging method. In a preferred embodiment, the main-cat comprises two substrate units. The main-cat, in certain embodiments is used alone, or alternatively is used in combination with a pre-cat. In a preferred embodiment, the main-cat comprises an intumescent matting. The main-cat can be used in all internal combustion engines. The main-cat can be used with fuel-borne catalysts. Moreover, the substrate of the main cat may be protection enhanced. The protection coating may be applied to the inside or to the external surface of the substrate.

Canning Types

The catalytic converter of the present invention has a canister. The canister can be prepared according to known methods in the art. Furthermore, the canister of the catalytic converter or particulate filter of the present invention may use materials known in the art, e.g., steel, to make the canister.

In a preferred embodiment, the catalytic converter of the present invention has an exit pipe that can be attached to a tailpipe of commercially available vehicles. Preferably, the catalyst converter fits tailpipes having a diameter of about 2½ or 3 inches.

For example, suitable canisters include those made according to any one of the following methods: clamshell, tourniquet, shoebox, stuffing, and swaging. The above canning methods utilize two different gap control mechanisms: (1) fixed gap and (2) fixed canning force. From the welding process perspective, the methods produce converters with one or two seams. These classifications are illustrated in Table 4 (Rajadurai 1999).

|  | Fixed Gap | Fixed Force |
|---|---|---|
| Single Seam | Stuffing, Swaging | Tourniquet |
| Dual Seam | Clam Shell | Shoebox |

Closing the can using a fixed force offers a more accurate gap density control by eliminating the dimensional tolerance influence of the substrate, can, and the mat itself. Closing the can to a fixed gap has the advantage of producing a converter of fixed final dimensions, which simplifies the converter design, primarily in respect to welding of cones to the finished can.

The single seam design is usually preferred for round or oval converters of low aspect ratios, where it can provide uniform gap density distribution. Single seam shells also provide more manufacturing flexibility and require less expensive tooling. The dual seam design is usually required for oval converters with high aspect ratios. In this case, reinforcing ribs are stamped in the shell to prevent its deformation and the resulting gap nonuniformity. The dual seam shells are produced in stamping processes which require very expensive tooling and have to be justified by high production volumes.

Clamshell

Figure 36:
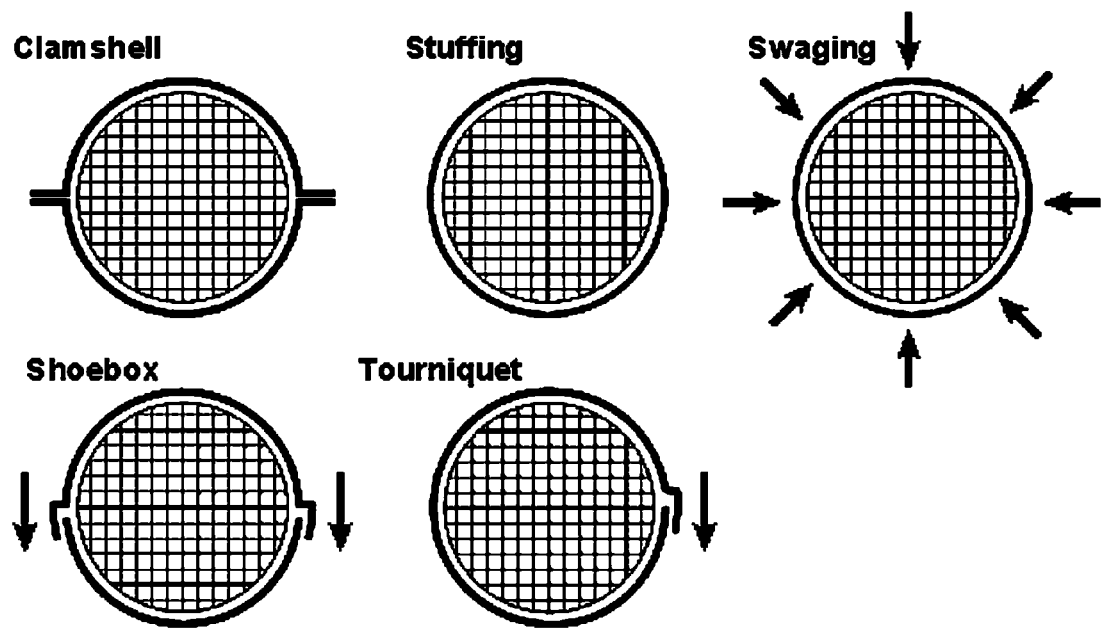
FIG. 36 illustrates various methods for placing a substrate in a canister.
Figure 37:
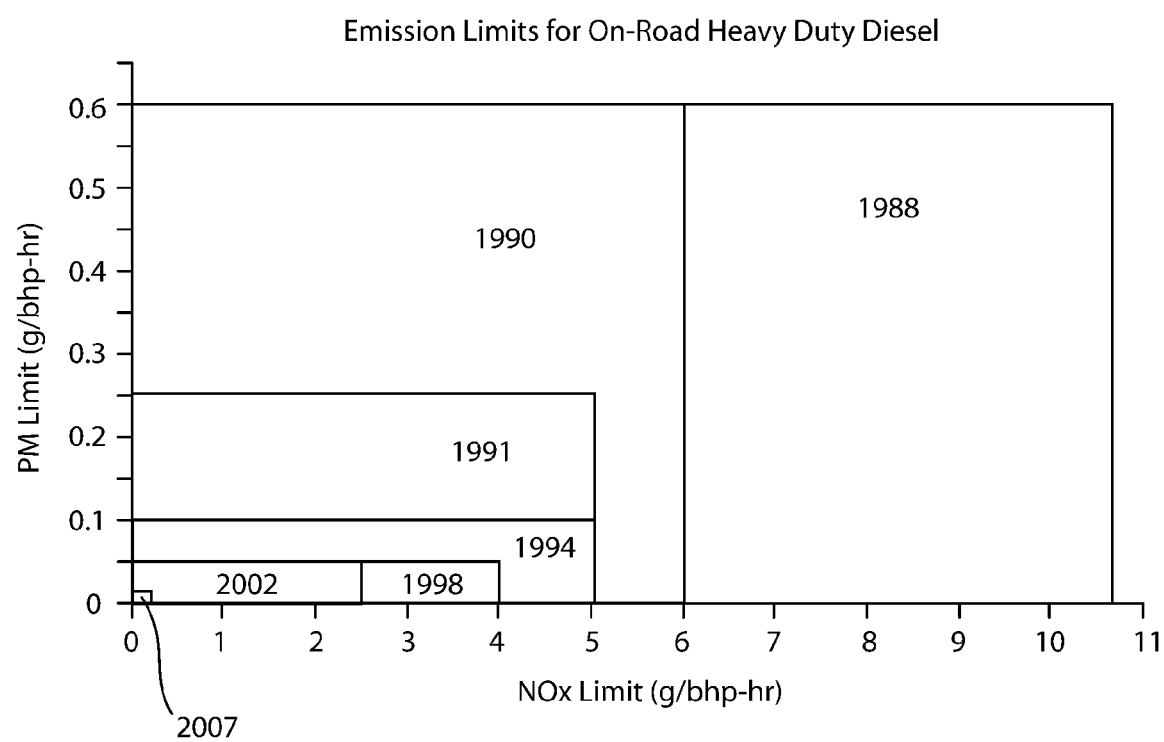
FIG. 37 is a graph illustrating the emission limits for on-road heavy duty diesel vehicles.
Figure 38:
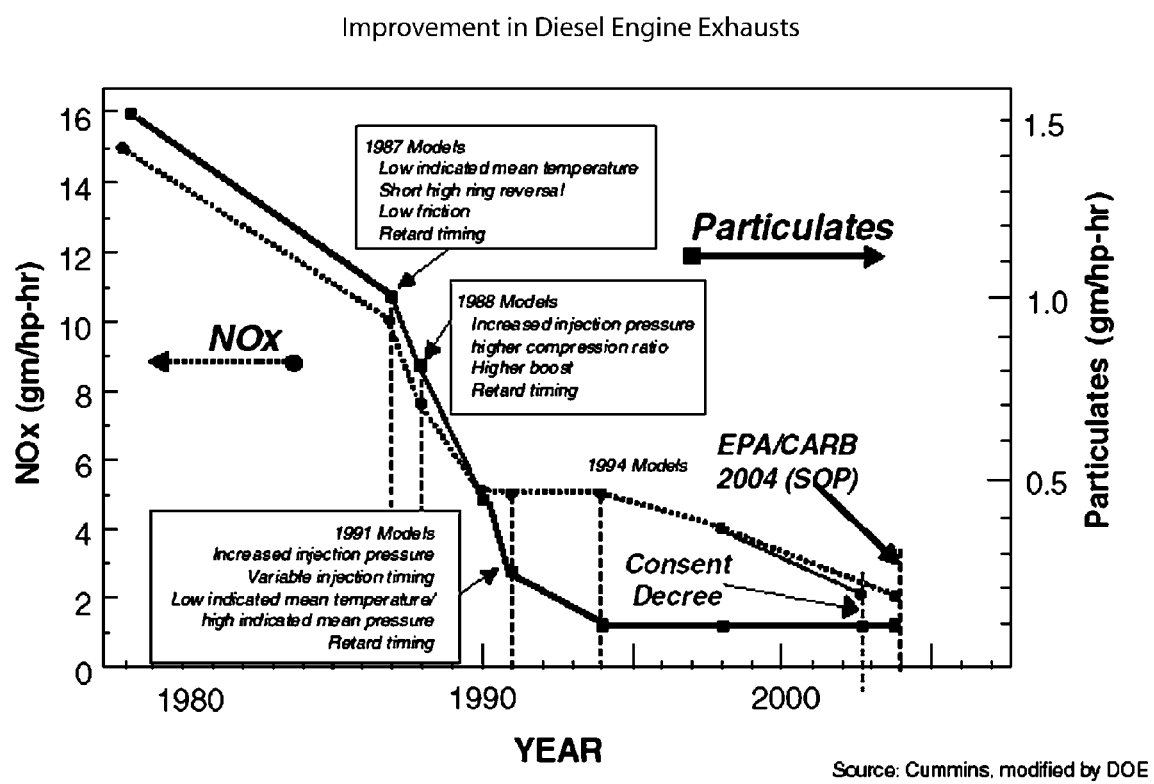
FIG. 38 is a graph that illustrates improvements over various years in NOx and Particulates emissions from diesel engine exhaust.
Figure 39:
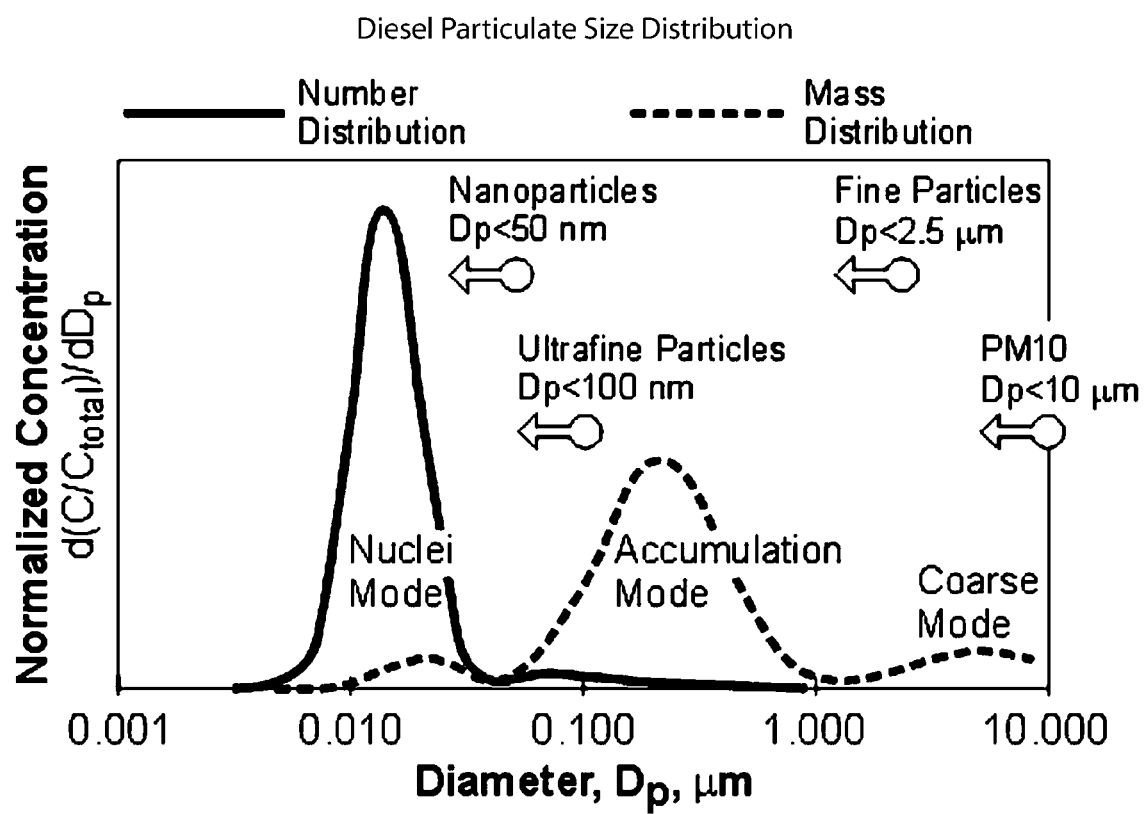
FIG. 39 is a graph that illustrates particulate size distribution in diesel emissions.
Figure 40:
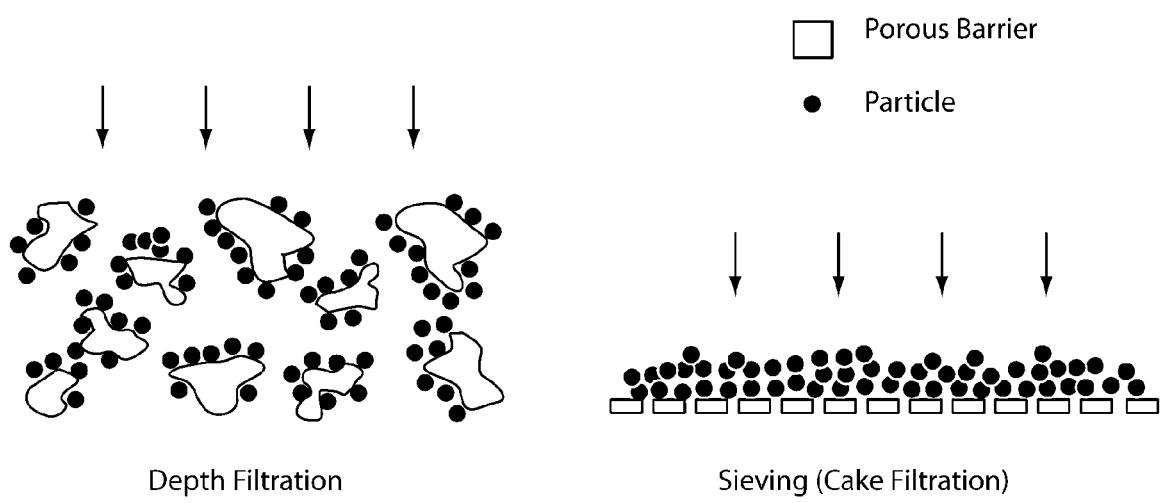
FIG. 40 is a graph that illustrates the difference between depth filtration and sieving (cake filtration).

In one embodiment, the catalytic converter of the present invention comprises a canister made with the clamshell technique. In another embodiment, the particulate filter comprises a canister made with a clamshell technique. In North America, clamshell has been traditionally the most common design of the underfloor converter in passenger cars and light trucks. Construction of a clamshell catalytic converter is illustrated in FIG. 36. The ceramic catalyst substrate(s) is wrapped in the mat and placed in the bottom part of the shell. Then, another symmetrical part of the shell is placed on the top, pressed together and welded.

Tongue and groove design is used for the mounting mat to avoid bypassing of the substrate by exhaust gases. The converter illustrated above also includes end seals. The seals are used here to protect the mat against gas impingement and erosion, rather than to prevent leaks. Most converters which utilize mats do not have end seals. Whenever wire mesh mount is used instead of the mat the end seals are required, at least at the inlet face of the substrate.

Clamshell converters are often equipped with external heat shields. Internally insulated designs were also developed, with the inside of clamshell stampings lined with an extra layer of thermal insulation.

Older designs of catalytic converters included support rings or deep pockets in the clamshell stampings to prevent axial movement of the substrate within the can. In a properly designed converter, which utilizes intumescent mats of high holding pressures, such measures are not required. There are many automotive converters without axial support of the substrate, which still show an impressive durability record. However, the axial support may be required for larger and heavier substrates or when non-intumescent mats of lower holding pressure are used. Another consideration is the erosion of mat. The converter shell profiles or end cones should be designed in such a way as to shelter the mat from direct impingement of hot exhaust gases. Some converter manufacturers impregnate mat edges, which are exposed to the gas, with chemicals to improve their erosion resistance. High holding pressures in modern converters also improve the mat resistance to erosion.

Dual monolith converters are used in many automotive applications. Two or more monoliths may be used due to monolith length manufacturing constraints or to combine catalysts of different specifications in one converter. In most dual monolith converters the substrates are separated by space, which is maintained by forming separate pockets in the clamshell stamping. In some designs, the space between substrates is maintained by a metal or ceramic ring. A butted monolith position, with no space in between, is also possible. The butted design, which offers less pressure drop than the spaced design, has been used in some commercial converters for gasoline engines (Kuisell, R. C., 1996, "Butting Monoliths in Catalytic Converters," SAE 960555).

The converter shell geometry has to provide the required mat compression. The clamshell profiles include stamped reinforcing ribs in order to provide the necessary stiffness and uniform pressure distribution. This is especially important for flat oval catalyst substrates. Care should be taken while designing the ribs that no excessive pressure areas exist which could cause damage to the substrate or the mat. The clamshell method puts high requirements on the dimensional tolerances of the monoliths, as well as the clamshell stampings. The mat compression during clamshell canning proceeds until the half-shells close, producing a certain gap thickness. The gap thickness is determined by the dimensions of the monolith and of the shell. Therefore, any variations in the size of monoliths result in variations in the mat density and, consequently, in the canning pressure that may cause converter durability problems.

Tourniquet is the most common method which allows direct control of the mounting pressure during canning process. Since tourniquet is insensitive to dimensional differences which may occur among the substrate monoliths, it is capable of producing the most robust catalytic converters. In practice, the tourniquet method is limited to round or close-to-round catalyst substrate cross-sections. Its suitability to oval or flat-oval automotive converters that are used in the underfloor position is very limited. Tourniquet was once more popular among car makers in Europe, but it became more common in North America as automotive converters migrated from the underfloor location to the engine close-coupled position. Tourniquet is also suitable for large diameter catalytic converters for heavy-duty diesel engines. A tourniquet catalytic converter is shown in In the tourniquet technique the substrate is first wrapped in a tongue-and-groove shaped mat. Then, the wrapped monolith is placed inside a longitudinally split can. The can is fabricated by rolling a rectangular piece of sheet metal. The part of the rectangle which goes underneath the overlap is usually tapered. In some designs the overlapping part of the can is formed, through an additional stamping operation, into a protruding lip to provide space for the can edge underneath the overlap. Such design prevents the inside edge of the can from cutting into the mat or creating a local pressure buildup which may damage the canned part, especially when thin mats are used. Next, the can with the wrapped monolith is placed in the tourniquet machine which applies a controlled force to the assembly. The can is tack welded when still under pressure, removed from the machine and seam welded. A push-out test is sometimes carried out as a quality assurance measure. Axial monolith displacement caused by applying a controlled force is measured in a special test apparatus. Finally, the converter headers or end cones, as well as flanges and/or ports, are welded to the converter body in a separate operation. The final assembly may be tested for weld quality by pressurizing with air while submerged in water.

The tourniquet machine includes a loop of a steel band that applies the force to canned parts. One end of the loop is attached rigidly to the machine while the other is pulled by a pneumatic or hydraulic actuator. In some machines vibration is applied during canning to minimize the closing force and to assure more uniform distribution of pressure.

The actual required canning force to achieve a target mount density for a given mat can be determined through a series of tests. Several converters should be closed using different closing forces. The canning force that produced the desired mat density should be selected. Due to mat pressure relaxation, it is important that the tourniquet machine produces repeatable closing speed and time patterns. After the target closing force is reached, the machine should maintain the can at constant position, to allow for tack welding, rather than at constant force. Applying constant force to the can as the mat pressure relaxes would cause over-compression of the mat.

The shoebox technique utilizes a split, two part shell similar to the clamshell method. The shell, however, is closed under fixed force with the edges of one of the half-shells overlapping those of the other. Therefore, the shoebox offers the robust packaging benefits of tourniquet in respect to its insensitivity to dimensional tolerances of the substrate.

Reinforcing ribs can be stamped on the shoebox shells. Thus, this technique allows for canning of flat-oval substrates in cases where tourniquet would be inadequate.

Stuffing

In the stuffing technique, the mat wrapped monolith is pushed into a cylindrical can. The can is usually made of a section of tube but it can also be rolled of sheet metal and welded. Non-cylindrical shapes (e.g., trapezoidal) are also possible. This method is applicable to both small sized passenger car converters and large converters for heavy duty engines. A stuffing cone is used to facilitate smooth insertion of the monolith (Li, F. Z., 2000, "The Assembly Deformation and Pressure of Stuffed Catalytic Converter Accounting for the Hysteresis Behavior of Pressure vs. Density Curve of the Intumescent Mat", SAE 2000-01-0223), as shown in the figure. After completing the operation, the end cones are welded to each end of the cylinder to complete the can assembly.

Although stuffed converters have similar appearance to the tourniquet assemblies, the actual mechanism of substrate holding is the same as in the clamshell design. In particular, the mat mounting pressure is determined by geometrical dimensions of the shell and of the monolith. As a consequence, high repeatability of substrate diameters is required when stuffing technique is used.

A modification of the stuffing technique—termed SoftMount Technology—has been proposed by Corning (Eisenstock, G., et al., 2002, "Evaluation of SoftMount Technology for Use in Packaging Ultra Thinwall Ceramic Substrates", SAE 2002-01-1097). The objective was to minimize the peak mat pressure during stuffing to allow for canning of ultra-thin wall substrates characterized by lower strength. The key idea is to employ a tapered cylindrical tool called an arbor, positioned ahead of the substrate, to take the peak pressure response of the mat during insertion.

In the SoftMount method, the mat is first inserted into the can where it is held on a flange during the process. Then, the mat-lined can is pushed down over the arbor and the substrate (i.e., the arbor is positioned on the substrate). The arbor is chamfered inward at the end to slip easily into the can-mat assembly. The arbor compresses the mat against the can as it moves through. As the substrate moves into position replacing the arbor in the can, it is not exposed to the instantaneous peak loads required to compress the mat.

Swaging

In swaged converters, the converter shell is machined down to the desired diameter after the mat-wrapped substrate has been inserted. Swaging is a newer packaging technique, performed in fully automated, CNC-controlled equipment suitable for high volume production for passenger car applications. Swaged converters can be manufactured from one section of tube together with their end cones, which are obtained in a spin forming process in the same production machine.

The gap control mechanism can be classified as constant gap thickness, as it is the case with stuffing, but CNC-controlled production lines can automatically account for differences in the substrate diameter. Swaged converters must be initially formed to diameters slightly less than the target diameter of finished product, to allow the shell to "spring back" after machining. This is a disadvantage of this method, which may lead to excessive peak pressures and substrate damage during canning.

Catalytic converter headers provide the transition between the inlet and outlet pipes and the substrate cross-section. Most converter headers are shaped as cones or funnels with axial gas flow. Other designs, such as truncated headers (Wendland, D. W., et al., 1992, "Effect of Header Truncation on Monolith Converter Emission Control Performance", SAE 922340) or headers with tangential gas inlet are possible but uncommon. The function of the inlet header is to diffuse the inlet flow, i.e., to decrease the gas velocity and increase its static pressure with as little loss in total pressure as possible. In practice, combined header losses can constitute from 10% to 50% of the overall converter pressure drop, depending on geometry and flow conditions. These pressure losses can be minimized by designing converter inlet headers which would provide more uniform flow distribution. There is also a notion that uniform flow distribution in a catalytic converter improves its emission performance and/or durability. In one embodiment of the present invention, the catalytic converter or particulate filter has a header having an angle of about 30%.

Matting

A catalytic converter or particulate filter of the present invention also optionally comprises a matting. Any of the embodiments recited above or below may comprise a matting. In certain embodiments, the present invention further comprises a mat (or matting or batting). For example, a catalytic converter of the present invention, in an embodiment, comprises a catalytic substrate as described above, a mat, and a canister. Mats useful for use in the present invention are known in the art.

A mat in certain embodiments can be selected based on a number of attributes as described herein and known in the art. The catalytic converter canister is preferably designed in such a way as to provide the required mounting pressure for a given catalytic substrate and a given mat. The mounting pressure of the mat increases exponentially during the compression from its initial bulk density to the final target density. The mounting pressure exhibits viscoelastic relaxation, i.e., the peak initial pressure that occurs at the canning decreases significantly during the first seconds or minutes thereafter due to the realignment of mat fibers (Myers 2000). The mounting pressure loss of intumescent mats due to the relaxation varies between 30 and 60% of the initial peak mounting pressure.

Due to the mat relaxation, as well as later in-service pressure losses, the mounting pressure is not a convenient parameter for the canning process specification. Instead, the mounting density—often called the gap bulk density (GBD)—is commonly used for that purpose. Typical mat mounting densities along with their bulk (uncompressed) densities, are listed in Table 2. The exact density for a given application should be consulted with the mat manufacturer. The exact density for a given application should be consulted with the mat manufacturer called basis weight. The weight/area is expressed in $g/m^2$ or $kg/m^2$ (since these are units of mass rather than weight, the customary term "weight/area" should be, strictly speaking, replaced by "mass/area"). Available mats have their weight/area in the range from 1050 to 6200 $g/m^2$ and uncompressed thickness between 1.5 and 10 mm. Intumescent mats of 3000-4000 $g/m^2$ are typically used for automotive converters. Higher mat weights, such as 6200 $g/m^2$ (6.2 $kg/m^2$), are recommended for more demanding applications or for large converters.

Another important property of catalytic converter mounting mats is their weight/area ratio, sometimes also called basis weight. The weight/area is expressed in $g/m^2$ or $kg/m^2$ (since these are units of mass rather than weight, the customary term "weight/area" should be, strictly speaking, replaced by "mass/area"). Available mats have their weight/area in the range from 1050 to 6200 $g/m^2$ and uncompressed thickness between 1.5 and 10 mm. Intumescent mats of 3000-4000 g/m$^2$ are typically used for automotive converters. Higher mat weights, such as 6200 g/m$^2$ (6.2 kg/m$^2$), are recommended for more demanding applications or for large converters.

Packaging mats can undergo erosion caused by the impingement of hot exhaust gases. Resistance to erosion is an important characteristic of the mat. The resistance to erosion depends strongly on gap bulk density. (Rajadurai, S., et al., 1999. "Single Seam Stuffed Converter Design for Thinwall Substrates", SAE 1999-01-3628).

Many other attributes of the mounting mats are specified and/or tested and are available from mat manufacturers. The list of these attributes includes thermal conductivity, gas sealing attributes, friction coefficients, and more.

During the design of a mounting system, the following considerations, in certain embodiments, are accounted for:

Mounting Pressure: Assuming that the mounting mat is the sole means of connecting the substrate to the shell (i.e., the converter has no end seals or support rings), the mechanical connection is provided by the radial pressure in combination with friction at the mat surface. Mounting pressure is the minimum pressure required to hold the substrate in place.

Peak Mounting Pressure. As mentioned earlier, mats behave like viscoelastic solids, producing high peak mounting pressures during initial compression, followed by a gradual relaxation to reach the residual mounting pressure. In thin wall substrates, the peak pressures may cause damage to the catalyst core during packaging. The transient behavior of mats has to be also considered when designing canning methods that rely on constant force, as opposed to constant gap size, such as tourniquet.

Figure 4A:
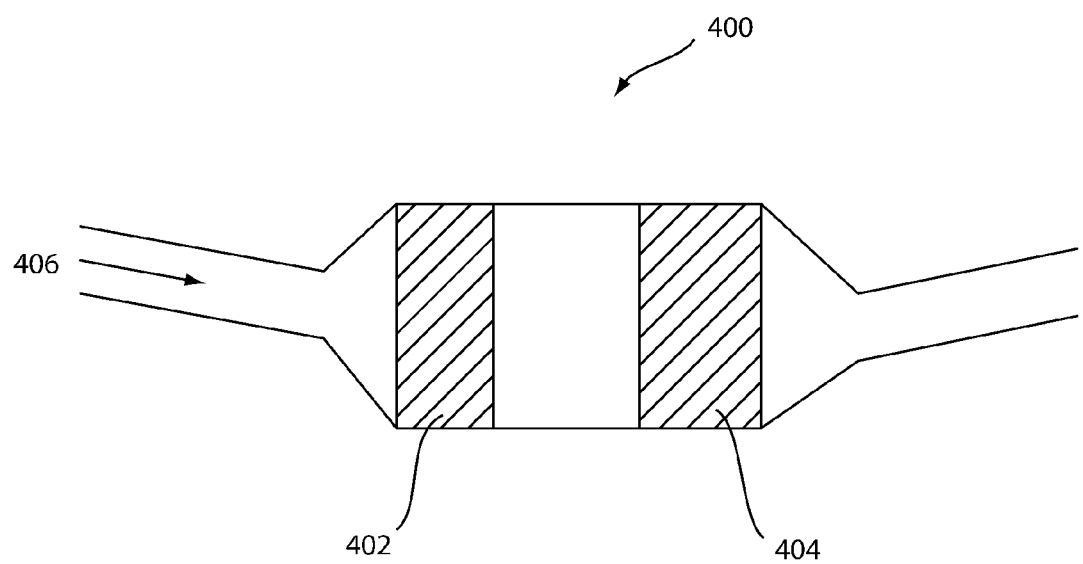
FIG. 4a is a longitudinal cross-sectional view of a typical catalytic converter schematic diagram. The catalytic converter 400 includes a reduction catalyst 402 and an oxidation catalyst 404. As exhaust flow 406 enters the catalytic converter 400 it is filtered and exposed to the reduction catalyst 102 and then to the oxidation catalyst 404. The exhaust flow 406 is then treated by the oxidation catalyst 404 which causes unburned hydro-carbons and carbon monoxide to burn further.
Figure 4B:
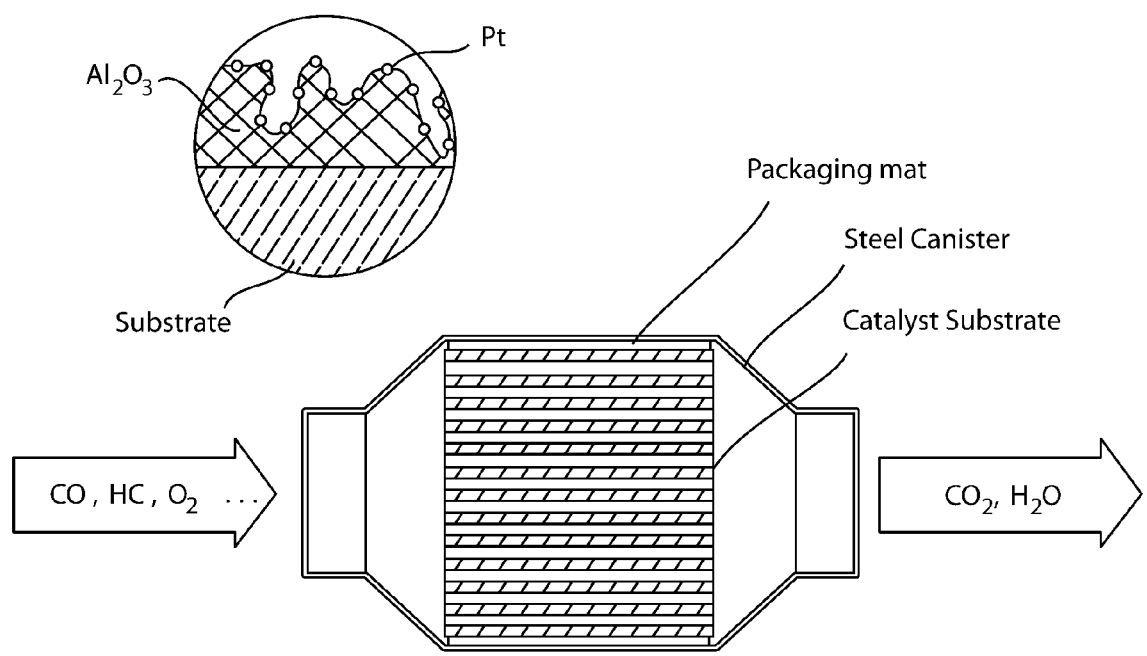
FIG. 4b shows a schematic diagram of a catalytic converter.

Temperature Behavior. For intumescent mats, the mat pressure depends upon achieving sufficient temperature to activate the vermiculite. An inlet temperature of at least 500° C. is required for vermiculite activation; higher inlet temperatures may be needed, depending on heat transfer conditions in the particular system. In gasoline applications, the mat is activated on the vehicle during the initial hours of engine operation. Oven-treatment of catalytic converters may be required in diesel applications, where the exhaust gas temperature may never reach sufficient levels during regular vehicle operation. Vermiculite expansion is in part reversible, causing the mat to expand as temperatures increase and contract when the converter is cooled down. This property of vermiculite more than compensates for the expansion of converter shell, producing very high mounting pressures at higher temperatures. In contrast, non-intumescent mats show approximately constant mounting pressure across the temperature range. The slight decrease of the pressure with increasing temperature visible in FIG. 4 can be attributed to gap expansion due to the thermal expansion of the converter shell. At temperatures above 500° C., intumescent mats provide higher holding pressures than non-intumescent mats. However, at temperatures below 500° C., the mounting pressure from intumescent mats is actually much less than that from non-intumescent mat. Therefore, non-intumescent mats are the preferred mounting material in many diesel applications where the converter inlet temperature remains below 500° C. Intumescent mats of reduced vermiculite content produce mounting pressures between the conventional intumescent mats and non-intumescent mats. Hybrid mats show pressure levels similar to non-intumescent mats, but they maintain a certain pressure boost at high temperature, which counteracts the gap expansion.

Gap Expansion. When the converter is exposed to high temperature, the gap thickness increases due to the differences in thermal expansion coefficients between the substrate and the shell. The thermal expansion of the gap can be a significant source of mounting pressure loss. The gap expansion is especially critical in applications where non-intumescent mats are used, as it cannot be compensated by vermiculite expansion. As a design guideline, the gap expansion should be kept below 10% (Olson, J. R., 2004, "Diesel Emission Control Devices—Design Factors Affecting Mounting Mat Selection," SAE 2004-01-1420).

Gap expansion depends on the following design factors:

Substrate diameter: larger substrates result in higher percentage gap expansion. Therefore, gap expansion can be still a problem in heavy-duty diesel applications, despite the relatively low converter temperature.

Gap thickness: thicker gaps result in less gap expansion.

Shell temperature: higher temperatures produce more gap expansion.

Shell material CTE: steels of higher thermal expansion coefficients produce higher gap expansion. Therefore, the gap expansion is easier to control using ferritic (as opposed to austenitic) steel grades.

Mat Aging. Once the converter is put in service, the intumescent mat expands, causing an increase of mounting pressure. A number of other aging factors are responsible for gradual irreversible loss of mounting pressure, as follows: thermal cycling; vibration acceleration and other mechanical factors; soaking of the mat by water (condensate, vehicle washing); and organic binder burn-out when the mat is first heated.

Advantages and Disadvantages of Current Mats

Conventional applications utilize intumescent and non-intumescent fibrous mats for mounting a honeycomb substrate in canisters, as exemplified in European Patent Application No. EP0884459 to Locker and European Patent Specification No. EP0912820 to Hwang. In accordance with one conventional system, the fibrous mat only allows for mounting a larger catalyst member in a canister.

Intumescent Mats

Intumescent mats were originally developed for gasoline converters. By the early 1990's, they became the most common type of ceramic mat used in catalytic converters for all internal combustion engine applications, including diesel. Intumescent mats have the property of partly irreversible expansion once exposed to high temperatures. Thermal expansion curves for the mats are available from several manufacturers including 3M and Unifrax. Once expanded, they increase the holding pressure on the substrate providing a very secure mounting system. Because of their temperature expansion characteristics, intumescent mats can actually increase their mounting pressures at high temperatures, compensating for the mounting pressure loss due to the thermal expansion of the steel housing.

Intumescent mats are made of alumina-silica ceramic fibers and contain vermiculite, which provides their thermal expansion. Typical compositions have 30-50% of alumina-silica fibers, 40-60% of vermiculite, and 4-9% of an organic binder (typically acrylic latex). After the converter is assembled, the mat has to be exposed to temperatures on the order of about 500° C. to achieve the initial expansion, which is usually achieved on the vehicle during the initial hours of engine operation. The organic mat binder, which decomposes at high temperatures, is responsible for the characteristic odor emitted when the mat is first heated.

The vermiculite component imposes relatively low maximum operating temperature limits for intumescent mats. The mats lose their holding pressure dramatically at temperatures of about 750° C. That temperature is usually defined as the average mat temperature. Therefore, mats can be used at higher exhaust temperatures provided there is a temperature gradient across the mat due to heat losses from the outside converter shell. The use of intumescent mats is limited in hot isothermal applications where no heat loss occurs through the converter wall. Such situations include catalysts mounted inside mufflers, e.g., for motorcycle applications.

High content of the vermiculite component is also responsible for high mounting pressures, especially at higher exhaust temperatures. The pressure from intumescent mats was found to be excessive for ultra-thin wall substrates, resulting in possible damage to the parts. For these applications, mat manufacturers introduced reduced vermiculite intumescent mats (sometimes referred to as "advanced" or "2nd generation" intumescent mats), which provide less mounting pressure than the conventional design.

Non-intumescent Mats

Non-intumescent mats do not contain vermiculite. Therefore, they can provide much higher temperature limits of about 1250° C. The main component of non-intumescent mats is alumina fiber, with addition of organic binders. In certain embodiments of the present invention, the catalytic converter or particulate filter comprises a substrate as described herein and a non-intumescent mats may be better with fibrous materials.

The substrate support relies on built-in compression or fiber "spring," which supplies constant holding pressure across the application temperature range. Since the converter shell expands with temperature, a decrease of the effective converter mounting pressure is observed at higher temperatures. Therefore, the non-intumescent mats, quite opposite to vermiculite mats, hold the catalyst substrate most securely at low temperatures. As the temperature increases, the substrate inside the converter is held with decreasing force.

Non-intumescent mats can be used not only in high temperature applications which cannot withstand high mounting pressures (thin wall substrates), but also in low temperature converters, such as those for diesel engines. Since they are not dependant on the vermiculite expansion, they do not require oven treatment in low temperature diesel converters.

Hybrid Mats

An improved catalytic converter or particulate filter of the present invention may further comprise a hybrid mat. Such mats are known in the art. A hybrid mat, in one embodiment, incorporate a two-layered design: a layer of intumescent mat on top of a layer of non-intumescent mat. Their attributes and performance are also in-between, with better low temperature mounting pressure than intumescent mats, but higher high temperature pressure than non-intumescent mats. In a preferred embodiment, the improved diesel particulate filter of the present invention comprises a hybrid mat, for use in both light- and heavy-duty applications.

Wire Mesh

Knitted stainless steel wire mesh may be used instead of mats to package ceramic catalyst substrates. Wire mesh is often considered to exhibit less favorable mounting pressure characteristics than mats, but is still used in some catalytic converters (traditionally, wire mesh had been used by Ford). End seals are always required with wire mesh to prevent bypassing of the substrate by gas.

Auxiliary Heating Source

As another configuration or exemplary embodiment to those previously disclosed, the filter element could include the addition of a series of electric heating rods added to the substrate after the catalyst is applied. Preferably, the heating elements are applied after the catalyst to prevent the curing process from harming any electrical contacts. In one embodiment, the heating elements or rods are placed approximately ¼ inch apart from each edge or any distance that is desired. In certain embodiments, one could also use a wire mesh configuration, or other heating element described herein, that is placed perpendicular to the gas flow direction and installed during the formation of the fiber blank. The electrical contacts could be protected with Nextel fabric or a similar material. The heating elements could be activated before an engine starts as a prewarmer and will remain in operation, either partially or in full operation, until the exhaust temperature exceed the temperatures achieved by auxiliary heating elements.

The use of auxiliary heating source applied to the filter foundation may be useful to increase the temperature inside of the filter foundation and/or to evenly distribute additional heat throughout the filter foundation making it more efficient. The auxiliary heat source may be comprised of resistant electric heating elements. The heating elements may have a rod configuration which can be inserted after filter foundation formation or during the sol-gel process. The filter foundation can have one or more electric heating elements applied and the heating elements can be heated simultaneously, independently, and in a cycled, patterned, or random series. The heating elements could be in the form of a wire mesh configuration which can be inserted during or after the filter foundation formation. The filter can employ the use of a single wire mesh or a plurality of wire mesh heating elements and those heating elements can be heated simultaneously or individually. Additionally, the mesh heating elements can be heated in a cycled, patterned or random series. The heating elements may also utilize rods, spirals or helical configurations inserted during or after formation. The filter foundation may incorporate one or more spiral or helical heating elements which may be heated simultaneously or independently including the use of a cycled, patterned or random series. Finally, the filter foundation may incorporate a combination of any of the heating elements previously described.

In addition to the resistant electrical heating elements described above the auxiliary heat source may also use infrared or microwave heat heating elements. The various heat sources may be implemented inside of the filter foundation itself or may be employed to heat the filter foundation as an exterior heating element. Once again, various heat sources may be applied independently or in combination with any of the other heating elements or sources.

The filter foundation will be encased in a casing with sufficient durability to protect the filter foundation from normal impacts encountered with vehicle transportation. Such a casing may include a common metal casing such as stainless steel, steel or another metal alloy. The material may also be non-metallic including ceramic-based casings. The filter foundation may be encapsulated in insulation or batting prior to being enclosed in the casing. The present invention may also incorporate a heat shield.

The entry and exit tubes of the filter foundation may be coated with an oxidation catalyst. The catalyst may make the radiation process quicker which results in the system as a whole treating the exhaust in a much faster time. The catalysts may be a noble metal catalysts including those which are platinum, palladium, or are rhodium based, as well as others. The catalyst may be applied directly to the filter foundation surface. Application of the catalyst may be sprayed on, applied by dipping the filter foundation into a solution or injected into the filter foundation itself. The use of an oxidation catalyst will promote the ignition of the particulate matter at a lower temperature. In addition, a catalyst can also be used as a supplemental heater within the filter foundation itself.

The exhaust filter system can be integrated with the engine exhaust path including integration inside the exhaust manifold of the engine itself. Because the filter foundation is so durable to heat and vibration it can be placed immediately next to an engine exhaust as it exits the engine block. The unique ability of the filter foundation to withstand high heat and increased vibrational stress allows the placement of the present invention much closer to the engine. The close placement provides advantage over conventional exhaust filters or catalytic converters which cannot withstand such high heat or vibrational stress.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

Specific Embodiments of a Catalytic Converter

The catalytic converter and particulate filter of the present invention are further illustrated by the following nonlimiting specific embodiments. A number of specific embodiments recited herein exemplify but do not necessarily limit the scope of the invention. A catalytic converter of the present invention can be used on any number of engines and vehicles. Thus, in one embodiment, a catalytic converter of the present invention is suitable for use on a vehicle or engine produce by any one of the following companies: Daimler-Chrysler; Chrysler; Dodge; Eagle; Jeep; Plymouth; General Motors; AM General (e.g., HUMMERs); Buick; Cadillac; Chevrolet; Geo; GMC; Hummer; LaSalle; Oldsmobile; Pontiac; Saturn; Ford; Continental; Lincoln; Mercury; Ace Motor Corp; American Motors; Avanti BMW; Daimler-Chrysler; Fiat; Ford; GAZ; General Motors; Honda; Mitsubishi; Renault; Peugeot; Toyota; and Volkswagen Group. Others include Holden; Lightburn; Hartnett; Alpha Sports; Finch; Amuza; Australian Kitcar; FPV; Bavariacars; Birchfield; G-Force; Bomac; Bullet; Homebush; Carbontech; HSV; Classic Glass; Kraftwerkz; Classic Revival; Cobra Craft; Piper; Daktari; PRB; Daytona; Python; Deuce Customs; RCM; Devaux; RMC; DRB; Roaring Forties; Elfin; Robnell; Evans; Austro-Daimler; ÖAF; Puch; Steyr; Steyr-Daimler-Puch; FN; Germain; Miesse; Minerva; Nagant; Vivinus; Gurgel; Puma; A-E; AC; Allard; Alvis; Ariel; Armstrong Siddeley; Ashley; Aston Martin; Austin; Austin-Healey; Bentley; Berkeley; Bond; Bristol; BSA; Caterham; Clan; Daimler; Dellow; De Lorean; Elva; F-L; Fairthorpe; Ford; Frazer Nash; Gilbern; Ginetta; Gordon-Keeble; Hillman; Humber; Jaguar; James and Browne; Jensen; Jowett; Lagonda; Lanchester; Land Rover; Lea-Francis; Lister; Locost; Lotus; M-R; Marcos; McLaren; MG; Morgan; Morris; Mini; Ogle; Panther; Peerless/Warwick; Piper; Range Rover; Reliant; Riley; Rochdale; Rolls-Royce; Rover; S-W; Singer; Standard; Sterling; Sunbeam; Swallow; Talbot; Tornado; Trident; Triumph; Turner; TVR; Vanden Plas; Vauxhall; Wolseley; Bricklin; McLaughlin; Aero; Jawa; Laurin & Klement; Praga; Skoda; Tatra; Walter; Kewet; Elcat; Valmet; RaceAbout; Amilcar; Alpine, aka. Alpine-Renault; Bonnet; Bugatti; CD; CG; Citroën; DB; De Dion-Bouton; Delage; Delahaye; Delaunay-Belleville; Facel Vega; Gordini; Hispano-Suiza; Hotchkiss; Peugeot; Renault; Rosengart; Simca; Sizaire-Naudin; Talbot; Tracta; Venturi; Voisin; A-G; Amphicar; Audi; Auto-Union; BMW; Fendt; Glas; Goggomobil; H-P; Heinkel (Heinkel Trojan); Horch; Käsbohrer-Setra; Kleinschnittger; MAN; Magirus; Maybach; Mercedes-Benz; Merkur; Messerschmitt; Neoplan; NSU; Opel; Porsche; S-W; Smart; Stoewer; Titan; Trabant; Volkswagen (VW); Wartburg; Wanderer; Thomond; Bajaj Tempo; Hindustan; Mahindra; Maruti; Premier; Reva; San Storm; Sipani; Tata; Abarth; Alfa Romeo; Autobianchi; Bugatti Automobili SpA; De Tomaso; Dino; Ferrari; Fiat; Iso; Innocenti; Isotta Fraschini; Itala; Lamborghini; Lancia; Maserati; OM; Piaggio; Qvale; Vespa; Zust; Daihatsu; Honda (also Acura); Isuzu; Mazda; Mitsubishi; Mitsuoka; Nissan aka. Datsun (also Infiniti); Subaru; Suzuki; Toyota (also Lexus); Proton; ACE; AMI; AMM; Bufori; Inokom; Naza; Perodua; Swedish Assembly; Tan Chong; TD 2000; Donkervoort; Spyker; DAF; Pyonghwa; Tokchon; Kewet; Think aka. Pivco; Troll; Syrena; UMM; Aro; Dacia; Marta; Oltcit; Volga; Moskvitch; GM Daewoo Motors; Hyundai Motor Company; Kia Motors; Renault Samsung Motors; SsangYong Motor Company; Nilsson; Nordic Uhr; S.A.M.; Saab; Scania; Thulin; Tidaholm; Tjorven (sold as Kalmar on the export market); Volvo; and Yugo.

Catalytic or Filtering Muffler

In another embodiment, the present invention is also directed to a catalytic muffler comprising a catalytic or filtering substrate of the present invention. As described herein, the catalytic substrate or filtering substrate is housed together with a muffler in a single cannister.

In one embodiment, the catalytic muffler of the present comprises a catalytic muffler of known design in which the prior art catalytic substrate is replaced with the catalytic substrate of the present invention. Suitable known catalytic mufflers include those disclosed in U.S. Pat. Nos. 6,622,482; 6,604,604; 6,341,662; and 4,457,895.

Exhaust Systems

In another embodiment, the present invention is directed to an exhaust system comprising a catalytic substrate of the present invention. An exhaust system generally comprises a number of components. The exhaust system comprises an engine and a suitable means for directing exhaust gas away from the engine.

The exhaust system comprises an internal combustion engine and a conduit for directing the exhaust gas away from the exhaust ports of the combustion chamber. Other optional components of an exhaust system include an exhaust manifold, a muffler, and an exhaust pipe.

In another embodiment, the present invention is directed to an exhaust system comprising a filtering substrate of the present invention.

In another aspect, the present invention is directed to an improved exhaust system utilizing a catalytic substrate of the present invention. In another aspect, the present invention is directed to an improved exhaust system utilizing a filtering substrate of the present invention.

The exhaust system of the present invention is suitable for use with any one of the following: 1) Mobile On-Road Engines, Equipment, and Vehicles, including cars and light trucks; highway and street motorcycles; heavy-duty highway engines, such as trucks and buses; 2) Mobile Non-Road Engines, Equipment, and Vehicles, including compression-ignition engines (farm, construction, mining, etc.); small spark-ignition engines (lawn mowers, leaf blowers, chainsaws, etc.); large spark-ignition engines (forklifts, generators, etc.); marine diesel engines (commercial ships, recreational diesel, etc.); marine spark-ignition engines (boats, personal watercraft, etc.); recreational vehicles (snowmobiles, dirt bikes, all-terrain vehicles, etc.); locomotives; aviation (aircraft, ground support equipment, etc.); and 3) Stationary Sources, including hundreds of sources, such as power plants, refineries, and manufacturing facilities. In another embodiment, the invention is directed to an exhaust system comprising a substrate, catalytic converter, particulate filter, or catalytic muffler of the present invention.

Other suitable exhaust systems of the present invention include those used in certain marine vehicles. The catalyst is typically positioned in an exhaust pipe leading from the engine. This exhaust pipe that leads through a chamber in the hull of the craft to an outlet near the stern. This arrangement causes the exhaust pipe to be susceptible to vibration, especially with prior art substrates. In addition, in personal watercraft the amount of space in which the engine may be positioned is limited so as to maintain the craft small in dimension and with a low center of gravity. Moreover, certain prior art substrates such as cordierite should not be placed too close to the engine (overheating and melting is possible). A marine vehicle exhaust system comprising a catalytic converter or particulate filter of the present invention may overcome one or more of these problems. The catalytic converter or particulate filter may be positioned in the marine exhaust system at the same place the traditional converter or filter is positioned, or it may be placed in another position. For example, in certain embodiments, the catalytic converter is smaller than a prior art catalytic converter but has substantially the same efficiency in removing and/or filtering pollutants. See for example U.S. Pat. No. 5,983,631 (Yamaha Hatsudoki Kabushiki Kaisha).

In other embodiments, the exhaust system of the present invention comprises one or more additional aftertreatment devices or methods that are used to reduce or limit the pollutants that are emitted from an exhaust system. Suitable devices and methods include CRT, EGR, SCR, ACERT, and the like. For example, in one embodiment, the exhaust system comprises a catalytic converter of the present invention and a CRT. The exhaust system may further comprise an SCR system. Additional combinations and variations are possible and are understood to be within the scope of the invention.

In another embodiment, the present invention is directed to an exhaust system comprising a NOx adsorber having a catalytic substrate comprising a nSiRF-C composite and a catalyst. The main-cat is located partially or totally within the head of an engine. In one embodiment, the main-cat comprises a catalytic substrate of the present invention, wherein said substrate has a density of about 12 lb/ft$^3$, has a porosity of about 97%, has a low thermal expansion, has a high structural integrity, has low heat conductance. In a preferred embodiment, the main-cat comprises about 600 cpsi and having a wall thickness of about 6 miles. The main-cat in this embodiment has wall-flow configuration. In a preferred embodiment, the main-cat has a channel. In a preferred embodiment, the channels of the catalytic substrate of the main-cat are made using the comb method. Additionally, in this embodiment, the catalytic substrate comprises an optional washcoat. In this embodiment, the main-cat is capable of catalyzing both oxidation and reduction of pollutants, e.g., it has a catalyst capable of oxidizing pollutants and it has a catalyst capable of reducing pollutants. In a preferred embodiment, the NOx combination exhaust system comprises an intumescent matting. The main-cat can be used in all internal combustion engines. The NOx combination system is preferably used without fuel-borne catalysts. Generally, the $NO_x$ combination exhaust system has the substrate located near the muffler, although other locations are possible.

Vehicles

In another embodiment, the present invention is directed to an improved vehicle, said improvement comprising a catalytic converter or a particulate filter according to the present invention. The improved vehicle includes in various embodiments, any of the specific embodiments of catalytic converters and particulate filters described herein.

Suitable exemplary improved vehicles include vehicles made by one or more of the following companies: DaimlerChrysler; Chrysler; Dodge; Eagle; Jeep; Plymouth; General Motors; AM General (e.g., HUMMERs); Buick; Cadillac; Chevrolet; Geo; GMC; Hummer; LaSalle; Oldsmobile; Pontiac; Saturn; Ford; Continental; Lincoln; Mercury; Ace Motor Corp; American Motors; Avanti BMW; Daimler-Chrysler; Fiat; Ford; GAZ; General Motors; Honda; Mitsubishi; Renault; Peugeot; Toyota; Volkswagen Group; and Yugo.

EXAMPLES

Example 1

Figure 19:
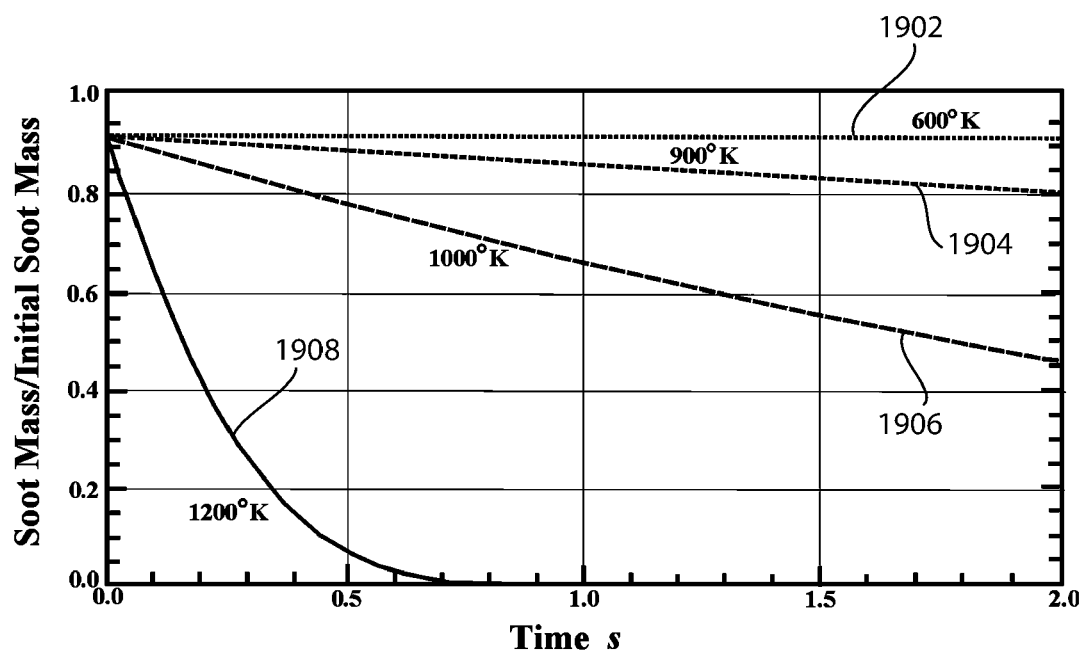
FIG. 19 is a graphical display of the residence time required to burn particulate matter at varying temperatures. It provides the residence time required to combust or burn particulate matter (soot mass) at various temperatures. As seen, the residence time to combust or burn soot mass having an initial 0.9 soot mass at 600 Kelvin is much longer than the residence time at 1200 Kelvin.
Figure 20:
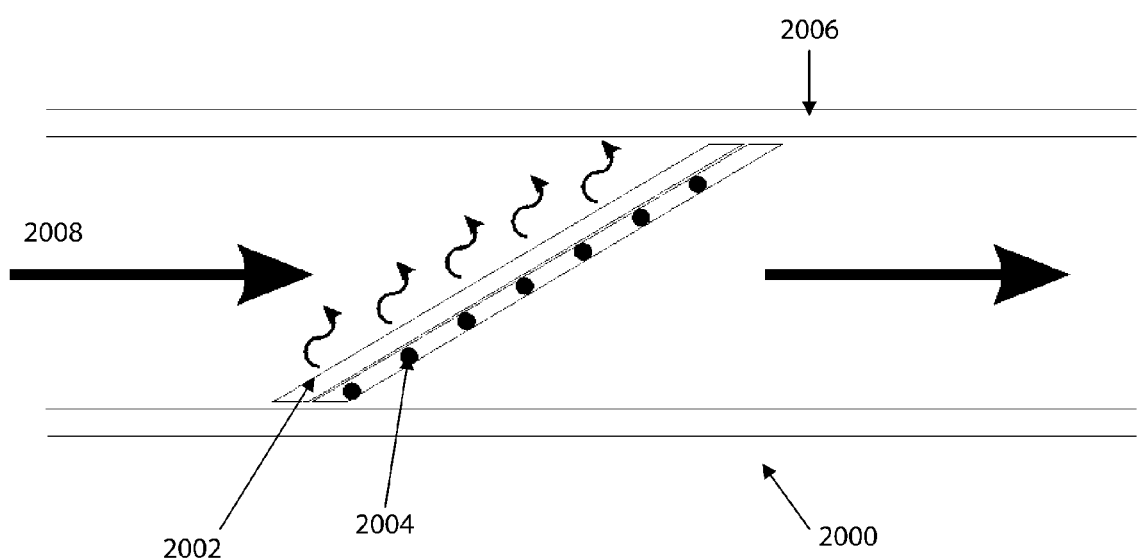
FIG. 20 provides an exhaust substrate system 2000 including a substrate 2002 combined with a wire mesh heating element 2004. The substrate 2002 and wire mesh heating element 2004 are inserted into the exhaust casing 2006 at an angle compared to the exhaust flow. Since the wire mesh heating element 2004 is placed behind and below the substrate 2002 as a result of the angle, the substrate 2002 can be heated more efficiently and uniformly taking advantage of the known principal that heat rises. As previously discussed, more uniform and efficient heating enables the substrate 2002 to more completely combust or flash off the particulates resulting in cleaner exhaust.
Figure 21:
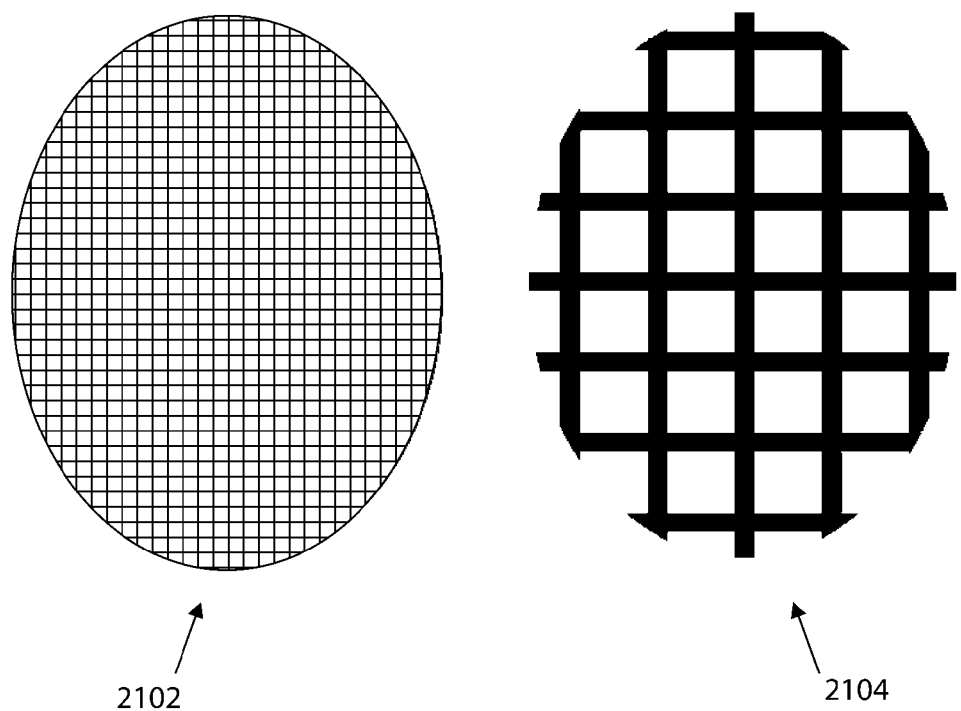
FIG. 21 is a diagram of a frontal view of the filter element 2102 and wire mesh heating element 2104 described and discussed in relation to FIG. 9. As can be seen the filter element 2102 and wire mesh heating element 2104 are oval shaped so as to fit in the casing at an angle. The shape of the casing, shape of the filter element 2102, type of heating element 2104 and angle can all be modified to fit the requirements and restrictions of the intended exhaust system application.

Residence time, or burn off time, is the amount of time for hydrocarbons from the exhaust emissions to abide within the emission filter to complete combustion or oxidation. The residence time of the present invention is calculated to be significantly better than conventional systems. FIG. 19 provides a graph of the residence times 1902, 1904, 1906, 1908 required to combust or burn soot at temperatures 600 Kelvin, 900 Kelvin, 1000 Kelvin, and 1200 Kelvin, respectively. The more kinetic energy possessed by particles, the higher likelihood of a successful reaction. As shown in FIG. 19, the residence time 1902 to combust or burn soot having 0.9 soot mass at 600 degrees Kelvin is much longer than the residence time 1908 at 1200 degrees Kelvin. The longer the residence time, the smaller the allowable through-put volumes and the greater the risk of more particulate accumulating on and clogging the filter pores. Clogging can also be a result of the ceramic material overheating to the point of melting, thereby blocking or clogging the pores. Residence time values 1902, 1904, 1906 are indicative of cordierite samples. Residence times 1902, 1904, 1906 range from about two minutes to twenty hours to complete combustion.

Example 2

Substrates

Substrates 1-7 were prepared as described herein. AETB-12 was purchased from COI Ceramics and used as the nSiRF-C material of choice with a density of 12 lbs/ft$^3$. The substrate/filter was machined from AETB-12 billets measuring 8×8×4 using standard carbide drill bits tipped machining methods described in this patent. The substrate was machined in a cylindrical shape with the following dimensions: radius of 2 inches, longitudinal length of 1 inch.

Flow-through, wall-flow and mixed flow-through/wall-flow channels were drilled into the substrate using standard CNC drilling methods described in this patent and known in the art. A 0.042" diameter stainless steel drill bit was used at 10,000 RPM to drill the channels. During the drilling process, it was observed that due to the high thermal emissivity and conductivity of the material, the drill bit was exposed to high temperature environments that led to damage and eventual melting of the drill-bits. Wall thickness was not measured.

Substrates 1 and 2 had a flow through configuration. Substrates 3-6 had a wall flow configuration. Substrate 3 had about 25% of the channels as flow through and about 75% as wall flow. Substrate 4 had about 50% of the channels as flow through and about 50% as wall flow. Substrate 5 and 6 had about 75% of the channels as flow through and about 25% as wall flow.

Some of the substrates were coated with an alumina washcoat, followed by a 5:1 Pt:Rh ratio catalyst coating. Specifically, Substrates 1, 2, and 7 were not coated with any chemical. Substrates 3, 4, 5, and 6 were given a uniform washcoating utilizing standard techniques known in the prior art. The mass of washcoat applied to each substrate is given in the column titled Mass of Washcoat. Following the washcoating, a catalyst mixture comprising 5:1 Pt/Rh was applied to the substrates 3, 4, 5, and 6 using standard methods. The mass of catalyst mixture applied to each substrate/filter is given in the column titled Mass of Catalyst (g/ft$^3$). The substrates with washcoat and precious metal catalyst loadings were canned using techniques known in the prior art.

indicative that the nSiRF-C substrates/filters do not generate high back-pressure in the wall-flow configuration.

Example 4

Preparation of Catalytic and Filtering Substrates

Substrates/Filters were prepared exactly as described in Example 2 unless mentioned explicitly.

In a marked difference from the substrates in Example 1, three different substrates were generated using AETB-11, AETB-12, and AETB-16 billets purchased from COI Ceramics with densities of 11, 12, and 16 lbs/ft$^3$ respectively.

For the substrate/filter created from AETB-11, the final depth of ¾ inches into the 1 inch slug the comb assembly was removed from the CNC and the opposite (mirror image) comb assembly was mounted onto the CNC punch and the same process for pecking method of broaching was employed. The end result this machining methodology is a 600 cpsi with 6 mil walls and ½ inch wall flow overlap. For the substrates/

| Substrate Number | Weigh of Dry Substrate (grams) | WET washcoat GMS | WET washcoat NET | Estimated amount of washcoat g/in3 | FIRED (grams) | Mass of Washcoat (G/IN3) | H2O ABS. WET WT. (GMS) | H2O ABS. H2O ABS (GMS/IN3) | WET (GMS) | Mass of Catalyst (grams) |
|---|---|---|---|---|---|---|---|---|---|---|
| 1 | 29.0 | 178.5 | 149.4 | 2.91 | 63.0 | 2.71 | | | — | — |
| 2 | 28.9 | 182.0 | 153.1 | 2.99 | 65.3 | 2.90 | | | | |
| 3 | 30.0 | 158.0 | 128.0 | 2.50 | 61.0 | 2.50 | 167.4 | 8.47 | 164.9 | 24.3 Pt 4.8 Rh |
| 4 | 30.4 | 163.3 | 132.9 | 2.59 | 61.9 | 2.51 | 168.4 | 8.50 | 155.1 | 21.8 Pt 4.4 Rh |
| 5 | 30.3 | 165.7 | 135.4 | 2.64 | 62.0 | 2.52 | 169.8 | 8.58 | 170.4 | 25.3 Pt 5.1 Rh |
| 6 | 30.9 | 184.6 | 153.7 | 3.00 | 67.3 | 2.90 | | | 202.5 | 31.6 Pt 6.3 Rh |
| | | | | | | | Ave = 8.52 | | | Ave = 30.9 |
| | | | | | | | S/D = 0.23 | | | S/D = 5.0 |
| | | | | | | | N = 3 | | | N = 4 |
| 7 | 24.3 | 105.1 | 80.8 | 2.47 | 44.6 | 2.54 | | | 99.7 | 20.2 Pt 4.0 Rh |

Example 3

Preparation of Catalytic and Filtering Substrates

Substrates/Filters were prepared exactly as described in Example 2 unless mentioned explicitly.

Figure 28:
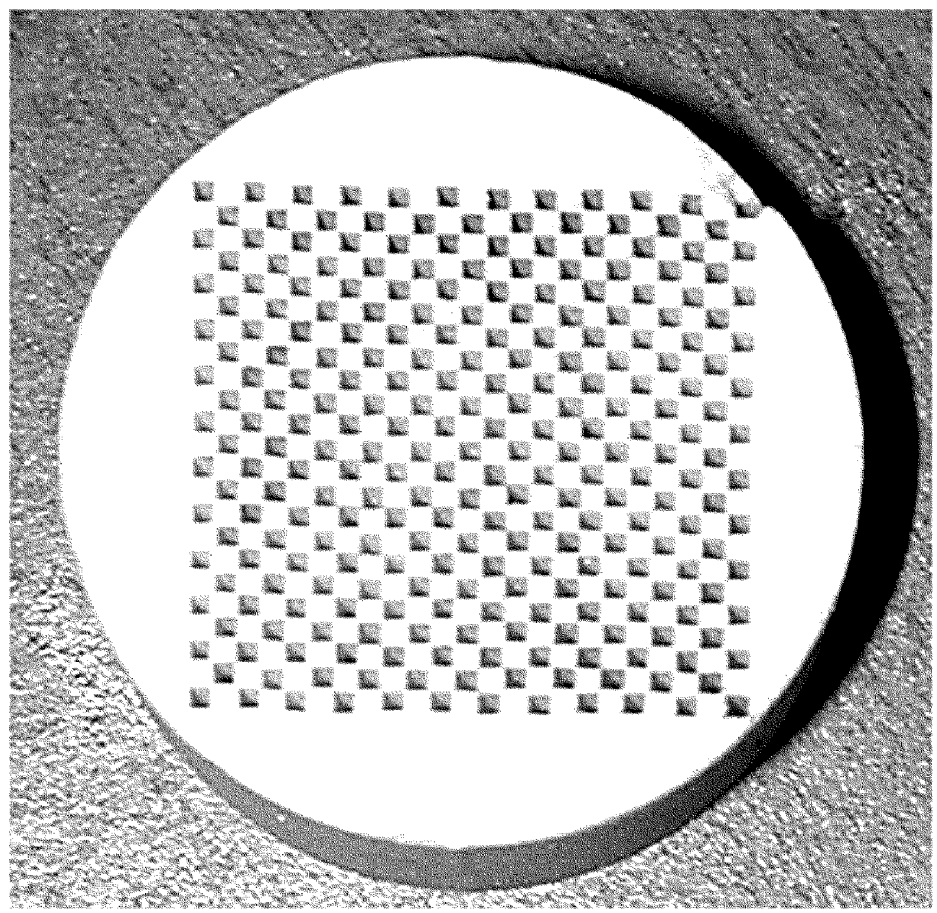
FIG. 28 is a photograph of a substrate/filter in a wall flow configuration made according to an embodiment of the present invention, with the following attributes: 1 inch diameter by 1 inch thickness, the channel pattern covered 0.8 inch by 0.8 inch.
Figure 29:
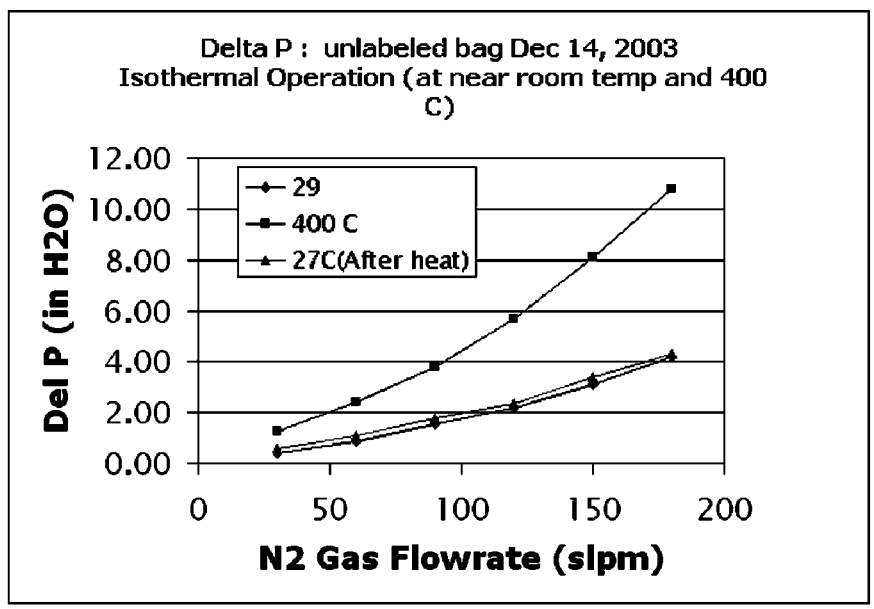
FIG. 29 is a graph that illustrates the drop in pressure measured in a reactor-tube flow-measurement system as a function of gas flow rate for temperatures of 27° C., 29° C. and 400° C. for an embodiment of the present invention.
Figure 30:
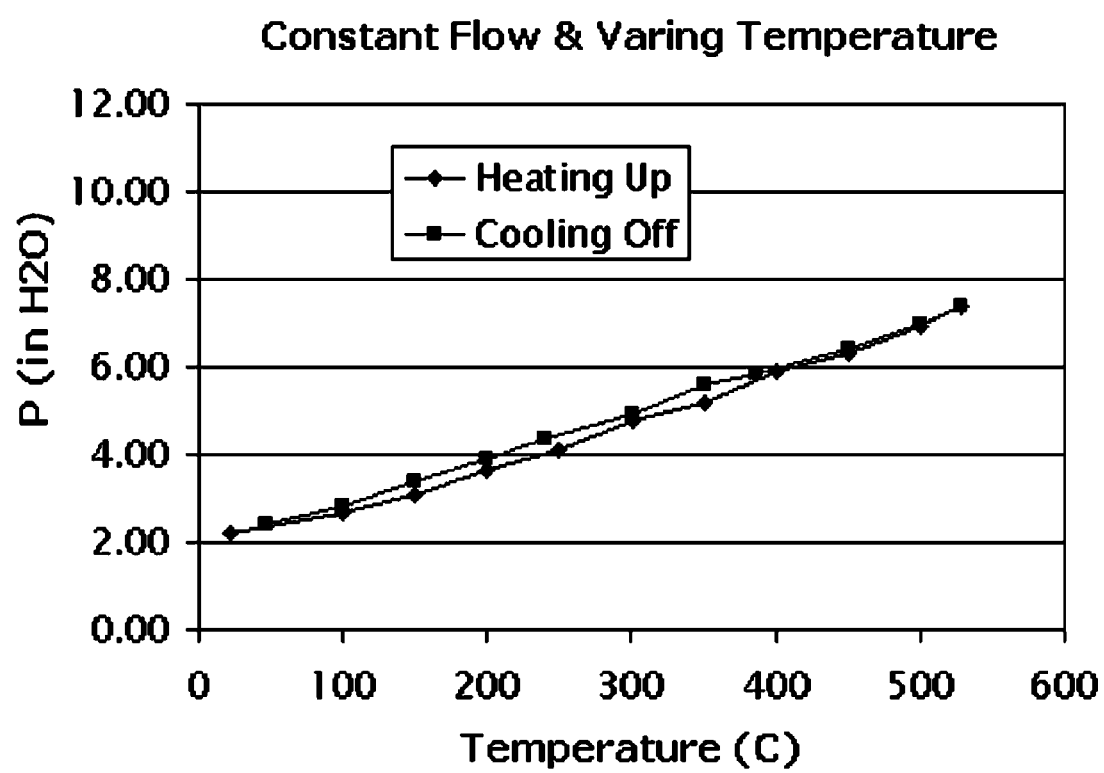
FIG. 30 is a graph that illustrates the drop in pressure measured in a reactor-tube flow measurement system as a function of temperature at a constant flow rate of 125 SLPM for an embodiment of the present invention.

In a marked difference from the substrate/filters in Example 1, the final depth of ¾ inches into the 1 inch slug the comb assembly was removed from the CNC and the opposite (mirror image) comb assembly was mounted onto the CNC punch and the same process for pecking method of broaching was employed. The end result this machining methodology is a 600 cpsi with 6 mil walls and ½ inch wall flow overlap. As shown in FIG. 28, the dimensions of the substrate/filter in wall-flow configuration were 1" diameter by 1" thickness and the pattern inside that slug was 0.8" by 0.8" square. This substrate was used to conduct an early-stage successful Delta P-test to observe the drop in pressure observed in a N$_2$ gas flow due to the obstruction in flow caused by wall-flow configuration. FIG. 29 demonstrates the drop in pressure measured in a reactor-tube flow-measurement system as a function of gas flow rate for temperatures of 27° C., 29° C. and 400° C. FIG. 30 demonstrates the drop in pressure measured in the same reactor as a function of temperature at a constant flow rate of 125 SLPM. These initial results were positive and filters created from AETB-12 and AETB-16, the final depth of ⅞ inches into the 1 inch slug the comb assembly was removed from the CNC and the opposite (mirror image) comb assembly was mounted onto the CNC punch and the same process for pecking method of broaching was employed. The end result this machining methodology is a 600 cpsi with 6 mil walls and ¾ inch wall flow overlap.

Figure 31:
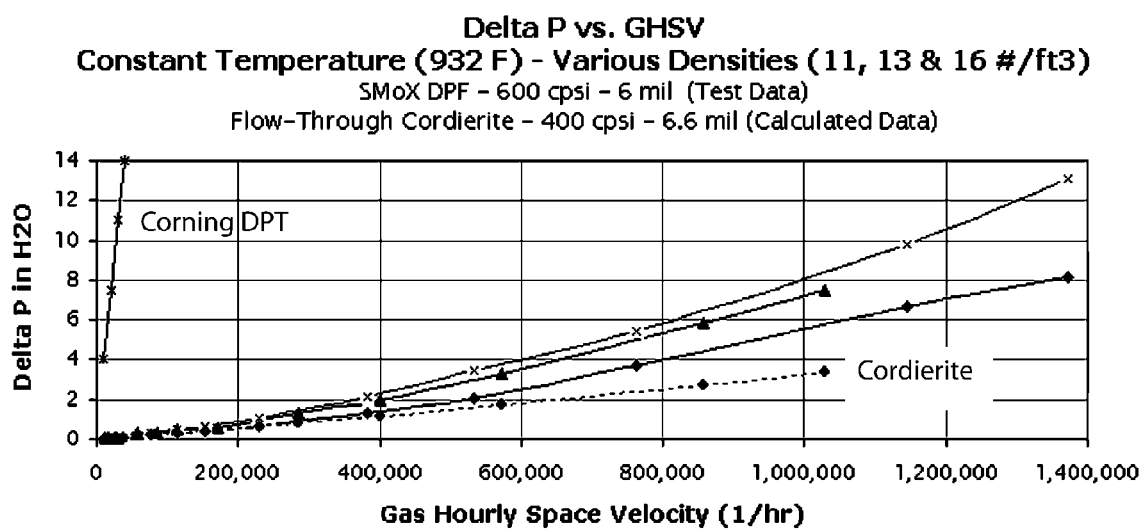
FIG. 31 is a graph that illustrates a the observed pressure drop for various substrates material density and wall-flow configuration as a function of space hourly velocity. This particular test was conducted at 932° F. temperature.

The dimensions of the all substrates/filters tested in this stage were 1" diameter by 1" thickness. The substrates were exposed to another early-stage Delta P-test to observe the drop in pressure observed for substrates material density and wall-flow configuration as a function of space hourly velocity. This particular test was conducted at 932 Fahrenheit temperature. The results of our tests are summarized in FIG. 31. In addition to the data observed for our AETB-11, AETB-12 and AETB-16 substrates/filters, the results reported by Corning for their 400/6.6 flow-through cordierite substrates/filters and 200/12 cordierite DPT (wall-flow configuration). Corning data was obtained through Corning Technical Reports. Our results indicate that while Corning DPT in wall flow configuration causes excessive backpressure compared to cordierite flowthrough filter, our nSiRF-C filters generate back-pressure equivalent to the cordierite flow-through substrate even when they are used in a wall-flow configuration. It can be inferred that since backpressure had been a big problem in wall-flow DPTs, as observed in FIG. 31, using wall-flow DPTs made of nSiRF-C materials, as invented in this patent, leads to an excellent alternative. Additionally it is also observed that a comparison of back-pressures observed with AETB-11 substrate/filter versus the AETB-12 and AETB-16 substrates/filters allows us to infer that increasing the 'overlap' channel length leads to better back-pressure performance.

Figure 32:
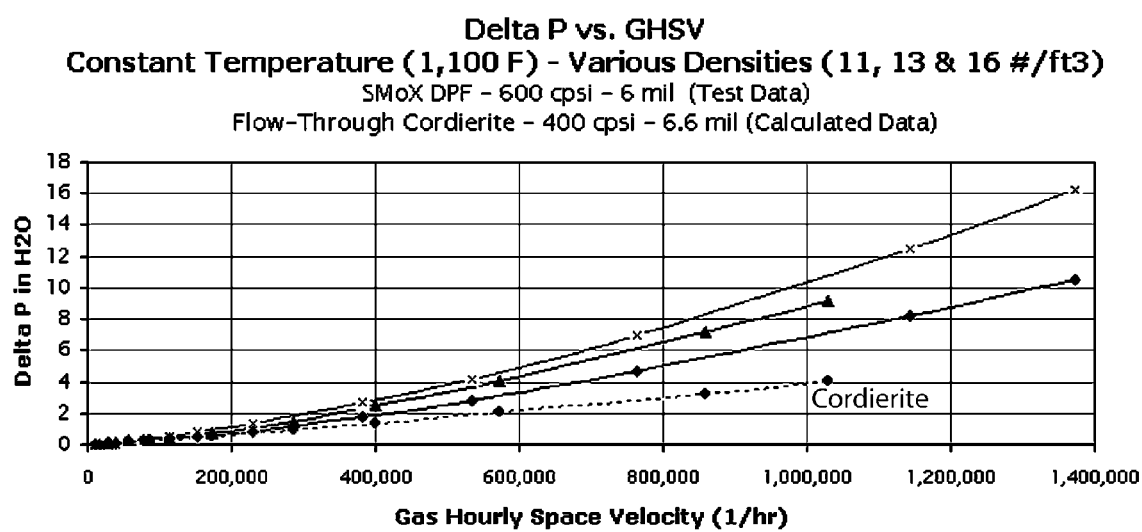
FIG. 32 is a graph that illustrates a the observed pressure drop for various substrates material density and wall-flow configuration as a function of space hourly velocity. This particular test was conducted at 1100 Fahrenheit temperature.

FIG. 32 is the same test performed at an operating temperature of 1100 Farenheit and the trends in results are almost identical.

Example 5

Preparation of Catalytic and Filtering Substrates

Substrates/filters were prepared as described in Example 2 unless mentioned explicitly.

AETB-12 was purchased from COI Ceramics and used as the nSiRF-C material of choice with a density of 12 lbs/ft$^3$. A laser-based channel drilling technique was tested to generate holes at 3000 cpsi and 30000 cpsi. The holes were drilled using a DPSS laser system as describe din this patent and in related prior art elsewhere. The holes generated using a pulsed, high-energy laser system were square in shape and due to the particular configuration, presented a high frontal surface area. The presence of a high frontal surface area (caused by a large value for wall thickness of channels) was obvious in the Delta-P tests carried out using the same test-flow reactor as described in Example 3. It was observed that for the early-stage prototype created using laser-based drilling techniques to be a success, the Delta back-pressure had to be brought to a value less than 10 inches of water. Further modifications can be done to decrease (or increase) the cell density and to alter the wall thickness as prescribed by the need of the application.

Figure 33:
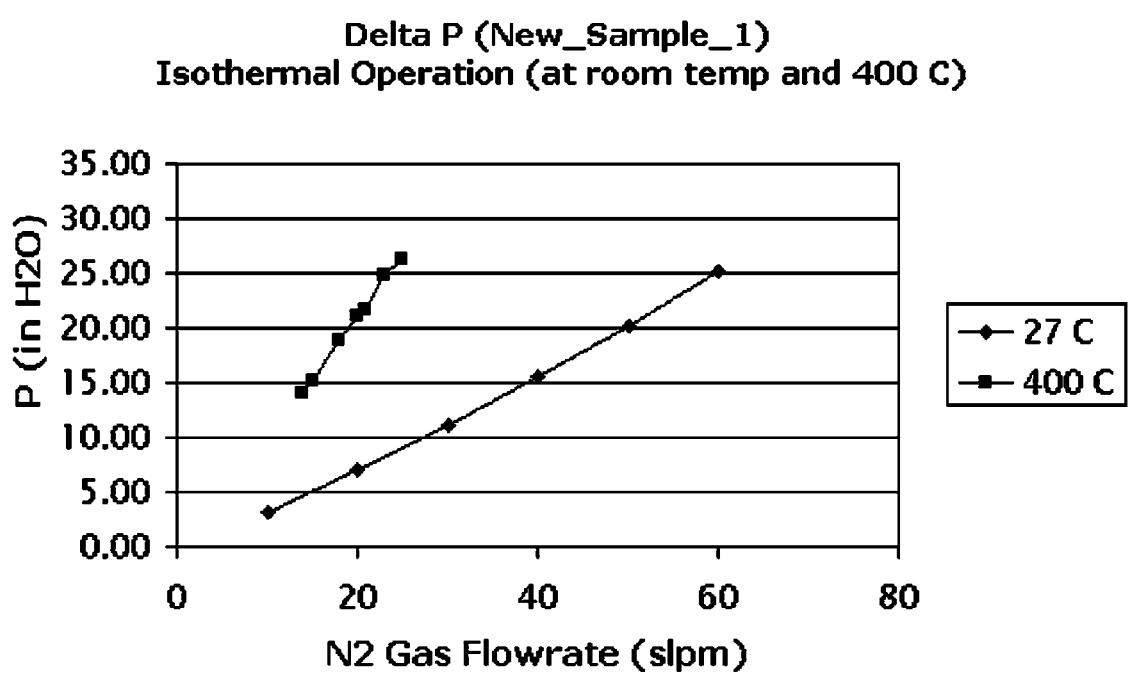
FIG. 33 is a graph that illustrates the change in pressure as a function of $N_2$ gas flowrate for the AETB-12 substrate/filter at 27° C. and 400° C.
Figure 34:
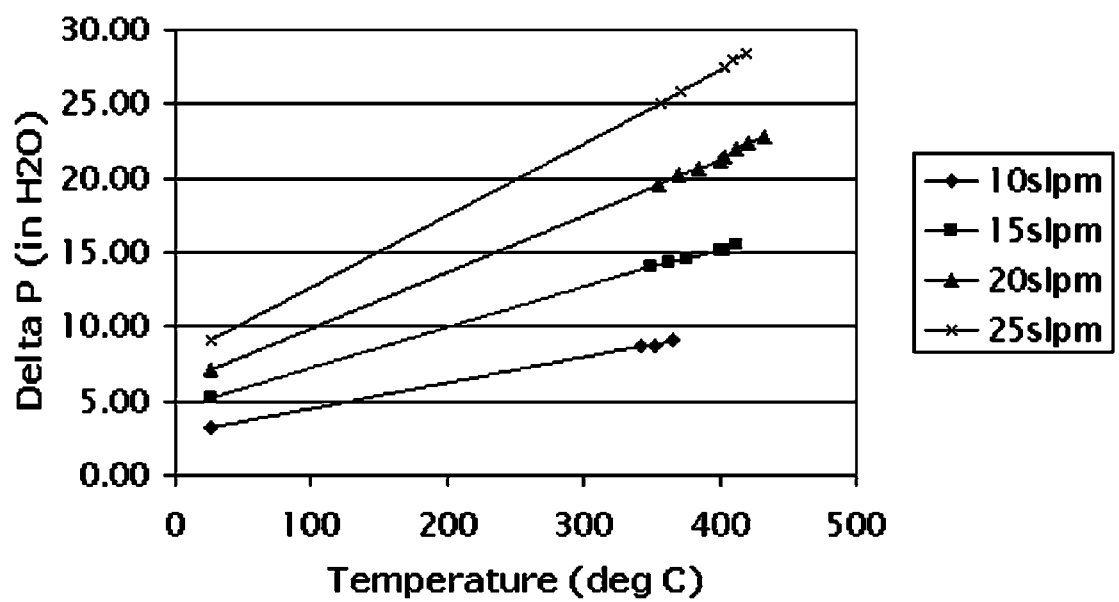
FIG. 34 is a graph that illustrates the change in pressure as a function of operating temperature for various $N_2$ gas flowrates for AETB-12 substrate/filter.

FIG. 33 shows the change in pressure as a function of N2 gas flow-rate for the AETB-12 substrate/filter with 30000 cpsi cell density at 27° C. and 400° C. FIG. 34 shows the change in pressure as a function of operating temperature for various $N_2$ gas flow-rates for AETB-12 substrate/filter with 30000 cpsi cell density.

Figure 35:
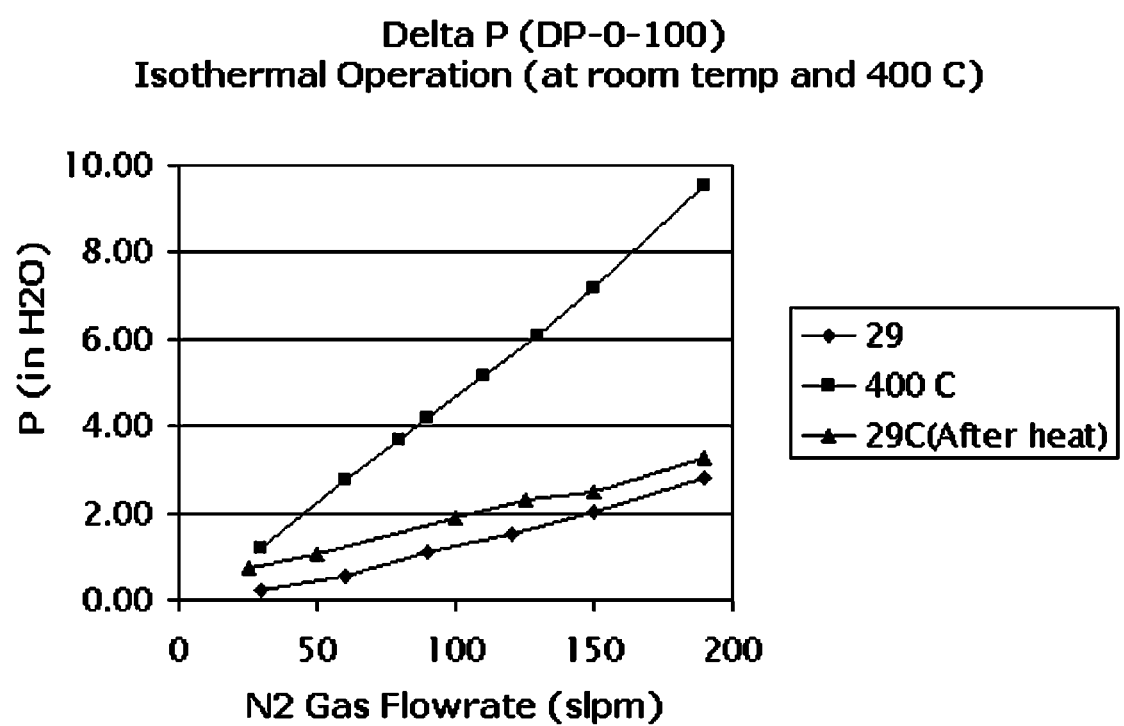
FIG. 35 is a graph that illustrates the change in pressure as a function of $N_2$ gas flowrate for the AETB-12 substrate/filter at 29° C. and 400° C.

FIG. 35 shows the change in pressure as a function of $N_2$ gas flow-rate for the AETB-12 substrate/filter with 3000 cpsi cell density at 29° C. and 400° C.

Example 6

Diesel Particulate Filter

The substrate is created using the AETB formulation and formed into a billet having the dimensions of about 13 inches×about 13 inches×about 5 inches with a density of about between 8 pounds per cubic foot. From the billet, a five inch tall cylinder slug which is about six inches in diameter is cut from the billet using a diamond tipped saw. This substrate is further machined to exact tolerances (within 0.001 inches) on a spinning lathe.

Then a plurality of channels are formed in the substrate to form a substrate containing 600 channels per square inch and having a wall flow configuration. The channels are formed using the combined drilling and comb techniques described herein. The channels are square shape having a dimension of about 6 mils by 6 mils. The adjacent walls of adjacent channels are substantially parallel to each other. The channels do not extend through the entire length of the substrate but are approximately 4.9 inches in length.

Example 7

Measurement of Gross Surface Area

The first and second cordierite samples have a gross surface area of 33.2 and 46.97 square inches per cubic inch, respectively. Thus, in a one inch cube of the first cordierite sample, there is 33.20 square inches of surface to put the precious metal loadings. A sample of a substrate of the present invention has a gross surface area of 83.58 square inches per cubic inch.

The gross wall volumes for both the first and second cordierite samples are 0.311 in$^3$/in$^3$ (cubic inches per cubic inch). The gross wall volume of the substrate of the present invention is 0.272 cubic inches per cubic inch. While this value is less than the first and second cordierite samples, the present invention has a much higher porosity and permeability, making the smaller gross wall volume more efficient.

Example 8

Activity Test

Figure 24:
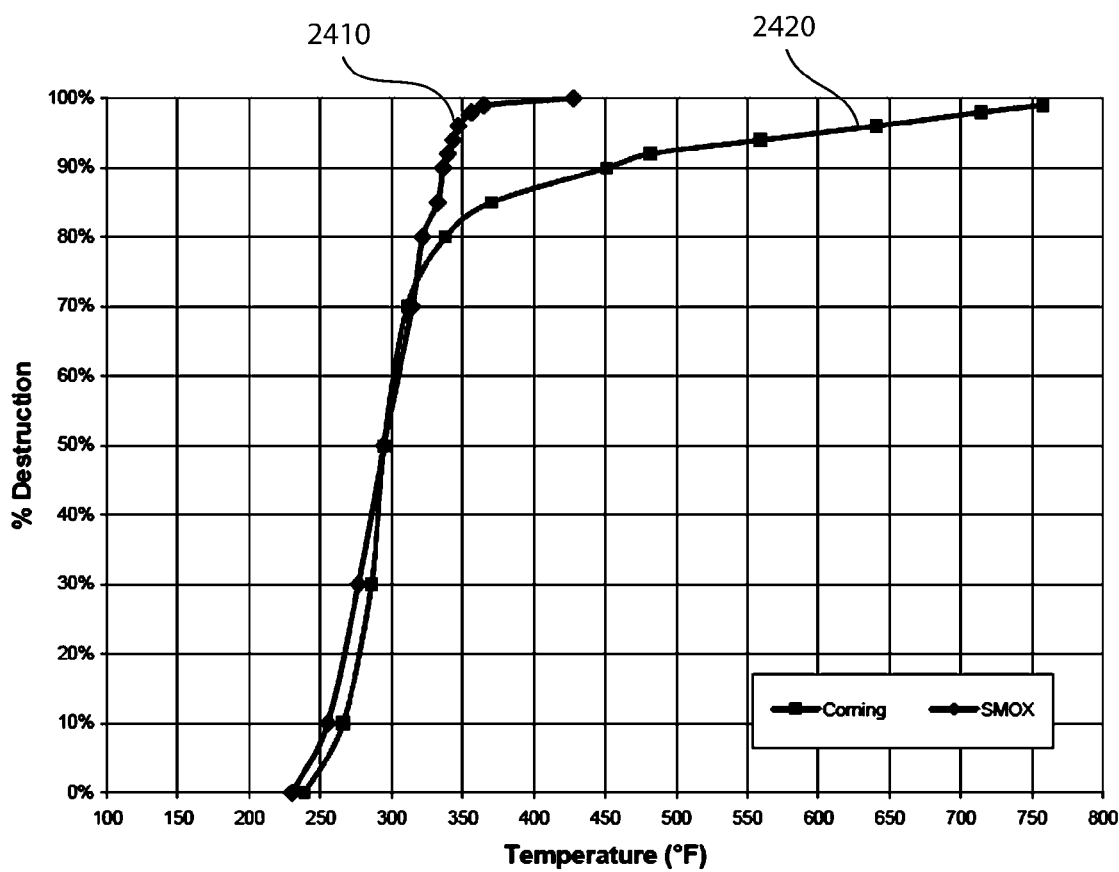
FIG. 24 is a graph showing the % destruction versus temperature. A substrate of the present invention 2410 shows a greater percentage of destruction of material at lower temperatures than a cordierite substrate 2420.
Figure 25:
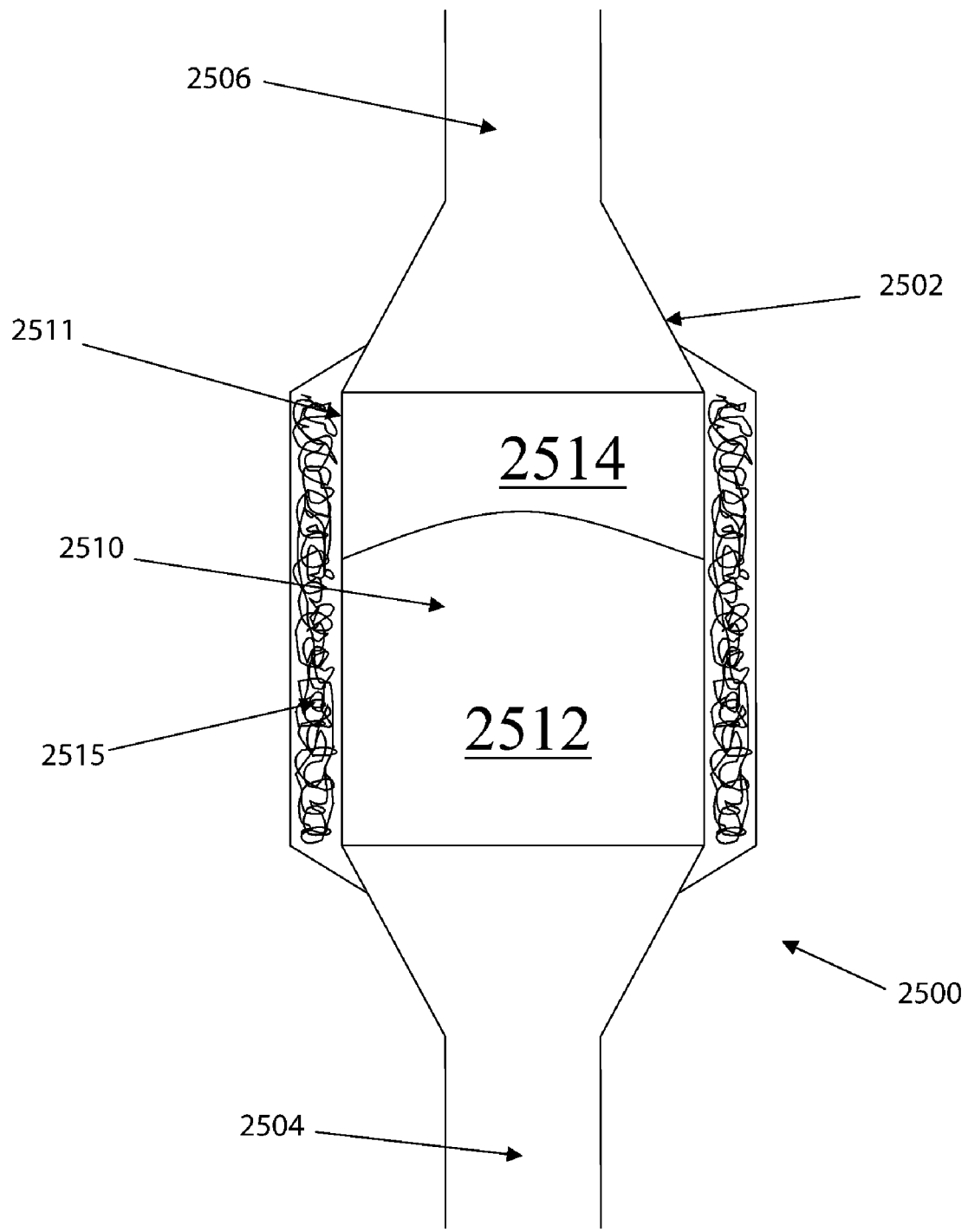
FIG. 25 is a diagram of a cross sectional view of an embodiment of an improved catalytic converter of the present invention. In this embodiment, the catalytic converter comprises a durable and heat resistant casing 2502. The casing 2502 has an intake 2504 and an exhaust port 2506. The improved substrate 2510 has one or a plurality of zones 2512, 2514. The improved substrate 2510 is wrapped or enclosed in one or more layers of matting/insulation 2515. The matting layer 2515 may be applied to the filter foundation 2510 to shield the foundation 2510 from engine and mobile environment vibrational shock as well as to insulate the exterior environment from internal thermal temperatures of the filter foundation 2510.
Figure 26:
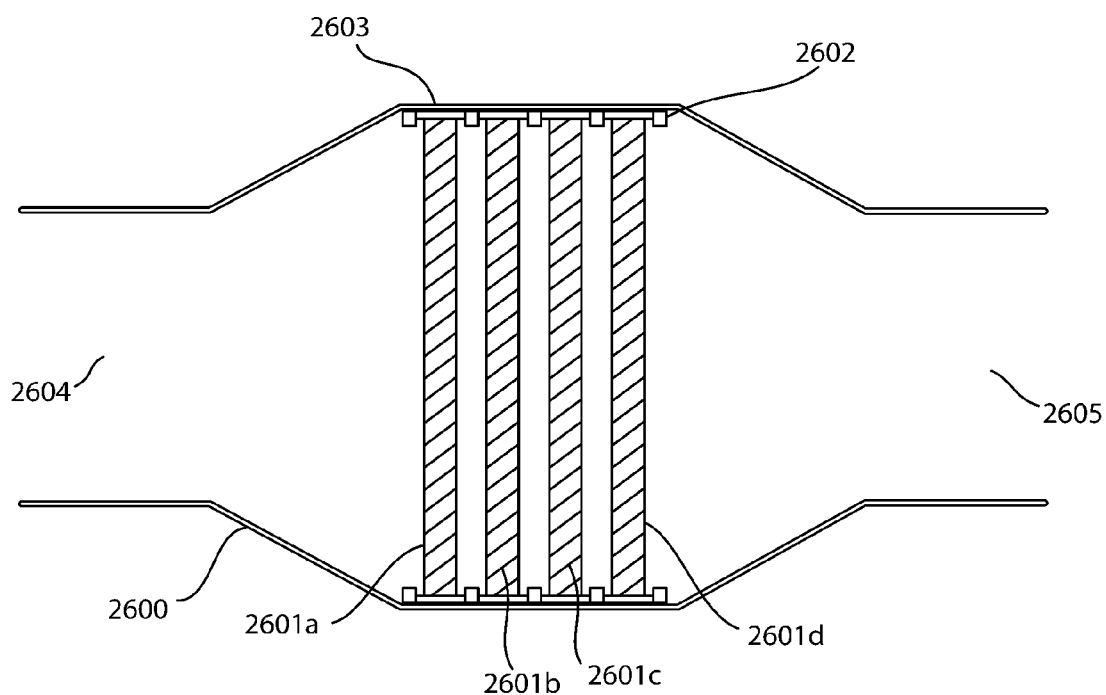
FIG. 26 is a shows a schematic of a catalytic converter or particular filter 2600 having four substrates 2601a, 2601b, 2601c, and 2601d arranged in a parallel fashion. The filter or converter has a frontal opening 2604 and an rear exit 2605.

An activity test measures the amount of pollutants entering and exiting the filter. In an activity test, a sample filter is placed in a reactor and gases of a known flow rate and temperature are pumped through the material. The activity test then measures the amount of pollutants exiting the filter. Referring to FIG. 24, an activity test of an exemplary substrate 2410 of the present invention and a sample of cordierite 2420 is shown. The test measured the activity of toluene at a concentration of 500 ppm and space velocity of 40,000 per hour. The cell density of the two samples were both 400 cpsi.

The test illustrates that the substrate 2410 of the present invention has a faster light off time and at a significantly lower temperature than the cordierite sample 2420. Substrate 2410 achieved 85% destruction at a temperature about 335 degrees Fahrenheit in about three to four seconds. Cordierite 2420 achieved 85% destruction at about 380 degrees Fahrenheit. Substrate 2410 then achieved 90% destruction at about 360 degrees Fahrenheit in about four to five seconds. Cordierite 2420 achieved 90% destruction at about 450 degrees Fahrenheit in about eight seconds. Substrate 2410 achieved substantially 100% destruction at about 425 degrees Fahrenheit in about five seconds. Cordierite 2420 is projected to achieve substantially 100% destruction at about 800 degrees Fahrenheit in about 28 seconds.

Example 9

Permeability of a Catalytic Substrate

The permeability of an exemplary embodiment of Example 2 of the present invention is approximately 1093 cd (centidarcies). Other testing values were over the maximum number measured by the testing equipment. In comparison to conventional systems, a sample of cordierite has a permeability of about 268 cd.

Example 10

Testing a Catalytic Converter of Example 2

Similar to an activity test, the EPA utilizes a test known as Federal Test Procedure ("FTP") 75 that actually mounts the filter on the tailpipe of a car and drives the car under specified conditions. The EPA uses this test for emission certification of vehicles. FTP 75 tests the conditions of the vehicle in three phases. The first phase includes crank and non-idle hold and driving for 505 seconds. This phase reflects conditions experienced at the beginning of a trip when the engine and the emission control system begin operation at ambient temperature and are not performing at optimum levels (i.e., the catalyst is cold and has not reached the "light off" temperature needed to efficiently control emissions coming from the engine) until part way through the trip. The second phase includes 864 seconds of driving with a non-idle hold, shutdown, and five extra sampling seconds. This phase reflects the condition of the engine when the vehicle has been in continuous operation long enough for all systems to have attained stable operating temperatures. The vehicle then has a soak time between 540 seconds and 660 seconds. This soak time reflects the condition of an engine that has been turned off and has not cooled to ambient conditions. The third phase is a crank and non-idle hold and driving for 505 seconds. Under these circumstances, the engine and catalyst are warm and, although not at peak operating efficiency when started, still have significantly improved emissions performance relative to the cold start mode.

Example 11

Thermal Testing of a Catalytic Substrate

The thermal conductivity of an exemplary embodiment of the present invention is approximately 0.0604 W/m-K (Watts of energy per meter thick and Kelvin changed). By comparison, a sample of cordierite is about 1.3 to 1.8 W/m-K. These results indicate that, if 1000 Watts of heat energy is lost from a given volume of cordierite material, only 33 Watts would be lost from the same volume of the material from the present invention. Thus, the material of the present invention has a thermal conductivity thirty times greater than cordierite.

The specific heat of an exemplary embodiment of the present invention is approximately 640 J/kg-K (Joules per kilogram-Kelvin). A sample of cordierite is about 750 J/kg-K. Even though the cordierite has a greater specific heat, cordierite filters have a greater mass to heat up. The result is more heat energy is needed to reach operating temperature making the cordierite less efficient.

A multiple use temperature limit is the maximum temperature in which a substance can be subjected a plurality of times without any degradation. The higher the temperature a substrate can continue to operate without micro-fractures or spallation, the less chance of the substrate breaking or cracking over time. This in turn means the substrate is more durable over a wider temperature range. A higher temperature limit is preferred.

The multiple use temperature limit of an exemplary embodiment of the present invention is 2,980 degrees Celsius. A sample of cordierite is about 1,400 degrees Celsius. Thus, the material of the present invention can withstand more than twice the temperature than cordierite before breaking down. This permits the material to function in a greater range of exhaust environments.

The coefficient of thermal expansion is a ratio of the increase of the length (linear coefficient), area (superficial), or volume of a body for a given rise in temperature (usually for zero to one degree Celsius) to the original length, area, or volume, respectively. These three coefficients are approximately in the ratio 1:2:3. When not specifically expressed, the cubical coefficient is usually intended. The less a substrate will expand when heated, the less chance of leaking, fracturing, or damage to filter assembly. A lower thermal expansion is preferred to ensure that the substrate keeps its dimensions even when heated or cooled.

The coefficient of thermal expansion for an exemplary embodiment of the present invention is approximately $2.65 \times 10^{-7}/°$ C.). A sample of cordierite is about $2.5 \times 10^{-6}/°$ C. to $3.0 \times 10^{-6}/°$ C. The thermal expansion of the material of the present invention is less than ten times that of cordierite.

The coefficient of thermal expansion of the substrate is preferably, in one embodiment, compatible with the coefficient of thermal expansion of the washcoat. If the coefficient of thermal expansion is not similar, the washcoat will spallate, delaminate, "flake" or peel off the substrate, resulting in the precious metals being blown away or plugging the pore spaces. This would eventually lead to increased backpressure, overheating and system failure.

Example 13

Structural Integrity

The tensile modulus of AETB-12 is approximately 2.21 MPa (mega-Pascal of pressure which equals approximately 22.1 times the pressure of one atmosphere of pressure). A sample of cordierite is about 25.0 MPa. Although the cordierite is about ten times stronger, the material of the present invention can withstand 22.1 atmospheres of pressure before rupture. This value is sufficient for uses described herein.

Example 13

Acoustical Testing

Acoustic attenuation may be defined as either the diminution of thickness, thinness, emaciation; diminution of density; diminution of force or intensity; or weakening. In one embodiment of the present invention, the acoustic attenuation is the substrate's ability to attenuate or dampen acoustic energy in engine exhaust. A substrate of the present invention can replace or compliment an engine's muffler assembly, as disclosed herein, thus decreasing exhaust noise and exhaust system costs. A higher acoustic attenuation is preferred.

Currently, there are no accredited laboratory tests that can be applied to the present invention in any configuration. All American Society for Testing and Materials ("ASTM") acoustical tests are applied to a large space such as a soundproofed room and not a material. However, in simple test using a sound meter, the noise from automobiles was found to be at least 25 decibels less than conventionally muffled vehicles when a substrate of the present invention is in the exhaust system. For reference, 110 decibels is the level that will cause permanent damage to human ears, and 60 decibels is the amount of noise in a luxury automobile at idle with the windows rolled up.

Example 14

Comparison to Prior Art Substrates

A sample of a suitable nSiRF-C (AETB-12) was compared to cordierite and SiC, measuring a number of attributes.

|  | AETB-12 | Cordierite | Silicon Carbide (SiC) |
|---|---|---|---|
| Thermal Conductivity | 6.04 × 10$_{-2}$ W/m-K | 1.3-1.8 W/m-K | 20 W/mK |
| Specific Heat | 640 J/kg-K | 750 J/kg-K | 950 J/kg-K |
| Density | 0.2465 gm/cc | 2-2.1 gm/cc | 3.2 gm/cc |
| Emissivity | 0.88 | .13 | .90 |
| Axial Strength | 2.21 Mpa | 2.5 Mpa | 18.6 Mpa |
| Noise Attenuation at 3500 rpm | 74 db | 100 db | 100 db |
| Porosity | 97.26% | 18-42% | 30-40% |
| Permeability | 1093-∞ cd | 268 cd | 6.65 cd |
| Regeneration Time | 0.75 sec | 2 min-20 hrs | 50 sec-20 hrs |
| Surface Area | 88,622 in$^2$ | 847 in$^2$ | 847 in$^2$ |
| Melting Point | 3,000° C. | 1,400° C. | 2400 |
| Thermal Expansion (CTE) | 0.25 × 10−7 1/C | 0.7 × 10−6 1/C | 4-5 × 10−6 1/C |

Example 15

In one embodiment, the substrate of the present invention has 600 cpsi with 6 mil walls. The cell density of a sample substrate of the present invention is compared with two samples of cordierite. In comparison, the first and second cordierite samples are 100 cpsi with 17 mil wall thickness and 200 cpsi with 12 mil wall thickness, respectively. In comparison, the substrate of the present invention in this embodiment has 600 cpsi with 6 mil walls.

In this exemplary embodiment, the substrate is drilled with 0.04 inch diameter channels spaced every 0.06 inches across the entire filter. These channels are smaller than conventional cordierite channels. The result is vastly increased surface area as compared to cordierite, even without taking into consideration the surface area existing in the massive pore space of the substrate material. The channels are preferably "blind" channels. Exhaust emission is forced to pass through the channel walls, rather than flowing in and out of the channels without reacting with the catalyst.

The channels are drilled using a CNC drill, which is computer controlled to maintain uniformity. The drilling process is performed under a constant water shower to prevent dust from becoming airborne, which is an OSHA hazard, and may get into the bearings of the drill and destroy it.

The drilled substrate is oven dried to drive or bake off any water or other liquid that may reside in the pore space before any catalytic applications. Baking time is not variable and evaporation of the water can be determined by simply weighing the substrate. Baking time primarily speeds up the dewatering process. After heating the filter element for several different intervals, the weight will level off and the substrate is ready for any catalyst or coating application.

Glossary

The term "substrate" as used herein refers to a solid surface on which pollutants can be converted to nonpollutants. A substrate is understood to include a filter element, catalytic substrate, or filtering substrate.

The term "sintered" as used herein refers to material that has been heated without melting.

The term "non-woven" as used herein means that there is no interlacing or interweaving pattern of fibers present.

The term "billet" as used herein refers to an unshaped or unmachined block of substrate material.

The term "green billet" as used herein refers to a billet that has not been cured.

The term "frontal surface" as used herein refers to surface through which the fluid enters the substrate. In certain embodiments, the channels have openings in the frontal surface and the channels are perpendicular to the frontal surface.

The term "rear surface" as used herein refers to the surface through which the fluid exits the substrate. In certain embodiments, the channels have openings in the rear surface and the channels are perpendicular to the rear surface.

The term "mil" as used herein refers to a unit of measurement and is equivalent to a thousandth of an inch.

The term "light off temperature" as used herein refers to the temperature at which conversion of the reaction in catalytic converter is 50%. That is, the light off temperature is the temperature at which 50% of one or more pollutants, or alternatively total pollutants, are converted into nonpollutants.

The term "burn off" as used herein refers to a process of combusting particulate matter and other material that is filtered by a substrate. For example, burn off may occur in a diesel particulate filter (DPF).

The term "channel" as used herein refers to a three-dimensional opening in the substrate that extends through at least a portion of the substrate and has a definitive shape and length.

The term "channels per square inch" as used herein refers to the number of channels present in a cross-sectional square inch of the substrate. The term cells per square inch is synonymous.

The term "channel shape" as used herein refers to the three-dimensional shape of the channel.

The term "PM" as used herein refers to particulate matter. Common measurements of PM include PM-10 and PM-2.5.

The term "gross surface area" as used herein is the total surface area and represents the total surface area that precious metals can be impregnated onto in one cubic inch.

The term "2-way catalytic converter" as used herein refers to a catalytic converter that only oxidizes the gas-phase pollution of HC and CO to $CO_2$ and $H_2O$.

The term "3-way catalytic converter" as used herein refers to a catalytic converter that oxidizes CO and HC to $CO_2$ and $H_2O$ and also reduces $NO_x$ to $N_2$.

The term "4-way catalytic converter" as used herein refers to a catalytic converter that performs the oxidation and reduction as described for a 3-way catalytic converter but also traps particulates to burn them off (regeneration can occur in active or passive mode).

The term "suitable for use" as used herein refers meeting the requirements of particular regulatory guidelines.

The term "thermal conductivity" as used herein refers to the quantity of heat that passes in unit time through unit area of a plate of a given material, when its opposite faces are subject to unit temperature gradient (e.g., one degree temperature difference across a thickness of one unit).

The term "matting" as used herein generally refers to any material that is used to provide insulation and/or protection to a substrate. Matting is sometimes also referred to as batting.

The term "boron binder" as used herein refers to an agent present in a nSiRF-C after the sintering process and that is derived from a boron biding agent.

The term "pecking" as used herein refers to a process of forming or reshaping a channel in a substrate by way of repeatedly forcing a tine into and out of a substrate material until the desired length of the channel is obtained.

Having now fully described this invention, it will be understood by those of ordinary skill in the art that the same can be performed within a wide and equivalent range of conditions, formulations and other parameters without affecting the scope of the invention or any embodiment thereof. All patents and publications cited herein are fully incorporated by reference herein in their entirety.

What is claimed is:

1. A substrate comprising:
bonded ceramic fibers forming a rigid non-woven matrix, wherein the ceramic fibers are bonded by a sintering process;
pore space of greater than 60% in the substrate;
a plurality of channels in the substrate, wherein the channels are in a cellular configuration; and
wherein the substrate is a non-pleated construction forming a filter or catalytic converter.

2. The substrate according to claim 1, wherein said substrate comprises aluminoborosilicate fibers, silica fibers, or alumina fibers.

3. The substrate according to claim 1, wherein said substrate comprises an alumina enhanced thermal barrier ceramic.

4. The substrate according to claim 1, wherein said substrate comprises an OCTB ceramic.

5. The substrate according to claim 1, wherein said substrate comprises a FRCI ceramic.

6. The substrate according to claim 1, wherein said substrate comprises from about 5% to about 50% of alumina.

7. The substrate according to claim 1, wherein said substrate comprises from about 50% to about 90% of silica.

8. The substrate according to claim 1, wherein said substrate comprises from about 10% to about 25% aluminoborosilicate.

9. The substrate according to claim 1, wherein said substrate comprises fibers comprising $Al_2O_3$, $SiO_2$, and $B_2O_3$, said fibers having a melting point of from about 1600° C. to about 2000° C. and a refractive index of from about 1.5 to about 1.8.

10. The substrate according to claim 1, wherein said substrate comprises aluminoborosilicate fibers and silica fibers in a ratio of about 19:1 to about 1:19; and boron oxide.

11. The substrate according to claim 1, wherein said substrate is prepared from amorphous silica fibers, amorphous alumina fibers, and about 2% to about 12% boron oxide.

12. The substrate according to claim 1, wherein said substrate comprises a plurality of channels extending through the length of the substrate.

13. The substrate according to claim 1, wherein the cell density of said channels is from about 50 to about 1000 channels per square inch.

14. The substrate according to claim 1, wherein the cell density of said channels is about 200 channels per square inch.

15. The catalytic substrate of claim 1, wherein said channels have a shape selected from the group consisting of square, triangular, and hexagonal.

16. The substrate according to claim 1, having a flow through configuration.

17. The substrate according to claim 1, having a wall-flow configuration.

18. The substrate according to claim 1, wherein the thickness of the walls of said channels is from about 2 to about 20 mils.

19. The substrate according to claim 1, wherein the density of said composite is from about 8 to about 16 pounds per cubic foot.

20. The substrate according to claim 1, further comprising one or more catalysts.

21. The substrate according to claim 20, wherein said catalyst is applied in an amount of about 5 to about 150 g/ft³.

22. The substrate according to claim 20, wherein said one or more catalysts are selected from the group consisting of an oxidation catalyst, a reduction catalyst, a two-way catalyst, a three-way catalyst, a four-way catalyst, a NOx adsorber, and mixtures thereof.

23. The substrate according to claim 20, wherein at least one catalyst is suitable for catalyzing an oxidation reaction of a hydrocarbon.

24. The substrate according to claim 20, wherein at least one catalyst is suitable for catalyzing a reduction reaction of NOx.

25. The substrate according to claim 20, wherein said one or more catalysts are selected from the group consisting of a platinum catalyst, a palladium catalyst, a rhodium catalyst, derivatives thereof, and combinations thereof.

26. The substrate according to claim 20, wherein said catalyst is selected from the group consisting of a chromium catalysts, a nickel catalyst, a rhenium catalyst, a ruthenium catalyst, a silver catalyst, an osmium catalyst, an iridium catalyst, a platinum catalyst, a magnesium catalyst, a gold catalyst, a base metal catalyst, a rare earth metal catalyst, derivatives thereof, and combinations thereof.

27. The substrate according to claim 20, wherein said substrate further comprises a coating applied to the surface of said substrate.

28. The substrate according to claim 27, wherein said coating is applied to the internal surface of said substrate.

29. The substrate according to claim 27, wherein said coating is applied to the external surface of said substrate.

30. The substrate according to claim 27, wherein said coating comprises a toughening coating.

31. The substrate according to claim 27, wherein said coating is a toughened unipiece fibrous insulation (TUFI) coating or a reaction cured glass (RCG) coating.

32. The substrate according to claim 27, wherein said coating comprises a washcoat.

33. The substrate according to claim 27, wherein said coating comprises a toughening coating and a washcoat.

34. The substrate according to claim 1, wherein said substrate has pore space of about 60% to about 85%.

35. The substrate according to claim 1, wherein said substrate has pore space of about 80% to about 90%.

36. The substrate according to claim 1, wherein said substrate is selected from an alumina enhanced thermal barrier ceramic and an OCTB ceramic; said ceramic having a density of from about 8 to about 16 pounds per cubic foot, pore space of about 60% to about 90%, and wherein the density of said plurality of channels is from about 50 to about 1000 channels per square inch, and the thickness of the walls of said channels is from about 1 to about 20 mils.

37. The substrate according to claim 36, further comprising a catalyst.

38. The substrate according to claim 36, further comprising a coating.

39. The substrate of claim 1, wherein said ceramic fibers comprises aluminosilicate fibers.

40. The substrate of claim 39, wherein the aluminosilicate fibers have a ratio of alumina to silica in a range of about 19:1 to about 1:19.

41. The substrate of claim 39, wherein said ceramic fibers further comprises mullite.

42. The substrate of claim 1, wherein said substrate is formed from at least one type of fiber.

43. The substrate of claim 1, wherein said substrate is formed from a plurality of fiber types.

44. The substrate of claim 1, wherein said substrate has both crystalline and glassy phases present.

45. The substrate of claim 1, wherein said substrate is at least 50% crystalline.

46. The substrate of claim 1, wherein said substrate is at least 75% crystalline.

47. The substrate of claim 1, wherein said substrate is about 100% crystalline.

48. The substrate of claim 42, wherein said at least one type of fiber has a length of about 0.1 to about 0.6 inches.

49. The substrate of claim 42, wherein said at least one type of fiber has a diameter of about 1 to about 12 microns.

50. The substrate according to claim 1, wherein the cell density of said channels is about 100 channels per square inch.

51. The catalytic substrate of claim 1, wherein said channels become narrower along the length of the channel.

52. The substrate according to claim 1, wherein said substrate comprises a nonwoven sintered refractory fibrous ceramic composite.

53. A filtering substrate for filtering an exhaust of an internal combustion engine, said filtering substrate comprising:
bonded ceramic fibers forming a rigid non-woven matrix, wherein the ceramic fibers are bonded by a sintering process;
pore space of greater than 60% in the substrate;
a plurality of channels in the substrate, wherein the channels are in a cellular configuration; and
wherein the substrate is a non-pleated construction.

54. The filtering substrate according to claim 53, wherein said filtering substrate is capable of reducing PM-10 emission from an exhaust gas by at least about 50%.

55. The filtering substrate according to claim 53, wherein said filtering substrate is capable of reducing PM-10 emission from an exhaust gas by at least about 80%.

56. The filtering substrate according to claim 53, wherein said composite comprises an alumina enhanced thermal barrier ceramic.

57. The filtering substrate according to claim 53, wherein said filtering substrate comprises a nonwoven sintered refractory fibrous ceramic composite.

58. An improved filtering substrate for an internal combustion engine, wherein the improvement comprises a substrate for hosting a chemical reaction, said substrate having a plurality of honeycomb channels and further comprising a nonwoven sintered refractory fibrous ceramic composite of bonded refractory fibers forming a rigid porous matrix, wherein the composite comprises alumina and silica.

59. The filtering substrate according to claim 58, wherein the ratio of alumina to silica is about 19:1 to about 1:19.

60. The filtering substrate according to claim 58, wherein said composite further comprises mullite.

61. The filtering substrate according to claim 58, wherein the internal combustion engine is located on a vehicle and wherein said vehicle is selected from a group consisting of a heavy duty truck, medium duty truck, light duty truck, passenger automobile, motorcycle, agricultural vehicle, and construction vehicle.

62. The filtering substrate according to claim 58, further comprising a diesel oxidation catalyst, diesel particulate filter catalyst, a NOx adsorber, NOx reduction catalyst, SCR (selective catalytic reduction) catalyst, or a combination thereof.

63. The filtering substrate according to claim 58, wherein the substrate comprising a plurality of channels extending through the substrate.

64. The filtering substrate according to claim 58, wherein the density of the plurality of channels is from about 50 to about 1000 channels per square inch.

65. The filtering substrate according to claim 58, having a flow through configuration.

66. The filtering substrate according to claim 58, having a wall flow configuration.

67. The filtering substrate according to claim 58, wherein the filtering substrate is capable of reducing PM-10 emission h m an exhaust gas by at least 50%.

68. The filtering substrate according to claim 58, wherein the filtering substrate is capable of reducing PM-10 emission from an exhaust gas by at least 80%.

69. An improved exhaust system for an internal combustion engine, wherein the improvement comprises a substrate for hosting a chemical reaction, said substrate having a plurality of honeycomb channels and further comprising a nonwoven sintered refractory fibrous ceramic composite of bonded refractory fibers forming a rigid porous matrix, wherein the composite comprises alumino silicate fibers.

70. The improvement according to claim 69, wherein the aluminosilicate fibers have a ratio of alumina to silica in the range of about 19:1 to about 1:19.

71. The improvement according to claim 69, wherein said composite further comprises mullite.

72. The improvement according to claim 69, wherein the said substrate further comprises a catalyst.

73. The improvement according to claim 69, further comprising a structure adapted to hold the substrate.

74. The improvement according to claim 69, wherein the structure is a matting.

75. The improvement according to claim 74, wherein the matting further comprises intumescent matting, conventional mating, reduced vermiculite matting, non-intumescent matting, or a hybrid thereof.

76. The improvement according to claim 69, wherein the structure is a canister.

77. The improvement according to claim 72, wherein the catalyst is adapted to catalyze an oxidation reaction, a reduction reaction, or a combination thereof.

* * * * *